US006271641B1

(12) United States Patent
Yasohara et al.

(10) Patent No.: US 6,271,641 B1
(45) Date of Patent: Aug. 7, 2001

(54) STEP MOTOR DRIVING DEVICE

(75) Inventors: Masahiro Yasohara, Hyogo; Masakazu Senoh, Tottori, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/476,317

(22) Filed: Dec. 30, 1999

(30) Foreign Application Priority Data

| | | |
|---|---|---|
| Mar. 29, 1999 | (JP) | 11-085833 |
| Apr. 9, 1999 | (JP) | 11-102264 |
| May 7, 1999 | (JP) | 11-126627 |

(51) Int. Cl.[7] .......... G05B 19/40

(52) U.S. Cl. .......... 318/685; 318/696; 318/671; 318/714; 318/567

(58) Field of Search .......... 318/685, 696, 318/671, 714, 567

(56) References Cited

U.S. PATENT DOCUMENTS

| | | | | |
|---|---|---|---|---|
| 5,006,772 | * | 4/1991 | Danby | 318/696 |
| 5,059,883 | * | 10/1991 | Takahashi | 318/696 |
| 5,278,481 | * | 1/1994 | Danbury | 318/685 |
| 5,291,111 | * | 3/1994 | Hirano | 318/563 |
| 5,485,070 | * | 1/1996 | Tominaga | 318/696 |
| 5,825,151 | * | 10/1998 | Ikawa | 318/685 |
| 5,914,580 | * | 6/1999 | Senoh | 318/696 |
| 5,963,005 | * | 10/1999 | Yamaji | 318/685 |

FOREIGN PATENT DOCUMENTS

| | | |
|---|---|---|
| 41-9489 | 5/1966 | (JP) . |
| 07059395 | 3/1995 | (JP) . |
| 11-262297 | 9/1999 | (JP) . |

* cited by examiner

*Primary Examiner*—Bentsu Ro
*Assistant Examiner*—Tyrone Smith
(74) *Attorney, Agent, or Firm*—Ratner & Prestia

(57) ABSTRACT

A step-motor-driving device includes (a) a step-motor having driving-windings in plurality of phases, (b) an exciter for supplying power to excite driving-windings, (c) a position detector for detecting a position of a mover of the motor and outputs a position-detecting-signal, and (d) an excitation-timing-controller for receiving a driving-instruction-signal and a position-detecting-signal, and outputs an exciting signal to the exciter responsive to an input of one of the driving-instruction-signal and the position-detecting-signal. The excitation-timing-controller outputs the exciting signal responding an input of the driving-instruction-signal when an excitation-switch of the driving-winding responsive to the driving-instruction-signal directs torque in a direction effective for the motor to rotate in a desirable direction, and the controller outputs the exciting signal responding an input of the position-detecting-signal when the excitation-switch of the driving-winding responsive to the driving-instruction-signal directs torque in an unfavorable direction for the motor to rotate in the desirable direction. This structure allows the step-motor-driving device to be free from jumping "out of sync".

45 Claims, 80 Drawing Sheets

CS-A= CS-Ap
CS-B= CS-Bp
DrA= CK-Ap IN-A
DrB= CK-Bp IN-B
RN-A
RP-A
RN-B
RP-B
X1
X2
advance
advance
t
θ
T
Ref
-Ta+Tb
-Ta-Tb
Ta-Tb
Ta+Tb
t11
t21
t31

CS-A= CS-Ap
CS-B= CS-Bp
DrA= CK-Ap IN-A
DrB= CK-Bp IN-B
RN-A
RP-A
RN-B
RP-B
Ref
X1
X2
t
θ
T
-Ta+Tb
-Ta-Tb
Ta-Tb
Ta+Tb
t11
t21
t31

CS-A= CS-Ap
CS-B= CS-Bp
DrA= CK-Ap IN-A
DrB= CK-Bp IN-B
RN-A
RP-A
RN-B
RP-B
Ref
X1
X2
delay
delay
t
T
-θ
Travr
-Ta+Tb
Ta-Tb
-Ta-Tb
-Ta+Tb
t11r
t21r
t31r CS-A= CS-Ap
CS-B= CS-Bp
DrA= CK-Ap IN-A
DrB= CK-Bp IN-B
RN-A
RP-A
RN-B
RP-B
Ref
X1
X2
t
T
-θ
Travr
Ta+Tb
Ta-Tb
-Ta-Tb
-Ta+Tb
t11r
t21r
t31r CS-A= CS-Ad CS-Ap
CS-B= CS-Bd CS-Bp
DrA= CK-Ad CK-Ap
DrB= CK-Bd CK-Bp
IN-A
IN-B
RN-A
RP-A
RN-B
RP-B
X1
X2
t
θ
T
Ref
-Ta+Tb
-Ta-Tb
Ta-Tb
Ta+Tb
t11 t12
t21 t22
t31 t32

CS-A= CS-Ad CS-Ap
CS-B= CS-Bd CS-Bp
DrA= CK-Ad CK-Ap
DrB= CK-Bd CK-Bp
IN-A
IN-B
RN-A
RP-A
RN-B
RP-B
advance
advance
X1
X2
t
θ
T
Ref
-Ta+Tb
-Ta-Tb
Ta-Tb
Ta+Tb
t11 t12
t21 t22
t31 t32

STEP MOTOR DRIVING DEVICE

FIELD OF THE INVENTION

The present invention relates to a novel step motor driving device which drives a step motor free from jumping out of synchronism

BACKGROUND OF THE INVENTION

Step motors have been recently used in numbers of office automation apparatuses and computer peripherals such as printers, facsimile machines, image scanners, copying machines, laser beam printers and the like, as well as factory automation equipment including machine tools. The step motors are thus now extensively used both in applications and quantity, because an extremely simple and extraordinarily inexpensive system employing a step motor can perform a speed control or a positioning control.

FIG. 73A and FIG. 73B illustrate a construction and a circuit diagram of a conventional step-motor-driving device in accordance with a first conventional instance.

In FIG. 73A, two-phase step motor 801 includes two-phase driving windings, which are hereinafter referred to as phase-A winding and phase-B winding. Exciters 802*a* and 802*b* receive driving-instruction-signals DrA, DrB, thereby exciting phase-A winding and phase-B winding.

As shown in FIG. 73B, exciter 802*a* comprises a bridge circuit formed by four transistors, and this circuit works as follows: When input IN-A is at H level, output A takes H level and output /A takes L level. When input IN-A is at L level, output A takes L level and output /A takes H level. In other words, when input IN-A is at H level, a voltage VDC of dc current (not shown) allows the current to flow in plus direction, i.e. flowing from A to /A. When input IN-A is at L level, the voltage VDC allows the current to flow in minus direction, i.e. from /A to A. Another exciter 802*b* is identical to exciter 802*a* both in construction and operation.

On-delay circuits 811–814 (Dly) are provided as shown in FIG. 73B in order to prevent the transistor switches—making up the bridge circuit—from shorting the power supply by an error.

In FIGS. 73A and 73B, a plus voltage VDC is applied between inputs A and /A of exciter 802*a* when signal DrA is at H level. This voltage excites phase-A winding to be plus. On the other hand, a minus voltage VDC is applied between inputs A and /A when signal DrA is at L level, and this voltage excites phase-A winding to be minus. Phase-B winding excited by exciter 802*b* experiences the same phenomena as discussed above.

FIGS. 74A–74D illustrate an operation of the conventional motor driving device employed in the first conventional instance.

FIG. 74A illustrates relation between mover's position θ and torque T generated there, where torque T is obtained by providing the driving windings of motor 801 with a given excitation. The relations between position θ and torque T in respective instances are expressed in FIG. 74A as follows:

Ta: phase-A winding is excited to be plus;

Th: phase-B winding is excited to be plus;

−Ta: phase-A winding is excited to be minus; and

−Tb: phase-B winding is excited to be minus.

When the mover travels in positive direction, mover's position θ corresponds to the rightward direction in FIG. 74A, and when the mover travels in negative direction, it corresponds to the leftward direction in FIG. 74A. Regarding torque T, a forward direction allows the mover to travel in the positive direction and a reverse direction allows the mover to travel in the negative direction. The torque in the forward direction heads upper side of FIG. 74A.

In FIG. 74A, a torque generated by exciting the phase-A winding has a difference of 90-degree electrical angle from a torque generated by exciting the phase-B winding. Because driving windings of respective phases are mounted with a shift of 90-degree electrical angle with regard to polarity pitch of the mover.

FIG. 74B illustrates a relation between mover's position θ and torque T generated there by exciting both phase-A and phase-B windings (2-phase exciting drive). The relations between θ and T in respective instances in FIG. 74B are expressed as follows:

Ta+Th: phase-A and phase-B windings are excited to be plus;

−Ta+Tb: phase-A winding is excited to be minus and phase-B winding is excited to be plus;

−Ta−Tb: phase-A and phase-B windings are excited to be minus; and

Ta−Tb: phase-A winding is excited to be plus and phase-B winding is excited to be minus.

Each instance discussed above is a composite of each torque shown in FIG. 74A. Regarding mover's position θ and the direction of torque, FIG. 74B expresses them in the same manner as FIG. 74A does.

According to the above description regarding the step motor, it is roughly concluded that a relation between mover's position θ and torque T generated there can be uniquely determined when the driving windings of respective phases are excited to a given level.

FIG. 74C illustrates driving instruction signals DrA, DrB are fed, with 90 degree out of phase, into exciter 802*a* and 802*b*, and FIG. 74D illustrates how motor 801 works with these driving instructions.

Before time t1, since signals DrA, DrB are at H level, both phase-A and phase-B windings are excited to be plus, and torque “Ta+Th” drives the mover during this plus period. At time t1, when signal DrA changes from H level to L level, the polarity of exciting phase-A winding changes so that torque changes to be expressed “−Ta+Tb” and turns to the forward direction again. Due to these changes, the mover is further driven in the same (positive) direction until time t2 when signal DrB changes from H level to L level.

At time t2, when signal DrB changes from H level to L level, the polarity of exciting phase-B winding changes so that torque changes to be expressed “−Ta−Tb” and turns to the forward direction again. The mover is then further driven in the same (positive) direction without pause.

In the same manner, at time t3, t4 and t5, whenever signals DrA, DrB change, the polarities of exciting phase-A and phase-B windings alternately change so that torque changes to be expressed “Ta−Tb”, “Ta+Tb”, and “−Ta+Tb” and turns to the forward direction sequentially. The mover is thus kept driving in the same (positive) direction.

The first conventional step motor driving device operates as discussed above. In this first conventional instance, when the frequencies of signals DrA, DrB increase, the torque for driving the mover of the motor lowers so quick that the mover loses speed. As a result, the motor jumps out of synchronism.

There are two major factors for the motor to jump out of synchronism:

1. Inductance of driving windings affects the current to be insufficient for exciting the windings so that a desirable torque cannot be generated. Several methods have been proposed to overcome this factor. For example, a method of putting a series resistor in order to reduce electrical time constant of the windings, and a method of boosting a driving voltage temporarily to establish an exciting current quickly, were proposed. Another method is disclosed in the Japanese Patent Application Examined Publication No. S41-9489, i.e. a driving voltage is changed responsive to a frequency of a driving instruction signal.

2. A switch timing of exciting the windings is off the relation between the mover's position θ determined by excitation of the windings and torque T generated there. This second factor is described hereinafter with reference to FIGS. 75A–75D.

FIGS. 75A and 75B illustrate relations between the mover's position θ and torque T generated there when the windings of respective phases are excited. Those FIGS. are identical to FIGS. 74A and 74B.

Assume that driving instruction signals DrA, DrB, of which frequencies are higher than those shown in FIG. 74C, are fed to be exciting signals IN-A and IN-B into exciters as shown in FIG. 75C.

Signals DrA, DrB switch the direction of respective excitations applied to the driving windings, thereby generating a torque as illustrated in FIG. 75D.

Before time tr1, the excitation-change turns torque T to forward direction; however, when the frequencies of signals DrA, DrB are at high, torque T is eventually turned to reverse direction as happened at time tr1. This is because the excitation has been changed at a timing regardless of the relation between position θ and torque T generated there.

After time tr1, if the frequencies of signals DrA, DrB stay at high, torque T further turns to the reverse direction, and the mover consequently loses the driving torque and loses speed, then the motor jumps out of synchronism, and finally the motor stops.

When these two factors for "out of "synchronism" are compared, the "out of "synchronism" due to the second factor, i.e. timing of excitation-change to the windings, is often observed before the "out of synchronism" due to the first factor, i.e. inductance of windings. In other words, the second factor is the principal factor of the "out of synchronism".

FIG. 76 is a circuit diagram of a conventional step motor driving device in accordance with a second prior art.

In FIG. 76, two-phase step motor 801 includes two-phase driving windings, i.e. phase-A winding and phase-B winding. Exciters 802*a* and 802*b* receive driving-instruction-signals DrA, DrB, thereby exciting phase-A winding and phase-B winding.

Exciters 802*a* and 802*b* receive a constant voltage Vr as current-value-signals Ref-A and Ref-B. These signals control the maximum exciting current of respective phase-windings.

Exciters 802*a* comprises, as shown in FIG. 77, a bridge circuit formed by four transistors and current controller 815 (CL), and this bridge circuit works as follows: When input IN-A is at H level, output A takes H level and output /A takes L level. When input IN-A is at L level, output A takes L level and output /A takes H level. In other words, when input IN-A is at H level, a voltage VDC of dc current (not shown) allows the current to flow in plus direction, i.e. flowing from A to /A. When input IN-A is at L level, the voltage VDC allows the current to flow in minus direction, i.e. from /A to A.

Current controller 815 controls the maximum exciting current of phase-A winding of motor 801 so that the current can be determined by current value signal Ref-A.

In other words, when an exciting current of phase-A winding, which is detected by current-detection-resistor 816 (R), reaches the value indicated by current value signal Ref-A, RS flip-flop 818 is set, thereby changing outputs A and /A to H level. At this moment, the voltage applied to phase-A winding becomes substantially zero so that an exciting current can be kept at a constant value corresponding to Ref-A by an effect of the winding inductance. Oscillator 819 (OSC) resets RS flip-flop 818 periodically thereby applying a voltage to the winding. Oscillator 819 thus prevents the exciting current from attenuating due to inner loss and the like. Another exciter 802*b* operates in the same way as exciter 802*a*.

On-delay circuits 811–814 (Dly) are provided in FIG. 77 in order to w prevent the transistor switches—making up the bridge circuit—from shorting the power supply by an error. Filter 817 (Fil) is provided in order to remove noises appearing when the exciting current of the driving windings is detected by current detecting resistor 816 (R).

Plus voltage VDC is thus applied between inputs A and /A of exciter 802*a* when driving instruction signal DrA is at H level. This voltage excites phase-A winding to be plus. On the other hand, a minus voltage VDC is applied between inputs A and /A when signal DrA is at L level, and this voltage excites phase-A winding to be minus. In both the cases, the maximum exciting current of the windings is regulated with the value determined by current-value-signal Ref-A, i.e. Vr. Phase-B winding excited by exciter 802*b* experiences the same phenomena as discussed above.

FIGS. 78A–78D illustrate an operation of the conventional motor driving device employed in the second conventional instance.

FIG. 78A illustrates relation between mover's position θ and torque T generated there, where torque T is obtained by providing the driving windings of motor 801 with a given excitation. This is identical to the first prior art shown in FIG. 74A.

FIG. 78B illustrates a relation between mover's position θ and torque T generated there by exciting both phase-A and phase-B windings (2-phase exciting drive). This is identical to the first prior art shown in FIG. 74B.

FIG. 78C illustrates driving instruction signals DrA, DrB are fed, with 90 degree out of phase, into exciter 802*a* and 802*b*, and FIG. 78D illustrates how motor 801 works with these driving instructions.

Before time t1, since signals DrA, DrB are at H level, both phase-A and phase-B windings are excited to be plus, and torque "−Ta+Tb" drives the mover during this plus period. At time t1, when signal DrA changes from H level to L level, the polarity of exciting phase-A winding changes so that torque changes to be expressed "−Ta+Th" and turns to the forward direction. Due to these changes, the mover is further driven in the same (positive) direction until time t2 when signal DrB changes from H level to L level.

At time t2, when signal DrB changes from H level to L level, the polarity of exciting phase-B winding changes so that torque changes to be expressed "−Ta−Th" and turns to the forward direction again. The mover is then further driven in the same (positive) direction.

In the same manner, at time t3, t4 and t5, every time signals DrA, DrB change, the polarities of exciting phase-A and phase-B windings alternately change so that torque changes to be expressed "Ta−Tb", "Ta+Tb", and "−Ta+Tb" and turns to the forward direction sequentially. The mover is thus kept driving in the same (positive) direction without pause. The conventional step motor driving device in accordance with the second conventional instance operates as discussed above.

In this second conventional instance, ripples generated when the mover is driven are tremendously large as shown in FIG. 78D, and the large ripples boost vibrations, noises, and variations of rotational speed. This is because the mover is driven by the exciting current at a constant level.

In other words, since the "out of synchronism" is one of inherence of the step motor, torque margin should be provided enough not to invite the "out of synchronism" for driving the motor. For this purpose, an exciting current or a driving voltage of windings should be set, in general, at a greater value to a certain extent, namely, at a level where the exciting current of the windings can obtain a starting torque. In this case, a normal operation carries too heavy exciting current because the normal operation carries a smaller load than the starting time. As a result, as shown in FIG. 78D, ripples of the torque generated is obliged to be greater than the torque ripple at the normal operation.

Further, the heavy exciting current produces greater heat in the motor and lowers the efficiency.

When the frequencies of driving instruction signals DrA, DrB of the step motor driving device of the second conventional instance increases in the same way as the first conventional instance, the torque for driving the mover decreases rapidly, whereby the mover loses speed and then jumps out of sync.

A factor of this phenomenon is the same as that of the first conventional instance.

A switch timing of exciting the windings is off the relation between the mover's position θ determined by excitation of the windings and torque T generated there. The "out of sync." due to this factor is described hereinafter with reference to FIGS. 79A–79D.

FIGS. 79A and 79B illustrate a relation between the mover's position θ and torque T generated there when the windings of respective phases are excited. Those FIGS. are identical to FIGS. 78A and 78B.

Assume that driving instruction signals DrA, DrB, of which frequencies are higher than those shown in FIG. 78C, are fed into exciters as exciting signals IN-A and IN-B as shown in FIG. 79C.

Signals DrA, DrB switch the respective excitations applied to the driving windings, thereby generating a torque as illustrated in FIG. 79D.

Before time tr1, the excitation-change turns torque T to forward direction; however, when the frequencies of signals DrA, DrB are at high, torque T is eventually turned to reverse direction as happened at time tr1. This is because the excitation has been changed at a timing regardless of the relation between position θ and torque T generated there.

After time tr1, if the frequencies of signals DrA, DrB stay at high, torque T further turns to the reverse direction, and the mover consequently loses the driving torque and loses speed, then the motor jumps out of synchronism, and finally the motor stops.

The Japanese Patent Application Non-Examined Publication H07-59395 discloses the following driving method that intends to avoid the "out of sync" discussed in the first and second conventional instances.

In a step motor, of which rotor is driven by switching a phase to be excited following a driving instruction signal, when the relation of $-\pi/2N<(\theta cmd-\theta lag-\theta rot)<\pi/2N$, is satisfied, $\theta ex=\theta cmd$ should be established, where, N=number of rotor teeth;

θcmd=instructed position determined by an instruction pulse;

θrot=position of the rotor;

θex=instructed excitation position; and

θlag=a delay angle between θex (instructed excitation position) and θm (actual excited position).

When the relation of $\pi/2N<(\theta cmd-\theta lag-\theta rot)$ is satisfied, $\theta ex=\theta rot+\theta lag+\pi/2N$, should be established.

When the relation of $-\pi/2N>(\theta cmd-\theta lag-\theta rot)$ is satisfied, $\theta ex=\theta rot+\theta lag-\pi/2N$, should be established.

FIG. 80 is a block diagram illustrating a third conventional instance of a driving circuit of a step motor.

This prior art allows the step motor to work as a normal step motor when the motor is not subject to jumping "out of sync". However, the driving circuit induces the motor to function as a dc motor once the motor encounters "out of sync" so that the motor can pursue an instructed position with its maximum torque. After the motor catches the instructed position, the driving circuit restores the motor to the normal operation. As discussed above, this prior art discloses a method for preventing the motor from jumping "out of sync".

This prior art, however, requires rotor-position-detecting signals supplied from rotary encoder 902 having a high resolution in order to actualize itself. Because the rotor position "θrot" should be finely detected in the range from $-\pi/2N$ to $\pi/2N$, namely the threshold values of the respective formulae, (i.e. between −90 and +90 degree of electrical angle) for determining instructed-excitation-position "θex" by the formulae discussed above corresponding to respective cases. Within this range, if the rotor position is detected with a poor resolution of 1–2 pulses, due to this rough accuracy of position detection, although this rotor position allows the motor to rotate free from jumping "out of sync" even if the equation of $\theta ex=\theta cmd$ is satisfied, the motor is actually driven by the maximum torque as if it were a dc motor based on an assumption of $\theta ex=\theta rot+\theta lag+\pi/2N$ being satisfied. On the contrary, although a rotor position needs to satisfy the equation of $\theta ex=\theta rot+\theta lag+\pi/2N$ in order to avoid jumping "out of sync", the step motor is driven based on $\theta ex=\theta cmd$ thereby lowering the torque substantially. As such, the motor sometimes performs in a contradictory manner to what is disclosed by this prior art.

The Japanese Patent Application Non-examined Publication No. H011-262297 discloses an art embodying a controller of a step-motor based on this prior art. This has been published after the present invention (the part claiming a priority) was filed with the Japanese Patent Office. As this publication discloses, an encoder used as a position detector needs a resolution of 1,000 pulses per rotation (it is converted to 10 pulses within the range of between −90 and +90 degree of electrical angle).

In other words, the conventional step-motor-driving device including this prior art discussed above essentially needs a rotary encoder having a high resolution, such as a resolver, which makes the device bulky and expensive.

SUMMARY OF THE INVENTION

A first aspect of the present invention is to eliminate a factor of jumping out of sync, i.e. off timing of exciting the driving windings from a relation between a mover position determined by exciting the driving winding and a torque generated there, and aims to provide a novel step-motor-driving device free from "out of sync".

A step-motor-driving device of the present invention comprises the following elements:

(a) a step motor having driving windings for a plurality of phases;

(b) exciters supplying power for exciting the driving windings;

(c) position detectors which detect a position of a mover of the step motor, and then output a position detecting signal;

(d) excitation-timing controllers which receive a driving instruction signal and the position detecting signal, and then output an exciting signal responsive to one of these two kinds of signals to the exciter.

The excitation-timing controllers have a structure performing the following two functions:

(1) outputting exciting signals responsive to respective input timings of the driving-instruction-signals, when the driving windings are switched by driving-instruction-signals so that a torque is directed toward a direction effective to drive the step motor in a desirable direction.

(2) outputting exciting signals responsive to input timings of the position-detecting-signals, when the driving windings are switched by driving-instruction-signals so that a torque is directed toward a direction to drive the step motor in an undesirable direction.

This structure allows the driving system to control the step motor free from "out of sync", i.e. it avoids losing speed due to decreasing a torque when driving instruction signals are fed with higher frequencies.

A second aspect of the present invention is to regulate the exciting current in the driving windings not to be excessive to provide a step motor of high-efficiency and low heat-dissipation, and having little ripple torque, low noise, and little vibrations as well as little variations in the rotational speed besides the advantage described in the first aspect.

Another step-motor-driving device of the present invention comprises the following elements:

(a) a step motor having driving windings for a plurality of phases;

(b) position detectors which detect a position of a mover of the step motor, and then output a position detecting signal;

(c) exciters supplying power for exciting the driving windings;

Each exciter receives an exciting signal and a current value signal, switches the excitation of the driving windings responding to the exciting signal, and determines the maximum exciting current of the driving windings with the current value signal.

(d) an excitation current controller which supplies exciting current control signals as current value signals of the exciters, responsive to a phase difference between a driving instruction signal and the position detecting signal, to the exciter.

This excitation current controller has a structure performing the following two functions:

(1) changing an exciting current control signal responsive to a phase difference between a driving-instruction-signal and a position detecting signal, thereby reducing the maximum exciting current of the driving windings, when the driving windings are switched by the driving-instruction-signals so that a torque is directed toward a direction effective to drive the step motor in a desirable direction.

(2) changing an exciting current control signal responsive to a phase difference between a driving-instruction-signal and a position detecting signal, thereby increasing the maximum exciting current of the driving windings, when the driving windings are switched by the driving-instruction-signals so that the torque is directed toward a direction to drive the step motor in an undesirable direction.

This structure allows the driving device to regulate the exciting current of the driving windings not to be excessive, and to realize a step motor of high-efficiency and low heat-dissipation, with little torque ripple, low noise, little vibrations and little rotating-speed-variations. This driving device also realizes a step motor strongly withstanding the "out of sync".

A third aspect of the present invention is, firstly to provide a step motor free from "out of sync" by eliminating the factors thereof previously discussed, and secondly to provide a step motor of high-efficiency and low heat-dissipation, with little torque ripple, low noise, little vibrations and little rotating-speed-variations. This driving device also realizes a step motor strongly withstanding the "out of sync".

Still another step-motor-driving device comprises the following elements:

(a) a step motor having driving windings for a plurality of phases;

(b) exciters supplying power for exciting the driving windings;

(c) position detectors which detect a position of a mover of the step motor, and then output a position detecting signal;

(d) excitation-timing controllers which receive a driving instruction signal and the position detecting signal, and output an exciting signal responding to one of these two kinds of signals to the exciter.

Each excitation-timing controller includes the following elements:

(d-1) a delay-signal selector which outputs a signal of later arrival out of the driving instruction signals and the position detecting signals when the step motor is driven in a positive direction, and which outputs a signal of later arrival out of the driving instruction signal and a reversed position detecting signal when the step-motor is driven in a negative direction;

(d-2) a deviation detector which detects a difference between numbers of pulses, i.e. a number of pulses by the driving instruction signal and a number of pulses by the position detecting signal. In other words, this deviation detector sorts the motor condition into the following three statuses according to the difference in numbers of the pulses: A first status is that the deviation falls within a given range. A second status is that the deviation falls outside the given range and requires a forwardly-directed torque which induces the mover of the step-motor to move in the positive direction so that the deviation falls within the given range. A third status is that the deviation falls outside the given range and requires a reversely-directed torque which induces the mover to move in the negative direction so that the deviation falls within the given range; and (d-3) an exciting signal selector which selects—based on a detection result—an exciting signal out of an output signal supplied from the delay signal selector, the position detecting signal and the reversed position detecting signal.

The exciting signal selector has a structure performing the following functions:

(1) selecting an output signal supplied from the delay signal selector as an exciting signal when the deviation detector detects the first status;

(2) selecting the position detecting signal as the exciting signal when the deviation detector detects the second status; and (3) selecting the reversed position detecting signal as the exciting signal when the deviation detector detects the third status.

This structure allows the step-motor-driving device to control the step-motor so that the mover avoids losing speed due to decreasing of a torque of the motor, when the driving instruction signal is fed with higher frequencies. As a result, the step motor can avoid the "out of sync".

DETAILED DESCRIPTION OF THE INVENTION

Exemplary embodiments of the present invention are demonstrated hereinafter with reference to the accompanying drawings.

Exemplary Embodiment 1

Figure 1:
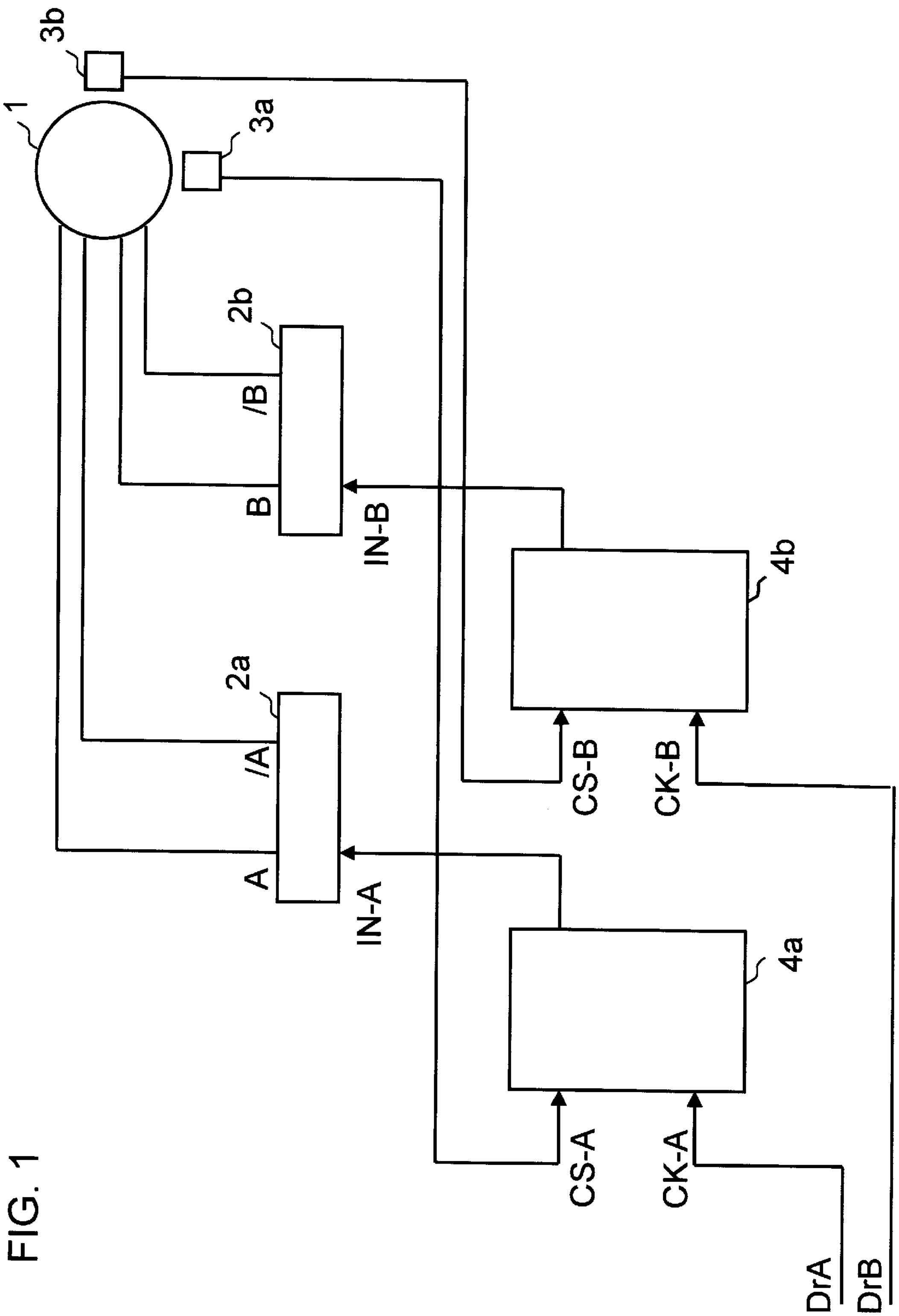
FIG. 1 illustrates a structure of a step-motor-driving device in accordance with a first exemplary embodiment.

FIG. 1 illustrates a structure of a step-motor-driving device in accordance with the first exemplary embodiment.

In FIG. 1, two-phase step-motor 1 includes a stator (not shown) and a rotor (not shown) functioning as a mover and both are disposed via an annular space in between. The stator is provided with two-phase driving windings (hereinafter referred to as phase-A winding and phase-B winding). The rotor is formed by a solid cylindrical magnet, and a motor shaft extends through the center of the magnet in an axial direction. On the outer wall of this magnet, N and S poles are alternately magnetized in the quantity of 24 poles, namely, 12 pairs in total. Phase-A and phase-B windings of the stator are disposed so that the two windings have a 90 degree phase-shift in electrical angle. These two windings receive respectively a forward current or a reverse current. Motor 1 thus has 48 standing points per rotation.

Exciters 2*a* and 2*b* receive signals IN-A and IN-B from outside thereby exciting phase-A and phase-B windings.

Position detectors 3*a* and 3*b* are formed by e.g. Hall elements, and the detectors detect a position of the rotor of motor 1 by detecting N and S poles of a position-detecting-magnet which is disposed to rotate together with the rotor. This position-detecting-magnet is magnetized in N and S poles alternately in the quantity of 24 poles as same as the rotor, and are disposed correspondingly to the rotor.

Position detectors 3*a* and 3*b* can directly detect N and S poles of the rotor magnet thereby detecting the rotor position, whereby the position-detecting-magnet can be eliminated.

Hereinafter, the rotor is referred to as a mover in the description.

Excitation timing controllers 4*a* and 4*b* receive the position detecting signals supplied from position detectors 3*a* and 3*b* at their respective input terminals CA-A and CS-B. Controllers 4*a* and 4*b* also receive driving-instruction-signals DrA, DrB at their another input terminals CK-A, CK-B. Output signals from controllers 4*a* and 4*b* are fed into input terminals IN-A, IN-B of respective exciters 2*a* and 2*b*.

Figure 73A:
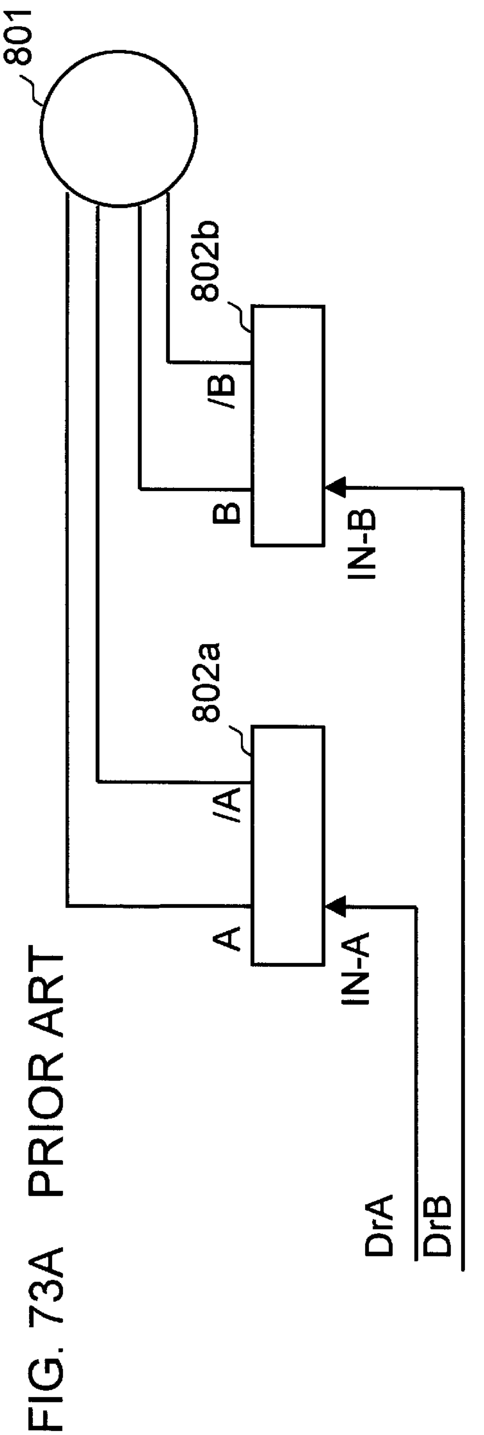
FIGS. 73A and 73B illustrates a structure of a step-motor-driving device in accordance with a first conventional instance.
Figure 73B:
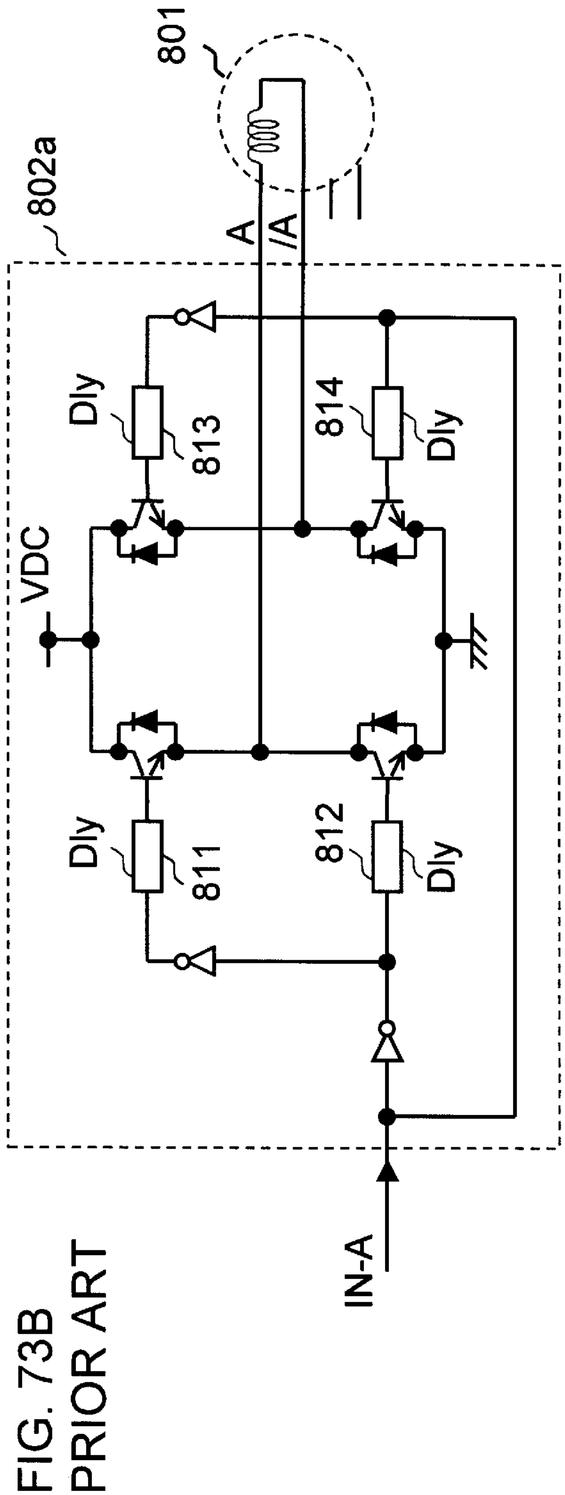
Figures 74A, 74B, 74C, 74D:
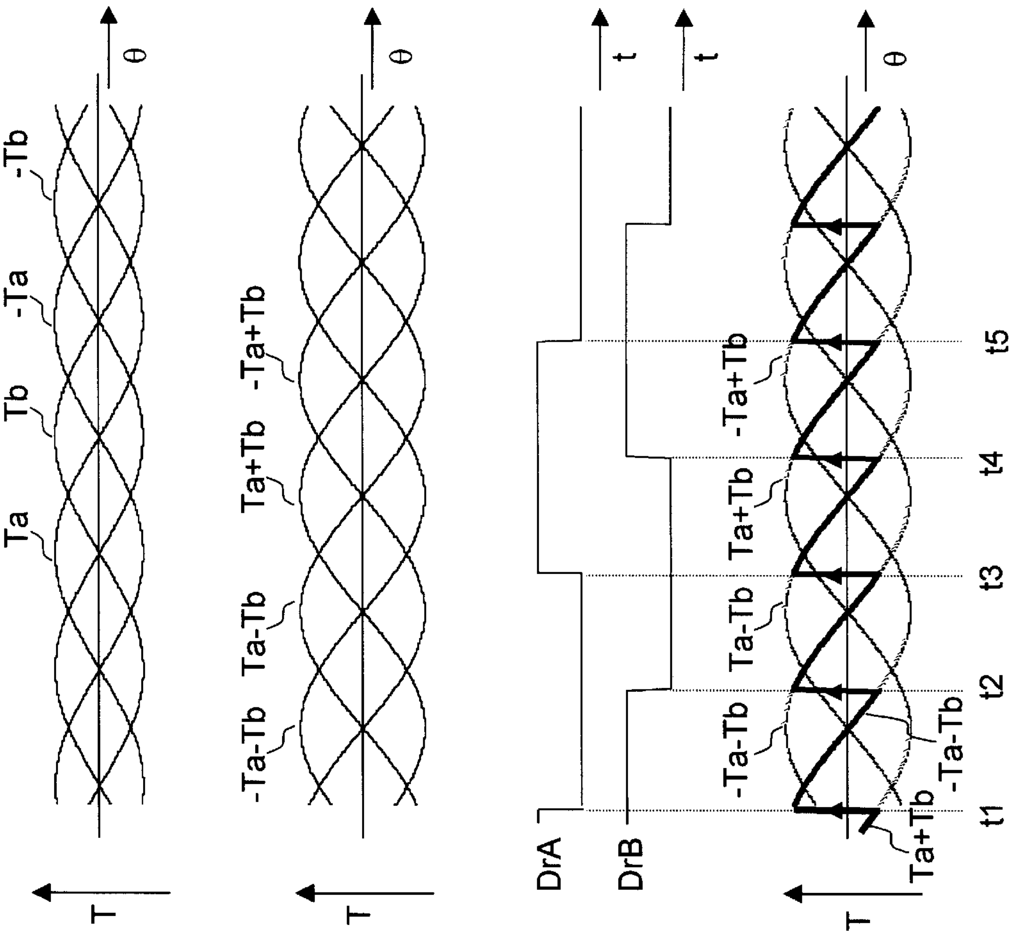
FIGS. 74A, 74B, 74C and 74D illustrate an operation of the step-motor-driving device in accordance with the first conventional instance.
Figures 75A, 75B, 75C, 75D:
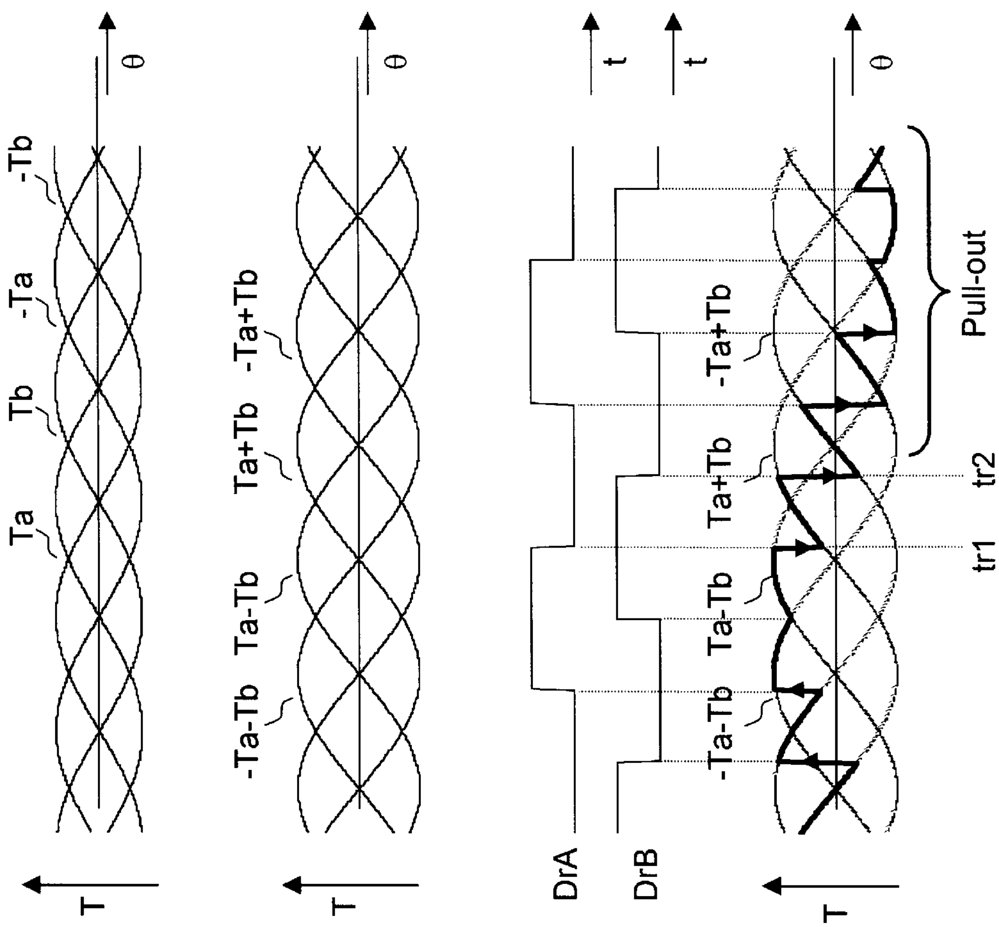
FIGS. 75A, 75B, 75C and 75D illustrate how the step-motor jumps out of sync in the first conventional instances.

One major difference between the first embodiment and a conventional instance can be read from FIG. 1 and FIG. 73 as follows: In the conventional instance, driving instruction signals DrA, DrB are directly supplied to exciters 802*a* and 802*b*, while in the first embodiment, controllers 4*a* and 4*b* output exciting signals IN-A, IN-B to exciters 2*a* and 2*b*, where both the exciting signals have undergone timing control by using the information of position-detecting-signals CS-A, CS-B.

The step-motor-driving device in accordance with the first exemplary embodiment is demonstrated hereinafter with reference to FIGS. 2A, 2B, 3A, 3B, 4A and 4B.

Several relations between mover's position θ and torque T are described in these Figs., and the following general rule is applied to the descriptions in this specification:

Mover's position θ: mover's forward movement in positive direction corresponds to the rightward direction in Figs., and mover's backward movement in negative direction corresponds to the leftward direction in Figs.

Torque T generated: Inducing the mover to move in the positive direction, torque T is directed in a forward direction. Inducing the mover to move in the negative direction, torque T is directed in a reverse direction. Torque T directing forwardly corresponds to an upward direction in Figs.

Figure 2A:
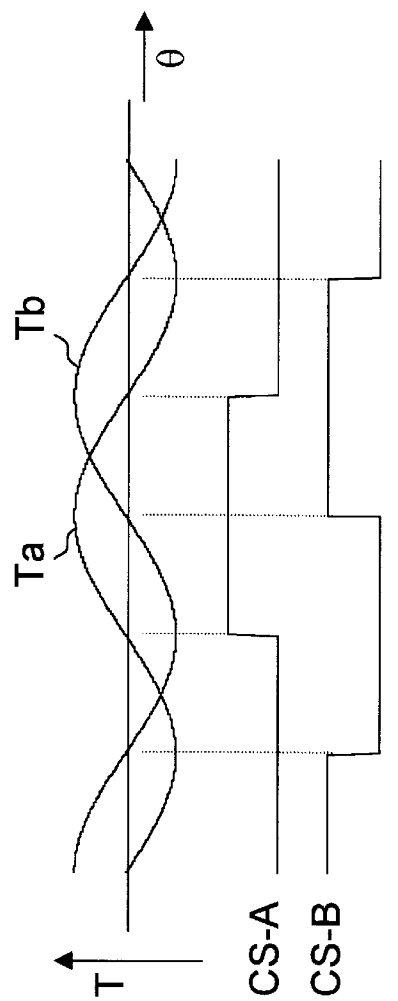
FIGS. 2A and 2B illustrate a relation between a torque generated and a position-detecting-signal, with regard to a mover position of a step-motor, in accordance with the first exemplary embodiment, a third, fourth and fifth exemplary embodiments.
Figure 2B:
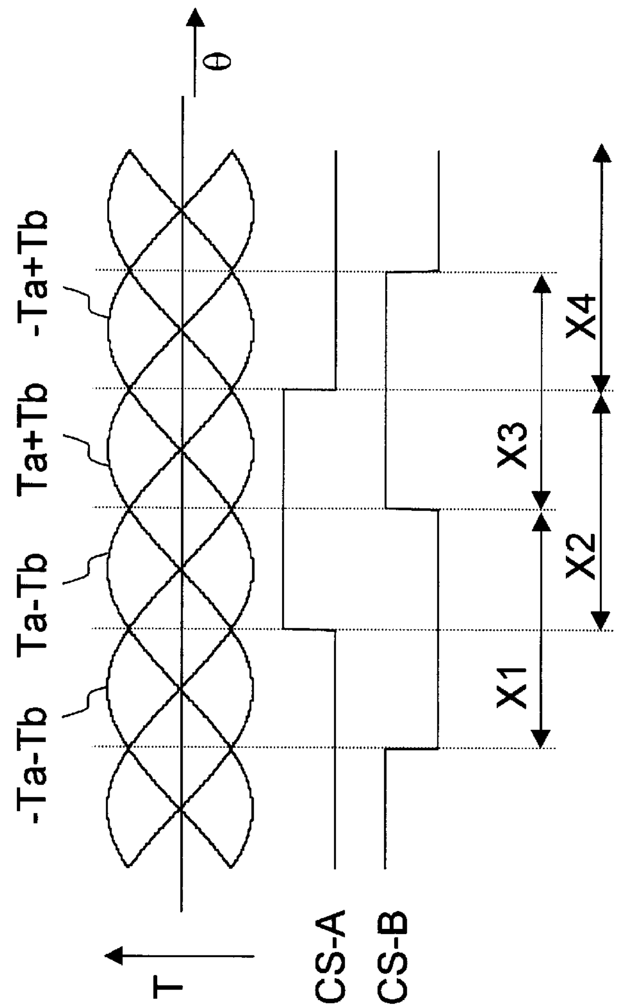

FIGS. 2A and 2B illustrate the relation between the input signals CS-A and CS-B supplied to controllers 4*a* and 4*b* and the torque generated at exciting the respective phase-windings.

Position detectors 3*a* and 3*b* are mounted to step-motor 1 so that position detecting signals CS-A and CS-B therefrom are generated at the timing shown in FIG. 2A then fed into excitation-timing-controllers 4*a* and 4*b*.

In other words, position detector 3*a* is mounted to motor 1 so that signal CS-A turns to level H when phase-A windings are excited to generate forward-torque Ta, and the signal turns to level L when reverse-torque "−Ta" is generated. In the same manner, position detector 3*b* is mounted to motor 1 so that signal CS-B turns to level H when phase-B windings are excited to generate forward-torque Th, and the signal turns to level L when reverse-torque "−Tb" is generated.

In the case that signals CS-A, CS-B are generated at such timings as discussed above, when motor 1 is driven by exciting both phase-A and phase-B windings (two-phase-excitation driving), the relation between generating the timing of signals CS-A, CS-B and the torque generated ("−Ta+Tb", "−Ta−Tb", "Ta−Tb", and "Ta+Tb") based on the combination of exciting directions of respective phase-windings is illustrated in FIG. 2*b*.

The relation between the torque generated by exciting the phase-windings and signals CS-A, CS-B produced in detectors 3*a* and 3*b* and fed into controller 4*a* and 4*b* has been discussed. An operation of controllers 4*a* and 4*b* is demonstrated hereinafter based on this relation.

In order to make the long story short, the operation during period X1 is demonstrated.

FIG. 3 illustrates an operation of excitation-timing-controllers 4*a* and 4*b* during period X1. In FIG. 3, the case when the mover is driven in the positive direction is demonstrated.

During period X1, signal CS-A turns to level H from level L, and signal CS-B stays at level L.

Figure 3B:
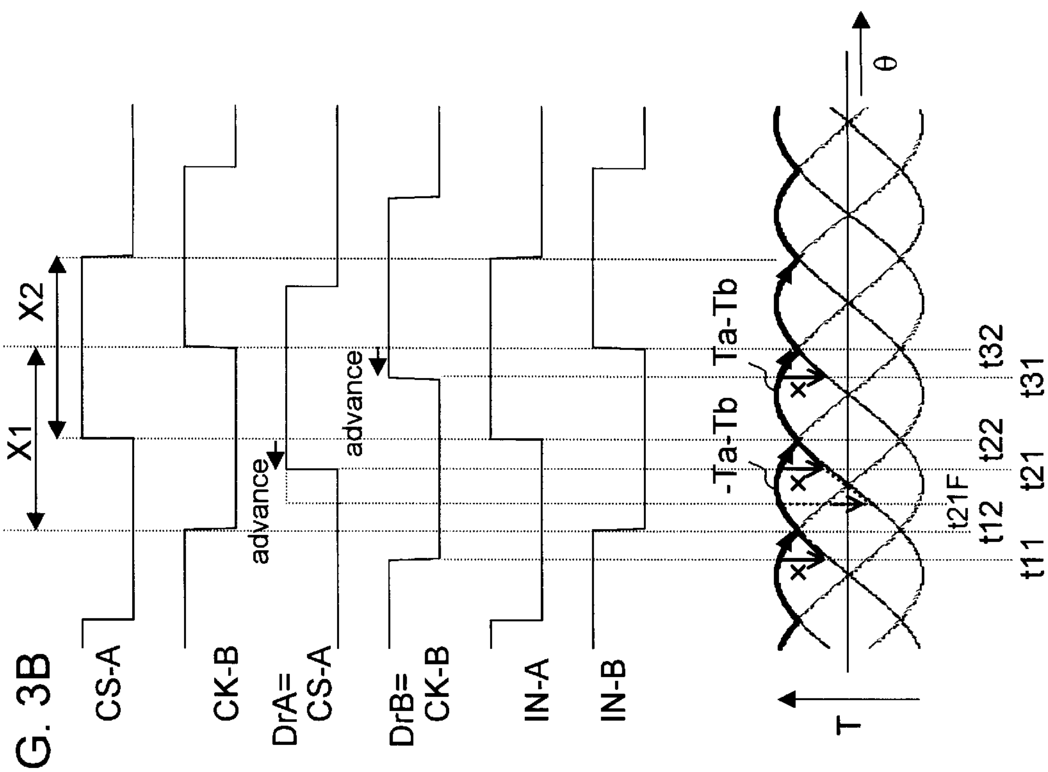
FIGS. 3A and 3B illustrate an operation at driving the motor in a positive direction in accordance with the first exemplary embodiment.
Figure 3A:
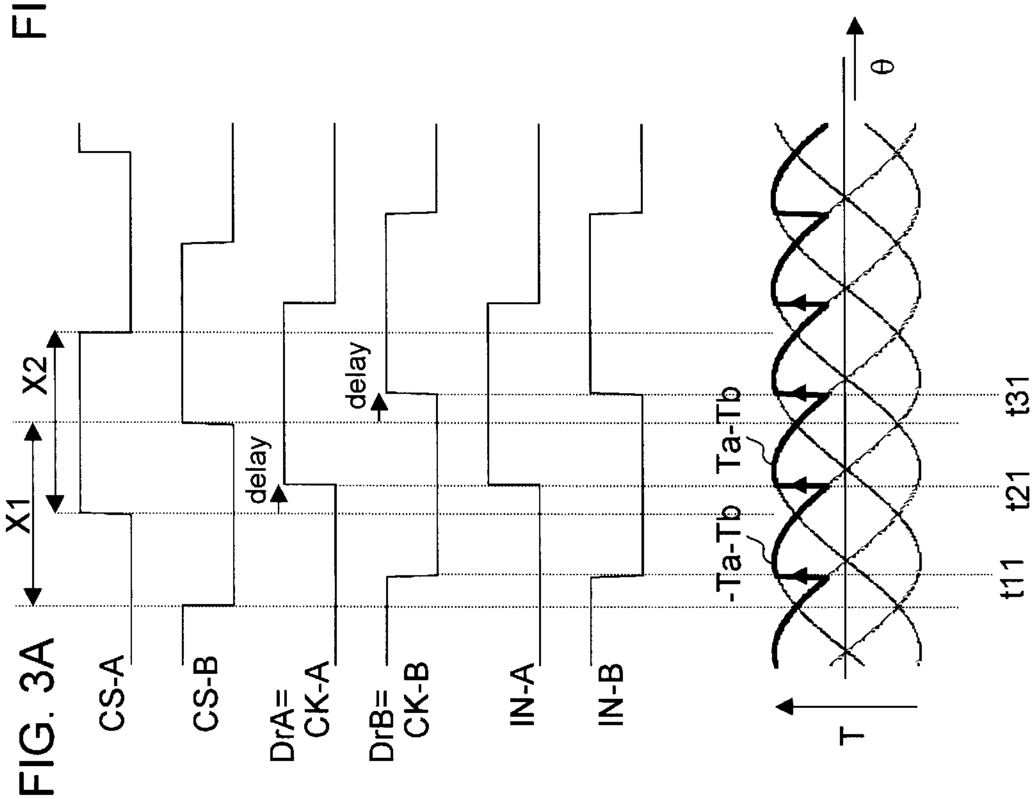

A first instance is shown in FIG. 3A, i.e. when driving-instruction-signals DrA, DrB are fed into controllers 4*a* and 4*b* at its input terminals CK-A, CK-B with a delay from signals CS-A, CS-B in phases, excitation-timing-controllers 4*a* and 4*b* operate as follows (low frequencies of signals DrA, DrB induce such an operation).

In FIG. 3A, signal CK-A turns to level H from level L at timing t21. Just before timing t21, exciting signals IN-A, In-B are both at level L, and exciters 2*a* and 2*b* excite phase-A and phase-B windings to be minus based on these signals. The mover thus receives the torque expressed with "−Ta−Tb".

Signal CK-A turns to level H from level L at timing t21, and if controller 4*a* operates so that this turning is supplied to exciter 2*a* at its input terminal IN-A, phase-A winding is excited to be plus whereby the mover receives the torque "Ta−Tb".

The torque applying to the mover at timing t21 increases its value in the forward direction comparing with that of just before t21. In other words, the switch of signal IN-A is effective for the mover to be kept driving in the positive direction.

As such, controller 4*a* operates to supply signal CK-A to exciter 2*a* at its input terminal IN-A when a switch of exciting the phase-A winding with signal CK-A, i.e. driving-instruction-signal DrA, is effective for the mover to be kept driving.

The same phenomenon can be seen at timings t11 and t31 in FIG. 3A, i.e. signal CK-B changes at these timings, and assume that controller 4*b* operates to output these changes to exciter 2*b* at its input terminal IN-B. Then excitation of phase-B winding changes thereby increasing the torque applied to the mover in the forward direction comparing with that of just before these timings. In other words, it is effective to produce exciting signal IN-B based on signal CK-B at timings t11 and t31 for the mover to be kept driving in the positive direction.

Controller 4*b* operates, like controller 4*a*, to supply signal CK-B to exciter 2*b* at its input terminal IN-B when a switch of exciting the phase-B winding with signal CK-B, i.e. driving-instruction-signal DrB, is effective for the mover to be kept driving.

A second instance is shown in FIG. 3B, i.e. when driving-instruction-signals DrA, DrB are fed into controllers 4*a* and 4*b* at its input terminals CK-A, CK-B with an advance from signals CS-A and CS-B in phases, excitation-timingcontrollers 4*a* and 4*b* operate as follows (high frequencies of signals DrA, DrB induce such an operation).

In FIG. 3B, signal CK-A turns to level H from level L at timing t21. Just before timing t21, exciting signals IN-A and IN-B are both on level L, and exciters 2*a* and 2*b* excite phase-A and phase-B windings to be minus based on these signals. Accordingly, the mover receives the torque expressed with "−Ta−Tb".

Signal CK-A turns to level H from level L at timing t21, and if controller 4*a* operates so that this turning is supplied to exciter 2*a* at its input terminal IN-A, phase-A winding is excited to be plus whereby the mover receives the torque "Ta−Tb".

The torque applying to the mover at timing t21 is directed in the forward direction in value; however, the torque decreases in the reverse direction comparing with the status just before timing t21. The change of exciting signal IN-A is unfavorable for the mover to be kept driving in the positive direction. This change is marked with x in FIG. 3B. Such an unfavorable change induces "out of sync" as already discussed in the conventional instances 1 and 2.

Further, when a turning point of signal CK-A is moved up to timing t21F, the torque is directed in the reverse direction in value, thereby further increasing the chances for "out of sync".

As such, controller 4*a* operates not to supply signal CK-A directly to exciter 2*a* at its input terminal IN-A when a switch of exciting the phase-A winding with signal CK-A, i.e. driving-instruction-signal DrA, is unfavorable for the mover to be kept driving, but it operates instead to supply signal CS-A produced by position detector 3*a* as an exciting signal to exciter 2*a* at its input terminal IN-A.

This operation by controller 4*a* allows the excitation of phase-A winding to change at timing t22 when signal CS-A turns to level H from level L. As a result, the maximum torque level is obtainable for the mover to be kept driving in the positive direction as shown in FIG. 3B. This clears away a fear of "out of sync".

The same phenomenon can be seen at timings t11 and t31 in FIG. 3B, i.e. signal CK-B changes at these timings, and assume that controller 4*b* operates to output this change to exciter 2*b* at its input terminal IN-B. Then excitation of phase-B winding changes thereby decreasing the torque applied to the mover in the reverse direction comparing with that of just before these timings. In other words, it is unfavorable to produce exciting signal IN-B at timings t11 and t31 based on signal CK-B for the mover to be kept driving in the positive direction.

As such, controller 4*b* operates not to supply signal CK-B directly to exciter 2*b* at its input terminal IN-B when a switch of exciting the phase-B winding with signal CK-B, i.e. driving-instruction-signal DrB, is unfavorable for the mover to be kept driving, but it operates instead to supply signal CS-B, produced by position detector 3b, as an exciting signal to exciter 2*b* at its input terminal IN-B.

This operation by controller 4*b* allows the excitation of phase-B winding to change at timing t12 or t32 when signal CS-B changes. As a result, the maximum torque level is obtainable for the mover to be kept driving in the positive direction as shown in FIG. 3B. This clears away a fear of "out of sync".

The operation during period X1 discussed above is also applicable to other periods X2, X3 and X4 shown in FIG. 2B.

The operation of excitation-timing-controllers 4*a* and 4*b* at the driving of the motor in the positive direction is summarized as follows:

When the excitation of respective phases' windings of motor 1 is switched with input signals CK-A, CK-B, i.e. driving-instruction-signals DrA, DrB, the resultant torque is directed in the reverse direction so that the mover is adversely affected to be kept driving in the positive direction. In this case, controllers 4*a* and 4*b* supply input signal CS-A and CS-B, i.e. the signals produced by position detectors 3*a* and 3*b*, as exciting signals to exciters 2*a* and 2*b*. On the other hand, if the resultant torque is not directed in the reverse direction but is still effective for the mover to be kept driving in the positive direction, controllers 4*a* and 4*b* supply input signal CK-A, CK-B, i.e. driving-instruction-signals DrA, DrB, as exciting signals to exciters 2*a* and 2*b*.

The instance of driving the motor in the positive direction has been demonstrated with reference to FIGS. 3A and 3B, and the same description is applicable to an instance of driving the motor in the negative direction.

Figure 4B:
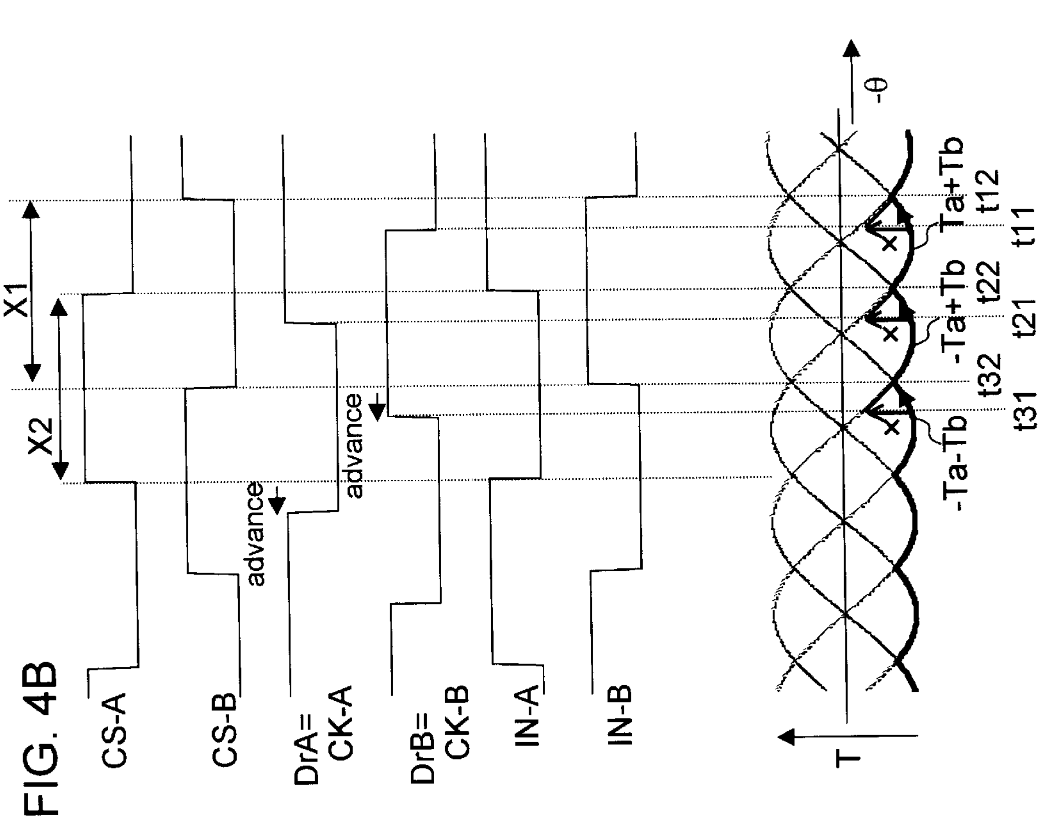
FIGS. 4A and 4B illustrate an operation at driving the motor in a negative direction in accordance with the first exemplary embodiment.
Figure 4A:
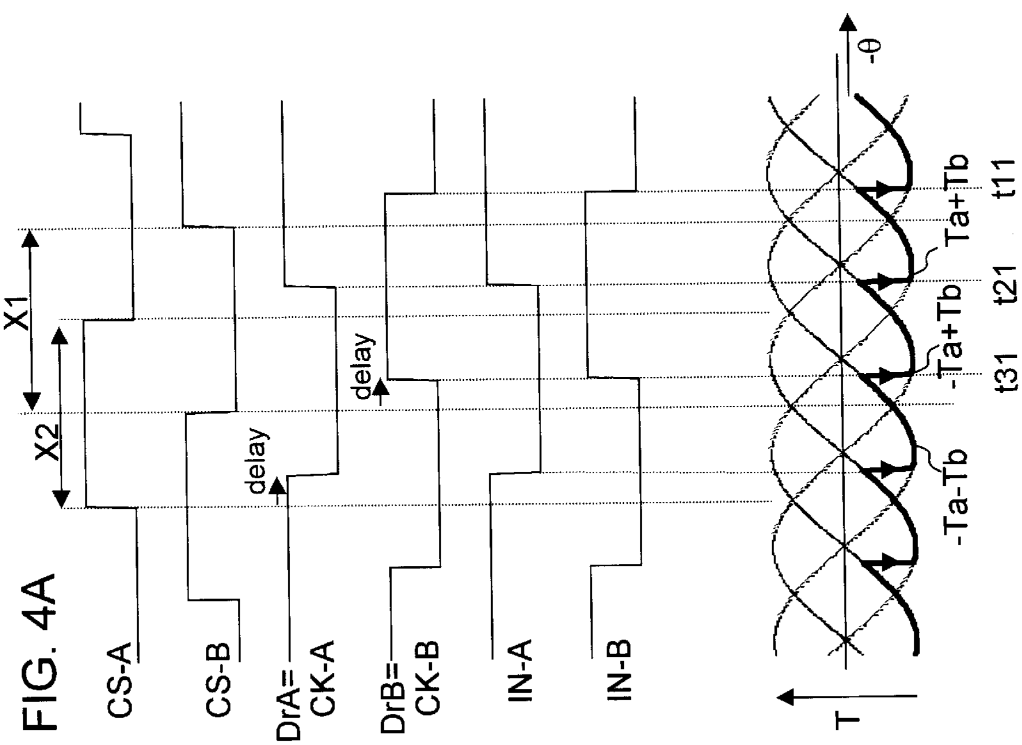

FIGS. 4A and 4B illustrate an operation of driving the mover in the negative direction, and focus on period X1 as FIGS. 3A and 3B did.

In FIGS. 4A and 4B, mover's position θ is described in the direction reversed to that in FIGS. 3A and 3B. In other words, the instance of driving the mover in the negative direction corresponds to the rightward direction in FIGS. 4A and 4B, and the instance of driving the mover in the positive direction corresponds to the leftward direction in FIGS. 4A and 4B. Torque T is expressed in the same manner as FIGS. 3A and 3B.

When the mover is driven in the negative direction, the operation is essentially the same as the instance of driving in the positive direction except the following points: Phases of signals CK-A, CK-B, i.e. driving instruction signals DrA, DrB, are reversed. Then the delays and advances of signals DrA, DrB with regard to position-detecting-signals CS-A and CS-B are related to the signals reversed to signals CS-A and CS-B. Detailed description of this instance is thus omitted here.

These two exceptions discussed above have the following objectives: Reversing the phases of signals DrA, DrB intends to reverse a rotational direction of the magnetic field produced by the driving windings. Relating the delays and advances of signals DrA, DrB with regard to the signals reversed to signals CS-A and CS-B intends to direct a reversely directed torque T in a desired direction in order to drive the mover in the negative direction.

The operation of controllers 4*a* and 4*b* is summarized as follows:

When the mover is driven in the negative direction, controllers 4*a* and 4*b* switch the excitation of phases' driving windings responsive to input signals CK-A, CK-B. In this instance, when a resultant torque is directed forwardly and affects favorably the mover to be kept driving in the negative direction, controllers 4*a* and 4*b* output the signals reversed to CS-A and CS-B, i.e. signals produced by position detectors 3*a* and 3*b*, as exciting signals to exciters 2*a* and 2*b*. Also in the same instance, when a resultant torque is not directed to forward direction and still affects favorably the mover to be kept driving in the negative direction, controllers 4*a* and 4*b* output signals CK-A, CK-B, i.e. driving-instruction-signals DrA, Dr B, as exciting signals to exciters 2*a* and 2*b*.

Controllers 4*a* and 4*b* operable as discussed above allow a step-motor-driving device to be free from "out of sync" without damaging the features of the step-motors.

In other words, when driving instruction signals DrA, DrB carry a rather low frequency, motor 1 is driven in accordance with the statuses shown in FIG. 3A or FIG. 4A.

These statuses are the same as that of the first conventional instance shown in FIGS. 74A–74D. Signals DrA, DrB thus can easily control a rotating speed with signal's frequency. The most important advantage of the step-motor, i.e. an extraordinarily simple and inexpensive system can control the speed and position, is still alive in this first exemplary embodiment.

When signals DrA, DrB carry a high frequency, motor 1 is driven in accordance with the statuses shown in FIGS. 3B and 4B. These statuses are equivalent to an operation of a dc brushless motor, and the maximum torque for driving the mover is obtainable in these statuses, which ensures the step-motor-driving device from "out of sync".

In the step-motor-driving device in accordance with the first exemplary embodiment, in the case that the excitation of phases' driving winding is switched by driving-instruction-signals DrA, DrB, signals produced by position detectors 3*a* and 3*b* are supplied as exciting signals to exciters 2*a* and 2*b*, if the torque generated is directed toward a direction unfavorable for the mover to be driven in a desirable direction. On the other hand, if the torque generated is directed toward a direction favorable for the mover to be driven in the desirable direction, signals DrA, DrB are supplied, as exciting signals, to exciters 2*a* and 2*b*. Excitation timing controllers 4*a* and 4*b* thus operating allow the step-motor to operate in the same manner as the conventional step-motor when signals DrA, DrB carry a rather low frequency. On the other hand, when signals DrA, DrB carry a high frequency, controllers 4*a* and 4*b* allows the step-motor to operate in the same manner as a dc brushless motor. The step-motor-driving device of the present invention can thus take over the most important advantage of the step motor, i.e. controlling its rotating speed with driving instruction signals DrA, DrB with ease, and realizing an extremely simple as well as inexpensive system which performs a speed control and a positioning control. At the same time, the step-motor-driving device is essentially free from "out of sync" when signals DrA, DrB carry a high frequency.

The operation of excitation-timing-controllers 4*a* and 4*b* in the first embodiment can be realized, as shown in FIGS. 3A, 3B or FIGS. 4A and 4B, by delay-signal-selectors 5*a* and 5*b* detailed hereinafter.

In FIGS. 3A, 3B or FIGS. 4A and 4B, the following relation is found between signals CS-A, CS-B as well as CK-A, CK-B fed into controllers 4*a* and 4*b* and the signals supplied to input terminals IN-A and IN-B of exciters 2*a* and 2*b* as exciting signals:

First, in FIGS. 3A and 3B illustrating the instance of driving the mover in the positive direction, when signals CK-A, CK-B arrive at controller 4*a* and 4*b* with a delay from signals CS-A and CS-B as shown in FIG. 3A, input terminals IN-A and IN-B of exciters 2*a* and 2*b* receive the signals having the same timing as that of signals CK-A, CK-B. On the other hand, as shown in FIG. 3B, when signals CK-A, CK-B arrive at controller 4*a* and 4*b* with an advance from signals CS-A and CS-B, input terminals IN-A and IN-B of exciters 2*a* and 2*b* receive the signals having the same timing as that of signals CS-A and CS-B. In other words, when the mover is driven in the positive direction, the signals having a slower input timing between signals CK-A, CK-B and CS-A, CS-B are supplied to input terminals IN-A and IN-B of exciters 2*a* and 2*b*.

Second, in FIGS. 4A and 4B illustrating the instance of driving the mover in the negative direction, when signals CK-A, CK-B arrive at controller 4*a* and 4*b* with a delay from the signals reversed to signals CS-A and CS-B as shown in FIG. 4A, input terminals IN-A and IN-B of exciters 2*a* and 2*b* receive the signals having the same timing as that of signals CK-A, CK-B. On the other hand, as shown in FIG. 4B, when signals CK-A, CK-B arrive at controller 4*a* and 4*b* with an advance from the signals reversed to signals CS-A and CS-B, input terminals IN-A and IN-B of exciters 2*a* and 2*b* receive the signals having the same timing as that of the signals reversed to signals CS-A and CS-B. In other words, when the mover is driven in the negative direction, the signals having a slower input timing between signals CK-A, CK-B and the signals reversed to signals CS-A, CS-B are supplied to input terminals IN-A and IN-B of exciters 2*a* and 2*b*.

Figure 5:
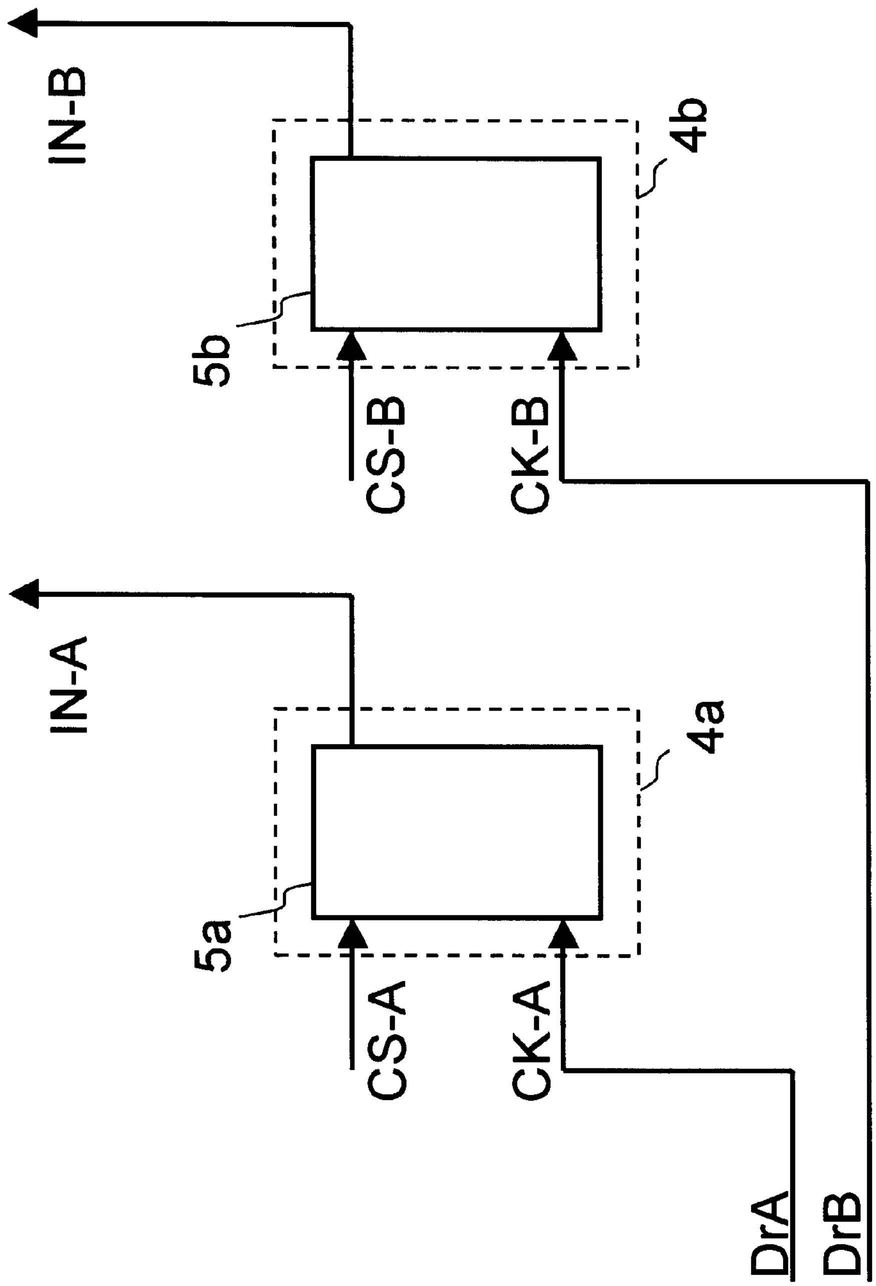
FIG. 5 illustrates that a delay-signal-selector is employed as an excitation-timing controller in accordance with the first embodiment.

Delay-signal-selectors 5*a* and 5*b* shown in FIG. 5 can handle the relations between inputs and outputs as discussed above. The function of excitation-timing-controllers 4*a* and 4*b* are thus realized with ease by introducing selectors 5*a* and 5*b*.

An example of delay-signal-selectors 5*a* and 5*b* can be expressed more specifically in a form of reciprocal latches 50*a*, and 50*b* detailed hereinafter.

Figure 6A:
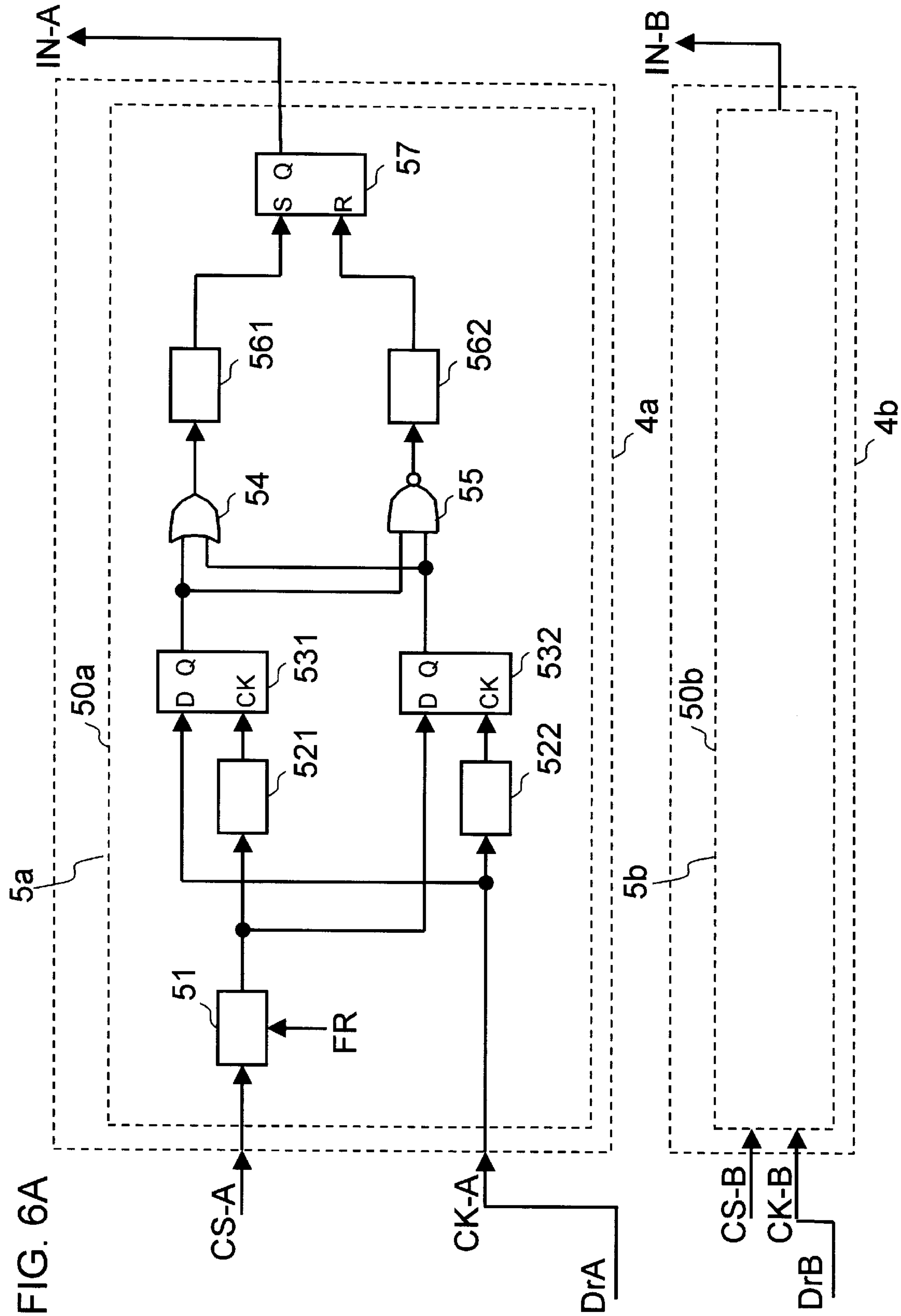
FIG. 6A illustrates that a reciprocal latch is employed as the delay-signal-selector in accordance with the first embodiment.

FIG. 6A illustrates a structure of reciprocal latch 50*a*. Since latch 50*b* is identical to latch 50*a*, the description thereof is omitted here.

In FIG. 6A, normal/reverse-accommodator 51 can determine to output signal CS-A in a reverse mode or in a non-reverse mode by input signal FR.

Input signal FR is determined by a driving direction of motor, and is produced with ease by detecting delay or advance of a phase between driving instruction signals DrA, DrB.

Both-edges detectors 521 and 522 are disposed on signal CS-A side and signal CS-B side respectively. Detectors 521 and 522 output a pulse every time when signal CS-A or CS-B turns to level H from level L or vice versa. D-type flip-flop 531 disposed at the subsequent stage to detector 521 latches the level of signal CK-A by the pulse supplied from detector 521. D-type flip-flop 532 disposed at the subsequent stage to detector 522 latches the level of signal CS-A by the pulse supplied from detector 522.

D-type flip flops 531 and 532 output signals to single-edge detectors 561 and 562 via OR gate 54 or NAND gate 55. Single-edge detectors 561 and 562 generate pulses at the timing when the input signals turn to level H from level L. Single-edge detector 561 and 562 output an edge-detecting-pulse to a set-input-terminal and a reset-input-terminal of RS flip flop 57. RS flip flop 57 outputs a signal, which is an output from reciprocal latch 50*a*.

Reciprocal latch 50*a* having a construction discussed above operates as follows:

In the first instance, the motor is driven in the positive direction.

Figures 7A, 7B, 8A, 8B:
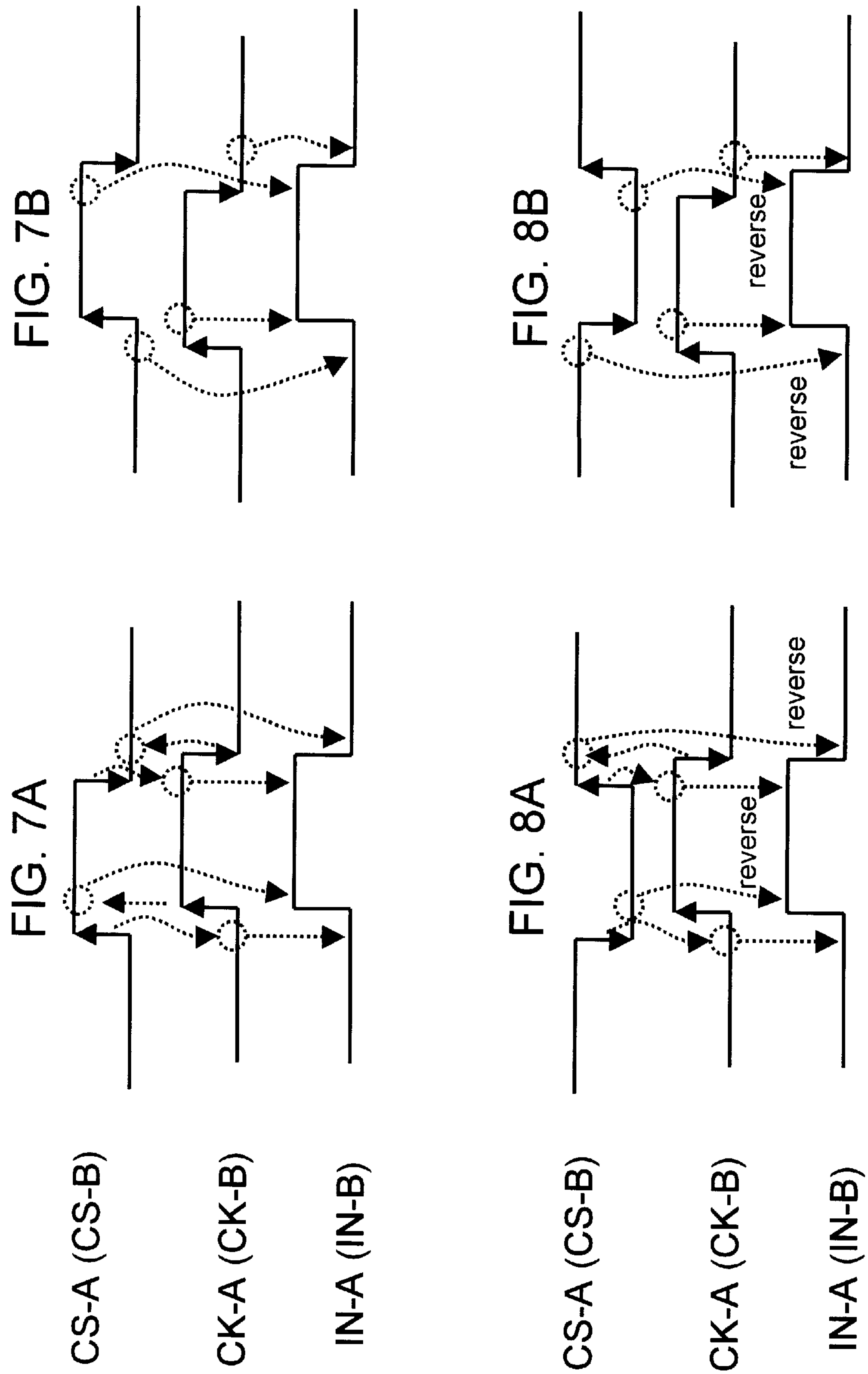
FIGS. 7A and 7B illustrate respective operations at the driving in positive direction of the reciprocal latch shown in FIG. 6A and the reciprocal signal selector in FIG. 6B.
FIGS. 8A and 8B illustrate respective operations at the driving in negative direction of the reciprocal latch shown in FIG. 6A and the reciprocal signal selector in FIG. 6B.

When the motor is driven in the positive direction, normal/reverse accommodator 51 forwards signal CS-A to the subsequent stages in a non-reverse mode by signal FR. As shown in FIGS. 7A and 7B, reciprocal latch 50*a* thus latches the level of position detecting signal CS-A at the timing when driving instruction signal DrA, i.e. signal CK-A changes, and also latches signal DrA, i.e. the level of signal CK-A at the timing when position detecting signal CS-A changes. FIG. 7A illustrates the instance where signal CK-A delays from signal CS-A, and FIG. 7B illustrate the instance where signal CK-A advances from signal CS-A.

As shown in FIGS. 7A and 7B, exciting signal IN-A received by exciter 2*a* is a later arrival signal, and this proves that reciprocal latch 50*a* functions as delay-signal-selector 5*a*.

The same operation is applicable to signals CS-B, CK-B and IN-B, and reciprocal latch 50*b* is thus proved to function as delay-signal-selector 5*b*.

In the second instance, when the motor is driven in the negative direction, normal/reverse accommodator 51 reverses signal CS-A responsive to FR signal and then forwards the signal to the subsequent stages. As shown in FIGS. 8A and 8B, reciprocal latch 50*a* thus reverses and latches the level of position-detecting-signal CS-A at the timing when driving-instruction-signal DrA, i.e. signal CK-A changes, and also latches signal DrA, i.e. the level of signal CK-A at the timing when position-detecting-signal CS-A changes.

FIG. 8A illustrates the instance when signal CK-A delays from the signal reversed to signal CS-A, and FIG. 8B illustrates the instance when signal CK-A advances from the signal reversed to signal CS-A.

As shown in FIGS. 8A and 8B, exciting signal IN-A received by exciter 2*a* is a later arrival signal out of signal CK-A and the signal reversed to signal CS-A, and this proves that reciprocal latch 50*a* functions as delay-signal-selector 5*a*.

The same operation is applicable to signals CS-B, CK-B and IN-B and reciprocal latch 50*b* is thus proved to function as delay-signal-selector 5*b*.

The discussion above thus proves that reciprocal latches 50*a* and 50*b* can function as delay-signal-selectors 5*a* and 5*b*.

Reciprocal latches 50*a* and 50*b*, in particular, receive exciting signals IN-A and IN-B not by switching driving-instruction-signals DrA, DrB (i.e. signals CK-A, CK-B) to position-detecting-signals CS-A and CS-B or vice versa. Therefore, when a delay or an advance between the driving-instruction-signals and the position-detecting-signals is abruptly reversed, the exciting signal can be forwarded smoothly without an intermittence. The step-motor thus can be controlled in a more stable manner.

Figure 6B:
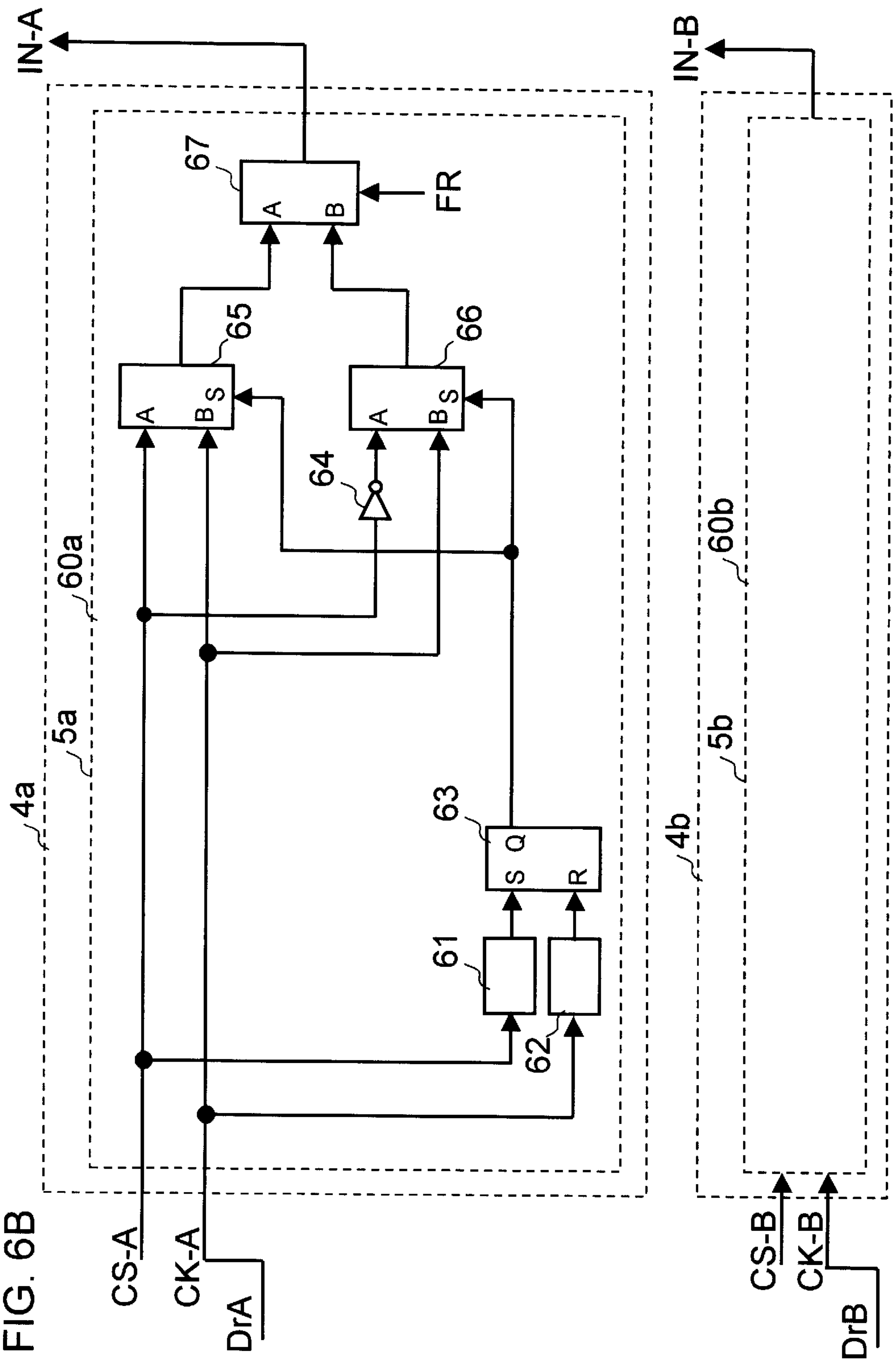
FIG. 6B illustrates that a reciprocal signal selector is employed as the delay signal selector in accordance with the first embodiment.

Latches 50*a* and 50*b* shown in FIG. 6A are used for delay-signal-selectors 5*a* and 5*b* in the operation discussed above; however, latches 50*a* and 50*b* can be replaced with reciprocal-signal-selectors 60*a* and 60*b* illustrated in FIG. 6B.

In FIG. 6B, reciprocal-signal-selector 60*a* is structured as follows, and since selector 60*b* is a counterpart of selector 60*a* thus the description thereof is omitted here.

In reciprocal-signal-selector 60*a*, signals CS-A, CK-A are fed into a set-input-terminal and a reset-input-terminal of RS flip-flop 63 via both-edges-detectors 61 and 62.

When RS flip-flop 63 is set and selector 65 receives signals CS-A, CK-A, selector 65 selects and outputs signal CK-A. When RS flip-flop 63 is reset, selector 65 selects and outputs signal CS-A.

Selector 66 selects and outputs signal CK-A when RS flip-flop 63 is set and selector 66 receives signal CK-A as well as the signal reversed to CS-A through reversing-gate 64. When RS flip-flop 63 is reset, selector 66 selects and outputs the signal reversed to CS-A.

Selector 67 receives respective output signals from selectors 65 and 66, and then selects and outputs one of these signals responsive to input signal FR. Input signal FR is determined by the driving direction (positive or negative) of the motor, and produced with ease by detecting the phase-relation (delay or advance) between driving-instruction-signals DrA, DrB.

The output of selector 67 is eventually the output of reciprocal-signal-selector 60*a*.

Reciprocal-signal-selector 60*a* thus structured operates as follows:

When signal CS-A turns to level L from level H, or vice versa, both-edges-detector 61 outputs a set-pulse to RS flip-flop 63, thereby setting flip-flop 63. At this moment, selector 65 selects and outputs signal CK-A, and selector 66 also selects and outputs signal CK-A.

When signal CK-A turns to level L from level H, or vice versa, both-edges-detector 62 outputs a reset-pulse to RS flip-flop 63, thereby resetting flip-flop 63. At this moment, selector 65 selects and outputs signal CS-A, and selector 66 selects and outputs the signal reversed to CS-A.

In other words, the output of selector 65 turns to signal CK-A when signal CS-A changes, and turns to CS-A when CK-A changes.

The output of selector 66 turns to signal CK-A when signal CS-A changes, and turns to the signal reversed to CS-A when CK-A changes.

When the motor is driven in the positive direction, selector 67 selects and outputs the signal supplied from selector 65 responsive to input signal FR, and this output signal is tapped off from reciprocal-signal-selector 60*a*.

When the motor is driven in the negative direction, selector 67 selects and outputs the signal supplied from selector 66 responsive to input signal FR, and this output signal is tapped off from reciprocal-signal-selector 60*a*. When the motor is driven in the positive direction, this reciprocal-signal-selector 60*a* selects and outputs the position-detecting-signal at the timing when the driving-instruction-signal changes, also selects and outputs the driving-instruction-signal at the timing when the position-detecting-signal changes. When the motor is driven in the negative direction, this reciprocal-signal-selector selects and outputs a signal reversed to the position-detecting-signal at the timing when the driving-instruction-signal changes, also selects and outputs the driving-instruction-signal at the timing when the position-detecting-signal changes.

The operation discussed above proves that the relation between input and output of reciprocal-signal-selector 60*a* is identical to what shown in FIGS. 7A, 7B, 8A and 8B, and selector 60*a* functions as delay-signal-selector 5*a* as same as reciprocal-latch 50*a* does.

The operation discussed above is also applicable to signals CS-B, CK-B and IN-B, therefore, selector 60*b* can function as delay-signal-selector 5*b*.

Reciprocal-signal-selectors 60*a* and 60*b* supply exciting signals IN-A and IN-B not by switching driving-instruction-signals DrA, DrB (i.e. signal CK-A, CK-B) to position-detecting-signals CS-A, CS-B or vice versa. Therefore, when a delay or an advance between the driving-instruction-signals and the position-detecting-signals is abruptly reversed, the exciting signals can be forwarded smoothly without an intermittence. The step-motor thus can be controlled in a more stable manner.

Further in the first exemplary embodiment, instead of an expensive and bulky encoder or a resolver, an inexpensive and compact Hall elements can be used as position detectors 3*a* and 3*b*. The Hall elements require less space to be mounted to the motor, and thus the step-motor-driving device free from "out of sync" can be achieved, and yet the device stands comparison with the conventional device in size and cost (compact and inexpensive). The position detector does not necessarily have a high resolution.

The encoder or resolver can be still used as position detectors 3*a* and 3*b* without any technical problems.

In the first exemplary embodiment, position detector 3*a* and excitation-timing-controller 4*a* as well as the counterparts 3*b* and 4*b* are independently provided to respective phases (phase-A and phase-B). Signals of respective phases are thus processed independently at controlling an excitation timing.

The excitation timing controller is thus not required to link with other phases in processing signals. As a result, this controller is formed in a simple structure and also employed with ease in a step-motor having a number of phases. Because the position-detectors and excitation-timing-controllers are disposed independently responsive to the number of phases so that this controller is applied with ease to the step-motor having a number of phases.

Exemplary Embodiment 2

The two-phase step motor has been described in the first exemplary embodiment; however, the present invention is applicable with ease to three-phase and more than three-phase step motors, thus a multi-phase step motor free from "out of sync" is achieved.

Figure 9:
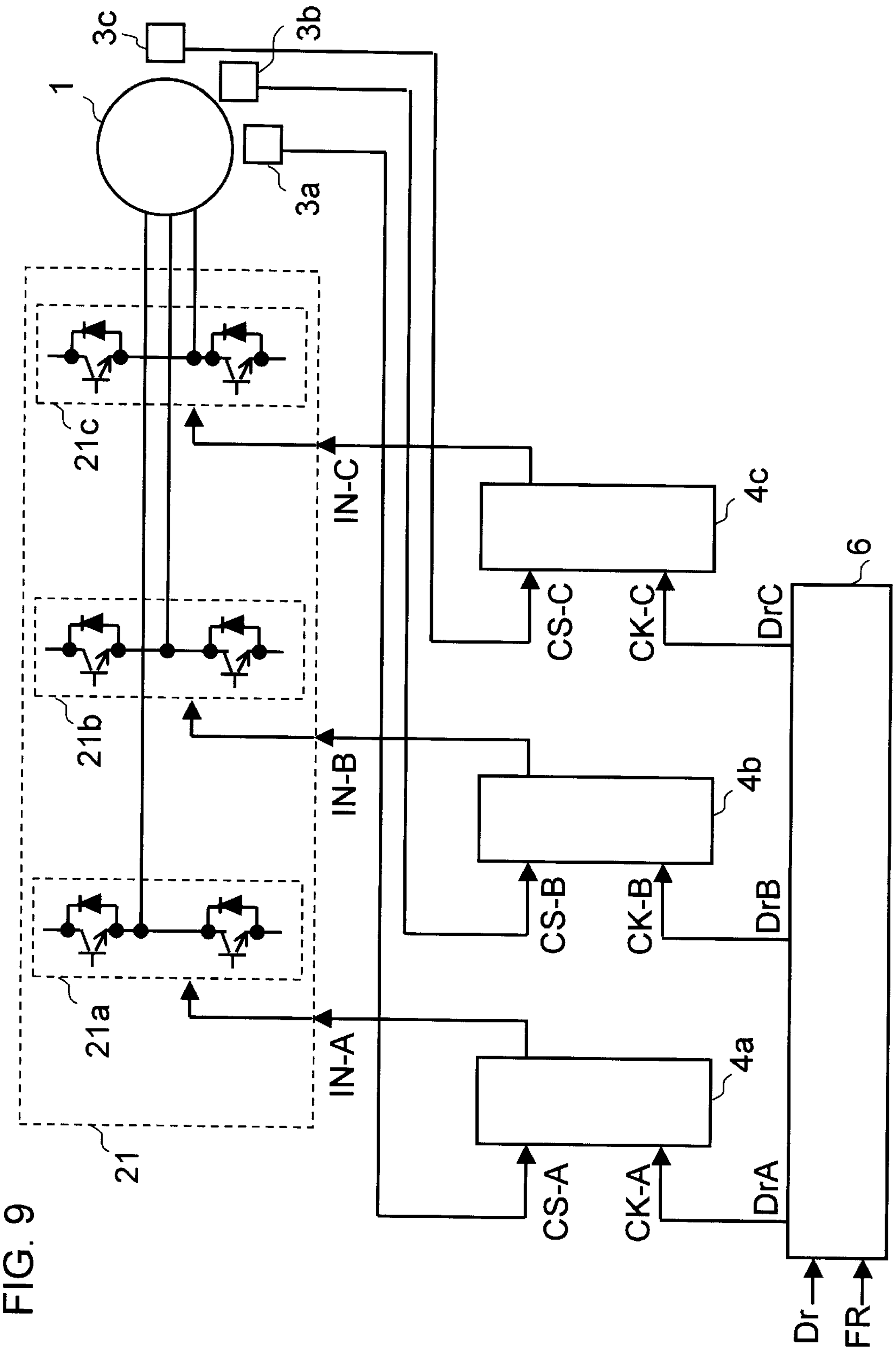
FIG. 9 illustrates a structure of a step-motor-driving device in accordance with a second exemplary embodiment.

FIG. 9 illustrates a structure where the step-motor-driving device employs a three-phase step motor in accordance with the second exemplary embodiment.

In FIG. 9, driving-instruction-signal-generator 6 for respective phases receives driving-instruction-signal Dr and driving-direction-instruction-signal FR for the motor, and produces driving-instruction-signals DrA, DrB and DrC for respective phases. Signals DrA, DrB and DrC have 120-degree phase difference with one anther. This signal-generator 6 can be embodied by a ring-counter with three-phase.

Exciter 21 comprises respective exciters 21*a*, 21*b* and 21*c* related to each phase. These exciters function as same as exciters 2*a* and 2*b* in the first embodiment.

Other elements in FIG. 9 are basically the same as those in FIG. 1, and the like elements carry the like reference marks. Since motor 1 in FIG. 9 has three phases, the elements for controlling the third phase are denoted with the suffix "c".

The step-motor-driving device of the present invention is applicable to four-phase or five-phase step motor in the same manner.

A number of position-detectors increases at greater numbers of phases, which increases a size and cost; however, the following methods are available to decrease the number of position detectors:

The first method is applied to the position detector comprising Hall elements. Parts of Hall elements are reduced, and the position-detecting-signals which should have supplied by the reduced Hall elements are virtually produced by the signals from the remained Hall elements. In this case, the signals from remained Hall elements should be delayed, or the signals should be changed into composite forms in order to virtually produce the signals.

The second method is to form a position detector by a simple encoder comprising Hall elements and MR elements, so that position-detecting-signals responsive to each phase are produced by using the signals from those elements.

These known-methods can decrease the number of position detectors with ease, so that the step-motor-driving device of the present invention is applicable to multi-phase step motor free from affecting its size and cost.

Exemplary Embodiment 3

Figure 10:
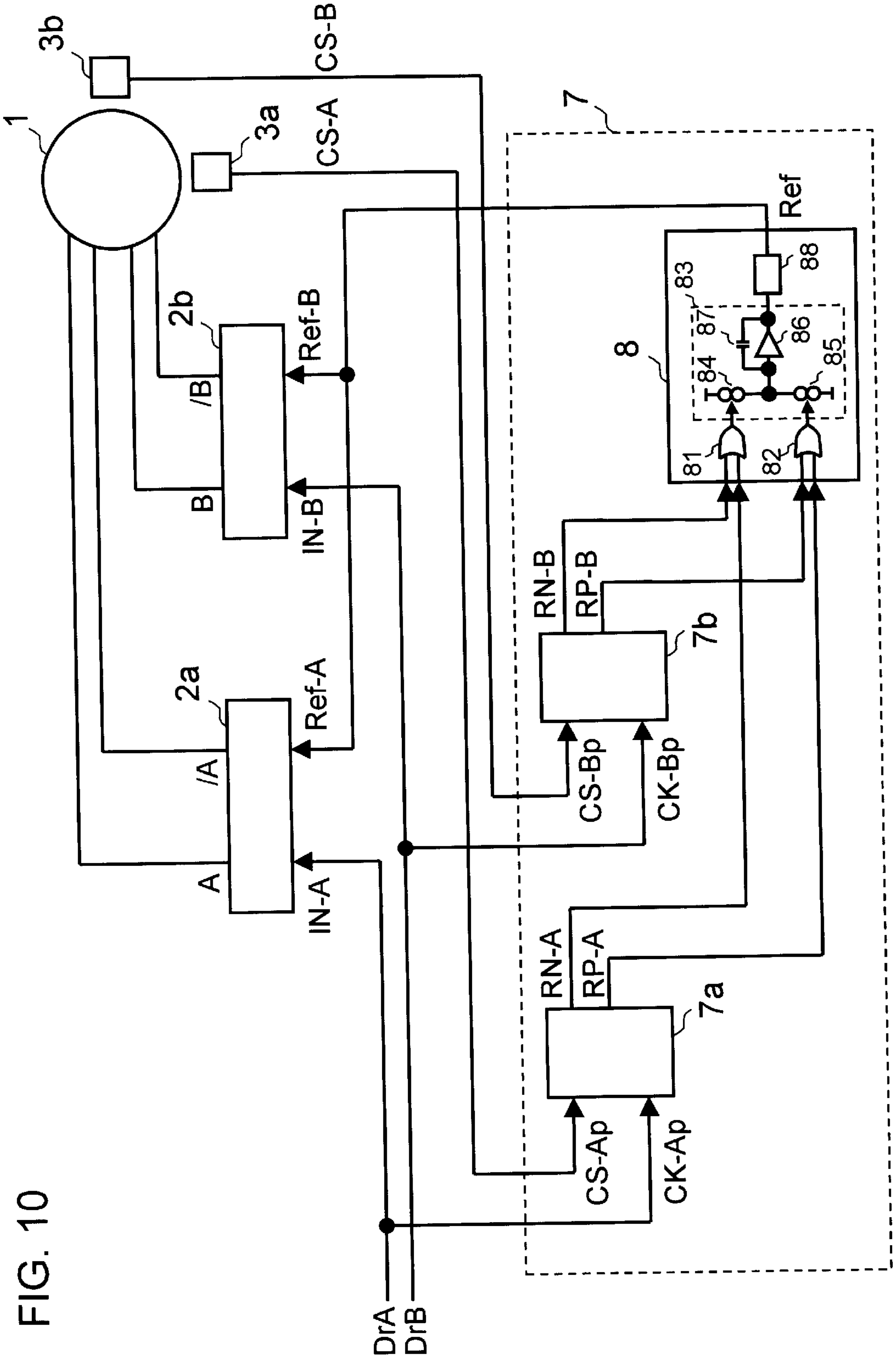
FIG. 10 illustrates a structure of a step-motor-driving device in accordance with the third exemplary embodiment.

FIG. 10 illustrates a structure of a step-motor-driving device in accordance with the third exemplary embodiment.

In FIG. 10, two-phase motor 1, position detectors 3*a* and 3*b* are the same as shown in FIG. 1. Position detectors 3*a* and 3*b* comprise, e.g. Hall elements.

Exciting current controller 7 receives position-detecting-signals CS-A, CS-B from position detectors 3*a* and 3*b* as well as driving-instruction-signals DrA, DrB, then outputs exciting-current-control-signal Ref to exciters 2*a* and 2*b*, responsive to the phase difference, as current-value-signals Ref-A, Ref-B.

The step-motor-driving device having a structure discussed above and in accordance with the third exemplary embodiment is demonstrated with reference to FIGS. 2A and 2B, as well as FIG. 11A through FIG. 15B.

The relations between mover's position θ and torque T are described here. The direction of mover's position θ and an applying direction of torque T have been defined in the first embodiment, and this definition is always applied to the relations in this third embodiment.

In the third embodiment, the relations between position-detecting-signals CS-A, CS-B and torque T generated at exciting phase-A and phase-B windings are the same as those of the first embodiment, the description is thus omitted here.

Exciting-current-controller 7 in accordance with the third embodiment is demonstrated with reference to FIG. 10. Controller 7 comprises the following elements:

- phase-difference-detector 7*a* for detecting a phase difference between position-detecting-signal CS-A and driving-instruction-signal DrA, both are received by detector 7*a* as input signals CS-Ap and Ck -Ap;
- phase-difference-detector 7*b* for detecting a phase difference between position-detecting-signal CS-B and driving-instruction-signal DrB, both are received by detector 7*b* as input signals CS-Bp and Ck-Bp; and
- phase-difference-amplifier 8 for amplifying the phase-difference-detecting-signals supplied from detectors 7*a* and 7*b* and outputting exciting-current-signal Ref.

Detector 7*a* detects the phase difference between signals CS-Ap and Ck-Ap, and it outputs instruction-delay-signal RN-A having a pulse width responding to a degree of a delay when signal CK-Ap delays from signal CS-Ap in phases. On the other hand, when signal CK-Ap advances with regard to signal CS-Ap in phases, detector 7*a* outputs instruction-advance-signal RP-A having a pulse width responding to a degree of the advance. These signals RN-A and RP-A are the phase-difference-detecting-signals supplied from detector 7*a*. Detector 7*b* operates in the same way as detector 7*a*.

Phase-difference-amplifier 8 decreases exciting-current-control-signal Ref when one of instruction-delay-signals RN-A or RN-B is produced, and amplifier 8 increases signal Ref when one of instruction-advance-signals RP-A or RP-B is produced. As shown in FIG. 10, phase-difference-amplifier 8 comprises, for instance, OR gates 81, 82, charge-pump-circuit 83, and absolute circuit 88. Charge-pump-circuit 83 comprises current-sources 84, 85 which are controlled by OR gates 81, 82, and integrating amplifier 86 as well as integrating capacitor 87.

Figure 11B:
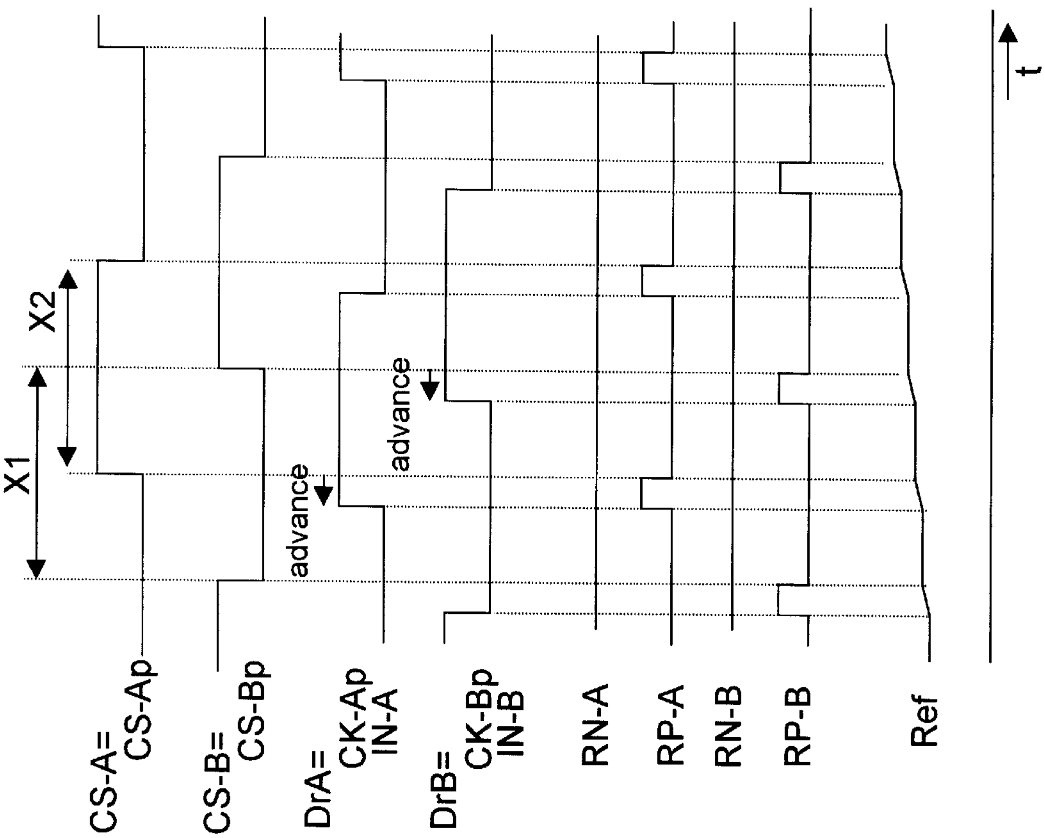
FIGS. 11A and 11B illustrate an operation of an exciting current controller in accordance with the third exemplary embodiment.
Figure 11A:
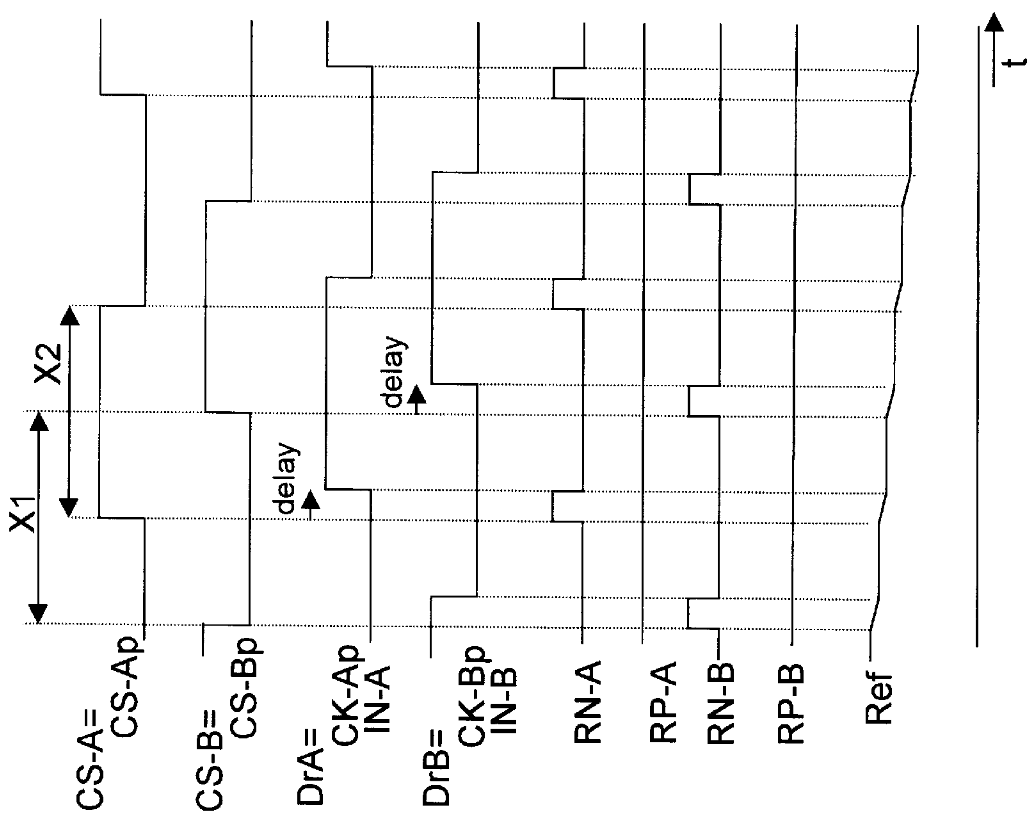

The operation of exciting-current-controller 7 thus structured is summarized as shown in FIGS. 11A and 11B.

FIG. 11A illustrates an operation when driving-instruction-signals DrA, DrB delay from position-detecting-signals CS-A, CS-B, while FIG. 11B illustrates an operation when driving-instruction-signals DrA, DrB advance from position-detecting-signals CS-A, CS-B.

The operation of entire step-motor-driving device in accordance with the third embodiment is hereinafter demonstrated based on the relation, shown in FIGS. 2A and 2B, between the torque generated by exciting phases' driving-windings and position-detecting-signals CS A, CS B, as well as the operation of exciting-current-controller 7 shown in FIGS. 11A and 11B.

A typical operation during period X1 is detailed in order to make a long story short.

The operation of the step-motor-driving device during period X1 in accordance with the third embodiment is illustrated in FIGS. 12A, 12B, 13A and 13B.

During period X1, signal CS-A turns to level H from level L, and signal CS-B stays at level L.

Figures 12A, 12B:
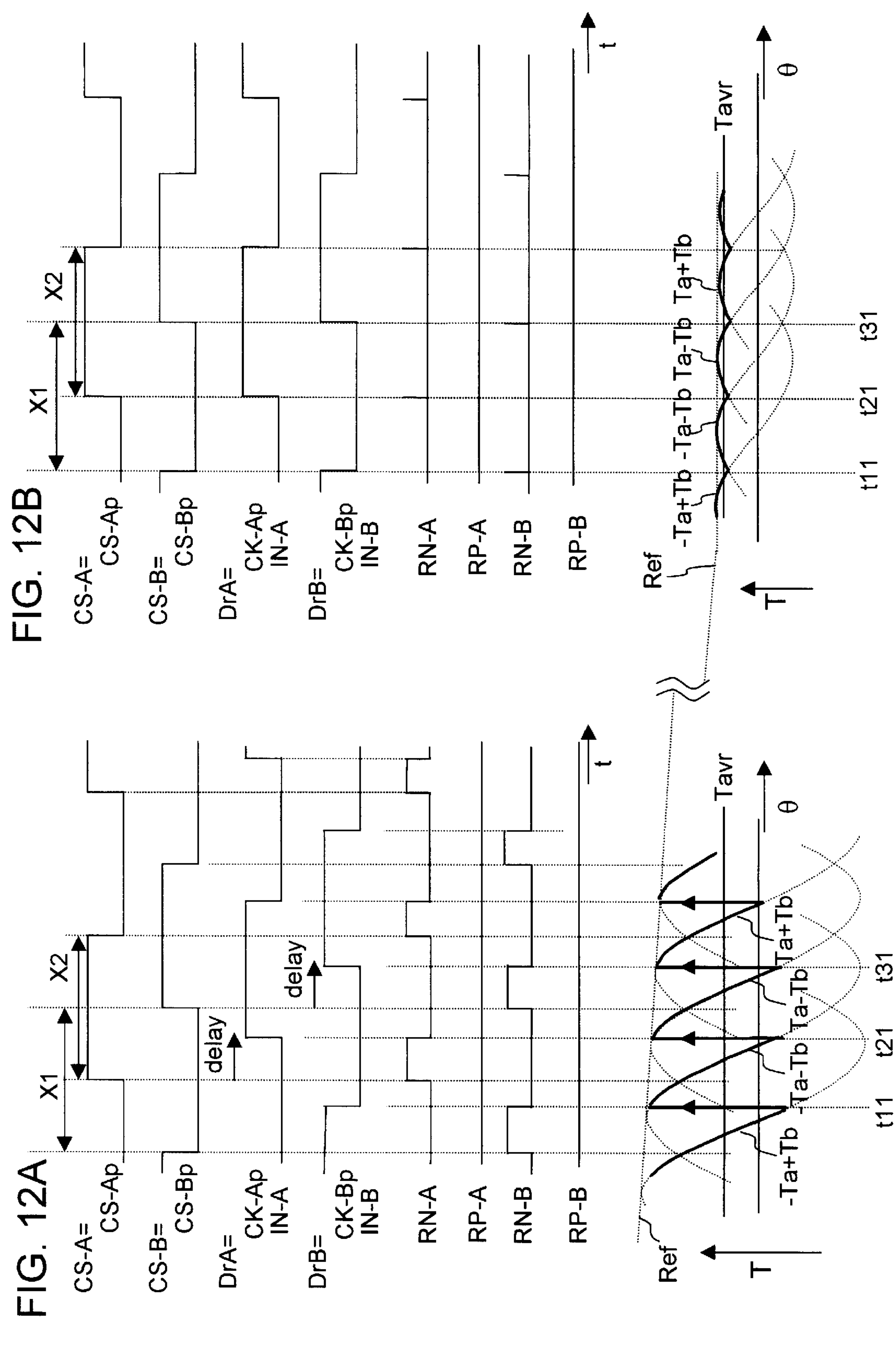
FIGS. 12A and 12B illustrate an operation, at the driving in the positive direction with a delay of driving instruction, of the step-motor-driving device in accordance with the third exemplary embodiment.

A specific instance, where the mover is driven in the desired positive direction and signals DrA, DrB delay from signals CS-A, CS-B, is illustrated in FIGS. 12A and 12B.

In general, when signals DrA, DrB carry a low frequency or bear a lighter load, signals DrA, DrB delay from signals CS-A, CS-B in phases as shown in FIG. 12A.

In FIG. 12A, driving-instruction-signal DrA, i.e. exciting signal IN-A is at level L and driving-instruction-signal DrB, i.e. exciting signal IN-B is at level H before timing t11. In this period, thus the torque expressed with"−Ta+Tb" is applied to the mover.

At timing t11, signal IN-B turns to level L from level H, thereby switching the excitation to phase-B winding and changing the exciting direction. At this moment, the torque applied to the mover turns to forward direction expressed with "−Ta−Tb". This torque-turn due to switching the excitation is effective for driving the mover in the desired positive direction. After timing t11, the torque turns again to forward direction at timing t21, t31 so that the mover is kept driving in the positive direction.

In this third exemplary embodiment, the exciting currents of the driving windings are controlled by exciting-current-controller 7 in addition to switching the excitation discussed above.

The switching of the excitation discussed above can be described, in a different way, as follows: When signals DrA, DrB delay with regard to signals CS-A, CS-B in phases, the switch of exciting the windings by signals DrA, DrB directs the torque toward an effective direction for the motor to be driven in the desirable positive direction.

This is also described the other way around, i.e. when signals DrA, DrB switch the excitation of the windings so that the motor can be driven in the desired positive direction, signals DrA, DrB delay from signals CS-A, CS-B in phases.

Exciting-current-controller 7 detects that signals DrA, DrB, i.e. signals CK-Ap, CK-Bp delay with regard to signals CS-A, CS-B in phases, i.e. signals CS-Ap, CS-Bp when the excitation is effectively switched. Controller 7 then decreases the current of signal Ref responsive to a degree of the delay detected.

FIG. 12A details this operation of controller 7. In FIG. 12A, input signals CK-Ap, CK-Bp are detected delaying with regard to input signals CS-Ap, CS-Bp in phases, and instruction-delay-signals RN-A, RN-B having a pulse width responsive to a degree of the delay are supplied. Instruction-advance-signals RP -A, RP-B are not supplied at this moment.

When instruction-delay-signals RN-A, RN-B are supplied, phase-difference-amplifier 8 induces exciting-current-control-signal Ref to decrease, thereby reducing the maximum-exciting-current of the winding, which is well known for being approximately proportional to a peak value of torque T generated at mover's position θ.

The peak values of torque T which drives the mover decrease in step with signal Ref as shown in FIG. 12A.

An average "Tavr" of torque T generated is to balance with a torque loaded, and in the step-motors, a relation between mover's position θ and the timing of driving-instruction-signals DrA, DrB is automatically established so that the average "Tavr" of torque generated can balance with the toque loaded. This is one of intrinsic natures of the step-motors.

This means that the timing delay of signals DrA, DrB with regard to mover's position θ, i.e. position-detecting-signals CS-A, CS-B increases at a greater peak value of torque T generated, and this delay decreases at the smaller peak value of torque T. As a result, average torque "Tavr" balances with the torque loaded.

In the latter case, i.e. when the peak value of torque T is small and the timing delay of signals DrA, DrB with regard to signals CS-A, CS-B decreases, the average torque "Tvar" approximates to the peak value thereof, thereby reducing torque ripples substantially.

Taking such natures of the step-motors into consideration, the inventors successfully reduce the torque ripples substantially by the following methods: Control the exciting current responsive to a degree of the timing delay of signals DrA, DrB with regard to signals CS-A, CS-B, and a feed-back-control for reducing this timing delay can be realized. When the delay is reduced, average torque "−Tavr"—necessary to drive the mover and a load—approaches to the peak value of torque T generated. As a result, the torque ripples substantially decrease. This mechanics is illustrated in FIG. 12B.

Smaller torque ripples contribute to lowering the vibration, noises and rotating-speed-variations of the motor, and the resultant exciting current is regulated to the minimum value responsive to the loads. The motor efficiency is thus substantially improved.

Figures 13A, 13B:
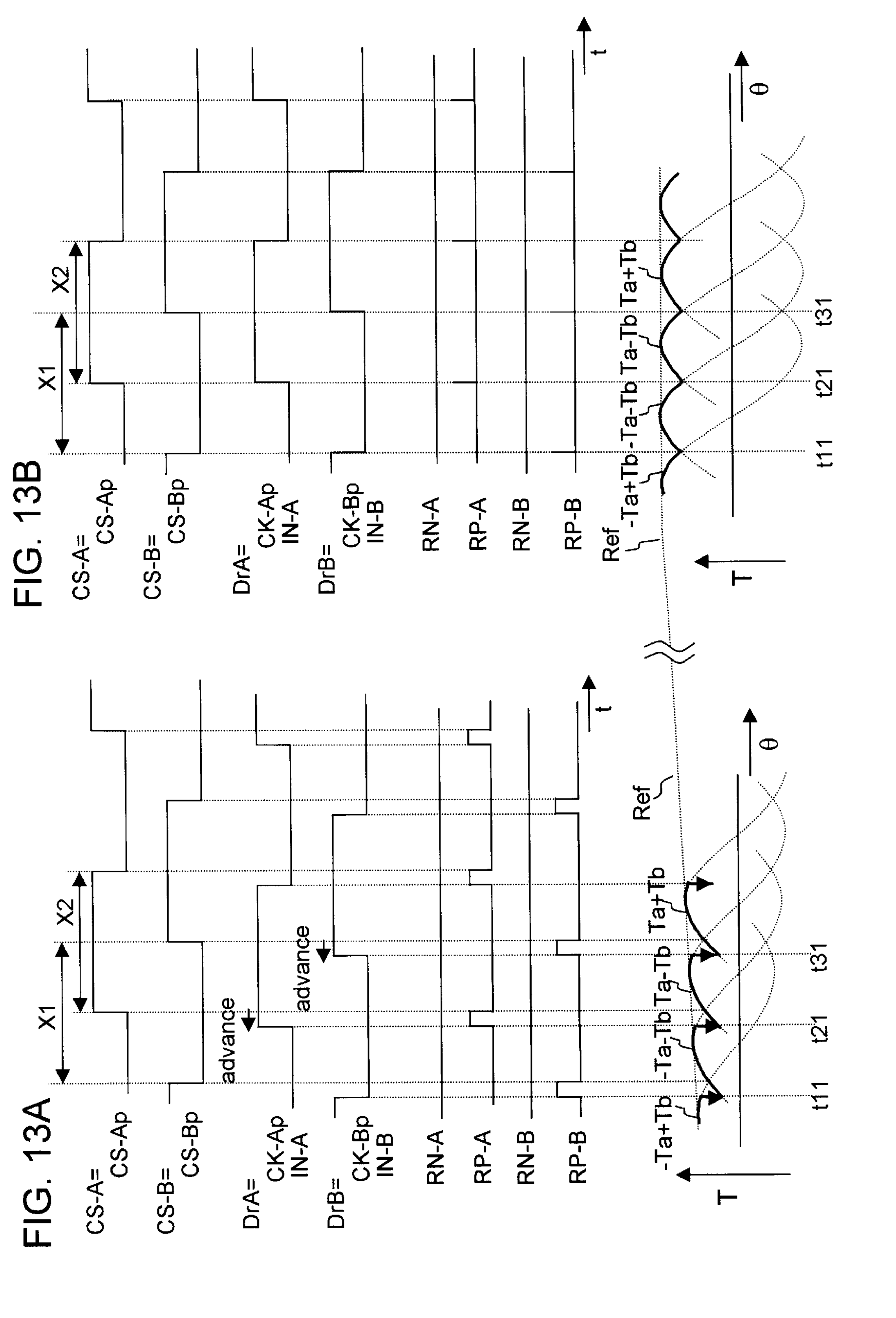
FIGS. 13A and 13B illustrate an operation, at the driving in the positive direction with an advance of driving instruction, of the step-motor-driving device in accordance with the third exemplary embodiment.

Next instance, i.e. the mover is driven in the positive direction and signal DrA, DrB advance with regard to position-detecting-signals CS-A, CS-B, is demonstrated with reference to FIGS. 13A and 13B.

In general, when signals DrA, DrB carry a high frequency or bear a heavier load, signals DrA, DrB advance from signals CS-A, CS-B in phases as shown in FIG. 13A.

As shown in FIG. 13A, signal DrA, i.e. exciting signal IN-A is at level L and signal DrB, i.e. exciting signal IN-B is at level H before timing t11. In this period, thus the torque expressed with "−Ta+Tb" is applied to the mover.

At timing t11, signal IN-B turns to level L from level H, thereby switching the excitation of phase-B winding and changing the exciting direction. At this moment, the torque applied to the mover turns to forward direction expressed with "−Ta−Tb". After timing t11, the torque turns again to forward direction at timing t21, t31 so that the mover is kept driving. This excitation-switch induces the torque to turn a reverse direction and is not favorable for driving the mover in the desired positive direction. In other words, this excitation-switch would invite "out of sync" as described in the conventional instance.

However, in this third exemplary embodiment, exciting-current-controller 7 allow the step-motor-driving device to withstand more persistently against the "out of step".

The switching of the excitation discussed above can be described, in a different way, as follows: When driving-instruction-signals DrA, DrB advance with regard to signals CS-A, CS-B in phases, the switch of exciting the windings by signals DrA, DrB directs the torque toward an unfavorable direction for the motor to be driven in the desirable positive direction.

This is also described the other way around, i.e. when signals DrA, DrB switch the excitation of the windings unfavorably for the motor to be driven in the desired positive direction, signals DrA, DrB advance with regard to signals CS-A, CS-B in phases.

Exciting-current-controller 7 detects that signals DrA, DrB, i.e. signals CK-Ap, CK-Bp advance with regard to signals CS-A, CS-B, i.e. input signals CS-Ap, CS-Bp in phases when the excitation is unfavorably switched. Controller 7 then increases the current of signal Ref responsive to a degree of the advance detected.

The reason why exciting-current-controller 7 can enhance the withstanding against "out of sync" is detailed with reference to FIGS. 13A, 13B and 14.

In FIG. 13A, input signals CK-Ap, CK-Bp are detected advancing with regard to input signals CS-Ap, CS-Bp in phases, and instruction-advance-signal RP-A, RP-B having a pulse width responsive to a degree of the advance are supplied. Instruction-delay-signals RN-A, RN-B are not supplied at this moment.

When instruction-advance-signals RP-A, RP-B are supplied, phase-difference-amplifier 8 induces exciting-current-control-signal Ref to increase. Then exciters 2*a* and 2*b* increases the maximum-exciting-current of the winding, which is well known for being approximately proportional to a peak value of torque T generated at mover's position θ.

The peak values of torque T which drives the mover increase in step with signal Ref as shown in FIG. 13A.

When the excitation is switched unfavorably as discussed above, this increasing of torque T can minimize the mover-driving-torque to be directed in the reverse direction.

Figure 14:
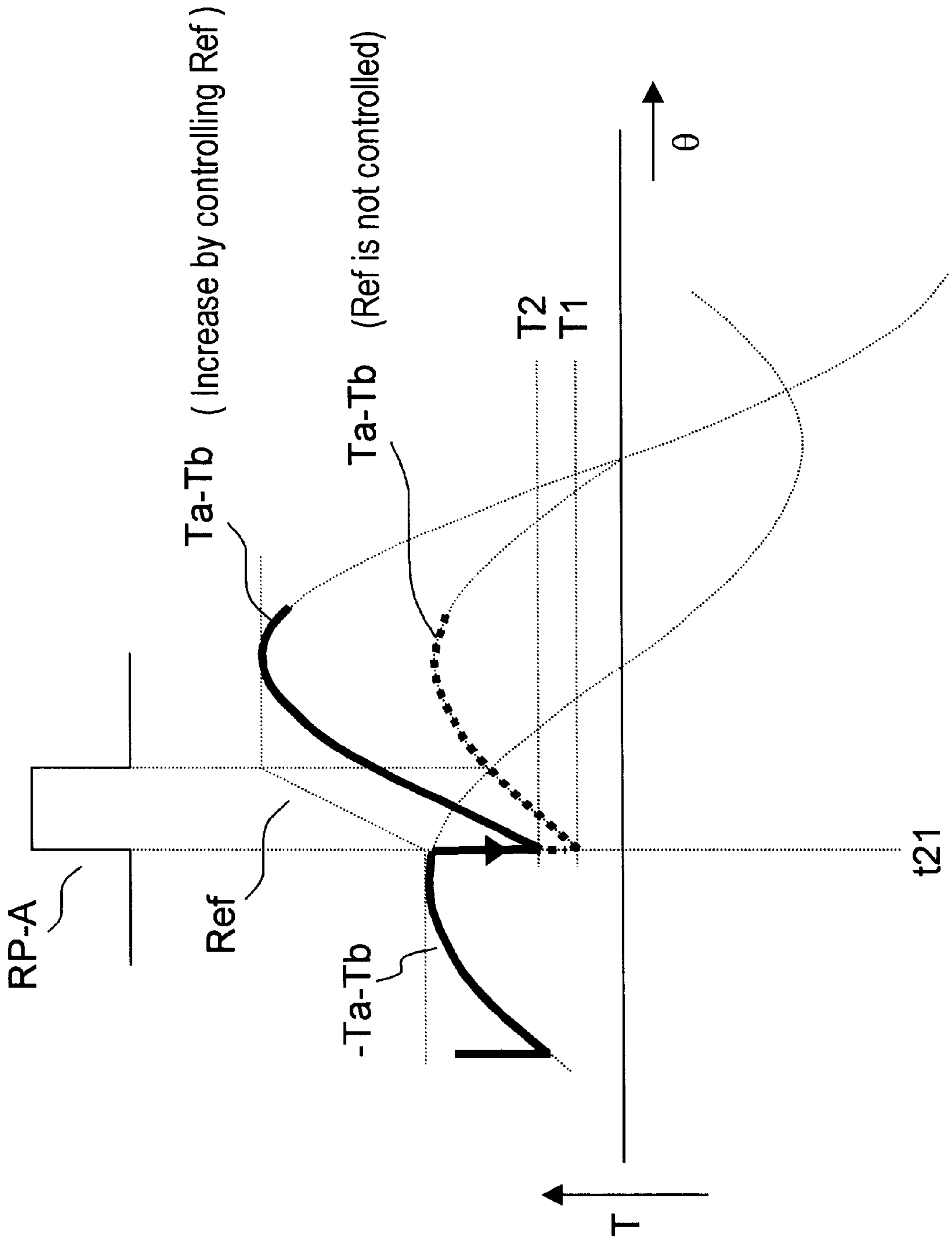
FIG. 14 is a partially enlarged view of the operation in the third embodiment.

FIG. 14 is an enlarged view of the status where the excitation is switched unfavorably at timing t21. Torque T turns in the reverse direction at timing t21; however, torque T drops to level T1 as shown in a broken-line when signal Ref is not controlled, and the drop thereof stops at level T2 when the current of signal Ref increases by control. This mechanics can be also applied to other timings.

Increasing the peak value of torque T by controlling signal Ref can minimize the driving torque of the mover to be directed in the reverse direction even when the excitation is switched unfavorably. As a result, the step-motor-driving device can withstand the "out of sync" more persistently.

As discussed above, when signal DrA, DrB advance with regard to signals CS-A, CS-B, current-controller 7 minimizes the torque to be directed in the reverse direction, which is induced by the excitation switch. This operation is kept going until the advance of signals DrA, DrB with regard to signals CS-A, CS-B becomes substantially small. In other words, controller 7 keeps increasing the exciting current of the windings until the advance becomes small enough.

When the driving-instruction-signal carries a high frequency or bears a heavy load, and signals DrA, DrB advance with regard to signals CS-A, CS-B in phases, and yet, the excitation is switched unfavorably to the step-motor, controller 7 provides a feed-back control so that the advances of signals DrA, DrB with regard to signals CS-A, CS-B can be reduced. When an extent of this advance decreases, torque ripples become substantially small as shown in FIG. 13B.

The third embodiment can thus not only enhance the withstanding against the "out of sync" but also reduce the torque ripples. The advantages produce the effects of reducing vibrations, noises and rotating-speed-variations of the motor. Resultant exciting current is controlled to an appropriate level responsive to the loads, which increases substantially the motor efficiency.

The description discussed above has been referred to the instance when the mover is driven in the positive direction (i.e. desired direction); however, the same manner is applicable to the case when the mover is driven in the negative direction (i.e. negative direction is desired).

Figures 15A, 15B:
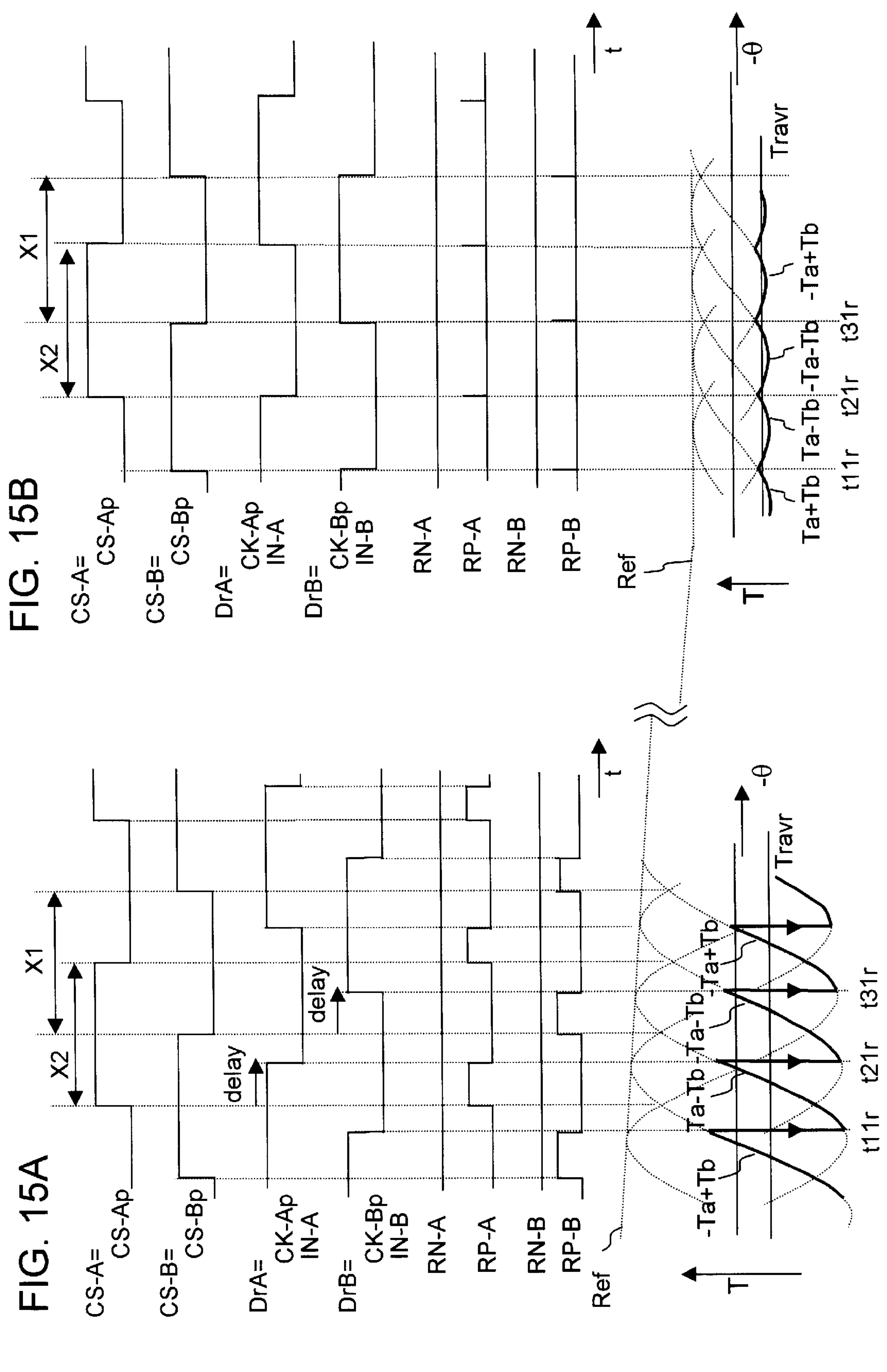
FIGS. 15A and 15B illustrate an operation, at the driving in the negative direction with a delay of driving instruction, of the step-motor-driving device in accordance with the third exemplary embodiment.

FIGS. 15A and 15B illustrates an operation when the mover is driven in the negative direction and driving-instruction-signals DrA, DrB delay with regard to position-detecting-signals CS-A, CS-B. This operation is basically the same as the operation illustrated in FIGS. 12A and 12B, i.e. the mover is driven in the positive direction, a detailed description about this operation is thus omitted here.

In FIGS. 15A and 15B, mover's position θ is expressed reversely to that in FIGS. 12A and 12B, namely, mover's progress in the negative direction corresponds to the rightward direction in the Figs., and mover's progress in the positive direction corresponds to the leftward direction in the FIGS. Torque T generated is expressed in the same way as that shown in FIGS. 12A and 12B.

An operation (not shown) when the mover is driven in the negative direction and signals DrA, DrB advance with regard to signals CS-A, CS-B is basically the same as the operation shown in FIGS. 13A and 13B, i.e. where the mover is driven in the positive direction.

When the mover is driven in the negative direction, the operation is basically the same as the operation when the mover is driven in the positive direction as shown in FIGS. 12A, 12B, 13A and 13B except the following point: the phases of signals DrA, DrB are reversed, then the delay and advance of signals DrA, DrB are related to the signals reversed to signals CS-A, CS-B.

Reversing the phases of signals DrA, DrB effects to reverse a rotating direction of a magnetic field generated by the windings, and relating the delay and advance to the reversal signals effects to direct a reversed torque T to a desired direction in order to drive the mover in the negative direction.

The operation when the mover is driven in the negative direction is supplemented here. When signals DrA, DrB delay from the signals reversed to signals CS-A, CS-B, an excitation-switch of windings by signals DrA, DrB directs the torque to the direction effective for the motor to be driven in the negative direction, i.e. a desirable direction. In other words, when the excitation of the windings is switched effectively for the motor to be driven in the desired negative direction, signals DrA, DrB delay with regard to the signals reversed to signals CS-A, CS-B in phases.

Therefore, when the excitation is effectively switched, exciting-current-detector 7 detects that signals DrA, DrB, i.e. input signals CK-Ap, CK-Bp, delay with regard to the signals reversed to CS-A, CS-B, i.e. input signals CS-Ap, CS-Bp, in phases, then reduces the current of exciting-current-control-signal Ref. This is illustrated in FIGS. 15A and 15B.

The phase-delay is detected not as instruction-delay-signals RN-A, RN-B but as instruction-advance-signals RP-A, RP-B. Because these signals are defined for the case when the motor is driven in the positive direction, and thus the meanings of these signals alternate with each other when the motor is driven in the negative direction. When the motor is driven in the negative direction, exciting-current-control-signal Ref always has a positive value due to absolute-value-circuit 88, but charge-pump-circuit 83 outputs a negative value.

In other words, when signals CK-Ap, CK-Bp are detected delaying from the signals reversed to CS-Ap, CS-Bp in phases, signals RP-A, RP-B are supplied, and a negative output from charge-pump-circuit 83 is directed to the positive direction thereby reducing its absolute value. This absolute value functions as exciting-current-control-signal Ref by absolute circuit 88, and signal Ref thus eventually decreases.

When signals DrA, DrB advance with regard to the signals reversed to signals CS-A, CS-B, the excitation-switch on windings by signals DrA, DrB directs the torque in an unfavorable direction for the motor to be driven in the desirable negative direction. In other words, when the excitation of the windings is switched unfavorably for the motor to be driven in the desirable negative direction, signals DrA, DrB advance with regard to the signals reversed to signals CS-A, CS-B in phases.

Therefore, when the excitation is unfavorably switched, exciting-current-controller 7 detects that signals DrA, DrB, i.e. input signals CK-Ap, CK-Bp, advance with regard to the signals reversed to CS-A, CS-B, i.e. input signals CS-Ap, CS-Bp, in phases, then controller 7 increases the current of exciting-current-control-signal Ref.

The phase-advance is detected not as instruction-advance-signals RP-A, RP-B but as instruction-delay-signals RN-A, RN-B, because of the reason discussed above. When the motor is driven in the negative direction, charge-pump-circuit 83 outputs a negative value.

In other words, when signals CK-Ap, CK-Bp are detected advancing from the signals reversed to CS-Ap, CS-Bp in phases, signals RN-A, RN-B are supplied, and a negative output from charge-pump-circuit 83 is directed further to the negative direction thereby increasing its absolute value. This absolute value functions as exciting-current-control-signal Ref by absolute circuit 88, and signal Ref thus eventually increases.

As discussed in this third exemplary embodiment, providing exciting-current-controller 7 allows the step-motor-driving-device to reduce torque ripples, because controller 7 can control the maximum exciting current of the windings responsive to the phase-difference between signals CS-A, CS-B and signals DrA, DrB. At the same time, vibrations, noises, and rotating-speed-variations of the motor are reduced. The exciting current is controlled to an appropriate level responsive to a frequency or a load of the driving-instruction-signal, thereby increasing substantially the motor's efficiency. Further, withstanding against the "out of sync" is boosted substantially.

Exemplary Embodiment 4

Figure 16:
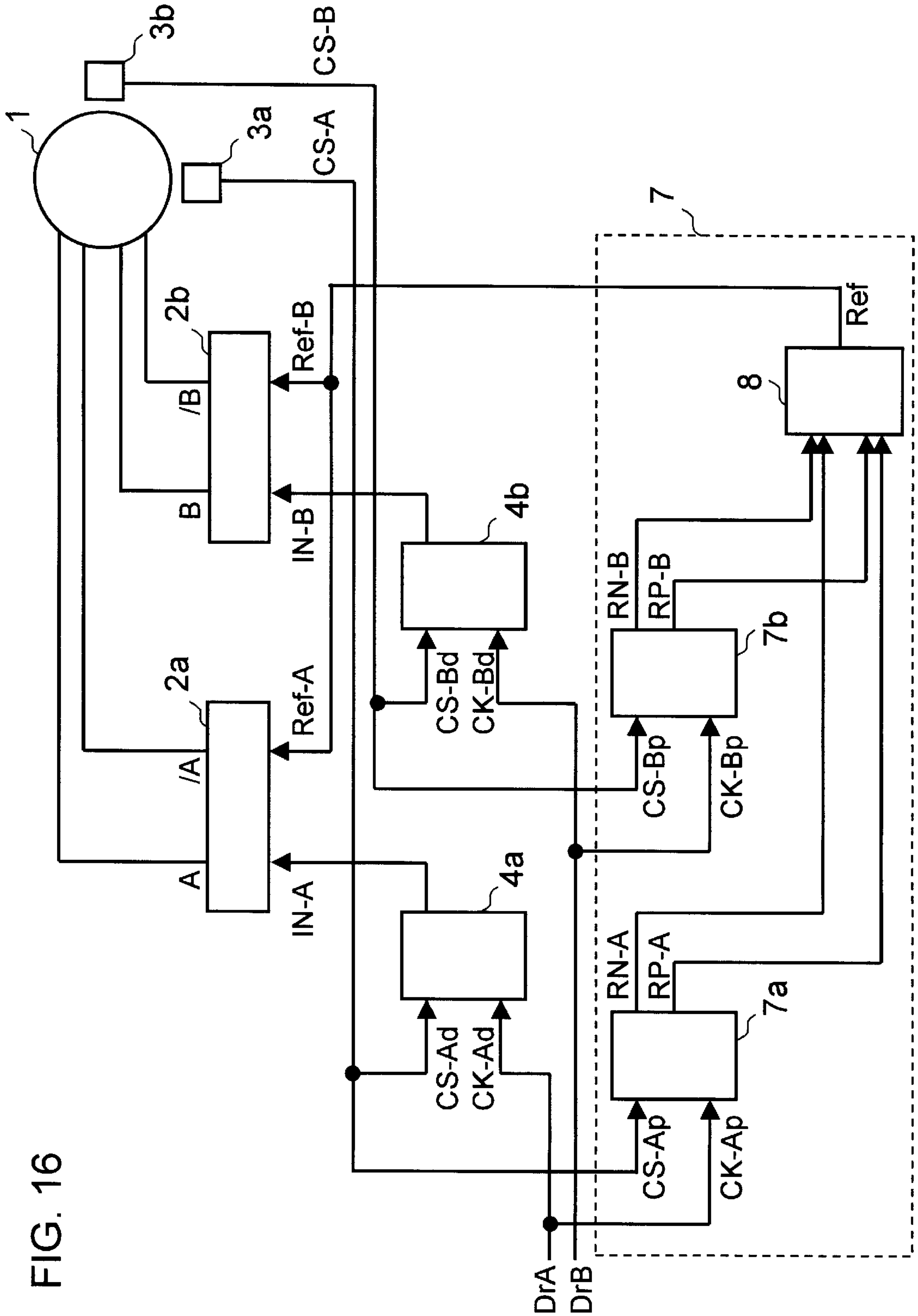
FIG. 16 illustrates a structure of a step-motor-driving device in accordance with the fourth exemplary embodiment.

FIG. 16 illustrates a structure of a step-motor-driving device in accordance with the fourth exemplary embodiment.

In FIG. 16, two-phase motor 1, exciters 2*a* and 2*b*, position detectors 3*a* and 3*b*, and exciting-current-controller 7 are the same those in FIG. 10, the detailed descriptions thereof are thus omitted here.

Exciting-current-controller 7 receives position-detecting-signals CS-A, CS-B tapped off from position detectors 3*a* and 3*b* as well as driving-instruction-signals DrA, DrB, and outputs exciting-current-control-signal Ref to exciters 2*a* and 2*b* in the form of current-value-signals Ref-A, Ref-B. Excitation-timing-controllers 4*a* and 4*b* receive signals CS-A, CS-B at their input terminals CS-Ad, CS-Bd, the controllers also receive signals DrA, DrB at another input terminals CK-Ad, CK-Bd. Controllers 4*a* and 4*b* outputs exciting signals IN-A, IN-B to exciters 2*a* and 2*b*.

The fourth exemplary embodiment shown in FIG. 16 differs from the third one in the following point: In the third embodiment, driving-instruction-signals DrA, DrB, i.e. exciting signals IN-A, IN-B are directly fed into exciters 2*a* and 2*b*, while in the fourth embodiment exciting signals IN-A, IN-B undergone a timing control with the information of position-detecting-signals CS-A, CS-B are fed into exciters 2*a* and 2*b*.

The fourth embodiment in the structure discussed above is demonstrated hereinafter with reference to FIGS. 2A, 2B, and FIG. 17A through FIG. 20.

The relations between mover's position θ and torque T are described here. The direction of mover's position θ and a moving direction of torque T have been defined in the first embodiment, and this definition is always applied to the relations in this fourth embodiment.

The relation between position-detecting-signals CS-A, CS-B and torque T generated at exciting the windings of phase-A, phase-B is the same as that of the first embodiment illustrated in FIGS. 2A and 2B, the description is thus omitted here.

An operation of excitation-timing-controller 4*a* and 4*b* in accordance with the fourth embodiment is demonstrated with reference to FIG. 16.

A typical operation during period X1 shown in FIG. 2B is demonstrated in order to make a long description to short.

Figure 17B:
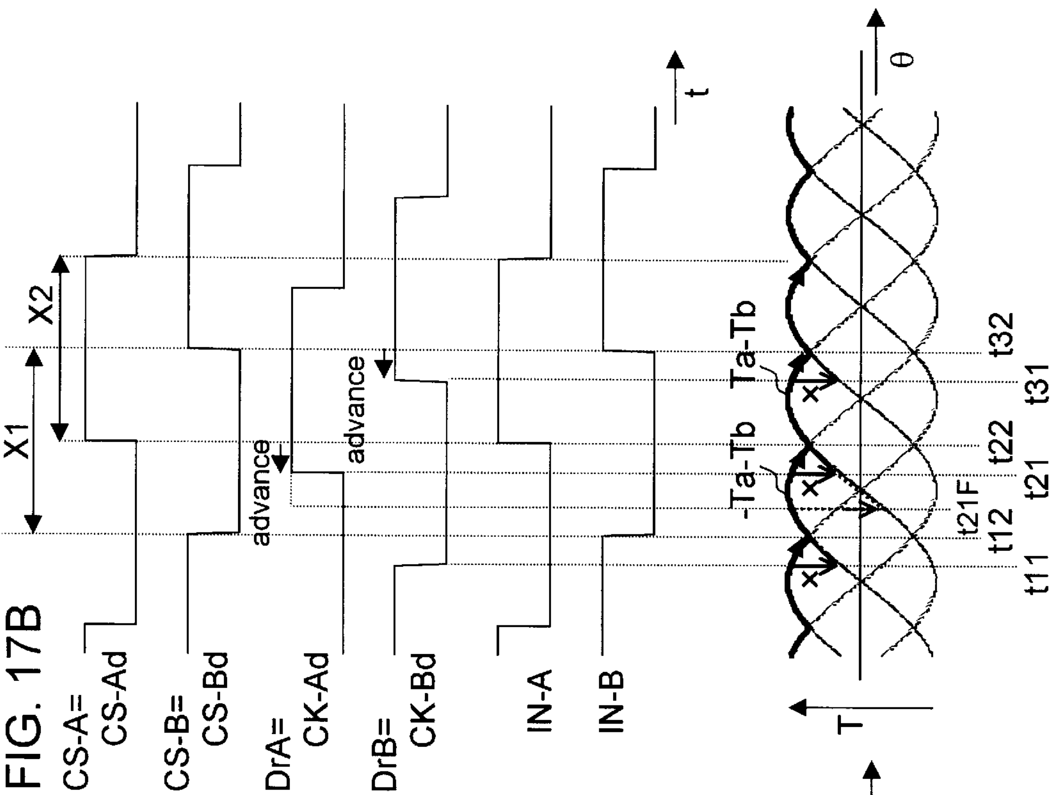
FIGS. 17A and 17B illustrate an operation of an excitation-timing controller in accordance with the fourth exemplary embodiment.
Figure 17A:
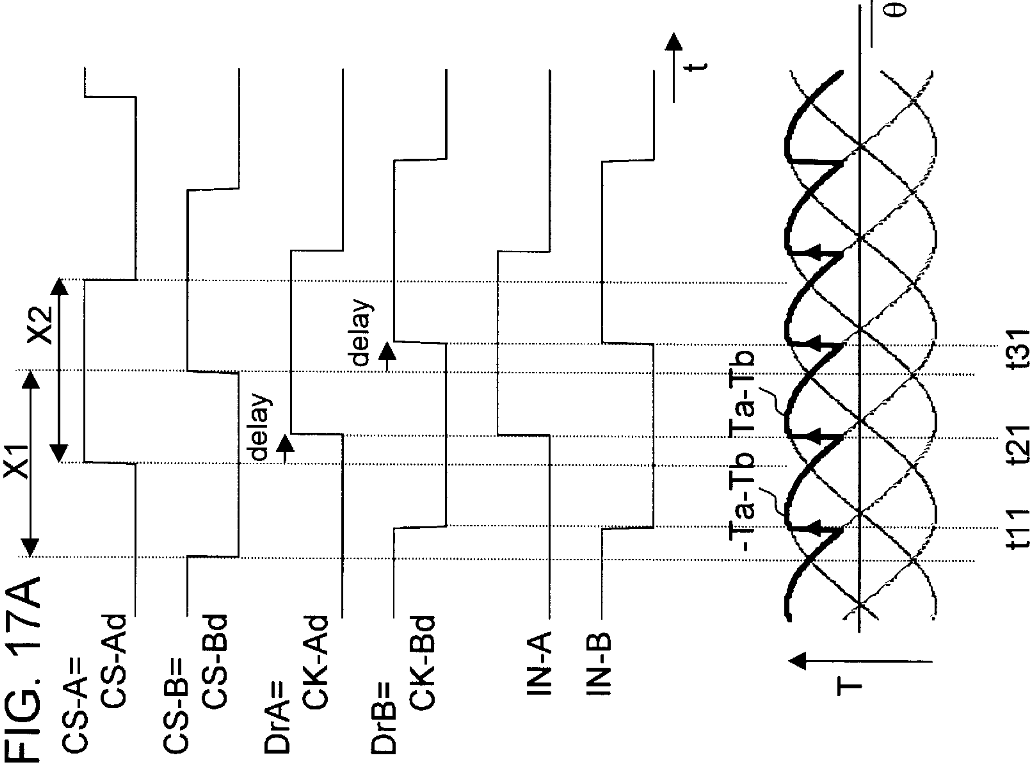

FIGS. 17A and 17B illustrate an operation of excitation-timing-controllers 4*a* and 4*b* during period X1.

During period X1, signal CS-A, i.e. signal CS-Ad turns to level H from level L, and signal CS-B, i.e. signal CS-Bd stays at level L.

As shown in FIGS. 17A and 17B, a first instance when the mover is driven in the desired positive direction is demonstrated. As shown in FIG. 17A, driving-instruction-signals DrA, DrB-delaying from signals CS-A, CS-B in phases—are fed into input terminal CK-Ad, CK-Bd of controllers 4*a* and 4*b*. In general, when signals DrA, DrB carry a low frequency or bear a lighter load, signals DrA, DrB delay from signals CS-Ad, CS-Bd in phases.

In FIG. 17A, signal CK-Ad turns to level H from level L at timing t21, and the operation at this timing is described here first. Exciting signal IN-A, IN-B are both at level L just before timing t21. Based on these signals, exciters 2*a* and 2*b* excite the windings of phase-A and phase-B to be minus. Thus the torque expressed with "−Ta−Tb" is applied to the mover.

At timing t21, signal CK-Ad turns to level H from level L, and assume that excitation-timing-controller 4*a* operates so that this signal-turn is fed into input terminal IN-A of exciter 2*a*. Then phase-A winding is excited to be plus and the torque expressed with "Ta−Tb" is applied to the mover. The torque active at timing t21 increases in the forward direction comparing with that at the timing just before t21. This torque-turn due to switching the excitation signal IN-A is effective for driving the mover in the desired positive direction.

As such, when switching the excitation of phase-A winding with signal CK-Ad, i.e. driving-instruction-signal DrA is effective for the mover to be kept driving, controller 4*a* operate so that signals CK-Ad is fed into input terminal IN-A of exciter 2*a*.

At timings t11 and t31, signal CK-Bd changes in the same manner. Assume that controller 4*b* operates so that the changes are fed into input terminal IN-B of exciter 2*b*, then excitation of phase-B winding is switched. The resultant torque increases in the forward direction comparing with those at the timings just before t11 and t31. In other words, to produce exciting signal IN-B following signal CK-Bd at timings t11 and t31 is effective for the mover to be kept driving in the positive direction.

As same as controller 4*a*, when switching the excitation of phase-B winding with signal CK-Bd, i.e. driving-instruction-signal DrB is effective for the mover to be kept driving, controller 4*b* operate so that signals CK-Bd is fed into input terminal IN-B of exciter 2*b*.

As shown in FIG. 17B, the next instance is when signals DrA, DrB advance with regard to signals CS-Ad, CS-Bd in phases, and the advanced signals are fed into input terminals CK-Ad, CK-Bd of controllers 4*a* and 4*b*. In general, signals DrA, DrB carry a high frequency or bear a heavier load, the signals advance.

In FIG. 17B, signal CK-Ad turns to level H from level L at timing t21. The operation at timing 21 is firstly demonstrated here.

Exciting signals IN-A, IN-B are both at level L just before timing t2 1. Based on these signals, exciters 2*a* and 2*b* excite the windings of phase-A and phase-B to be minus. Thus the torque expressed with "−Ta−Tb" is applied to the mover.

At timing t21, signal CK-Ad turns to level H from level L, and assume that excitation-timing-controller 4*a* operates so that this signal-turn is fed into input terminal IN-A of exciter 2*a*. Then phase-A winding is excited to be plus and the torque expressed with "Ta−Tb" is applied to the mover.

The torque active at timing t21 decreases in the reverse direction, though its value is still in the forward direction, comparing with that at the timing just before t21. This switching of the excitation signal IN-A is unfavorable for driving the mover in the desired positive direction. (This switch is marked with ×in FIG. 17B.) This switch would cause "out of sync" as described in the conventional instances.

Further, when a turning point of signal CK-Ad is moved up to timing t21F, the torque is directed in the reverse direction in value, thereby further increasing the chances for "out of sync".

As such, controller 4*a* operates not to supply signal CK-Ad directly to exciter 2*a* at its input terminal IN-A when a switch of exciting the phase-A winding with signal CK-Ad, i.e. signal DrA, is unfavorable for the mover to be kept driving, but it operates instead to supply signal CS-A, i.e. signal CS-Ad, as an exciting signal to exciter 2*a* at its input terminal IN-A.

This operation by controller 4*a* allows the excitation of phase-A winding to change at timing t22 when signal CS-Ad turns to level H from level L. As a result, the maximum torque level is obtainable for the mover to be kept driving in the positive direction as shown in FIG. 17B. This clears away a fear of "out of sync".

The same phenomenon can be seen at timings t11 and t31 in FIG. 17B, i.e. signal CK-Bd changes at these timings, and assume that controller 4*b* operates to output this change to exciter 2*b* at its input terminal IN-B. Then excitation of phase-B winding changes thereby decreasing the torque applied to the mover in the reverse direction comparing with that of just before these timings. In other words, it is unfavorable to produce exciting signal IN-B at timings t11 and t31 based on signal CK-Bd for the mover to be kept driving in the positive direction.

As such, controller 4*b* operates not to supply signal CK-Bd directly to exciter 2*b* at its input terminal IN-B when a switch of exciting the phase-B winding with signal CK-Bd, i.e. signal DrB, is unfavorable for the mover to be kept driving, but it operates instead to supply signal CS-B, i.e. signal CS-Bd, as an exciting signal to exciter 2*b* at its input terminal IN-B.

This operation by controller 4*b* allows the excitation of phase-B winding to change at timing t12 or t32 when signal CS-Bd changes. As a result, the maximum torque level is obtainable for the mover to be kept driving in the positive direction as shown in FIG. 17B. This clears away a fear of "out of sync".

The operation during period X1 discussed above is also applicable to other periods X2, X3 and X4 shown in FIG. 2B.

The operation of excitation-timing-controllers 4*a* and 4*b* at the driving of the motor in the positive direction is summarized as follows:

When the excitation of respective phases' windings of motor 1 is switched responsive to signals CK-Ad, CK-Bd, i.e. driving-instruction-signals DrA, DrB, if the resultant torque is directed in the reverse direction, which is unfavorable for the mover to be kept driving in the positive direction, controllers 4*a* and 4*b* supply input signal CS-Ad, CS-Bd, i.e. the signals produced by position detectors 3*a* and 3*b*, as exciting signals to exciters 2*a* and 2*b*. On the other hand, if the resultant torque is not directed in the reverse direction but is still effective for the mover to be kept driving in the positive direction, controllers 4*a* and 4*b* supply input signal CK-Ad, CK-Bd, i.e. driving-instruction-signals DrA, DrB, as exciting signals to exciters 2*a* and 2*b*.

The operation discussed above can be more specifically described as follows: Controllers 4*a* and 4*b* operate to output the later arrival signals between signals DrA, DrB, and signals CS-Ad, CS-Bd as exciting signals.

The instance of driving the motor in the positive direction (=desirable direction) has been demonstrated with reference to FIGS. 17A and 17B, and the same description is applicable to an instance of driving the motor in the negative direction (=desirable direction).

When the mover is driven in the negative direction, the operation (not illustrated) is essentially the same as the instance of driving the mover in the positive direction shown in FIGS. 17A and 17B except the following points: Phases of signals CK-Ad, CK-Bd, i.e. driving instruction signals DrA, DrB, are reversed. Then the delays and advances of signals DrA, DrB with regard to position-detecting-signals CS-A, CS-B are related to the signals reversed to signals CS-A, CS-B.

These two exceptions discussed above have the following objectives: Reversing the phases of signals DrA, DrB intends to reverse a rotational direction of the magnetic field produced by the driving windings. Relating the delays and advances of signals DrA, DrB with regard to the signals reversed to signals CS-A and CS-B intends to direct a reversely directed torque in a desired direction in order to drive the mover in the negative direction.

The operation of controllers 4*a* and 4*b* is summarized as follows:

Controllers 4*a* and 4*b* switch the excitation of phases' driving windings responsive to input signals CK-Ad, CK-Bd, i.e. signals DrA, DrB. In this instance, when a resultant torque is directed forwardly and affects unfavorably the mover to be kept driving in the negative direction, controllers 4*a* and 4*b* output signals CS-Ad and CS-Bd, i.e. signals reversed to the signals produced by position detectors 3*a* and 3*b*, as exciting signals to exciters 2*a* and 2*b*. Also in the same instance, when a resultant torque is not directed to forward direction and still affects favorably the mover to be kept driving in the negative direction, controllers 4*a* and 4*b* output signals CK-Ad, CK-Bd, i.e. signals DrA, Dr B, as exciting signals to exciters 2*a* and 2*b*.

Controllers 4*a* and 4*b*, in more specific, outputs the later arrival signals between signals DrA, DrB and signals CS-A, CS-B as exciting signals to exciters 2*a* and 2*b*.

Controllers 4*a* and 4*b*, as discussed above, controls the excitation timing so that signals, which can switch the excitation effectively for driving the mover, are supplied out of signals DrA, DrB and signals CS-A, CS-B as exciting signals. As a result, the step-motor-driving device employing controllers 4*a* and 4*b* is free from "out of sync".

Figure 18:
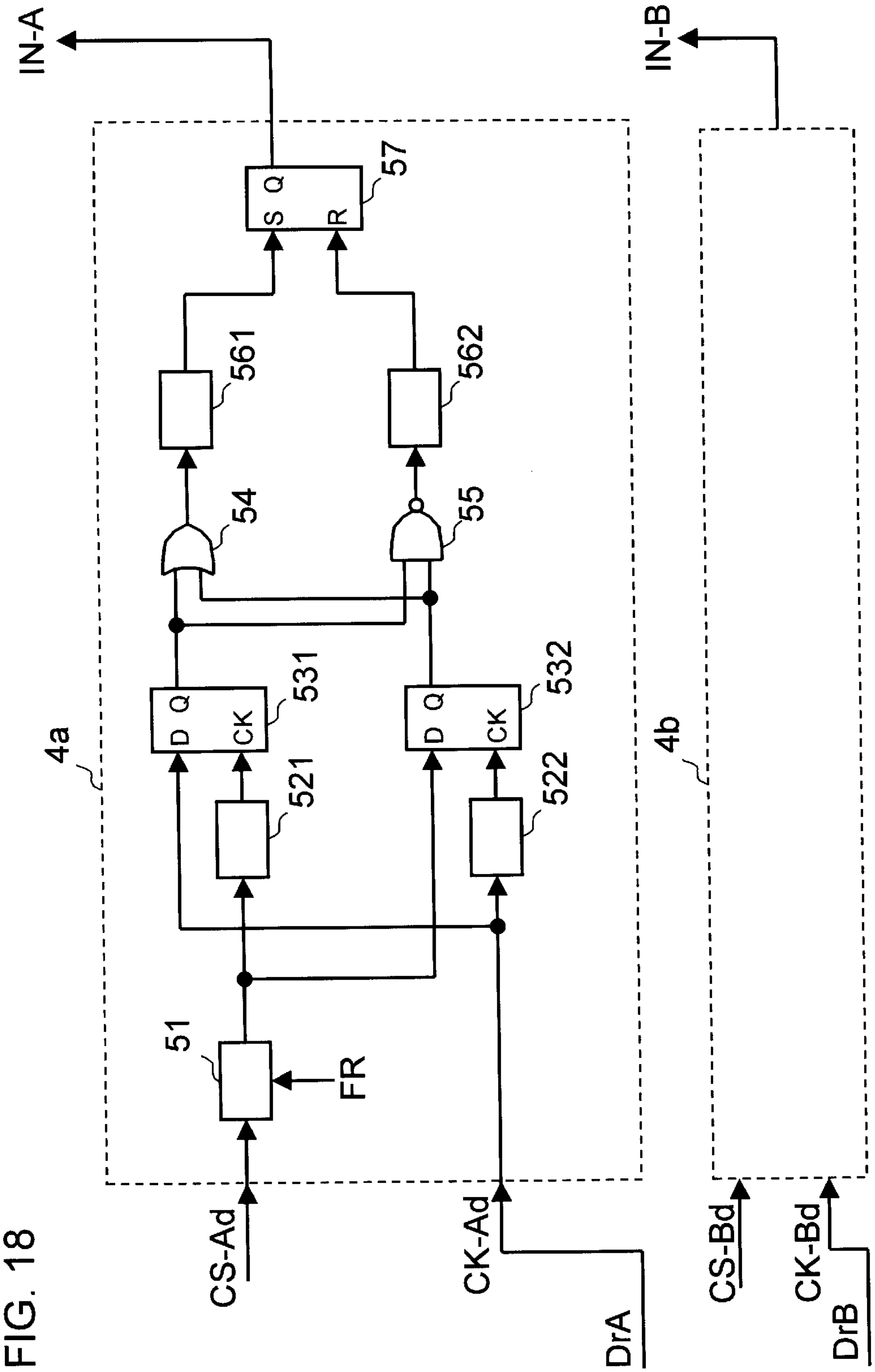
FIG. 18 illustrates a specific construction of the excitation-timing controller in accordance with the fourth exemplary embodiment.

Reciprocal latch shown in FIG. 18 is a specific example of controller 4*a*. This reciprocal latch has the same inner structure as latch 50*a* used in the first embodiment illustrated in FIG. 6A, a detailed description thereof is thus omitted here. This reciprocal latch receives signals CS-Ad, CK-Bd and outputs signal IN-A to exciter 2*a*. Controller 4*b* has an inner structure identical to controller 4*a*.

Controllers 4*a* and 4*b* shown in FIG. 18 operates so that the position-detecting signal and a driving-instruction-signal latch with each other at their own timings. The circuit embodying this operation allows controller 4*a* and 4*b* to output the delayed signal between the position-detecting-signal and driving-instruction-signal as the exciting signal.

Reciprocal-signal-selector 60*a* shown in FIG. 6B is another specific example of controller 4*a* as discussed in the first embodiment. Controller 4*b* can be also embodied by reciprocal-signal-selector 60*b*.

The step-motor-driving device, which employs controllers 4*a* and 4*b* as well as exciting-current-controller 7 in accordance with the third embodiment, operates in the fourth embodiment as follows:

A first instance, when the mover is driven in the desired positive direction and driving-instruction-signals DrA, DrB delay with regard to position-detecting-signals CS-A, CS-B, is demonstrated hereinafter.

In general, signals DrA, DrB carry a low frequency or bear a light load, signals DrA, DrB delay from signals CS-A, CS-B in phases.

In this case, excitation-timing-controllers 4*a* and 4*b* output timing signals as exciting signals IN-A, IN-B responsive to signals DrA, DrB because signals DrA, DrB are effective for the mover to be driven. This operation is thus equivalent to that in the third embodiment, i.e. signals DrA, DrB are directly supplied as exciting signals IN-A, IN-B, which is shown in FIGS. 12A and 12B.

The instance, when the mover is driven in the desired negative position and signals DrA, DrB delay with regard to signals CS-A, CS-B, is also equivalent that in the third embodiment which is shown in FIGS. 15A and 15B.

It is concluded that when signals DrA, DrB delay with regard to signals CS-A, CS-B, exciting-current-controller 7 effectively operates, thereby reducing torque ripples, vibrations, noises and rotating-speed-variations in the step-motor. The exciting current is regulated to a minimum level responsive to the loads, and the step-motor efficiency is thus improved substantially.

A second instance—when the mover is driven in the desired positive direction and signals DrA, DrB advance with regard to signals CS-A, CS-B—is demonstrated.

In general, signals DrA, DrB carry a high frequency or bear a heavy load, signals DrA, DrB advance from signals CS-A, CS-B in phases.

In this case, controllers 4*a* and 4*b* output timing signals as exciting signals IN-A, IN-B responsive to signals CS-A, CS-B because signals CS-A, CS-B are effective for the mover to be driven as previously discussed. This operation is illustrated in FIGS. 19A and 19B.

Figure 19B:
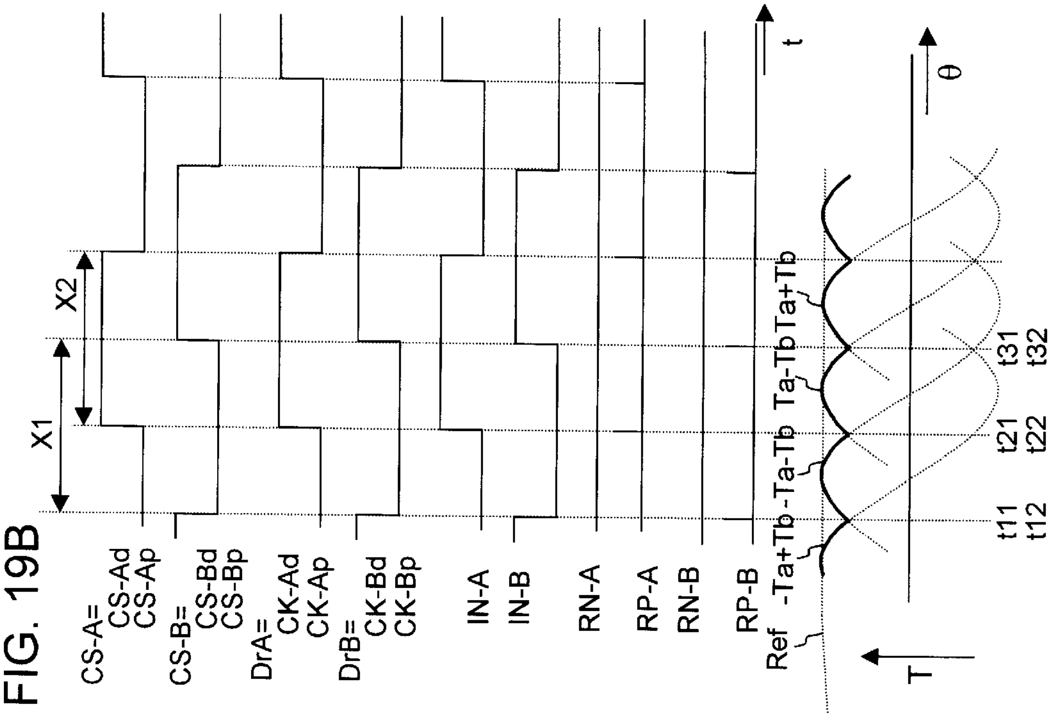
FIGS. 19A and 19B illustrate an operation, at the driving in the positive direction with an advance of driving instruction, of the step-motor-driving device in accordance with the fourth exemplary embodiment.
Figure 19A:
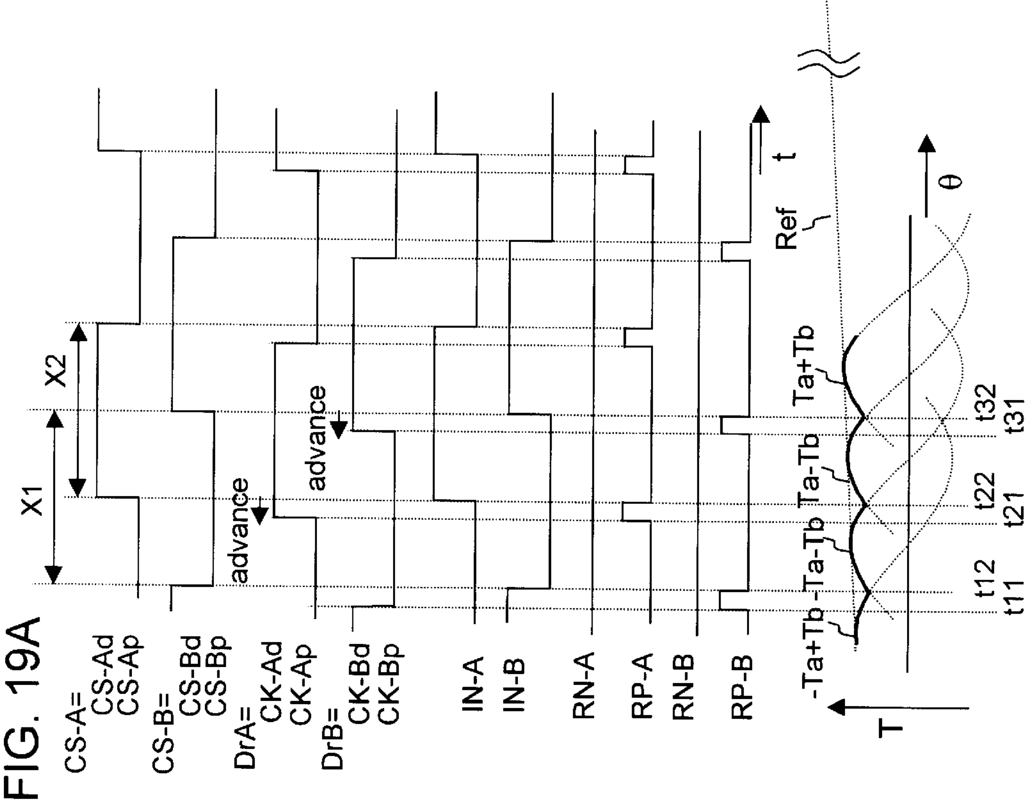

As FIGS. 19A and 19B show, controllers 4*a* and 4*b* allow torque T generated for driving the mover to get another waveform due to a switch of exciting the driving windings not by the timing of signals DrA, DrB but by the timing of signals CS-A, CS-B.

In the third embodiment, where the excitation-timing-controllers 4*a* and 4*b* are not employed, torque T is directed in the reverse direction at the excitation-switch (refer to FIGS. 13A and 13B); however, torque T is never directed in the reverse direction in this fourth embodiment. As a result, a chance of "out of sync" is sweepingly cleared away.

Figure 20:
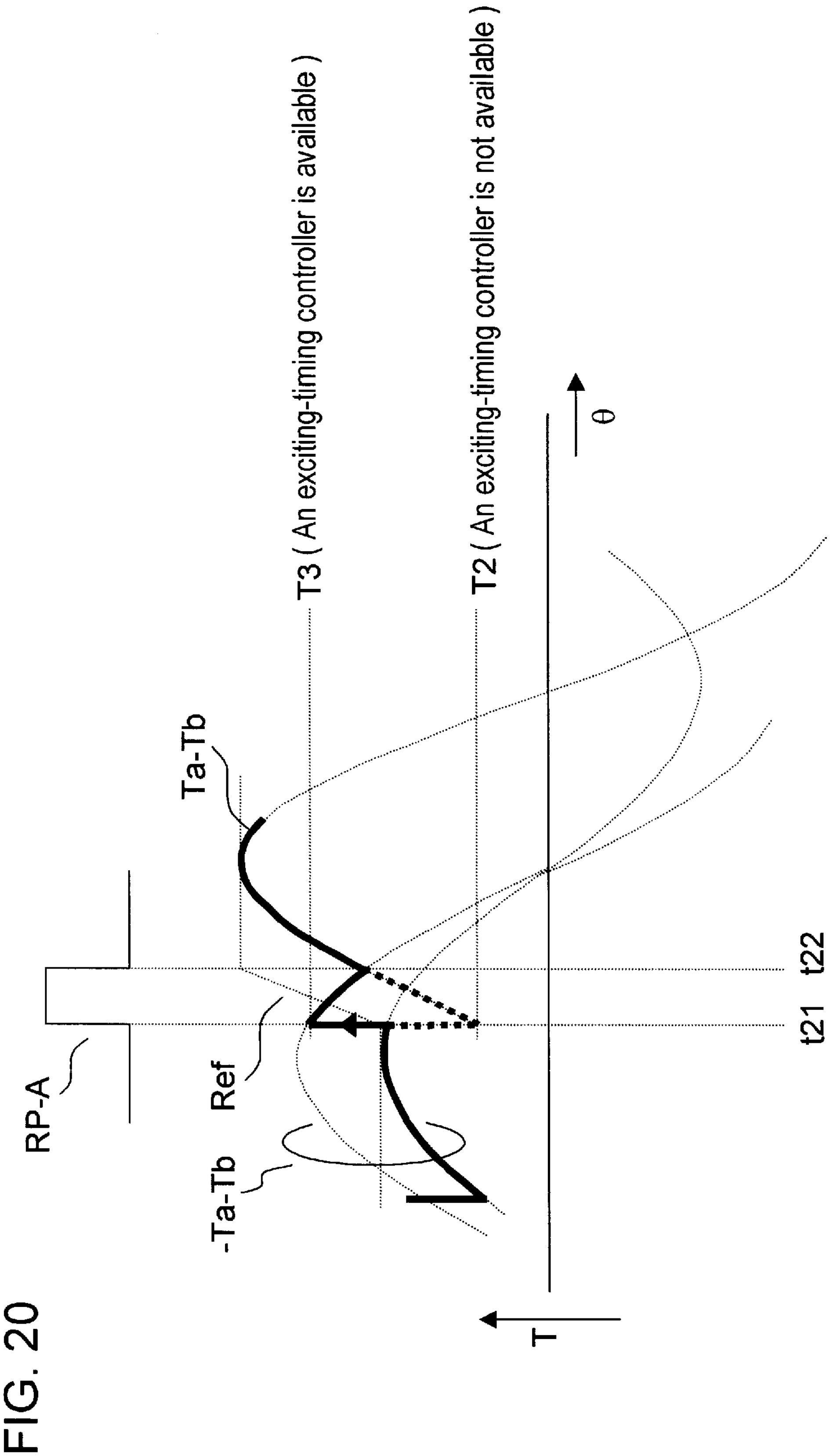
FIG. 20 is a partially enlarged view of the operation in the third embodiment.

FIG. 20 is an enlarged view of the period around timing t21 in FIGS. 19A and 19B in order to describe operations during the period more in detail.

As shown in FIG. 20, instruction-advance-signal RP-A turns to level H at timing t21 responsive to the change of driving-instruction-signal DrA, then exciting-current-control-signal Ref starts to increase at timing t21. Excitation-switch of the windings is not done at timing 21 due to the operation of excitation-timing-controller 4*a* and 4*b*. Ibrque T is expressed with "−Ta−Tb" before timing t21 is carried over with increasing its peak value in step with signal Ref until timing t22. At timing t22 when signal CS-A changes, instruction-advance-signal RP-A once returns to level L and signal Ref stop increasing, and at the same time, excitation of the windings is switched, thereby turning torque T to the torque expressed with "−Ta−Tb".

In a series of operations of the fourth embodiment discussed above, the effect of exciting-current-controller 7 cooperates with the effect of excitation-timing-controller 4*a* and 4*b* thereby increasing the torque up to level T3 as shown in FIG. 20. On the other hand, in the third embodiment—where controller 4*a* and 4*b* are not used—the torque lowers down to level T2 at timing 21. This proves that a chance of "out of sync" is sweepingly avoidable in the fourth embodiment. (This operation is applicable to other timings.) This second instance when signals DrA, DrB advance with regard to signals CS-A, CS-B continues until an extent of the advance becomes substantially small.

When the driving-instruction-signal carries a high frequency or bears a heavy load, and signals DrA, DrB advance with regard to signals CS-A, CS-B in phases, and yet, the excitation is switched unfavorably to the step-motor, excitation-timing-controllers 4*a* and 4*b* as well as current-controller 7 provide a feed-back control so that the advances of signals DrA, DrB with regard to signals CS-A, CS-B can be reduced. When an extent of this advance decreases, torque ripples become substantially small as shown in FIG. 19B.

The fourth embodiment can thus not only avoid the "out of sync" but also reduce the torque ripples. These advantages produce the effects of reducing vibrations and rotating-speed-variations of the motor. Resultant exciting current is controlled to an appropriate level responsive to the loads, which increases substantially the motor efficiency.

The description discussed above has been referred to the instance when the mover is driven in the desired positive direction (where DrA, DrB advance with regard to CS-A, CS-B). The same manner is applicable to the instance when the mover is driven in the desired negative direction (where DrA, DrB advance with regard to CS-A, CS-B).

When the mover is driven in the negative direction (not shown), the operation is basically the same as the operation when the mover is driven in the positive direction as shown in FIGS. 19A and 19B except the following two points: The phases of signals DrA, DrB are reversed, then the delay and advance of signals DrA, DrB are related to the signals reversed to signals CS-A, CS-B. These two differences have the following objectives.

Reversing the phases of signals DrA, DrB is to reverse a rotating direction of a magnetic field generated by the windings. Relating the delay-advance relation with the reversal signals to signals CS-A, CS-B is to direct a reversed torque T to a desired direction in order to drive the mover in the negative direction.

As discussed in this fourth exemplary embodiment, providing (1) excitation-timing-controllers 4*a* and 4*b*—controlling the excitation timing so that signals, which can switch the excitation effectively for driving the mover, are supplied out of signals DrA, DrB and signals CS-A, CS-B as exciting signals and (2) exciting-current-controller 7—controlling the maximum exciting current of the windings responsive to the phase difference between signals CS-A, CS-B and signals DrA, DrB, allow the step-motor-driving device to avoid the "out of sync" sweepingly, and at the same time, to reduce vibrations, noises, and rotating-speed-variations of the motor. The exciting current is controlled at an appropriate level responsive to a frequency of the driving-instruction-signal or load to the motor, thereby increasing substantially the motor's efficiency.

Exemplary Embodiment 5

Figure 21:
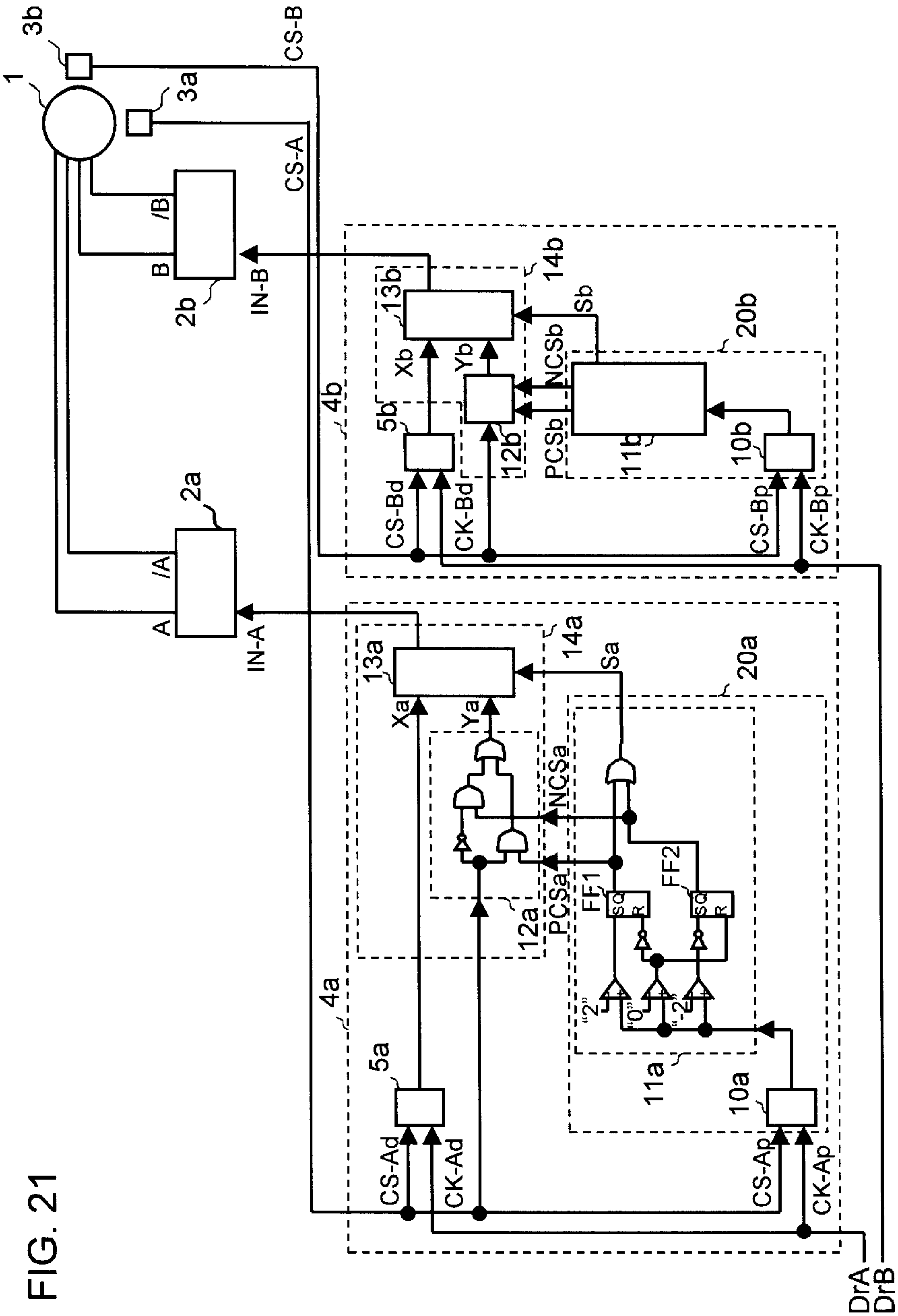
FIG. 21 illustrates a structure of a step-motor-driving device in accordance with the fifth exemplary embodiment.

FIG. 21 illustrates a structure of a step-motor-driving device in accordance with the fifth exemplary embodiment of the present invention.

In FIG. 21, two-phase motor 1, exciters 2*a*, 2*b*, position detectors 3*a* and 3*b* are the same as used in the first embodiment shown in FIG. 1.

Excitation-timing-controllers 4*a* and 4*b* receive position-detecting-signals CS-A, CS-B from position detectors 3*a* and 3*b* and driving-instruction-signals DrA, DrB, then output signals to exciters 2*a* and 2*b* at their input terminals IN-A, IN-B.

The fifth embodiment illustrated in FIG. 21 differs from the first conventional instance shown in FIG. 73 in the following point: In the conventional instance, driving-instruction-signals DrA, DrB are directly fed into exciters 2*a* and 2*b*, while in the fifth embodiment exciting-signals IN-A, IN-B, which have been undergone a timing control by excitation-timing-controllers 4*a* and 4*b* using the information of position-detecting-signals CA-A, CS-B, are fed into exciters 2*a* and 2*b*.

Excitation-timing-controllers 4*a* and 4*b* are described hereinafter. Controllers 4*a* and 4*b* are identical, and thus only controller 4*a* is described here for describing both.

As shown in FIG. 21, excitation-timing-controller 4*a* comprises delay-signal-selector 5*a*, deviation-detector 20*a*, and exciting-signal-selector 14*a*.

Delay-signal-selector 5*a* receives position-detecting-signal CS-A and driving-instruction-signal DrA as input signals CS-Ad and CK-Ad, and outputs a signal of later arrival between signals CS-Ad and CK-Ad when the step motor is driven in the positive direction. Selector 5*a* outputs a signal of later arrival between signal CK-Ad and a signal reversed to signal CS-Ad when the step-motor is driven in the negative direction.

Deviation detector 20*a* receives position-detecting-signal CS-A and driving-instruction-signal DrA as input signals CS-Ap and CK-Ap, and detects a difference between numbers of pulses of these signals, i.e. deviation. In other words, this deviation detector sorts the motor condition into the following three statuses based on the difference in numbers of the pulses, i.e. deviation: A first status is that the deviation falls within a given range. A second status is that the deviation falls outside the given range and requires a forwardly-directed torque which induces the mover of the step-motor to move in the positive direction so that the deviation falls within the given range. A third status is that the deviation falls outside the given range and requires a reversely-directed torque which induces the mover to move in the negative direction so that the deviation falls within the given range. To be more specific, deviation detector 20*a* comprises, as shown in FIG. 21, deviation counter 10*a* for counting the deviation and determiner 11*a* for determining whether an output, i.e. deviation, from counter 10*a* falls into the first or second status.

Exciting-signal-selector 14*a* which selects and outputs—based on a detection result by deviation detector 20*a*—one signal to exciter 2*a* as exciting signal IN-A, out of an output signal supplied from delay-signal-selector 5*a*, position detecting signal CS-A and the reversed signal to position-detecting-signal CS-A. FIG. 21 illustrates exciting-signal-selector 14*a* more specifically, i.e. selector 14*a* comprises the following elements:

- controller 12*a* for determining position-detecting-signal CS-A to go as it is or to be reversed before going depending on output signal PCSa, NCSa supplied from detector 20*a*; and
- selector 13*a* for selecting one of signal Ya supplied from controller 12*a* or signal Xa supplied form selector 5*a* depending on output signal Sa supplied from detector 20*a*.

In the same way, excitation-timing-controller 4*b* comprises delay-signal-selector 5*b*, deviation detector 20*b*, and exciting-signal-selector 14*b*.

Regarding controller 4*b*, as shown in FIG. 21, the like elements of controller 4*a* are denoted with the like reference marks and the suffix "a" or "A" expressing controller 4*a* is changed to "b" or "B" for expressing controller 4*b*. The description thereof is omitted here.

An operation of the fifth exemplary embodiment having a structure discussed above is demonstrated hereinafter.

Several relations between mover's position θ and torque T are described in the drawings. The direction of mover's position θ and an applying direction of torque T have been defined in the first embodiment, and this definition is always applied to the relations in this fifth embodiment.

The expression, "when the motor is instructed to rotate in the positive (or negative) direction", means that a driving-instruction-signal instructs the motor to rotate in the positive (or negative) direction. The driving-direction-instruction has been well known for being determined by the phase-relation between driving-instruction-signals DrA and DrB.

The expression, "when the motor is driven in the positive (or negative) direction", means that the motor rotates actually in the positive (or negative) direction. An actual rotating direction has been well known for being recognized by the phase relation between position-detecting-signals CS-A and CS-B.

The relation between signals CS-A, CS-B and torque T generated at exciting the respective phases' windings is the same as that described in the first embodiment illustrated in FIGS. 2A and 2B.

A first instance, when the motor is instructed to rotate in the positive direction, is demonstrated here. In this instance, three statuses already described in the description of deviation-detector 20*a* are available.

The first status, where the deviation between position-detecting-signals CS-A, CS-B and driving-instruction-signals DrA, DrB falls within the given range, is described. The first status, in other words, finds itself that signals CS-A, CS-B synchronize with signals DrA, DrB, and the motor intrinsically works and functions properly under this condition.

Figure 22B:
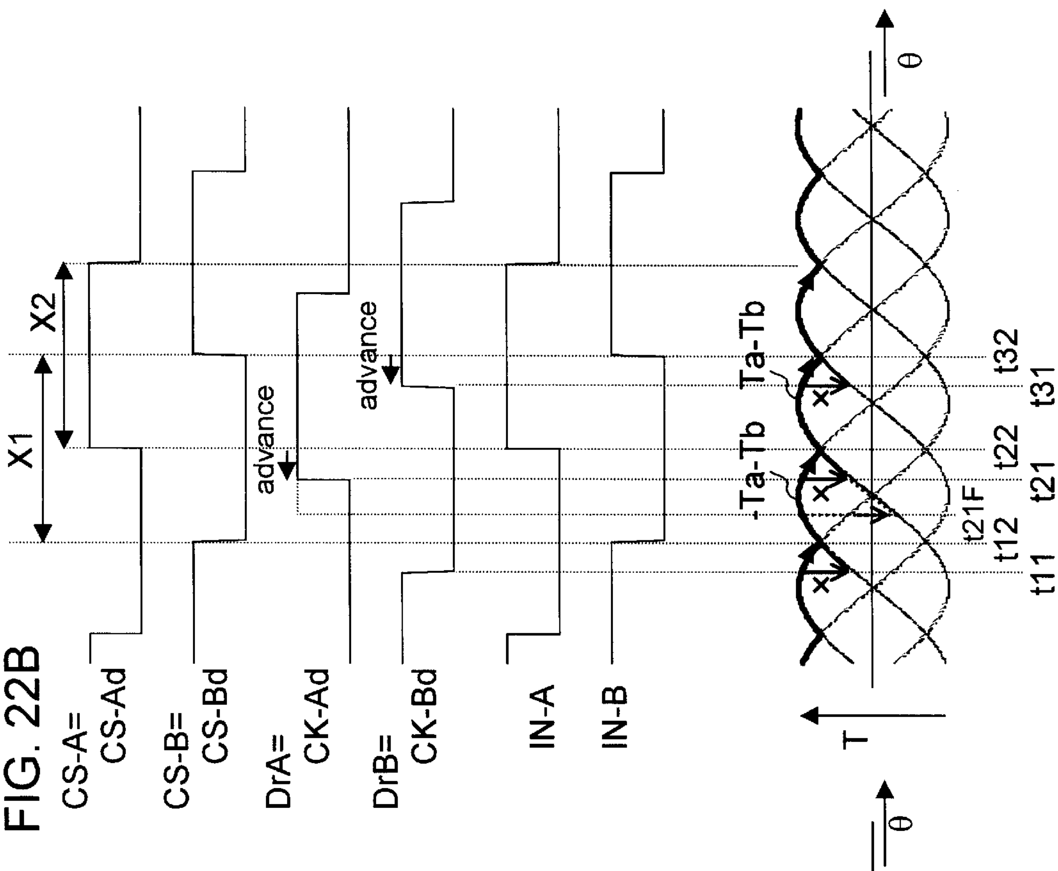
FIGS. 22A and 22B illustrate an operation in a first status of the step-motor-driving device at the driving in the positive direction in accordance with the fifth exemplary embodiment.
Figure 22A:
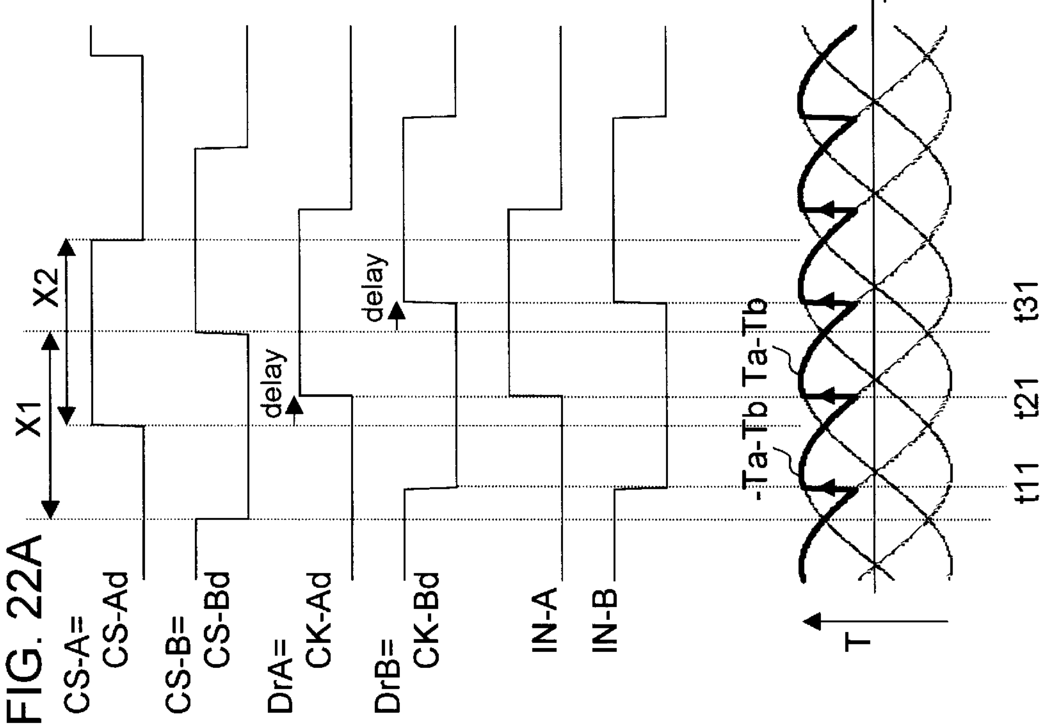

An operation in this first status is demonstrated with reference to FIGS. 21, 22A and 22B.

When signals CS-A, CS-B synchronize with signals DrA, DrB, these signals change alternately and arrive at input terminals CS-Ap, CS-Bp, CK-Ap and CK-Bp of deviation-detectors 20*a* and 20*b* as well as input terminals CS-Ad, CS-Bd, CK-Ad, and CK-Bd of delay-signal-selectors 5*a* and 5*b*.

Under this condition, when the motor is instructed to rotate in the positive direction, deviation-counter 10*a*, which is one of the elements making up deviation-detector 20*a*, counts up its output value by one every time input signal CK-Ap changes, and when the motor is driven in the positive direction counter 10*a* counts down its output value by one every time input signal CS-Ap changes. When the motor is driven in the negative direction, counter 10*a* counts up by one every time input signal CS-Ap changes.

Deviation-counter 10*a* having the structure discussed above outputs alternately "+1, 0" or "−1, 0" when receiving signals CS-A and DrA alternately changing.

In determiner 11*a*, one of the elements making up detector 20*a*, flip-flops FF1 and FF2 stay at level L because they are neither reset nor set. Meanwhile flip-flops FF1 and FF2 have been reset at an initial stage and their outputs have stayed at level L. As a result, output signals PCSa, NCSa and Sa are all at level L. As such, in the first status deviation-detector 20*a* operates so that all the outputs signals PCSa, NCSa and Sa turn to level L.

Deviation-counter 10*b* and determiner 11*b*, both making up deviation-detector 20*b*, operate in the same way. In the first status detector 20*b* also operates so that all the outputs signals PCSb, NCSb and Sb turn to level L.

When output signals Sa, Sb from deviation detectors 20*a* and 20*b* are at level L, exciting-signal-selectors 14*a* and 14*b* select and output the signals supplied from delay-signal-selectors 5*a* and 5*b* as exciting signals IN-A, IN-B. Meanwhile the output signals from selector 5*a* and 5*b* have been fed into selectors 13*a* and 13*b* as input signals Xa, Xb.

In the first status excitation-timing-controllers 4*a* and 4*b* thus operate so that the output signals from selectors 5*a* and 5*b* work as exciting signals IN-A, IN-B.

FIGS. 22A and 22B illustrate the operation in the first status and focus on periods X1 and X2 shown in FIGS. 2A and 2B.

FIG. 22A specifically shows an operation when driving-instruction-signals DrA, DrB delay with regard to position-detecting-signals CS-A, CS-B in phases (in general, when signals DrA, DrB carry a low frequency or bear a light load, these signals delay). FIG. 22B shows an operation when driving-instruction-signals DrA, DrB advance with regard to position-detecting-signals CS-A, CS-B in phases (in general, when signals DrA, DrB carry a high frequency or bear a heavy load, these signals advance).

First, in FIG. 22A, since signals DrA, DrB delay from signals CS-A, CS-B, delay-signal-selector 5*a* and 5*b* output signals at the same timing as signals DrA, DrB. Excitation-timing-controllers 4*a* and 4*b* thus operate so that exciting-signals IN-A, IN-B are supplied at the same timing as signals DrA, DrB. As a result, an excitation of the driving windings is switched at timings t11, t21, t31 and onward.

Around timing t21, for instance, signals IN-A, IN-B are at level L just before timing t21, thus torque T expressed with "−Ta−Tb" works on the mover, and signals IN-A, IN-B are at level H just after timing t21, thus torque T expressed with "Ta−Tb" works on the mover.

The excitation-switch at timing t21, as shown in FIG. 22A, works so that the torque turns to the forward direction. Thus the excitation-switch is also effective for the mover to be driven in the positive direction. This phenomenon can be seen also at timings t11 and t31.

As such, when signals DrA, DrB are supplied later than signals CS-A, CS-B in phases, excitation-switch induces the mover to be driven as same as the conventional step-motor.

In FIG. 22B, on the other hand, since signals DrA, DrB advance with regard to signals CS-A, CS-B, delay-signal-selectors 5*a* and Sb output signals at the same timing as signals CS-A, CS-B. Excitation-timing-controllers 4*a* and 4*b* thus operate so that exciting-signals IN-A, IN-B are supplied at the same timing as signals CS-A, CS-B. As a result, an excitation of the driving windings is switched at timings t12, t22, t32 and onward.

The operation shown in FIG. 22B differs from that in FIG. 22A in the timings, namely, the excitation is switched at not timing t11, t21 and t31 (i.e. the timings when signals DrA, DrB change), but at timings t12, t22 and t32 (i.e. the timings when signals CS-A, CS-B change).

When signals DrA, DrB are supplied in advance of signals CS-A, CS-B in phases, and at this situation if excitations are switched at timings t11, t21 and t31 as same as shown in FIG. 22A, the torque turns at the point marked with X in FIG. 22B. This torque-turn is directed in the reverse direction and is unfavorable for the mover to be driven in the positive direction.

Repetition of such an operation would cause the "out of sync" as described in the conventional instances. Timing t21F shown in FIG. 22B is the point where changes of signal DrA are moved up in timing. At this point, a value of the torque is directed in the reverse direction, which further increases chances of "out of sync".

When signals DrA, DrB are supplied in advance of signals CS-A, CS-B in phases, the excitation is switched following the timing at which signals CS-A, CS-B change in order to overcome this conventional problem.

In the first status, as discussed above, excitation-timing-controllers 4*a* and 4*b* operate so that the output signals from delay-signal-selectors 5*a* and 5*b* work as exciting-signals IN-A, IN-B, thereby controlling the motor.

In conclusion, when signals DrA, DrB carry a low frequency or bear a light load, i.e. when signals DrA, DrB are supplied delaying with regard to signals CS-A, CS-B in phases, delay-signal-selectors 5*a* and 5*b* allow signals DrA, DrB to work as exciting signals IN-A, IN-B, so that the step-motor performs equivalently to the conventional step-motor.

When signals DrA, DrB carry a high frequency or bear a heavy load, i.e. when signals DrA, DrB are supplied advancing with regard to signals CS-A, CS-B in phases, since delay-signal-selectors 5*a* and 5*b* allow signals CS-A, CS-B to work as exciting signals IN-A, IN-B, the torque turns at timing t12, t22 and t 32 in FIG. 22B so that the maximum torque level is obtained for the mover to be driven in the positive direction. As a result, chances for "out of sync" are sweepingly cleared away.

The second status is described hereinafter.

In the second status, the deviation between position-detecting-signals CS-A, CS-B and driving-instruction-signals DrA, DrB fall outside the given range. Then the forward torque, which directs the mover in the positive direction, is required for the deviation to fall within the given range.

In other words, the second status happens at the following instances:

signals DrA, DrB carry a high frequency;

the frequency of signals DrA, DrB jumps to a higher level;

the motor bears heavy load;

the loads to the motor jump to a heavier level; or the mover undershoots the position.

This second status means that signals DrA, DrB are supplied in more numbers than signals CS-A, CS-B. When the motor falls into this status, forward torque should be applied immediately to the motor to accelerate so that the motor can return to the first status which ensures the motor to function properly.

The operation in the second status is demonstrated hereinafter with reference to FIGS. 21 and 23.

When signals DrA, DrB are supplied in more numbers than signals CS-A, CS-B due to the factors listed above, the outputs from deviation-counters 10*a* and 10*b*, which make up deviation-detectors 20*a* and 20*b*, take a value of "+2" or more than "+2" overshooting "+1". Then determiner 11*a*, which is also one of the elements of detector 20*a*, turns output signals PCSa, NCSa and Sa to be at levels H, L, and H respectively, because flip-flop FF1 in determiner 11*a* is set to turn its output to level H.

As such, in this second status, deviation-detector 20*a* operates so that its output signals PCSa, NCSa and Sa to turn to levels H, L and H respectively. This second status is kept going until the output of deviation-counter 10*a* returns to zero "0" and flip-flop FF1 is reset whereby the first status takes over this second status.

Determiner 11*b*—making up deviation-detector 20*b*—operates in the same way. Detector 20*b* also operates so that its output signals PCSb, NCSb and Sb turn to levels H, L and H respectively. When output signals Sa, Sb from detectors 20*a* and 20*b* turn to level H as discussed above, exciting-signal-selectors 14*a* and 14*b* select and output the signals supplied to input terminals Ya, Yb of selectors 13*a*, 13*b* as exciting signals IN-A, IN-B.

Selectors 13*a* and 13*b* receive input signals Ya, Yb supplied from controllers 12*a* and 12*b*, which controls position-detecting-signals CS-A, CS-B whether the signals should go as they are or should be reversed before going. Controllers 12*a* and 12*b* allow signals CS-A, CS-B to go as they are when output signals PCSa, NCSa, and PCSb, NCSb of detectors 20*a* and 20*b* are at levels H, L respectively.

Excitation-timing-controllers 4*a* and 4*b* thus allow position-detecting-signals CS-A, CS-B to work as exciting-signals IN-A, IN-B in the second status.

Figure 23:
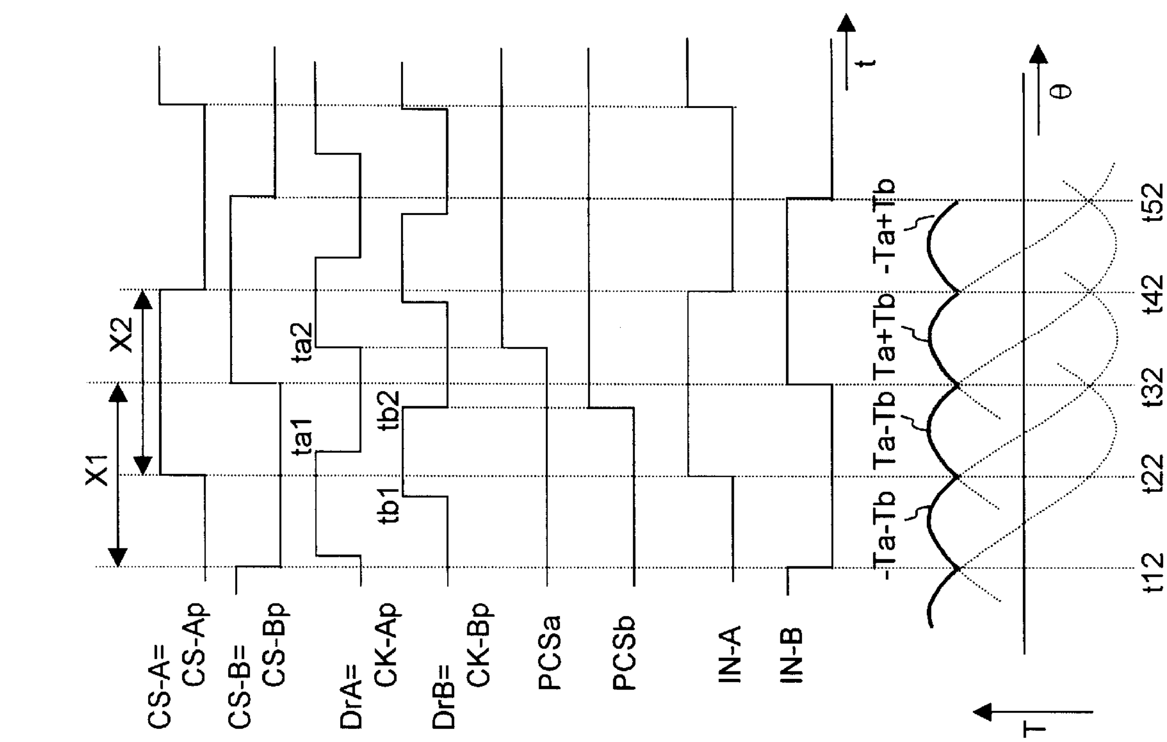
FIG. 23 illustrates an operation in a second status of the step-motor-driving device at the driving in the positive direction in accordance with the fifth exemplary embodiment.

FIG. 23 illustrates an operation in the second status and focuses on a transition from the first to second status during periods X1 and X2.

In FIG. 23, driving-instruction-signal DrA changes twice i.e. at timings ta1 and ta2, when position-detecting-signal CS-A stays at level H. The second timing-change at ta2 allows deviation-detector 20*a* to detect the second status and turn signals PCSa, NCSa and Sa to levels H, L and H respectively.

Phase-A is thus changed from the first status to the second one at timing ta2. Around the timing ta2, exciting-signal IN-A changes from an output signal of delay-signal-selector 5*a* to signals CS-A. (In the case of FIG. 23, because signal CS-A delays from signal DrA, selector 5*a* outputs CS-A.)

In the same manner, signal DrB changes twice i.e. at timings tb1 and tb2, when position-detecting-signal CS-B stays at level L. The second timing-change at tb2 allows deviation-detector 20*b* to detect the second status and turn signals PCSb, NCSb and Sb to levels H, L and H respectively. Phase-B is thus changed from the first status to the second one at timing tb2.

Around the timing tb2, exciting-signal IN-B changes from an output signal of delay-signal-selector 5*b* to signals CS-B. (In the case of FIG. 23, because signal CS-B delays from signal DrB, selector 5*b* outputs CS-B.)

As such, during the second status, excitation-timing-controllers 4*a* and 4*b* turn signals CS-A, CS-B to exciting signals IN-A, IN-B, thereby controlling the step-motor.

If the step-motor falls into the second status from the first one due to the factors discussed previously, excitation of the windings can be switched free from lowering torque T and the mover can be accelerated to rotate in the positive direction with maintaining the maximum torque level.

When the following conditions are satisfied, the step motor restores its operation as shown in FIGS. 22A and 22B: (a) the step motor is sufficiently accelerated in the positive direction; (b) when signals CS-A, CS-B change twice or more during a period when signals DrA, DrB stay level L or H and deviation-counters 10*a* and 10*b* return to outputting zero "0", phase-A and phase-B then shift from the second status to the first one. In short, the step motor is eventually driven to operate in the status where signals DrA, DrB synchronize with signals CS-A, CS-B for performing the original functions of the step-motor.

In the transition from the first status to the second one and vice versa, there is no chance for the step motor to jump out of sync.

The third status is demonstrated hereinafter. In the third status, the deviation between position-detecting-signals CS-A, CS-B and driving-instruction-signals DrA, DrB falls outside the given range. Then reverse torque, which directs the mover in the negative direction, is required for this deviation to fall within the given range.

In other words, the step motor falls into the third status when one of the following factors happens:

a frequency of signals DrA, DrB lowers abruptly;

a load to the motor lightens abruptly;

an instruction of driving direction is reversed; or the mover overshoots the position.

In this third status, signals CS-A, CS-B are supplied in more numbers than signals DrA, DrB. When the step motor falls into the third status, reverse torque should be immediately applied to the motor for decelerating the speed so that the motor returns to the first status where the motor works properly.

The operation in the third status is described with reference to FIGS. 21 and 24.

When signals CS-A, CS-B are supplied in more numbers than signals DrA, DrB due to the factors listed above, the outputs from deviation-counters 10*a* and 10*b*, which make up deviation-detectors 20*a* and 20*b*, take "−2" or less than "−2" undershooting "−1". Then determiner 11*a*, which is also one of the elements of detector 20*a*, turns output signals PCSa, NCSa and Sa to be at levels L, H, and H respectively, because flip-flop FF2 in determiner 11*a* is set to turn its output to level H.

As such, in this third status, deviation-detector 20*a* turns its output signals PCSa, NCSa and Sa to levels L, H and H respectively. This third status is kept going until the output of deviation-counter 10*a* returns to zero "0" and flip-flop FF2 is reset whereby the first status takes over this third status.

Determiner 11*b* making up deviation-detector 20*b* operates in the same way. Detector 20*b* also turns its output signals PCSb, NCSb and Sb to levels L, H and H respectively. When output signals Sa, Sb from detectors 20*a* and 20*b* turn to level H as discussed above, exciting-signal-selectors 14*a* and 14*b* select and output the signals supplied to input terminals Ya, Yb of selectors 13a, 13b as exciting signals IN-A, IN-B.

Selectors 13a and 13b receive input signals Ya, Yb supplied from controllers 12a and 12b, which control position-detecting-signals CS-A, CS-B whether the signals should go as they are or should be reversed before going. Controllers 12a and 12b allow signals CS-A, CS-B to be reversed before going when output signals PCSa, NCSa, and PCSb, NCSb of detectors 20a and 20b are at levels L, H respectively.

Excitation-timing-controllers 4a and 4b thus operate so that signals reversed to CS-A, CS-B work as exciting-signals IN-A, IN-B in the third status.

Figure 24:
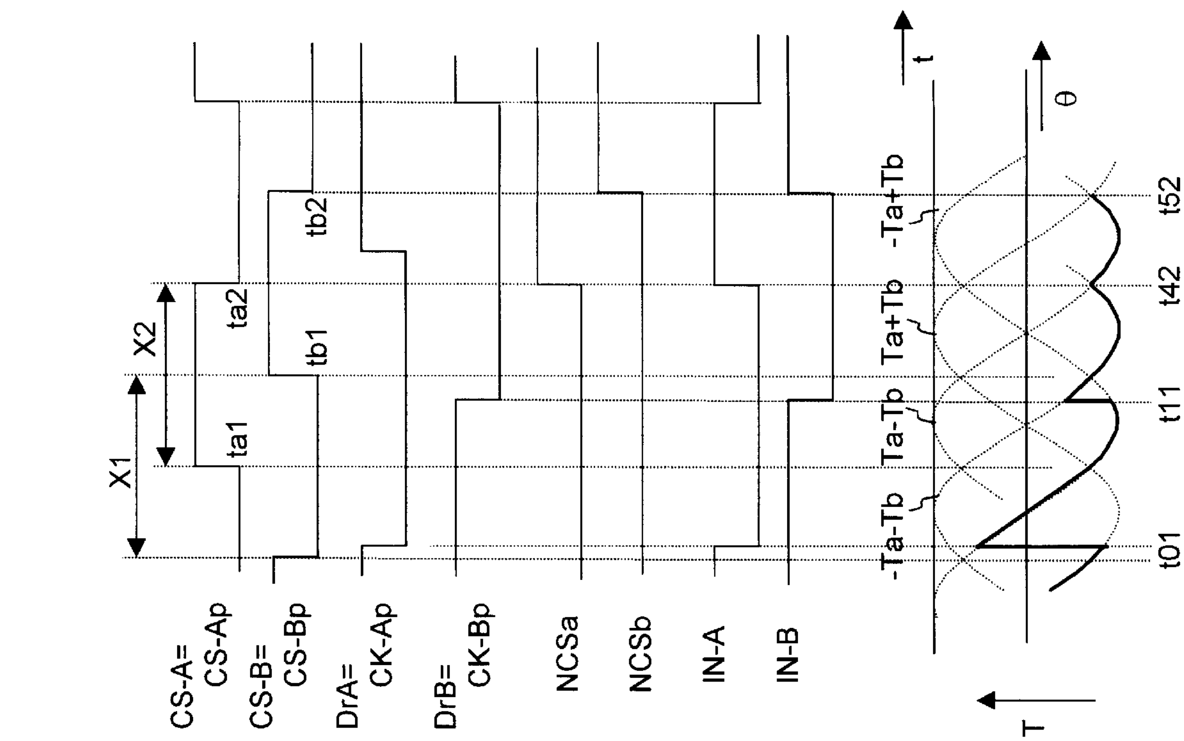
FIG. 24 illustrates an operation in a third status of the step-motor-driving device at the driving in the positive direction in accordance with the fifth exemplary embodiment.

FIG. 24 illustrates an operation in the third status and focuses on a transition from the first to third status during periods X1 and X2.

In FIG. 24, position-detecting-signal CS-A changes twice i.e. at timings ta1 and ta2, when driving-instruction-signal DrA stays at level L. The second timing-change at ta2 allows deviation-detector 20a to detect the third status and turn signals PCSa, NCSa and Sa to levels L, H and H respectively.

Phase-A is thus changed from the first status to the third one at timing ta2. Around the timing ta2, exciting-signal IN-A changes from an output signal of delay-signal-selector 5a to signal reversed to CS-A. (In the case of FIG. 24, because signal DrA delays from signal CS-A, selector 5a outputs DrA.)

In the same manner, signal CS-B changes twice i.e. at timings tb1 and tb2, when signal DrB stays at level L. The second timing-change at tb2 allows deviation-detector 20b to detect the third status and turn signals PCSb, NCSb and Sb to levels L, H and H respectively. Phase-B thus moves from the first status to the third one at timing tb2.

Around the timing tb2, exciting-signal IN-B changes from an output signal of delay-signal-selector 5b to signals reversed to CS-B. (In the case of FIG. 24, because signal DrB delays from signal CS-B, selector 5b outputs DrB.)

As such, during the third status, excitation-timing-controllers 4a and 4b turn the signals reversed to CS-A, CS-B into exciting signals IN-A, IN-B, thereby controlling the step-motor.

If the step-motor falls into the third status from the first one due to the factors discussed previously, torque T can be applied to the mover so that the mover reduces the speed free from jumping out of sync.

The step-motor restores its operation as shown in FIGS. 22A and 22B through the following operations: the mover is sufficiently decelerated, and signals DrA, DrB change twice or more during a period when signals CS-A, CS-B stay level L or H, and then deviation-counters 10a and 10b returns to outputting zero "0". Phase-A and phase-B then shift from the third status to the first one. In short, the step motor is eventually driven to operate in the status where signals DrA, DrB synchronize with signals CS-A, CS-B for performing the original functions of the step-motor.

In the transition from the first status to the third one or vice versa, there is no chance for the step motor to jump out of sync.

The instance, when the motor is instructed to rotate in the positive direction, has been discussed hitherto. Next, an instance, when the motor is instructed to rotate in the negative direction, is described hereinafter. This instance is essentially the same as the instance in the positive direction, and there are also first, second and third statuses.

Therefore, only different points from the instance of instruction in the positive direction are discussed, and detailed descriptions are omitted here.

When the motor is instructed to rotate in the negative direction, the relations of phase-delay and phase-advance of signals DrA, DrB should be reversed in order to reverse the rotating direction of magnetic field generated by the windings.

In the operation of delay-signal-selectors 5a and 5b, the delay and advance of signals DrA, DrB with regard to signals CS-A, CS-B should be related to the signals reversed to signals CS-A, CS-B. In other words, selectors 5a and 5b operate to output the delayed signals between signals DrA, DrB and signals CS-A, CS-B. This operation allows the torque reversed to torque T to be directed in a desired direction in order to drive the mover in the negative direction.

Further, deviation counters 10a and 10b count down their output values by one every time input signals CK-Ap, CK-Bp change. In the case when the motor is instructed to rotate in the positive direction, each counter counts down by one every time input signal CS-Ap changes. In the case when the motor is instructed to rotate in the negative direction, each counter counts up by one every time signal CS-Ap changes. These count-down and count-up operations are the same as those when the motor is instructed to rotate in the positive direction.

Although there are several minor differences as discussed above, the operation in this instance is essentially the same as the instance when the motor is instructed to rotate in the positive direction.

Figure 25A:
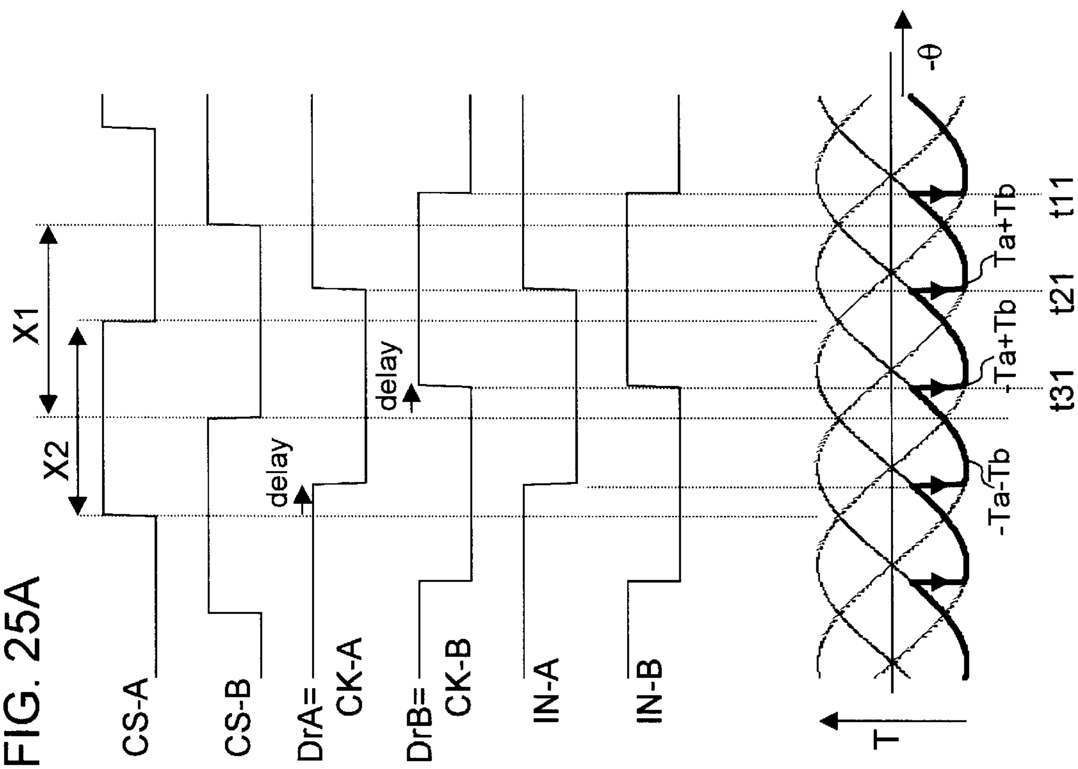
FIGS. 25A and 25B illustrate an operation in the first status of the step-motor-driving device at the driving in the negative direction in accordance with the fifth exemplary embodiment.
Figure 25B:
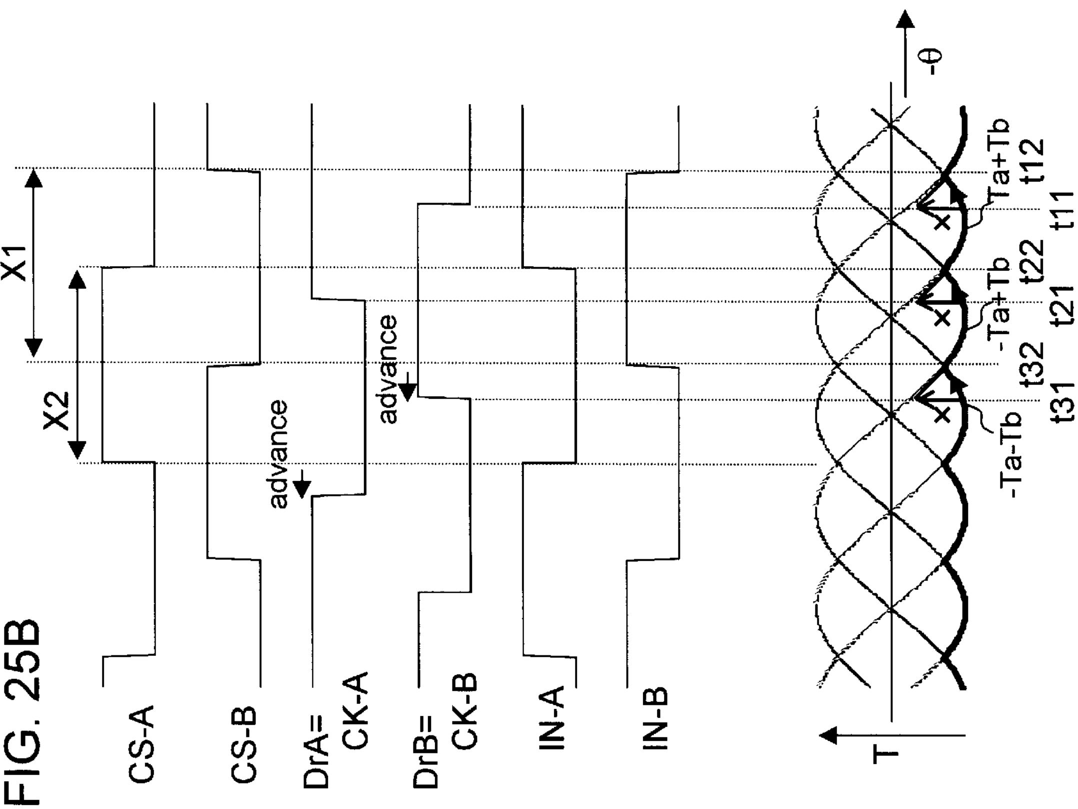

FIGS. 25A and 25B illustrate the operation in the first status of the instance when the motor is instructed to rotate in the negative direction. Only one difference in FIGS. 25A and 25B from the previous drawings is that mover's progress in the negative direction corresponds to rightward direction. However, due to introducing this difference, FIGS. 25A and 25B well illustrate that a reverse torque turns sequentially into a torque of desired direction so that the motor is driven in the negative direction smoothly. In this instance, the excitation-switch free from a fear of jumping "out of sync" is performed.

In the case when the motor is instructed to rotate in the negative direction, the motor falls into the second status when a phenomenon, corresponding to the third status in the instance when the motor is instructed to rotate in the positive direction, happens. In other words, when one of the following factors happens:

- a frequency of signals DrA, DrB lowers abruptly;
- a load to the motor lightens abruptly;
- an instruction of driving direction is reversed; or
- the mover overshoots the position in the negative direction.

When the motor falls into this second status, forward torque should be immediately applied to the motor so that the motor is accelerated in the positive direction (if the negative direction is viewed as a reference, the motor should be decelerated), thereby restoring the motor into the first status where the motor properly functions. This is the same operation as in the instance when the motor is instructed to rotate in the positive direction.

In the case when the motor is instructed to rotate in the negative direction, the motor falls into the third status when a phenomenon, corresponding to the second status in the case when the motor is instructed to rotate in the positive direction, happens. In other words, when one of the following factors happens:

- signals DrA, DrB carry a high frequency;
- the frequency of signals DrA, DrB jumps to a higher level;

the motor bears heavy load;

the load to the motor jumps to a heavier level; or the mover undershoots the position in the positive direction.

When the motor falls into this third status, reverse torque should be applied immediately to the motor so that the motor is decelerated in the negative direction (if the negative direction is viewed as a reference, the motor should be accelerated), thereby restoring the motor into the first status where the motor properly functions. This is the same operation as in the case when the motor is instructed to rotate in the positive direction.

The step-motor-driving device in accordance with the fifth exemplary embodiment is, as discussed above, structured to operate as follows:

Delay-signal-selectors 5*a* and 5*b* output a signal with a delaying-input-timing between driving-instruction-signals DrA, DrB and position-detecting-signals CS-A, CS-B when the motor is instructed to rotate in the positive direction. On the other hands, selectors 5*a* and 5*b* output a signal with a delaying-input-timing between signals DrA, DrB, and signals reversed to CS-A, CS-B when the motor is instructed to rotate in the negative direction.

Deviation detectors 20*a* and 20*b* detect whether the deviation falls within the given range (first status), falls outside the given range and the motor requires forward torque directing the mover in the positive direction so that this deviation falls within the range (second status), or falls outside the given range and the motor requires reverse torque directing the mover in the negative direction so that this deviation falls within the range (third status). Meanwhile the deviation is defined as a difference in numbers of pulses between signals DrA, DrB and signals CS-A, CS-B.

Excitation-timing-controllers 4*a* and 4*b* includes selectors 5*a*, 5*b*, detectors 20*a*, 20*b* and exciting-signal-selectors 14*a*, 14*b*. Exciting-signal-selectors 14*a* and 14*b*, which selects—based on the outputs of detectors 20*a*, 20*b*—one of the following signals as exciting-signals IN-A, IN-B: output signals from selectors 5*a* and 5*b*, signals CS-A, CS-B, and signals reversed to CS-A, CS-B. Selectors 14*a* and 14*b* operate responsive to the detection by detectors 20*a* and 20*b* as follows:

| detectors 20a and 20b detect | selectors 14a and 4b select |
|---|---|
| 1. the first status | 1. output signals from selectors 5a and 5b as exciting signals IN-A, In-B. |
| 2. the second status | 2. signals CS-A, CS-B as exciting signal IN-A, In-B. |
| 3. the third status | 3. signals reversed to CS-A, CS-B as exciting signal IN-A, In-B. |

In the first status, when signals DrA, DrB carry a low frequency or bear a light load, delay-signal-selectors 5*a* and 5*b* allow signals DrA, DrB to function as exciting signals IN-A, In-B so that the step-motor of the present invention can perform equivalently to the conventional step-motor. Rotating speed thus can be controlled responsive to the frequency of signals DrA, DrB with ease. In conclusion, a speed control and a positioning control can be performed by an extremely simple and inexpensive system, which is the most important advantage of the step-motor.

In the first status, when signals DrA, DrB carry a high frequency or the motor bears heavy load, selectors 5*a* and 5*b* allow signals CS-A, CS-B to function as exciting signals IN-A, In-B so that the motor functions equivalently to a dc brushless motor which is essentially free from "out of sync".

In the second status, when the motor find itself to move from the first status into the second status because at least one of following factors happen, the structure discussed above allows signals CS-A, CS-B to function as exciting signals IN-A, In-B so that excitation of the windings can be switched free from lowering torque T:

signals DrA, DrB carry an extremely high frequency;

the frequency of DrA, DrB jump to a high level;

the motor bears extremely heavy load;

the loads to the motor jumps to a heavier level; or the mover undershoots the position.

As a result, the mover is accelerated to rotate in the positive direction with maintaining the maximum torque level.

After the mover is accelerated sufficiently in the positive direction, the step-motor is eventually restored to the first status where the motor properly function.

In the transition from the first status to the second one or vice versa, there is no chance for the step motor to jump out of sync.

If the step-motor falls into the third status from the first one due to the factors discussed previously, the signals reversed to signals CS-A, CS-B are worked as exciting signals IN-A, IN-B. Then torque T can be applied to the mover so that the mover reduces the speed free from jumping out of sync.

The mover is sufficiently decelerated, then the motor returns to the first status where the motor can properly function. In the transition from the first status to the third one or vice versa, there is no chance for the step motor to jump out of sync.

In deviation-detector 20*a* in accordance with this fifth embodiment, deviation counter 10*a* counts down its output value by one every time input signal CK-Ap changes when the motor is instructed to rotate in the positive direction. In the case when the motor is instructed to rotate in the negative direction, counter 10*a* counts up by one every time input signal CK-Ap changes. In the case when the motor is driven in the positive direction, counter 10*a* counts up by one every time signal CS-Ap changes, and counts down by one when the motor is driven in the negative direction.

Determiner 11*a* can operate as follows thereby maintaining the same performance of the motor as discussed above:

| Determiner 11a determines that | Output from counter 10a |
|---|---|
| 1. the motor is in the first status | 1. ranges from "−1" to "+1" |
| 2. the motor is in the second status | 2. reaches to "−2" then returns to zero "0", |
| 3. the motor is in the third status | 3. reaches to "+2" then returns to zero "0". |

Deviation-counter 10*b* and determiner 11*b* of deviation-detector 20*b* operate in the same way.

In this fifth embodiment, delay-signal-selector 5*a*, 5*b* can be formed by the reciprocal latches or the reciprocal-signal-selectors, both of which operations are shown in FIGS. 26A, 26B, 27A and 27B. The reciprocal latches or reciprocal-signal-selectors have been shown in FIGS. 6A and 6B and described in the first embodiment. They operate as follows:

First, the case when the motor is instructed to rotate in the positive direction is demonstrated.

Figures 26A, 26B, 27A, 27B:
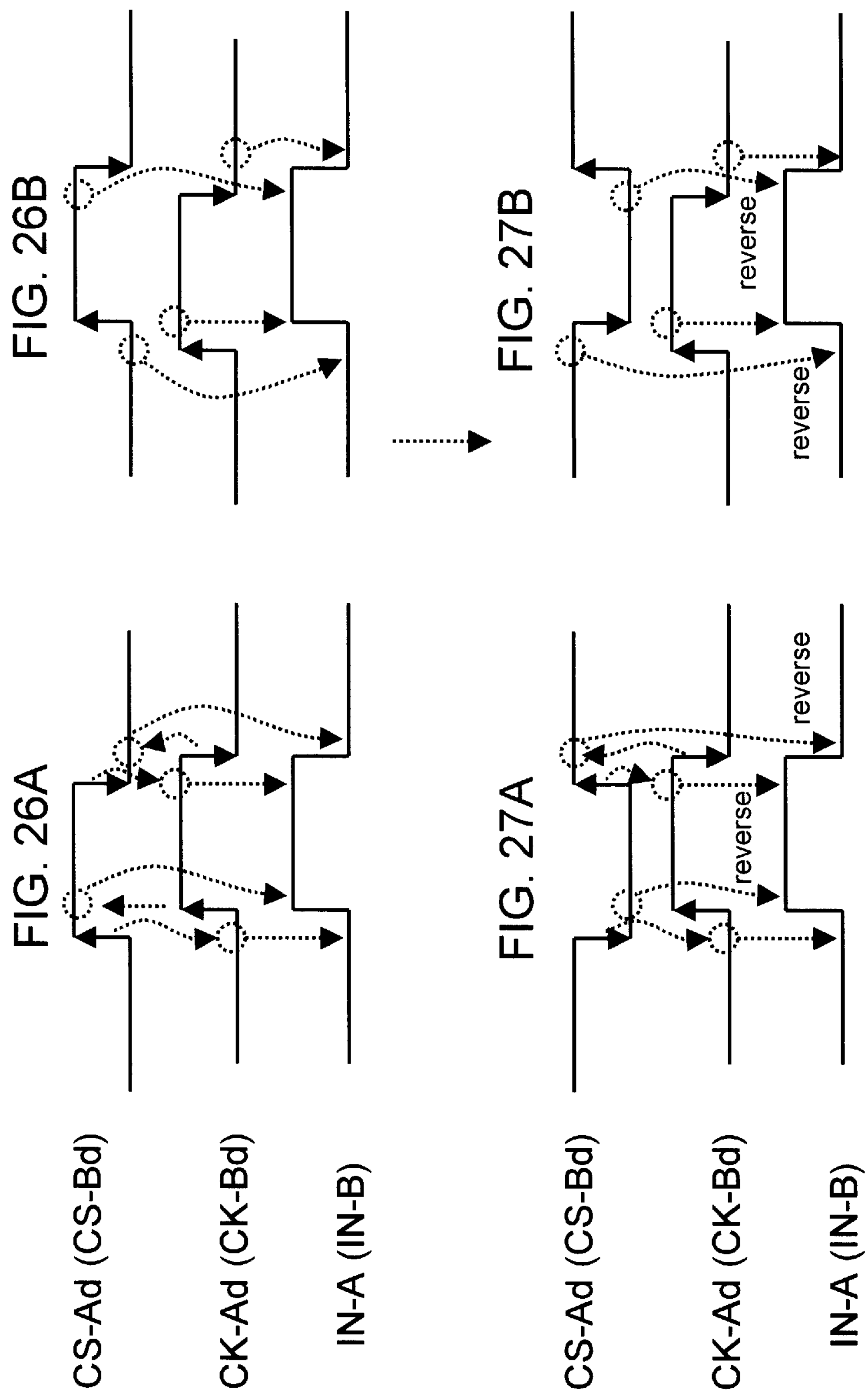
FIGS. 26A and 26B illustrate an operation of a reciprocal latch at the driving in the positive direction in accordance with the fifth exemplary embodiment.
FIGS. 27A and 27B illustrate an operation of the reciprocal latch at the driving in the negative direction in accordance with the fifth exemplary embodiment.

When the motor is instructed to rotate in the positive direction, as shown in FIGS. 26A and 26B, each reciprocal-latch or reciprocal-signal-selector latches or selects the level of position detecting signals CS-Ad, CS-Bd at the timing when driving instruction signals DrA, DrB i.e. signals CK-Ad, CK-Bd change, and also latches or selects the levels of signal DrA, DrB, i.e. signals CK-Ad, CK-Bd at the timing when position detecting signals CS-A, CS-Bd change.

FIG. 26A illustrates the instance where signals CK-Ad, CK-Bd delay from signals CS-Ad, CS-Bd and FIG. 26B illustrates the instance where signals CK-Ad, CK-Bd advance from signals CS-Ad, CS-Bd.

As shown in these Figs., exciting signals IN-A, IN-B received by exciters 2*a* and 2*b* are the later arrival signals between signals CK-Ad, CK-Bd, and CS-Ad, CS-Bd, and this proves that the reciprocal latches or reciprocal-signal-selectors function as delay-signal-selectors 5*a* and 5*b*.

In the second instance, when the motor is instructed to rotate in the negative direction, as shown in FIGS. 27A and 27B, each reciprocal latch or reciprocal-signal-selector reverses and latches, or reverses and selects the level of position-detecting-signals CS-Ad, CS-Bd at the timing when driving-instruction-signals DrA, DrB i.e. signals CK-Ad, CK-Bd change, and also latches or selects the level of signals DrA, DrB, i.e. signals CK-Ad, CK-Bd at the timing when position-detecting-signals CS-Ad, CS-Bd change.

FIG. 27A illustrates the instance where signal CK-Ad, CK-Bd delay with regard to the signals reversed to signals CS-Ad, CS-Bd and FIG. 27B illustrates the instance where signals CK-Ad, CK-Bd advance with regard to the signals reversed to signals CS-Ad, CS-Bd.

As shown in these Figs., exciting signals IN-A, IN-B received by exciters 2*a* and 2*b* are the later arrival signals between signals CK-Ad, CK-Bd, and the signals reversed to CS-Ad, CS-Bd, and this proves that the reciprocal latches or reciprocal-signal-selectors function as delay-signal-selectors 5*a* and 5*b*.

Delay-signal-selectors 5*a* and 5*b*, as discussed above, can be embodied by the reciprocal latches or reciprocal-signal-selectors.

The reciprocal latches or reciprocal-signal-selectors, in particular, receive exciting signals IN-A and IN-B not by switching driving-instruction-signals DrA, DrB (i.e. signals CK-Ad and CK-Bd) to position-detecting-signals CS-Ad and CS-Bd or vice versa. Therefore, when a delay or an advance between the driving-instruction-signals and the position-detecting-signals is abruptly reversed, the exciting signals can be forwarded smoothly without an intermittence. The step-motor thus can be controlled in a more stable manner.

Further in the fifth exemplary embodiment, instead of an expensive and bulky encoder or a resolver, an inexpensive and compact Hall element can be used as position detectors 3*a* and 3*b*. The Hall element requires less space to be mounted to the motor, and thus the step-motor-driving device free from "out of sync" can be achieved, and yet the device stands comparison with the conventional device in size and cost (compact and inexpensive).

The encoder or resolver, not to mention, can be still used in position detectors 3*a* and 3*b* without any technical problems.

In the fifth exemplary embodiment, position detector 3*a* and excitation-timing-controller 4*a* as well as their counterparts 3*b* and 4*b* are independently provided to respective phases (phase-A and phase-B). Signals of respective phases are thus processed independently at controlling an excitation timing.

The excitation timing controller is thus not required to link with other phases in processing signals. As a result, this controller is formed in a simple structure and also employed with ease in a step-motor having a number of phases. Because the position-detectors and excitation-timing-controllers are disposed independently responsive to the number of phases so that this controller is applied with ease to the step-motor having a number of phases.

In this fifth embodiment, two-phase step motor is taken as an example; however, the structures discussed above is applicable to three-phase or more than three-phase step motors with ease, thus a multi-phase step motor free from "out of sync" can be achieved.

Exemplary Embodiment 6

Figure 28:
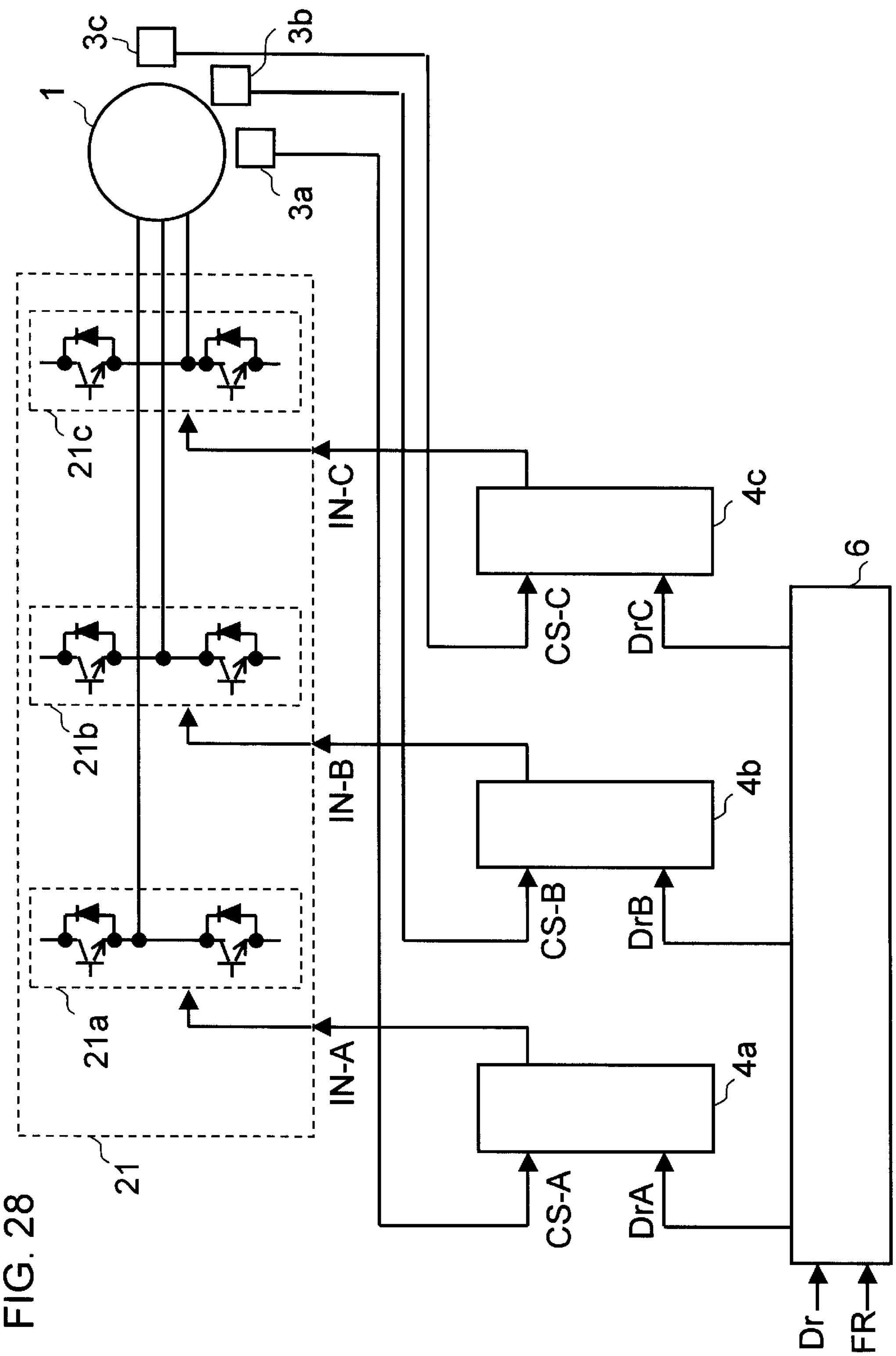
FIG. 28 illustrates a structure of a step-motor-driving device in accordance with a sixth exemplary embodiment.

FIG. 28 illustrates a structure of a step-motor-driving device in accordance with the sixth exemplary embodiment, where the novelty of the present invention is applied to three-phase step motor.

In FIG. 28, driving-instruction-signal-generator 6 for respective phases receives driving-instruction-signal Dr and driving-direction-instruction-signal FR for the motor, and produces driving-instruction-signals DrA, DrB and DrC for respective phases. Signals DrA, DrB and DrC have 120-degree phase difference with one anther. This signal-generator 6 can be formed by a ring-counter with three-phase.

Exciter 21 comprises exciters 21*a*, 21*b* and 21*c* related to respective phase-A, phase-B and phase-C. These exciters function as same as exciters 2*a* and 2*b* in the fifth embodiment shown in FIG. 21.

Other elements in FIG. 28 are basically the same as those in FIG. 21, and the like elements carry the like reference marks. Since motor 1 in FIG. 28 has three phases, the elements for controlling the third phase are denoted with the suffix "c".

The step-motor-driving device of the present invention is applicable to four-phase or five-phase step motor in the same manner.

A number of position-detectors increases at greater numbers of phases, which increases a size and cost; however, the methods discussed in the second embodiment are available to decrease the number of position detectors.

Exemplary Embodiment 7

Figure 29:
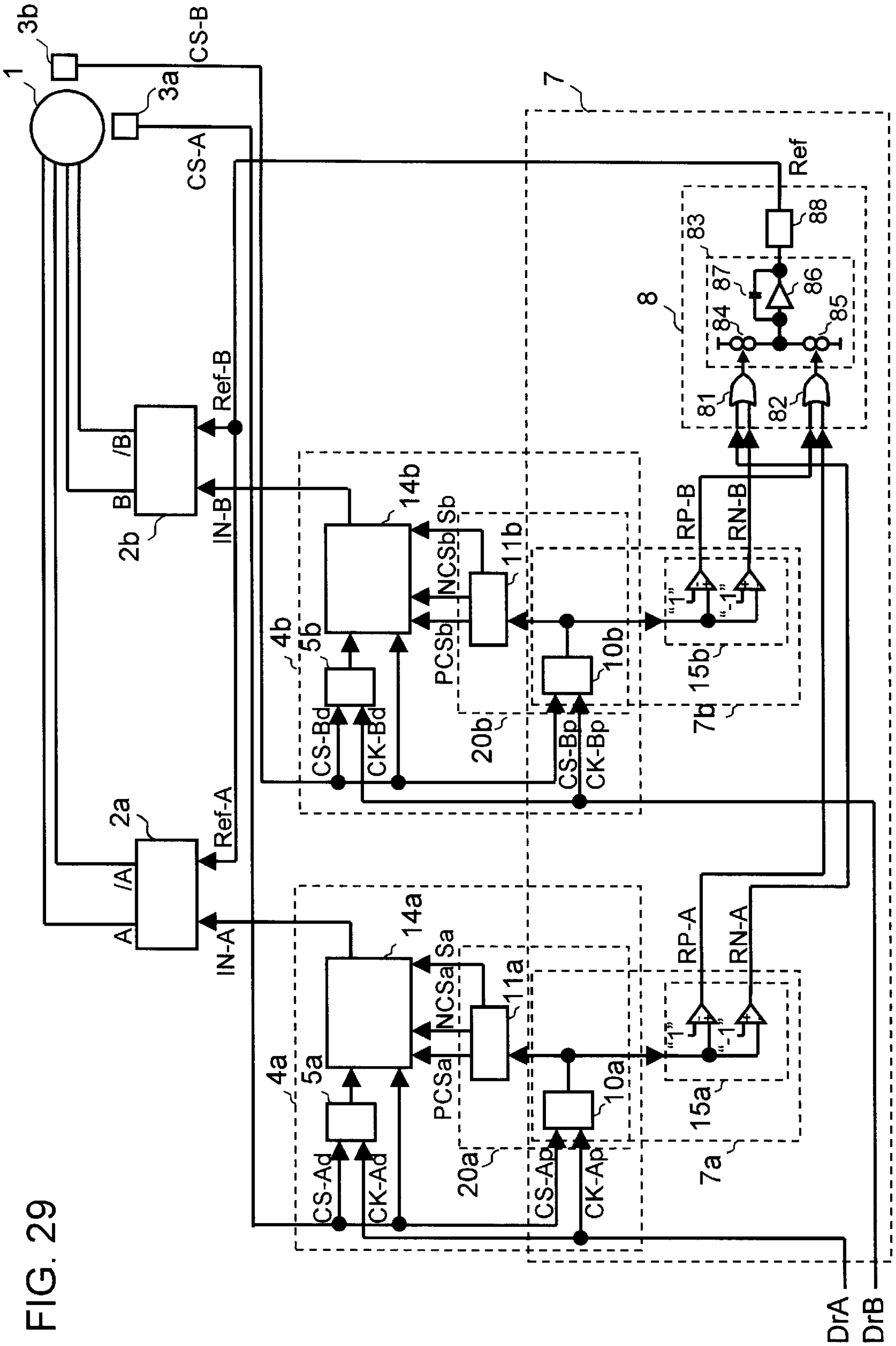
FIG. 29 illustrates a structure of a step-motor-driving device in accordance with a seventh exemplary embodiment.

FIG. 29 illustrates a structure of a step-motor-driving device in accordance with the seventh exemplary embodiment.

In FIG. 29, two-phase step motor 1 and position-detectors 3*a* and 3*b* are identical to those used in the fifth embodiment shown in FIG. 21.

Figure 76:
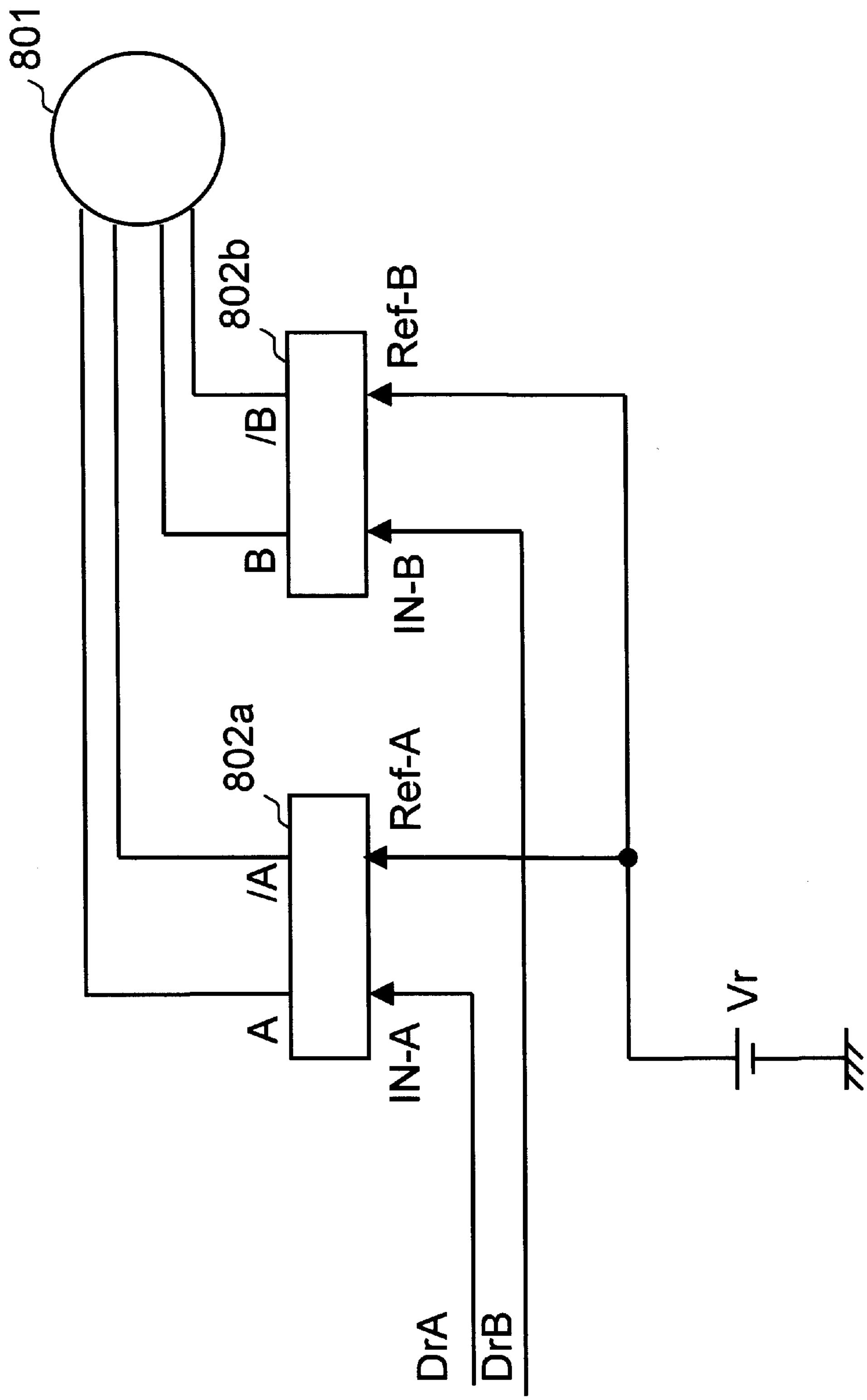
FIG. 76 illustrates a structure of a step-motor-driving device in accordance with a second conventional instance.
Figure 77:
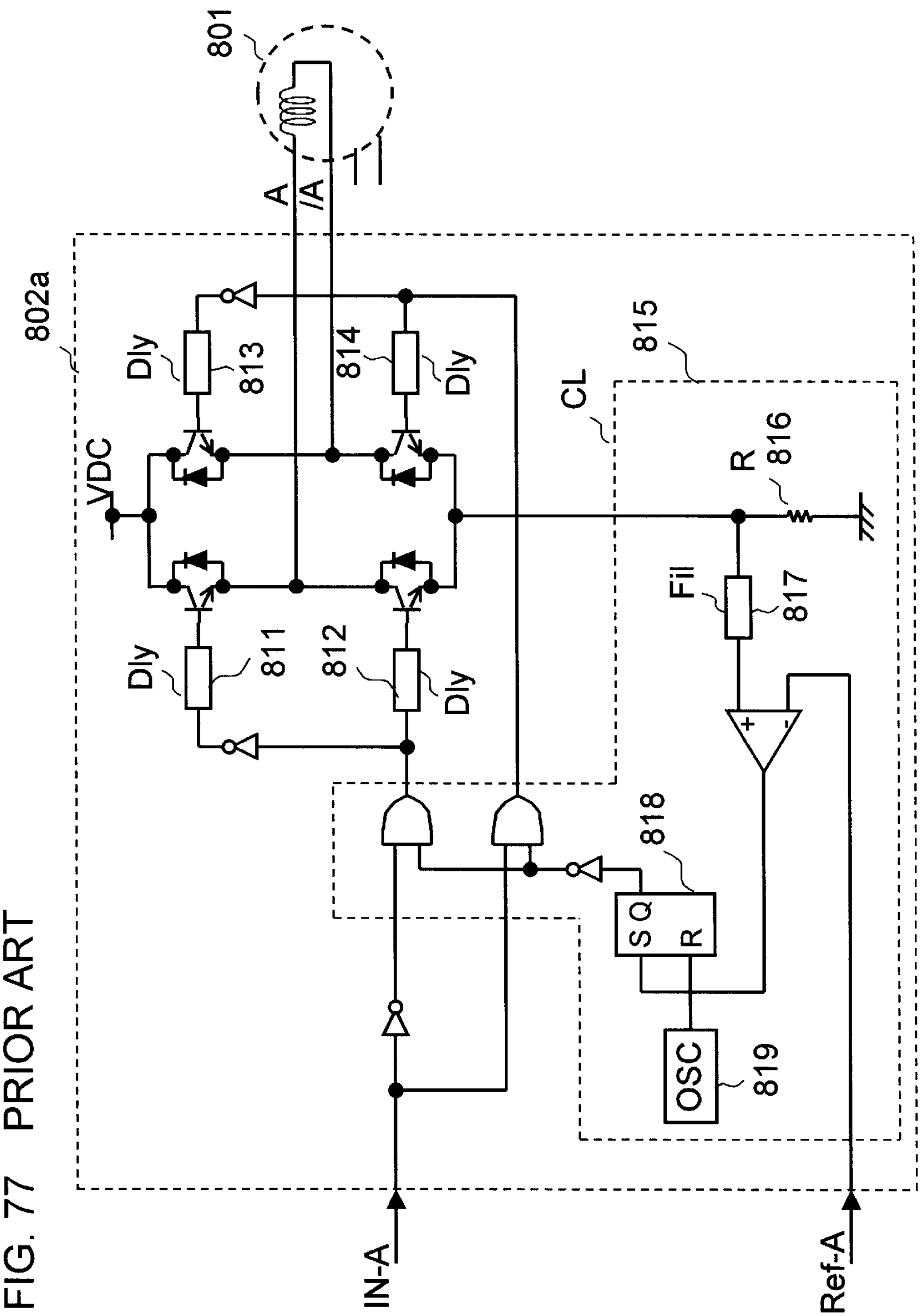
FIG. 77 illustrates a specific structure of an exciter in accordance with the second conventional instance.
Figures 78A, 78B, 78C, 78D:
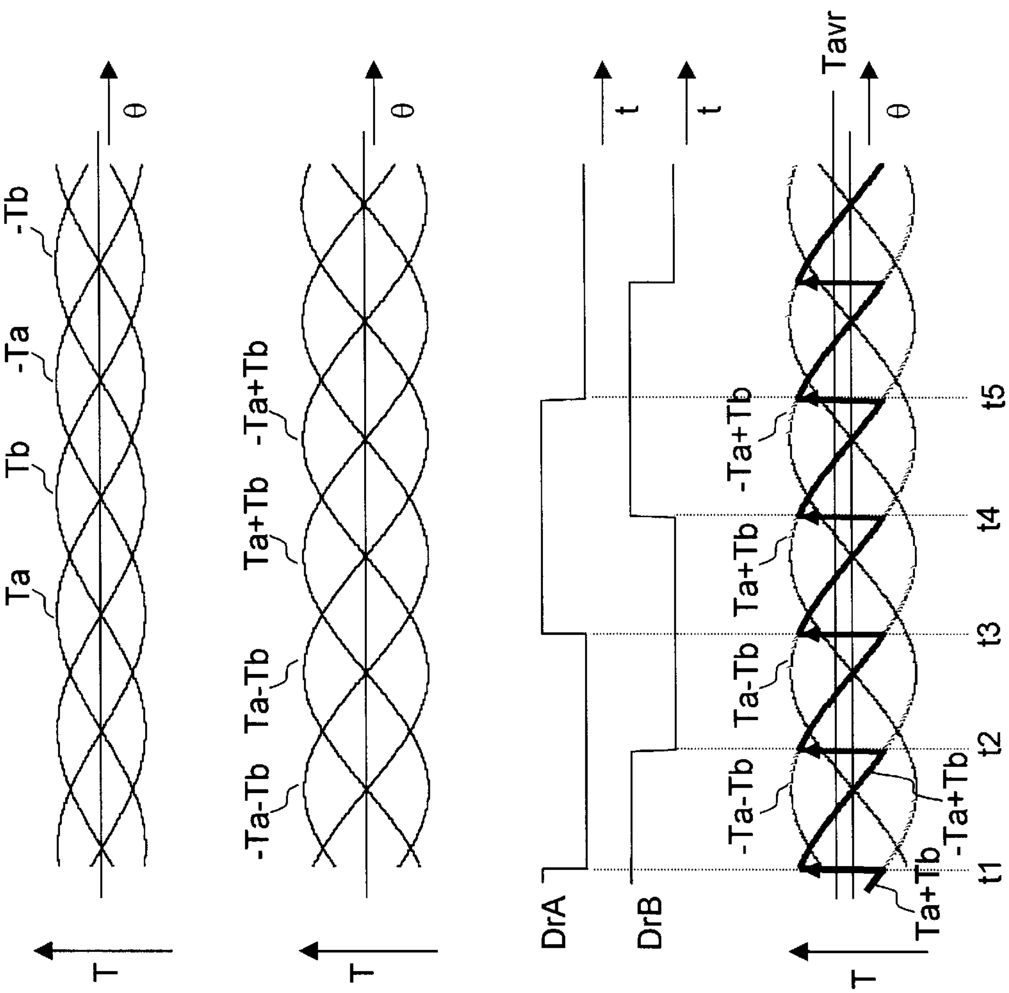
FIGS. 78A, 78B, 78C and 78D illustrate an operation of the step-motor-driving device in accordance with the second conventional instance.
Figures 79A, 79B, 79C, 79D:
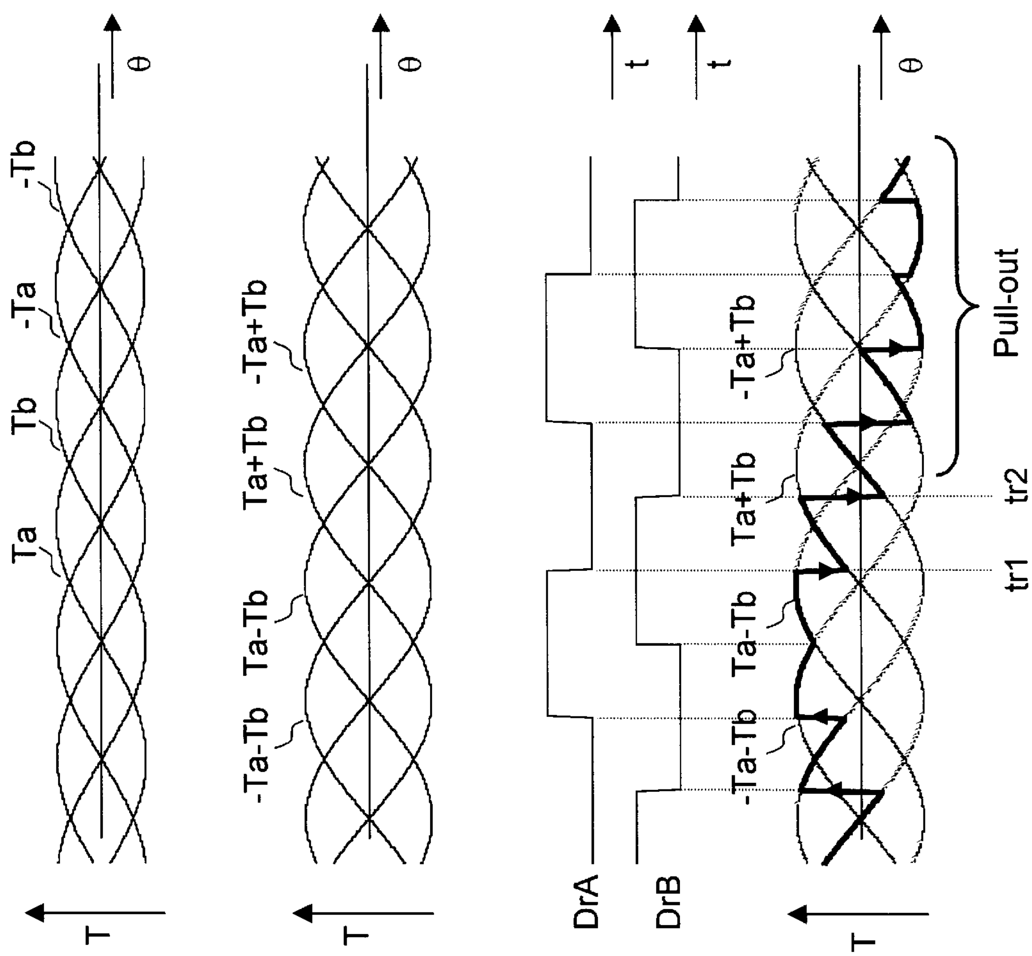
FIGS. 79A, 79B, 79C and 79D illustrate how the step-motor jumps out of sync in the second conventional instances.
Figure 80:
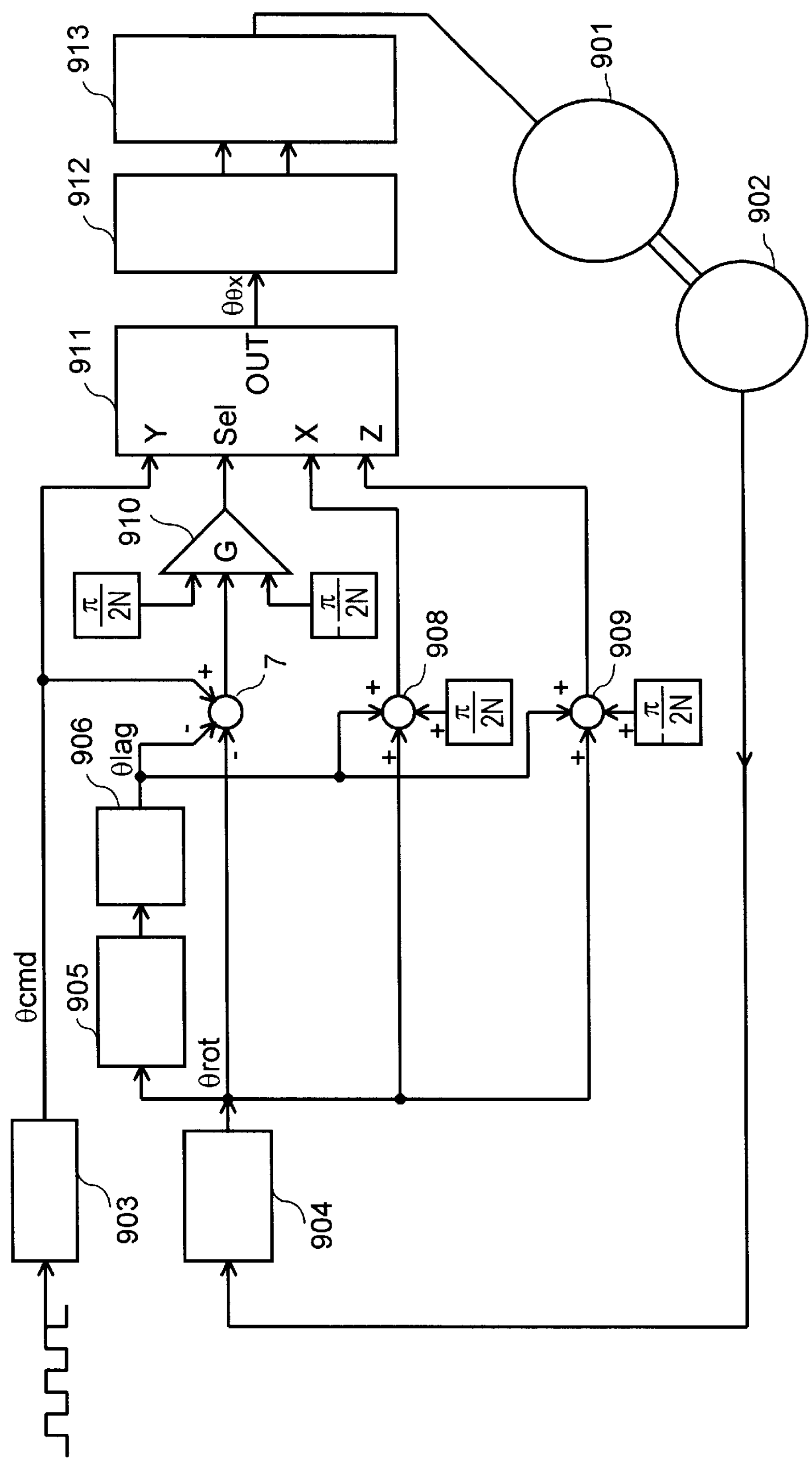
FIG. 80 illustrates a structure of a step-motor-driving device in accordance with a third conventional instance.

Exciters 2*a* and 2*b* are identical to exciters 802*a* and 802*b* shown in FIGS. 76 and 77 of the second conventional instance.

Excitation-timing-controllers 4*a* and 4*b* receive position-detecting-signals CS-A, CS-B tapped off from position-detectors 3*a* and 3*b* at their input terminals CS-Ad, CS-Bd. Controllers 4*a* and 4*b* also receive driving-instruction-signals DrA, DrB at their another input terminals CK-Ad, CK-Bd, and output respective exciting signals to input-terminals IN-A, IN-B of exciters 2*a* and 2*b*. Since controllers 4*a* and 4*b* are identical to those used in the fifth embodiment shown in FIG. 21, detailed description is thus omitted here.

A major difference between this embodiment 7 and embodiment 5 is that exciting-current-controller 7 is provided in embodiment 7.

This exciting-current-controller 7 is detailed hereinafter. Controller 7 outputs exciting-current-control-signal Ref, which is responsive to the phase difference between position-detecting-signals CS-A, CS-B and driving-instruction-signals DrA, DrB, to exciters 2*a* and 2*b* as current-value-signals Ref-A, Ref-B.

The inner structure of controller 7 is detailed here.

Controller 7 comprises phase-difference-detectors 7*a* and 7*b* as well as phase-difference-amplifier 8. Detector 7*a* receives position-detecting-signal CS-A and driving-instruction-signals DrA as input signals CS-Ap, CK-Ap, then detects the phase difference between these signals.

Detector 7*b* receives position-detecting-signal CS-B and driving-instruction-signal DrB as input signals CS-Bp, CK-Bp, then detects the phase difference between these signals.

Amplifier 8 amplifies the respective phase-difference-detecting-signals from detectors 7*a* and 7*b*, then outputs exciting-current-control-signal Ref.

Detector 7*a* detects the phase difference between signals CS-Ap and Ck-Ap, and it outputs instruction-delay-signal RN-A having a pulse width responding to a degree of a delay when signal CK-Ap delays from signal CS-Ap in phases. On the other hand, when signal CK-Ap advances with regard to signal CS-Ap in phases, detector 7*a* outputs instruction-advance-signal RP-A having a pulse width responding to a degree of the advance.

Detector 7*a* can be formed by deviation counter 10*a*—described in the fifth embodiment—and phase-determiner 15*a* which determines whether the output from counter 10*a* is not less than "+1" or not more than "−1".

Detector 7*b* outputs, as same as detector 7*a* does, instruction-delay-signal RN-B and instruction-advance-signal RP-B responsive to the phase difference between input signals CS-Bp, CK-Bp.

Phase-difference-amplifier 8 decreases exciting-current-control-signal Ref when one of instruction-delay-signals RN-A or RN-B is produced, and amplifier 8 increases signal Ref when one of instruction-advance-signals RP-A or RP-B is produced. As shown in FIG. 29, phase-difference-amplifier 8 comprises, for instance, OR gates 81, 82, charge-pump-circuit 83, and absolute circuit 88. Charge-pump-circuit 83 comprises current-sources 84, 85 which are controlled by OR gates 81, 82 and integrating amplifier 86 as well as integrating capacitor 87.

Figure 30B:
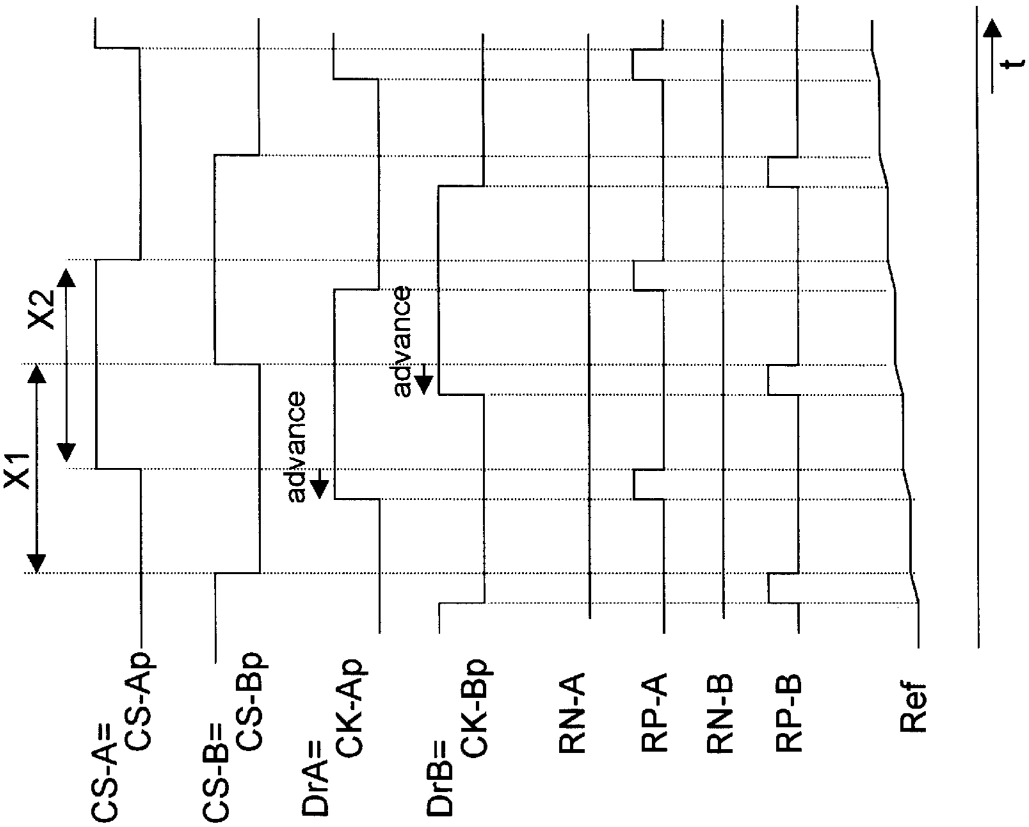
FIGS. 30A and 30B illustrate an operation of an exciting current controller in accordance with the seventh exemplary embodiment.
Figure 30A:
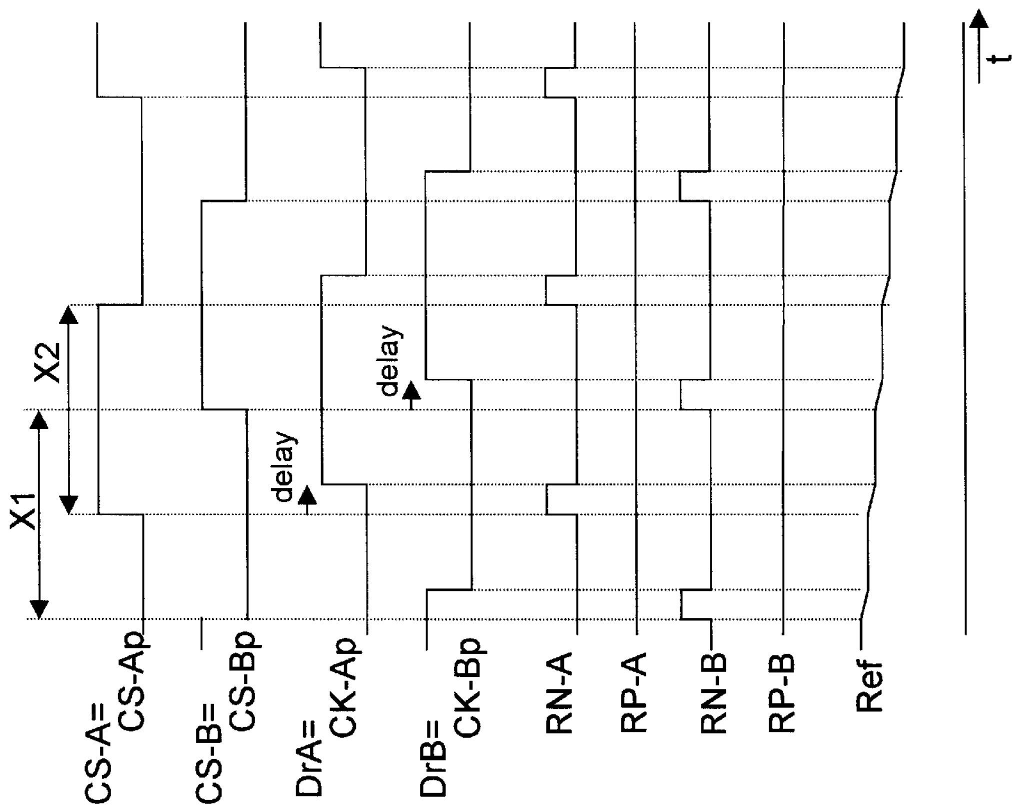

The operation of exciting-current-controller 7 comprising detectors 7*a* and 7*b* as well as amplifier 8 is illustrated in FIGS. 30A and 30B.

FIG. 30A illustrates an operation when driving-instruction-signals DrA, DrB delay from position-detecting-signals CS-A, CS-B, while FIG. 30B illustrates an operation when driving-instruction-signals DrA, DrB advance from position-detecting-signals CS-A, CS-B.

The operation of the seventh exemplary embodiment having the structure discussed above is demonstrated hereinafter. The expressions regarding the progressing direction of mover's position θ and the applying direction of torque T are the same as those used in the fifth embodiment. Also the expression of "the motor is instructed to rotate in the positive (negative) direction" and "the motor is driven in the positive (negative) direction" are respectively the same as those used in the fifth embodiment.

The relations between torque T and signals CS-A, CS-B described here are the same as those in the first embodiment shown in FIGS. 2A and 2B.

First instance is "the motor is instructed to rotate in the positive direction." In this instance, the motor also falls into the first status, second status or third status, as same as in the fifth embodiment.

The first status, already discussed in the fifth embodiment, is that the deviation between position-detecting-signals CS-A, CS-B and driving-instruction-signals DrA, DrB falls within a given range, i.e. signals CS-A, CS-B synchronize with signals DrA, DrB. The step-motor functions properly in this first status.

An operation of the step-motor in the first status is demonstrated hereinafter with reference to FIG. 29 through FIG. 33. As already discussed in the fifth embodiment, excitation-timing-controllers 4*a* and 4*b* in the first status allow the output signals from delay-signal-selectors 5*a* and 5*b* to function as exciting-signals IN-A, IN-B.

When receiving signals DrA, DrB later than signals CS-A, CS-B in phases, controllers 4*a* and 4*b* output signals DrA, DrB as exciting-signals IN-A, IN-B. When receiving signals CS-A, CS-B later than signals DrA, DrB in phases, controllers 4*a* and 4*b* output signals CS-A, CS-B as exciting signals IN-A, IN-B.

In this seventh embodiment, besides the operation by this excitation-timing-controllers 4*a* and 4*b*, exciting-current-controller 7, already discussed previously, controls the exciting-current of the windings.

Figures 31A, 31B:
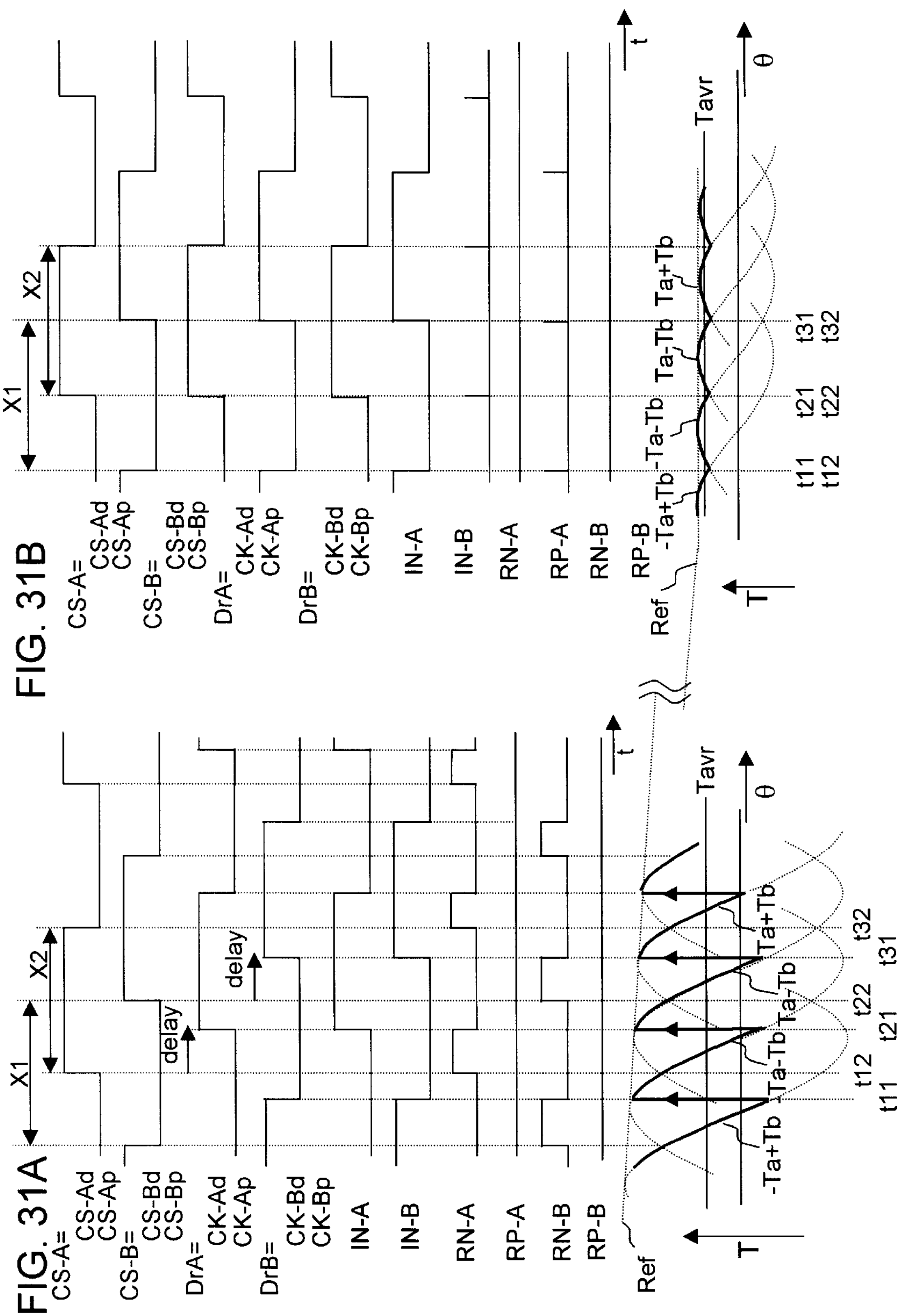
FIGS. 31A and 31B illustrate an operation in a first status, at the driving in the positive direction with a delay of driving instruction, of the step-motor-driving device in accordance with the seventh exemplary embodiment.

FIGS. 31A and 31B illustrate that exciting-current-controller 7 controls the exciting-current thereby driving the motor, when signals DrA, DrB are supplied with delay from signals CS-A, CS-B in phases.

Respective operations illustrated in FIGS. 31A, 31B and FIGS. 32A, 32B are detailed here.

First, the operation shown in FIGS. 31A and 31B, i.e. the operation when signals DrA, DrB delay from signals CS-A, CS-B in phases is detailed. In general, when signals DrA, DrB carry a low frequency or the motor bears light load, the signals delay from signals CS-A, CS-B in phases.

In this case, signals CS-A, CS-B synchronize with signals DrA, DrB, and these signals are fed into respective input terminals CS-Ap, CS-Bp and CK-Ap, CK-Bp of phase-difference-detectors 7*a* and 7*b* so that signals DrA, DrB change after the changes of signals CS-A, CS-B.

When the motor is instructed to rotate in the positive direction, deviation-counter 10*a*, which is one of the elements making up detector 7*a*, counts up its output value by one every time input signal CK-Ap changes, and counts down its output value by one every time the motor is driven in the positive direction and input signal CS-Ap changes. Counter 10*a* also counts up by one every time the motor is driven in the negative direction and input signal CS-Ap changes.

Deviation counter 10*a* discussed above is identical to the deviation counter which is the element of deviation detector 20*a*. Not to mention, a deviation counter can be provided as an exclusive use for a phase-difference-detector.

Counter 10*a* structured above counts down by one at timing t12 (refer to FIG. 31A) where input signal CS-Ap turns to level H from level L, as a result, the output from counter 10*a* takes a value of "−1". At timing t21 where input signal CK-Ap turns to level H from level L, counter 10*a* counts up by one and its output returns to "0" (zero). In other words, the output of counter 10*a* stays at "−1" during the period from the change of input signal CS-Ap to the change of input signal CK-Ap. Phase-determiner 15*a* detects this condition and keeps instruction-delay-signal RN-A at level H while the output of counter 10*a* stays not more than "−1". Phase-determiner 15*a* keeps instruction-delay-signal RN-A at level H during the period from the change of input signal CS-Ap to the change of input signal CK-Ap. Meanwhile, instruction-advance-signal RP-A stays at level L.

This series of operations proves that instruction-delay-signal RN-A supplied from phase-difference-detector 7a has a pulse width responsive to the amount of phase-delay of signal DrA with regard to signal CS-A.

The same manner is applicable to phase-difference-detector 7b, and it supplies instruction-delay-signal RN-B having a pulse width responsive to an amount of phase-delay of signal DrB with regard to signal CS-B as shown in FIG. 12B.

Instruction-delay-signal RN-A or RN-B is fed into phase-difference-amplifier 8, which operates as follows when receiving the instruction-delay-signal:

When instruction-delay-signal RN-A or RN-B is output and is turned to level H, then OR gate 81 allows current-source 84 to output a constant current. Charge-pump-circuit 83 charges integrating-capacitor 87 with this constant current thereby reducing its own output. This reducing speed depends on the constant-current-value of current-source 84 and the capacitance of capacity 87. The output from charge-pump-circuit 83 is interfaced with exciters 2a and 2b by absolute-circuit 88, then tapped off from amplifier 8 as exciting-current-signal Ref.

Amplifier 8 thus operated allows detectors 7a and 7b to output instruction-delay-signal RN-A or RN-B, which induces signal Ref to decrease. As a result, the maximum-exciting-current of the windings decreases. The maximum-exciting-current is known for being approximately proportional to a peak value of torque T generated at mover's position θ.

The peak-value of torque T thus decreases in step with signal Ref as shown in FIG. 31A.

An average torque "Tavr" of torque T generated is to balance with a torque loaded. In the step-motors, a relation between mover's position θ and the timing of signals DrA, DrB is automatically established so that the average torque "Tavr" of torque T generated can balance with the toque loaded. This is one of intrinsic natures of the step-motors.

This means that the timing delay of signals DrA, DrB with regard to mover's position θ, i.e. position-detecting-signals CS-A, CS-B, increases at a greater peak value of torque T generated, and this delay decreases at the smaller peak value of torque T. As a result, average torque "Tavr" balances with the torque loaded.

In the latter case, i.e. when the peak value of torque T is small and the timing delay of signals DrA, DrB with regard to signals CS-A, CS-B decreases, the average torque "Tavr" approximates to the peak value Torque T, thereby reducing torque ripples substantially.

Taking such natures of the step-motors into consideration, the inventors successfully reduce the torque ripples substantially by the following methods: Control the exciting current to decrease responsive to a degree of the timing delay of signals DrA, DrB with regard to signals CS-A, CS-B, and a feed-back-control for reducing this timing delay can be realized. When the delay is reduced, average torque "Tavr"—necessary to drive the mover and a load—approaches to the peak value of torque T generated. As a result, the torque ripples substantially decrease.

In this seventh embodiment, the exciting-current is controlled by newly equipped exciting-current-controller 7 as discussed above.

FIG. 31B illustrates that the torque ripples decrease due to controlling the exciting-current. When the condition reaches to what shown in FIG. 31B, the pulse width of instruction-delay-signal RN-A, RN-B become almost "0" (zero), and exciting-current-control-signal Ref stop decreasing. As a result, the step-motor is kept driving with small torque ripples.

The smaller torque ripples allow the motor to rotate with less vibration, noise as well as rotating-speed-variation, and as a result, the exciting-current is controlled to be minimum responsive to the load, the motor efficiency is thus substantially improved.

Figures 32A, 32B:
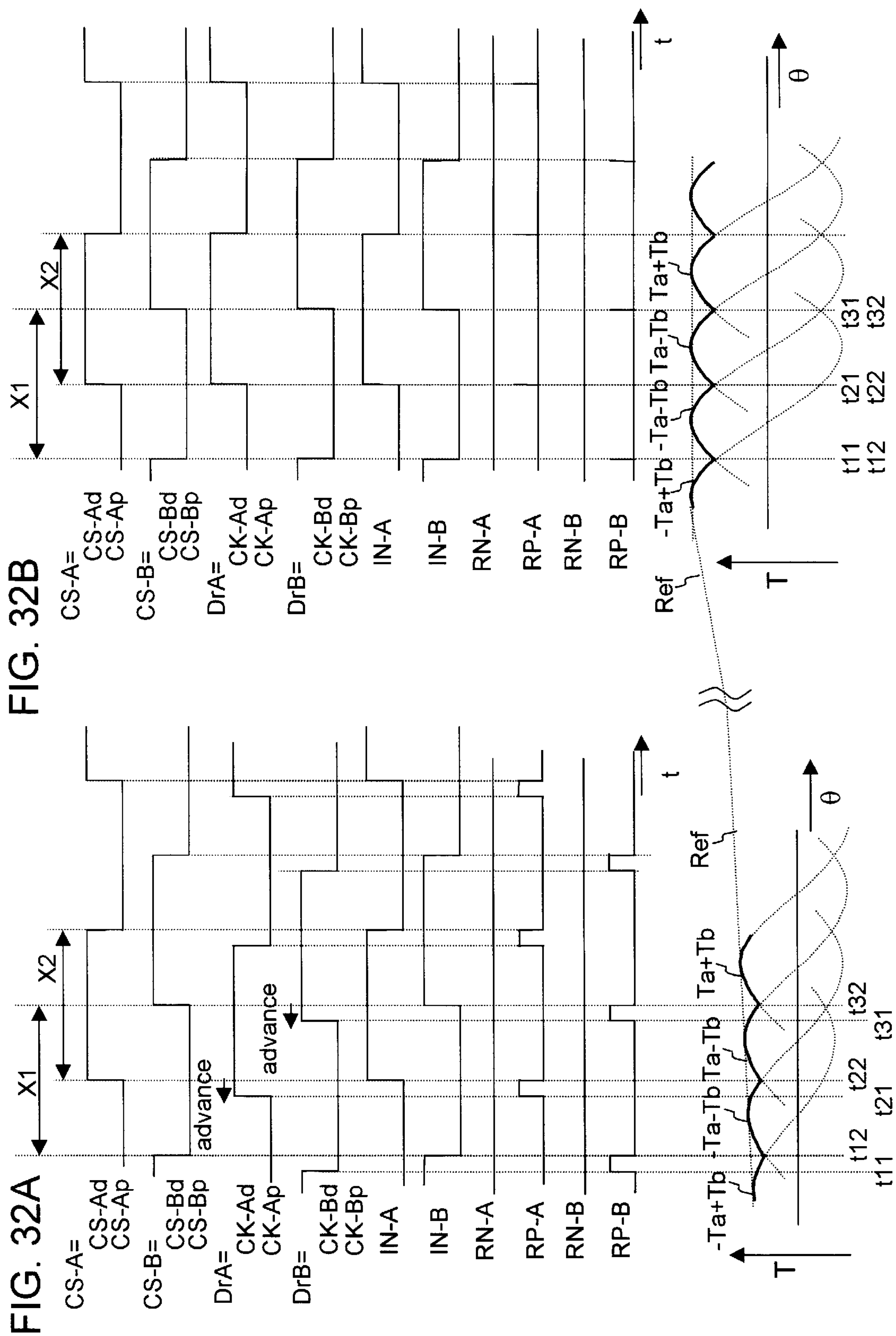
FIGS. 32A and 32B illustrate an operation in the first status, at the driving in the positive direction with an advance of driving instruction, of the step-motor-driving device in accordance with the seventh exemplary embodiment.

The operation shown in FIGS. 32A, 32B, i.e. the operation when signals DrA, DrB advance with regard to signals CS-A, CS-B in phases, is demonstrated here. In general, when carrying a high frequency or the motor bears heavy load, signals DrA, DrB advance with regard to signals CS-A, CS-B in phases.

In this case, signals CS-A, CS-B synchronize with signals DrA, DrB, and these signals are fed into respective input terminals CS-Ap, CS-Bp and CK-Ap, CK-Bp of phase-difference-detectors 7a and 7b so that signals DrA, DrB change before the changes of signals CS-A, CS-B.

At this time, counter 10a counts up by one at timing t21 (refer to FIG. 32A) where input signal CK-Ap turns to level H from level L, as a result, the output from counter 10a takes a value of "+1". At timing t22 where input signal CS-Ap turns to level H from level L, counter 10a counts down by one and its output returns to "0" (zero). In other words, the output of counter 10a stays at "+1" during the period from the change of input signal CK-Ap to the change of input signal CS-Ap. Phase-determiner 15a detects this condition and keeps instruction-advance-signal RP-A at level H while the output of counter 10a stays not less than "+1". Phase-determiner 15a keeps instruction-advance-signal RP-A at level H during the period from the change of input signal CK-Ap to the change of input signal CS-Ap. Meanwhile, instruction-delay-signal RN-A stays at level L.

This series of operations proves that instruction-advance-signal RP-A supplied from phase-difference-detector 7a has a pulse width responsive to the amount of phase-advance of signal DrA with regard to signal CS-A.

The same manner is applicable to phase-difference-detector 7b, and it supplies instruction-advance-signal RP-B having a pulse width responsive to an amount of phase-advance of signal DrB with regard to signal CS-B as shown in FIG. 32A.

Instruction-advance-signal RP-A or RP-B is fed into phase-difference-amplifier 8, which operates as follows when receiving the instruction-advance-signal:

When instruction-advance-signal RP-A or RP-B is output and is turned to level H, then OR gate 82 allows current-source 85 to output a constant current. Charge-pump-circuit 83 discharges integrating-capacitor 87 with this constant current thereby increasing its own output. This increasing speed depends on the constant-current-value of current-source 85 and the capacitance of capacity 87. The output from charge-pump-circuit 83 is interfaced with exciters 2a and 2b by absolute-circuit 88, then tapped off from amplifier 8 as exciting-current-signal Ref.

Amplifier 8 thus operated allows detectors 7a and 7b to output instruction-advance-signal RP-A or RP-B, which induces signal Ref to increase. As a result, the maximum-exciting-current of the windings increases. The maximum-exciting-current is known for being approximately proportional to a peak value of torque T generated at mover's position θ.

The peak-value of torque T thus increases in step with signal Ref as shown in FIG. 32A.

On the other hand, as shown in FIG. 32A, excitation-timing-controllers 4*a* and 4*b* allow torque T, which drives the mover, to get another waveform by the excitation-switch of the windings responsive to signals CS-A, CS-B and not responsive to signals DrA, DrB. Meanwhile, signals CS-A, CS-B are produced with delay from signals DrA, DrB in phases. A chance of "out of sync" is thus sweepingly cleared away, which has been already discussed in the fifth embodiment.

In this seventh embodiment, in addition to being free from jumping "out of sync", capability of maintaining the motor in the first status is strengthened by controlling the exciting-current to increase when signals DrA, DrB are supplied with advancement from signals CS-A, CS-B in phases.

Figure 33:
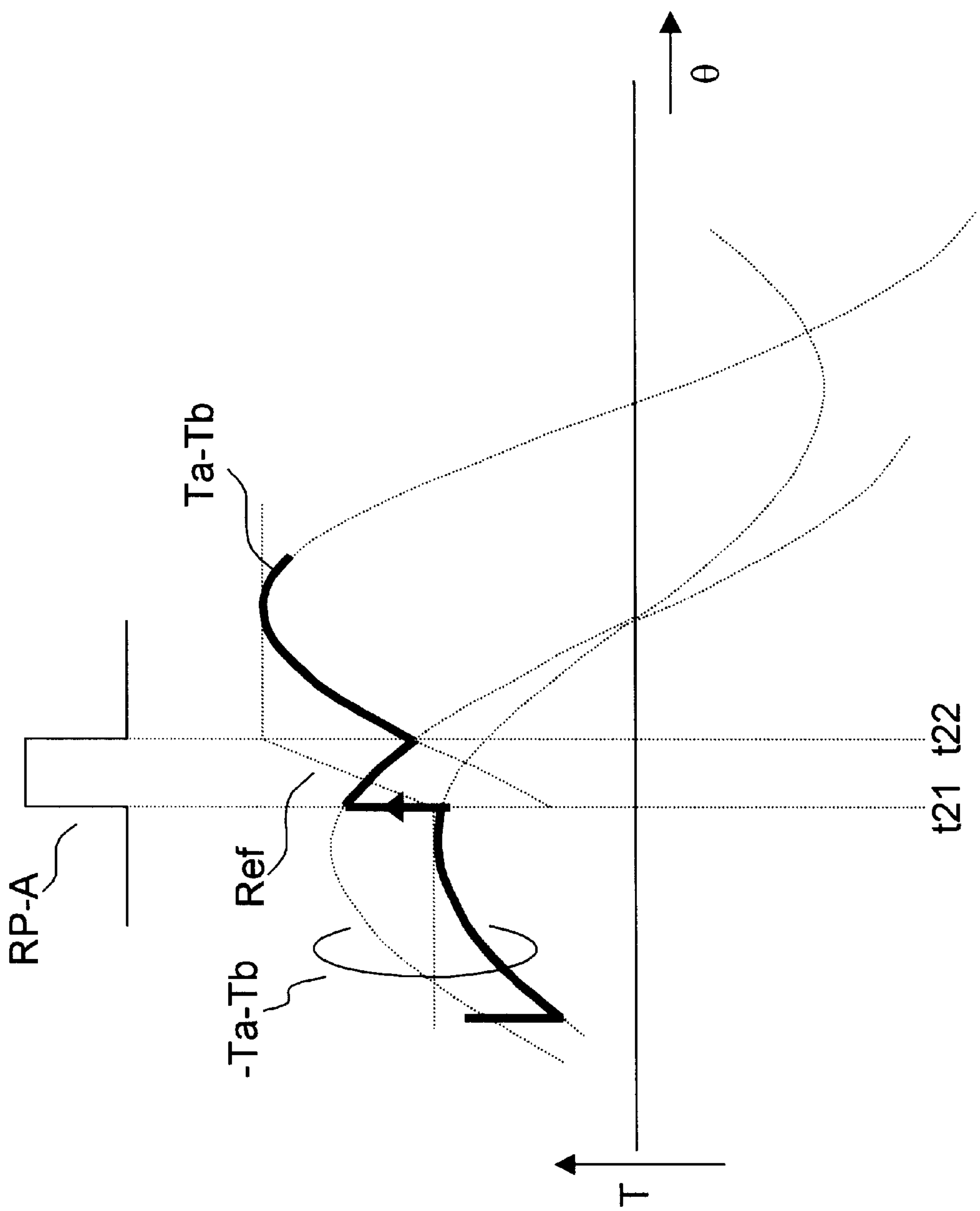
FIG. 33 is a partial enlarged view illustrating the seventh exemplary embodiment.

This is further detailed hereinafter. FIG. 33 is an enlarged view of the operation at timing t21 in FIG. 32A.

In FIG. 33, instruction-advance-signal RP-A turns to level H at timing t21 responsive to the change of signal DrA. At this timing, exciting-current-control-signal Ref starts increasing. However, excitation-timing-controllers 4*a* and 4*b* allow the windings not to change the excitation at timing t21. Torque T is thus kept being expressed with "−Ta−Tb" since before timing t21 until timing t22, and the peak value of torque T increases in step with signal Ref. At timing t22, when signal CS-A changes, instruction-advance-signal RP-A once returns to level L, and signal Ref stops increasing. At the same time, excitation of the windings is switched, and torque T is turned to the torque expressed with "Ta−Tb". (This operation is applicable to the other timings.)

In this series of operations, torque T evidently increases, and the capability of driving the mover increases every time instruction-advance-signals RP-A, RP-B generate. This capability of driving the mover is kept increasing until the speed of the mover substantially increases and the pulse width of signals RP-A, RP-B becomes almost "0" (zero). Eventually, the condition shown in FIG. 32B is achieved, and then signal Ref stops increasing. As a result, the motor is kept rotating with small torque ripples.

In addition to being free from jumping "out of sync", the step-motor-driving device increases the driving capability of the mover by controlling the exciting-current to increase when signals DrA, DrB are supplied with advancement from signals CS-A, CS-B in phases. In other words, capability of maintaining the motor in the first status, where the motor properly functions, is strengthened.

The smaller torque ripples thanks to the above advantage allow the motor to rotate with less vibration, noise as well as rotating-speed-variation, and as a result, the exciting-current is controlled to be appropriate responsive to the load, the motor efficiency is thus substantially improved.

Next, the operation when the motor falls into the second status is demonstrated.

In the second status, which has been described in the fifth embodiment, the deviation between position-detecting-signals CS-A, CS-B and driving-instruction-signals DrA, DrB falls outside the given range. Then the forward torque, which directs the mover in the positive direction, is required for the deviation to fall within the given range.

In other words, the second status happens at the following instances:

signals DrA, DrB carry a high frequency;

the frequency of signals DrA, DrB jumps to a higher level;

the motor bears heavy load;

the load of the motor jumps to a heavier level; or the mover undershoots the position.

This second status means that signals DrA, DrB are supplied in more numbers than signals CS-A, CS-B. When the motor falls into this status, forward torque should be applied immediately to the motor to accelerate so that the motor can return to the first status which ensures the motor to function properly.

First, exciting-current-controller 7 operates as follows in the second status: As already described in the fifth embodiment, deviation counters 10*a* and 10*b* output "2" or more than "2" in the second status.

Phase-determiners 15*a* and 15*b* allow phase-difference-detectors 7*a* and 7*b* to turn instruction-advance signals RP-A, RP-B to level H and instruction-delay-signal RN-A, RN-B to level L. When the signals stay at these level respectively, phase-difference-amplifier 8 increases the current of exciting-current-control-signal Ref.

As such, in the second status, exciting-current-controller 7 outputs instruction-advance-signal RP-A, RP-B and increases the current of signal Ref As a result, exciting-current of the windings, i.e. torque T for driving the mover, is increased.

On the other hand, timing-controllers 4*a* and 4*b* allow signals CS-A, CS-B to function as exciting-signals IN-A, IN-B, and therefore, the excitation is switched so that torque T for driving the mover can maintain the maximum torque level as shown in FIG. 23.

In the seventh embodiment, when the motor falls into this second status, timing-controllers 4*a*, 4*b* and current-controller 7 simultaneously operate as discussed above thereby increasing the forward torque applied to the mover substantially as well as boosting the capability of accelerating the motor.

When the step-motor falls into the second status due to the following factors, the step-motor can be immediately returned to the first status, where the motor can properly function:

signals DrA, DrB carry a high frequency;

the frequency of signals DrA, DrB abruptly increases;

the motor bears heavy load;

the load of the motor abruptly increases; or the mover undershoots the position.

The operation when the motor falls into the third status, which has been already described in the fifth embodiment, is demonstrated.

In the third status, the deviation between position-detecting-signals CS-A, CS-B and driving-instruction-signals DrA, DrB falls outside the given range. Then reverse torque, which directs the mover in the negative direction, is required for this deviation to fall within the given range.

In other words, the step motor falls into the third status when at least one of the following factors happens:

a frequency of signals DrA, DrB lowers abruptly;

a load to the motor lightens abruptly;

an instruction of driving direction is reversed; or the mover overshoots the position.

In this third status, signals CS-A, CS-B are supplied in more numbers than signals DrA, DrB. When the step motor falls into the third status, reverse torque should be immediately applied to the motor for reducing the speed so that the motor returns to the first status where the motor works properly.

First, exciting-current-controller 7 operates as follows in the third status: As already described in the fifth embodiment, deviation counters 10a and 10*b* output "−2" or less than "−2" in the third status.

Phase-determiners 15*a* and 15*b* allow phase-difference-detectors 7*a* and 7*b* to turn instruction-advance signals RP-A, RP-B to level L and instruction-delay-signal RN-A, RN-B to level H. When the signals stay at these level respectively, the output from charge-pump-circuit 83 lowers down to a negative value, and when this output further decreases, absolute-circuit 88 allows signal Ref to turn to increasing.

As such, in the third status, exciting-current-controller 7 outputs instruction-delay-signal RN-A, RN-B and increases the current of signal Ref after temporary decreasing. As a result, exciting-current of the windings, i.e. torque T for driving the mover, increases after temporary decreasing.

On the other hand, timing-controllers 4*a* and 4*b* allow the signals reversed to signals CS-A, CS-B to function as exciting-signals IN-A, IN-B, and therefore, the excitation is switched so that torque T for decelerating the mover can maintain the maximum torque level as shown in FIG. 24.

In the seventh embodiment, when the motor falls into this third status, timing-controllers 4*a*, 4*b* and current-controller 7 simultaneously operate as discussed above thereby increasing the reverse torque applied to the mover substantially as well as boosting the capability of decreasing the rotating speed of the motor.

When the step-motor falls into the third status due to the following factors, the step-motor can be immediately returned to the first status, where the motor can properly function:

the frequency of signals DrA, DrB abruptly decreases;

the load of the motor abruptly decreases;

instruction of driving direction is reversed; or the mover overshoots the position.

In the above demonstration, torque T has been described as increasing after temporary decreasing. Some supplemental description about this operation is provided hereinafter.

At the moment when the motor moves from the first status to the third one due to the factors discussed above, it is possible that the torque applied to the mover is temporarily directed in the forward direction. If so, an abrupt increase of torque T accelerates the mover thereby moving the mover further away from the first status.

Increasing torque T after temporary decreasing is to avoid this inconvenience so that reverse torque can be applied to the mover without fail and the motor can be immediately returned to the first status from the third status.

The instance, when the motor is instructed to rotate in the positive direction, is discussed above. Next is the instance when the motor is instructed to rotate in the negative direction.

In this instance, the first, second and third statuses are also available, which is essentially the same as the instance discussed above. Therefore, only the points different from the previous case are demonstrated, and the detailed description is omitted here.

When the motor is instructed to rotate in the negative direction, the relation of phase-delay and phase-advance of signals DrA, DrB should be reversed in order to reverse the rotating direction of magnetic field produced by the windings.

Further, in the operation of delay-signal-selectors 5*a* and 5*b*, the delay and advance of signals DrA, DrB with regard to signals CS-A, CS-B should be related to the signals reversed to signals CS-A, CS-B. In other words, selectors 5*a* and 5*b* output the later arrival signals between DrA, DrB and reversal signals to CS-A, CS-B so that the reversed torque to torque T is directed in a desired direction for driving the mover in the negative direction.

Still further, deviation counters 10*a* and 10*b* should count down their outputs by one every time input signals CK-Ap, CK-Bp change. When the motor is driven in the positive direction, counter 10*a* counts down by one every time input signal CS-Ap changes, and when the motor is driven in the negative direction, counter 10*a* counts up by one every time input signal CS-Ap changes. This is the same operation as that in the instance when the motor is instructed to rotate in the positive direction.

Figures 34A, 34B:
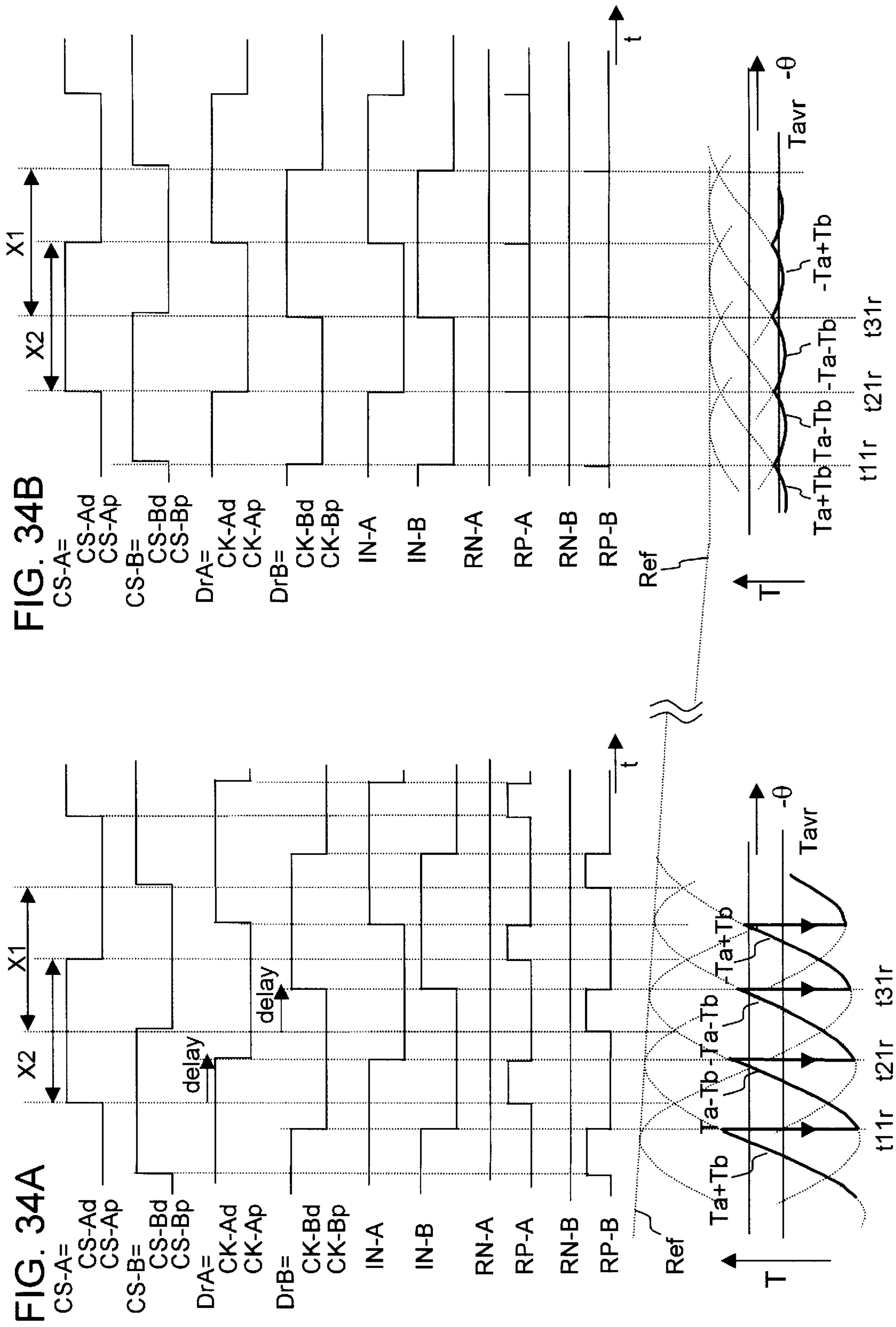
FIGS. 34A and 34B illustrate an operation in the first status, at the driving in the negative direction with a delay of driving instruction, of the step-motor-driving device in accordance with the seventh exemplary embodiment.

FIG. 34 illustrates the first status when the motor is instructed to rotate in the negative direction, where signals DrA, DrB are supplied with delay from the signals reversed to CS-A, CS-B in phases.

Only one difference in FIG. 34 from the previous drawings is that mover's progress in the negative direction corresponds to rightward direction in FIG. 34. However, due to introducing this difference, FIG. 34 well illustrates that torque ripples become substantially small because of controlling the exciting-current, which is the same operation as that shown in FIGS. 31A, 31B describing the instance when the motor is instructed to rotate in the positive direction. This operation results in decreasing the vibration, noise and rotating-speed-variation of the motor, and the exciting-current thus can be controlled at the minimum level responsive to the load. The motor efficiency is thus improved substantially.

In the instance when the motor is instructed to rotate in the negative direction in the first status, where signals DrA, DrB are supplied ahead of the signals reversed to CS-A, CS-B, the operation (not shown) is the same as shown in FIG. 32 illustrating the instance of instructing the motor to rotate in the positive direction and effects the same advantage.

The second status in the instance of instructing the motor to rotate in the negative direction occurs when a condition corresponding to the third status in the instance of instructing the motor to rotate in the positive direction occurs. In other words, when the motor is instructed to rotate in the negative direction, the motor falls into the second status at the happening of at least one of the following factors:

the frequency of signals DrA, DrB abruptly decreases;

the load of the motor abruptly decreases;

instruction of driving direction is reversed; or the mover overshoots the position.

However, when the motor falls into this second status, forward torque is immediately applied to the motor to accelerate the motor in the positive direction (decelerate the motor when the negative direction is viewed as the reference), so that the step-motor should be returned to the first status where the motor properly functions. This is the same manner as that in the instance when the motor is instructed to rotate in the positive direction.

In this instance also, the operations by timing-controllers 4*a*, 4*b* and current-controller 7 allow the forward torque applied to the mover to increase as well as the capability of accelerating the motor to increase substantially. As a result, the step-motor can be restored to the first status, where the motor can properly function, immediately from the second status.

The third status in the instance of instructing the motor to rotate in the negative direction takes place when a condition corresponding to the second status in the instance of instructing the motor to rotate in the positive direction occurs. In other words, the motor falls into the third status at the happening of at least one of the following factors:

signals DrA, DrB carry a high frequency;

the frequency of signals DrA, DrB abruptly increases;

the motor bears heavy load;

the load of the motor abruptly increases; or the mover undershoots the position in the positive direction.

When the motor falls into this third status, reverse torque should be immediately applied to the motor so that the motor can be decelerated in the negative direction (the motor should be accelerated when the negative direction is viewed as the reference) and restored to the first status. This is the same operation as that in the instance when the motor is instructed to rotate in the positive direction.

In this instance also, the operations by timing-controllers 4_a_, 4_b_ and current-controller 7 allow the reverse torque applied to the mover to increase extensively as well as the capability of decelerating the motor in the negative direction to increase substantially. As a result, the step-motor can be restored to the first status, where the motor can properly function, immediately from the third status.

In the first status of the seventh embodiment, as discussed above, current-controller 7 newly provided controls the exciting-current to decrease responsive to the phase difference between signals DrA, DrB and signals CS-A, CS-B when signals DrA, DrB delay with regard to signals CS-A, CS-B in phases. As a result, torque ripples at driving the motor can be substantially smaller when signals DrA, DrB carry a low frequency or the motor bears light load. This substantially smaller torque ripples allow the vibration, noise and rotating-speed-variation to decrease. As a result, the exciting-current is controlled at the minimum level responsive to the load, and the motor efficiency is thus improved substantially.

The step-motor-driving device increases the driving capability of the mover by the functions of timing controllers 4_a_, 4_b_ and current controller 7 when signals DrA, DrB are supplied ahead of signals CS-A, CS-B in phases. In other words, in the instance when signals DrA, DrB carry a high frequency or the motor bears heavy load, capability of maintaining the motor in the first status, where the motor properly functions, is strengthened.

The smaller torque ripples thanks to the above advantage allow the motor to rotate with less vibration, noise as well as rotating-speed-variation, and as a result, the exciting-current is controlled to be appropriate responsive to the load, the motor efficiency is thus substantially improved.

When the motor falls into the second status, timing-controllers 4_a_, 4_b_ and current-controller 7 increase the forward torque applied to the mover substantially as well as boost the capability of accelerating the motor.

When the step-motor falls into the second status due to the following factors, the step-motor can be immediately restored to the first status, where the motor can properly function:

signals DrA, DrB carry a high frequency;

the frequency of signals DrA, DrB abruptly increases;

the motor bears heavy load;

the load to the motor abruptly increases; or the mover undershoots the position.

When the motor falls into the third status, timing-controllers 4_a_, 4_b_ and current-controller 7 increase the reverse torque applied to the mover substantially as well as boost the capability of decelerating the motor.

When the step-motor falls into the third status due to the following factors, the step-motor can be immediately restored to the first status, where the motor can properly function:

the frequency of signals DrA, DrB abruptly decreases;

the load to the motor abruptly decreases;

instruction of driving direction is reversed; or the mover overshoots the position.

This seventh embodiment can be structured as follows: Deviation counter 10_a_ of phase-difference-detector 7_a_ counts down its output value by one every time input signal CK-Ap changes when the motor is instructed to rotate in the positive direction. In the case when the motor is instructed to rotate in the negative direction, counter 10_a_ counts up by one every time input signal CK-Ap changes. In the case when the motor is driven in the positive direction, counter 10_a_ counts up by one every time signal CS-Ap changes, and counts down by one when the motor is driven in the negative direction. Phase-determiner 15_a_ determines that the phase-difference be advance when counter 10_a_ outputs "−1" or less than −1", and determines that the phase-difference be delay when counter 10_a_ outputs "+1" or more than "+1". Deviation counter 10_b_ and phase-determiner 15_b_ of phase-difference-detector 7_b_ operate as same as their respective counterparts do. This structure also allow the step-motor-driving device to operate as same as the operation discussed above.

Exemplary Embodiment 8

Figure 35:
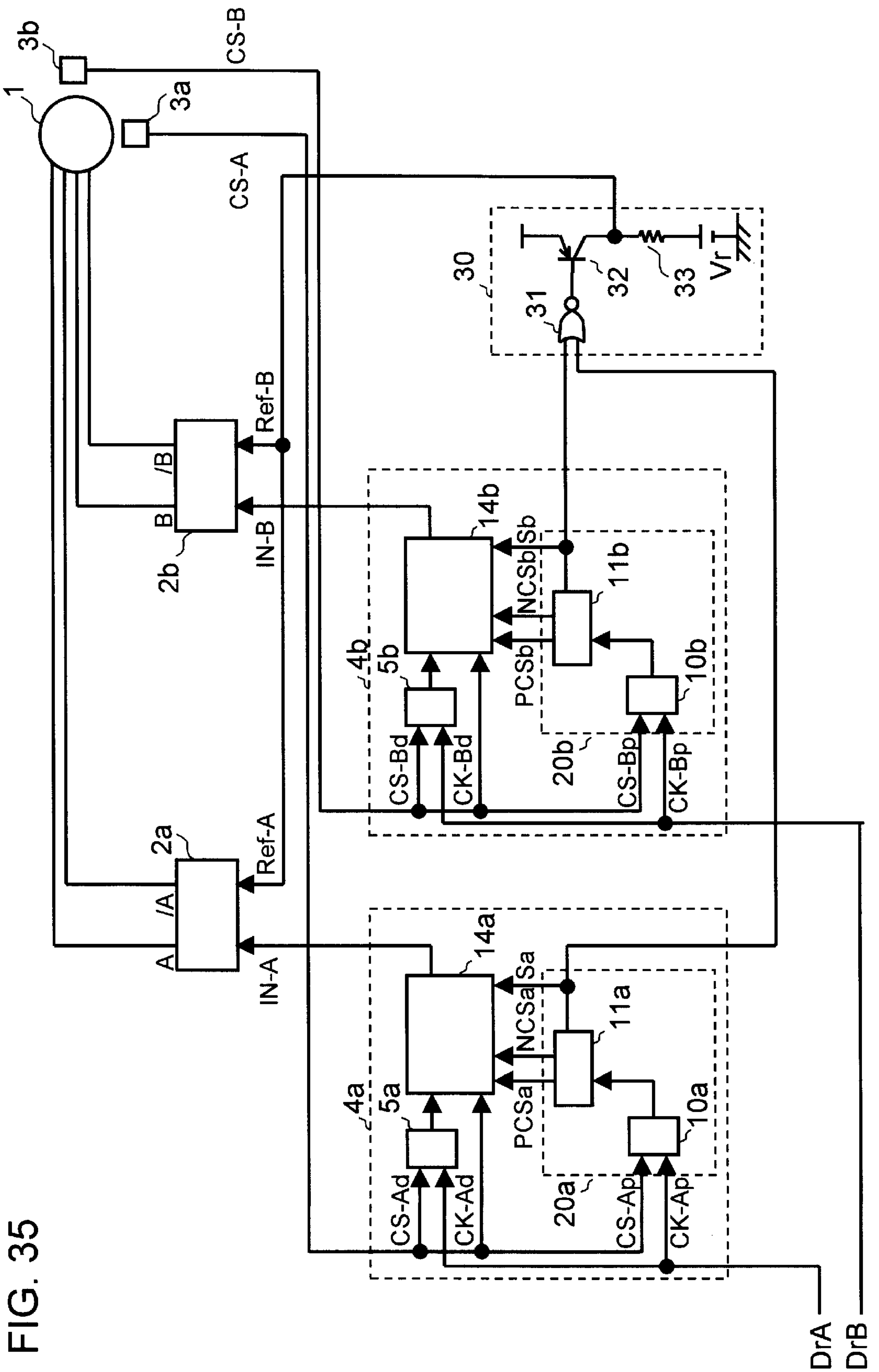
FIG. 35 illustrates a structure of a step-motor-driving device in accordance with an eighth exemplary embodiment.

FIG. 35 illustrates a structure of a step-motor-driving device in accordance with the eighth exemplary embodiment.

In FIG. 35, two-phase step-motor 1 and position-detectors 3_a_ and 3_b_ are the same as those used in the fifth and seventh embodiments. Exciters 2_a_ and 2_b_ are also the same as those used in the seventh embodiment.

Excitation-timing-controllers 4_a_ and 4_b_ receive position-detecting-signals CS-A, CS-B tapped off from position-detectors 3_a_ and 3_b_ at their input terminals CS-Ad, CS-Bd. Controllers 4_a_ and 4_b_ also receive driving-instruction-signals DrA, DrB at their another input terminals CK-Ad, CK-Bd. Controllers 4_a_ and 4_b_ output respective exciting-signals to input-terminal IN-A, IN-B of exciters 2_a_ and 2_b_. Since controllers 4_a_ and 4_b_ and position-detectors 3_a_ and 3_b_ are identical to those used in the fifth embodiment shown in FIG. 21, detailed description is thus omitted here.

A major difference between this embodiment 8 shown in FIG. 35 and embodiment 5 shown in FIG. 21 is that exciting-current-compulsory-booster 30 is provided in embodiment 8.

Exciting-current-compulsory-booster 30 outputs a current-compulsory-boosting-signal to exciters 2_a_ and 2_b_ as current-value-signals Ref-A, Ref-B based on a result of deviation-detection by deviation-detectors 20_a_ and 20_b_, which are elements of excitation-timing-controllers 4_a_ and 4_b_.

An operation of the eight embodiment having the structure as discussed above is demonstrated hereinafter.

Timing-controllers 4_a_ and 4_b_ operate in the same way as those used in the fifth and seventh embodiment, i.e. they output exciting-signals IN-A, IN-B based on the first, second or third status responsive to the deviation between signals DrA, DrB and signals CS-A, CS-B.

The instance, when the motor stays in the first status, is demonstrated hereinafter. The first status has been described in the fifth and seventh embodiments, i.e. the deviation between signals DrA, DrB and signals CS-A, CS-B falls within a given range. Deviation-determiners 11_a_, 11_b_—making up deviation-detectors 20_a_, 20_b_—output Sa, Sb at level L, which has been already described in the fifth embodiment.

When the output from determiners 11*a* and 11*b* are both at level L, exciting-current-compulsory-booster 30 turns an output from NOR gate 31 to level H and turns off transistor 32. As a result, an output voltage from voltage source Vr is fed into input terminals Ref-A, Ref-B of exciters 2*a*, 2*b* as current-value signals.

The exciting-current of the winding thus becomes at a constant value responsive to the output voltage of voltage-source Vr, and the operation and effect during this first status are the same as those in the fifth embodiment.

Next, the instances when the motor falls into the second and third statuses are demonstrated.

In the second and third statuses, the deviation between signals CS-A, CS-B and signals DrA, DrB falls outside the given range, which has been already described in the fifth and seventh embodiments.

In these statuses, one of the outputs Sa, Sb of determiners 11*a* and 11*b* is at level H. At this moment, booster 30 turns the output from NOR gate 31 to level L, and turns on transistor 32. As a result, a voltage greater than the output voltage from voltage-source Vr is fed into input terminals Ref-A, Ref-B of exciters 2*a*, 2*b* as current-value signals.

The motor is thus driven by an exciting-current greater than that used in the first status.

On the other hand, timing-controllers 4*a* and 4*b* output signals CS-A, CS-B or the reversal signals thereof as exciting-signals IN-A, IN-B responsive to the second or third status. In other words, the step-motor is accelerated or decelerated with the excitation-switch which can maintain the maximum torque level so that the step-motor can be restored to the first status where the motor can properly function.

In addition to these excitation-switches by controllers 4*a* and 4*b*, exciting-current-compulsory-booster 30 increases the exciting-current compulsorily, thereby increasing the torque level for restoring the motor to the first status.

This eighth embodiment proves that when the step-motor falls into the second status due to the following factors, the step-motor can be immediately restored to the first status, where the motor can properly function:

signals DrA, DrB carry a high frequency;

the frequency of signals DrA, DrB abruptly increases;

the motor bears heavy load;

the load to the motor abruptly increases; or the mover undershoots the position.

The eight embodiment also proves that when the step-motor falls into the third status due to the following factors, the step-motor can be immediately restored to the first status:

the frequency of signals DrA, DrB abruptly decreases;

the load to the motor abruptly decreases;

instruction of driving direction is reversed; or the mover overshoots the position.

In both the instances, exciting-current is compulsorily increased to restore the motor to the first status.

In the seventh embodiment, restoring the motor into the first status from the second or third status has been described; however, the exciting current is controlled via phase-difference-amplifier 8 in the seventh embodiment. Thus a response to increasing the exciting-current is obliged to delay when the motor falls into the second or third status particularly due to integrating-capacitor 87—an element of charge-pump-circuit 83 of phase-difference-amplifier 8.

In this eighth embodiment, exciting-current-compulsory-booster 30 is provided thereby increasing the exciting current immediately responsive to the detection by deviation detectors 20*a* and 20*b*. The motor in the second or third status can be thus restored to the first status at a faster speed than that in the seventh embodiment.

Exemplary Embodiment 9

Figure 36:
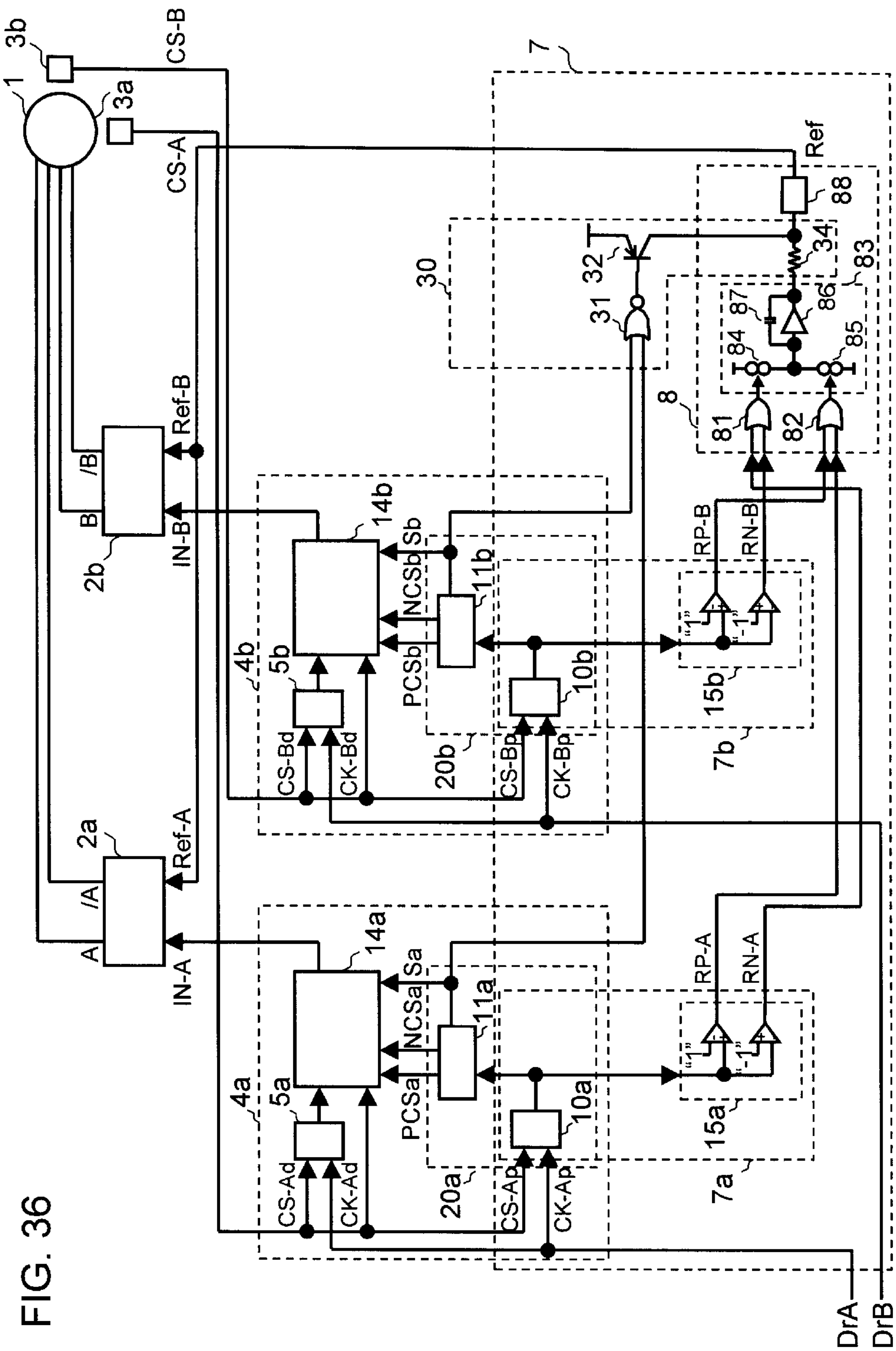
FIG. 36 illustrates a structure of a step-motor-driving device in accordance with a ninth exemplary embodiment.

FIG. 36 illustrates a structure of a step-motor-driving device in accordance with the ninth exemplary embodiment.

In FIG. 36, two-phase step-motor 1 and position-detectors 3*a* and 3*b* are the same as those used in the fifth, seventh and eighth embodiments. Excitation-timing-controllers 4*a* and 4*b* receive position-detecting-signals CS-A, CS-B tapped off from position-detectors 3*a* and 3*b* at their input terminals CS-Ad, CS-Bd. Controllers 4*a* and 4*b* also receive driving-instruction-signals DrA, DrB at their another input terminals CK-Ad, CK-Bd. Controllers 4*a* and 4*b* output respective exciting-signals to input-terminal IN-A, IN-B of exciters 2*a* and 2*b*. Since controllers 4*a* and 4*b* and position-detectors 3*a* and 3*b* are identical to those used in the fifth embodiment shown in FIG. 21, detailed description is thus omitted here.

A major difference between this embodiment 9 shown in FIG. 36 and embodiment 5 shown in FIG. 21 is that exciting-current-compulsory-booster 30 and exciting-current-controller 7 are provided in embodiment 9.

Exciting-current-compulsory-booster 30 outputs a current-compulsory-boosting-signal to exciters 2*a* and 2*b* as current-value-signals Ref-A, Ref-B based on a result of deviation-detection by deviation-detectors 20*a* and 20*b*, which are elements of excitation-timing-controllers 4*a* and 4*b*.

Current controller 7 outputs exciting-current-control signal "Ref" to exciters 2*a* and 2*b* as current-value-signals Ref-A, Ref-B responsive to the phase-difference between position-detecting-signals CS-A, CS-B and driving-instruction-signals DrA, DrB An operation of the ninth embodiment having the structure discussed above is demonstrated hereinafter.

Current compulsory booster 30 allows a current-compulsory-boosting signal to work on exciting-current-controller 7 based on a detection result of deviation-detectors 20*a* and 20*b*, thereby increasing exciting-current-control signal Ref compulsorily.

Current controller 7 is identical to that used in the seventh embodiment shown in FIG. 29, and compulsory booster 30 is identical to that used in the eighth embodiment shown in FIG. 35.

In other words, this ninth embodiment employs compulsory-booster 30 used in the eighth embodiment shown in FIG. 35 in addition to the structure of the seventh embodiment shown in FIG. 29.

An operation of the motor in the first status of this ninth embodiment is demonstrated hereinafter. The first status has been already described in the previous embodiments, i.e. the deviation between position-detecting-signals CS-A, CS-B and driving-instruction-signals DrA, DrB falls within a given range. Deviation-determiners 11*a*, 11*b*—making up deviation-detectors 20*a*, 20*b*—output Sa, Sb at level L, which has been already described in the fifth embodiment.

When the output from determiners 11*a* and 11*b* are both at level L, exciting-current-compulsory-booster 30 turns an output from NOR gate 31 to level H and turns off transistor 32. Current-controller 7 operates following the manner described in the seventh embodiment, i.e. outputs current-control-signal Ref to input terminals Ref-A, Ref-B of exciters 2*a*, 2*b* as current-value signals. The operation in this instance is thus identical to what described in the seventh embodiment shown in FIG. 29.

Next, the instances when the motor falls into the second and third statuses are demonstrated.

In the second and third statuses, the deviation between signals CS-A, CS-B and signals DrA, DrB falls outside the given range, which has been already described in the previous embodiments.

In these statuses, one of the outputs Sa or Sb from determiners 11*a* and 11*b* is at level H. At this moment, booster 30 turns the output from NOR gate 31 to level L, and turns on transistor 32. The turning on of transistor 32 induces a voltage on the side of absolute-circuit 88 of resistor 34 to increase. As a result, current-control-signal Ref from current controller 7 is compulsorily increased. The step-motor is thus driven by a large exciting current in the second and third status.

On the other hand, timing-controllers 4*a* and 4*b* output signals CS-A, CS-B or the signals reversed to signals CS-A, CS-B as exciting-signals IN-A, IN-B responsive to the second or third status. In other words, the step-motor is accelerated or decelerated with the excitation-switches which can maintain the maximum torque level so that the step-motor can be restored to the first status where the motor can properly function.

In addition to these excitation-switches by controllers 4*a* and 4*b*, exciting-current-compulsory-booster 30 increases the exciting-current compulsorily, thereby further increasing the torque level for restoring the motor to the first status.

As already described in the seventh embodiment, the motor can be restored to the first status from the second or third status even without current-compulsory-booster 30; however, this newly provided booster 30 can avoid a response-delay due to phase-difference-amplifier 8, (integrating-capacitor 87 among others, an element of charge-pump-circuit 83).

This ninth embodiment proves that when the step-motor falls into the second status due to the following factors, the step-motor can be immediately restored to the first status, where the motor can properly function:

signals DrA, DrB carry a high frequency;

the frequency of signals DrA, DrB abruptly increases;

the motor bears heavy load;

the load to the motor abruptly increases; or the mover undershoots the position.

The eight embodiment also proves that when the step-motor falls into the third status due to the following factors, the step-motor can be immediately restored to the first status:

the frequency of signals DrA, DrB abruptly decreases;

the load to the motor abruptly decreases;

instruction of driving direction is reversed; or the mover overshoots the position.

In both the instances, exciting-current is compulsorily increased to restore the motor immediately to the first status with a quick response.

This ninth embodiment naturally effects the advantages which the fifth and seventh embodiments have achieved.

Exemplary Embodiment 10

Figure 37:
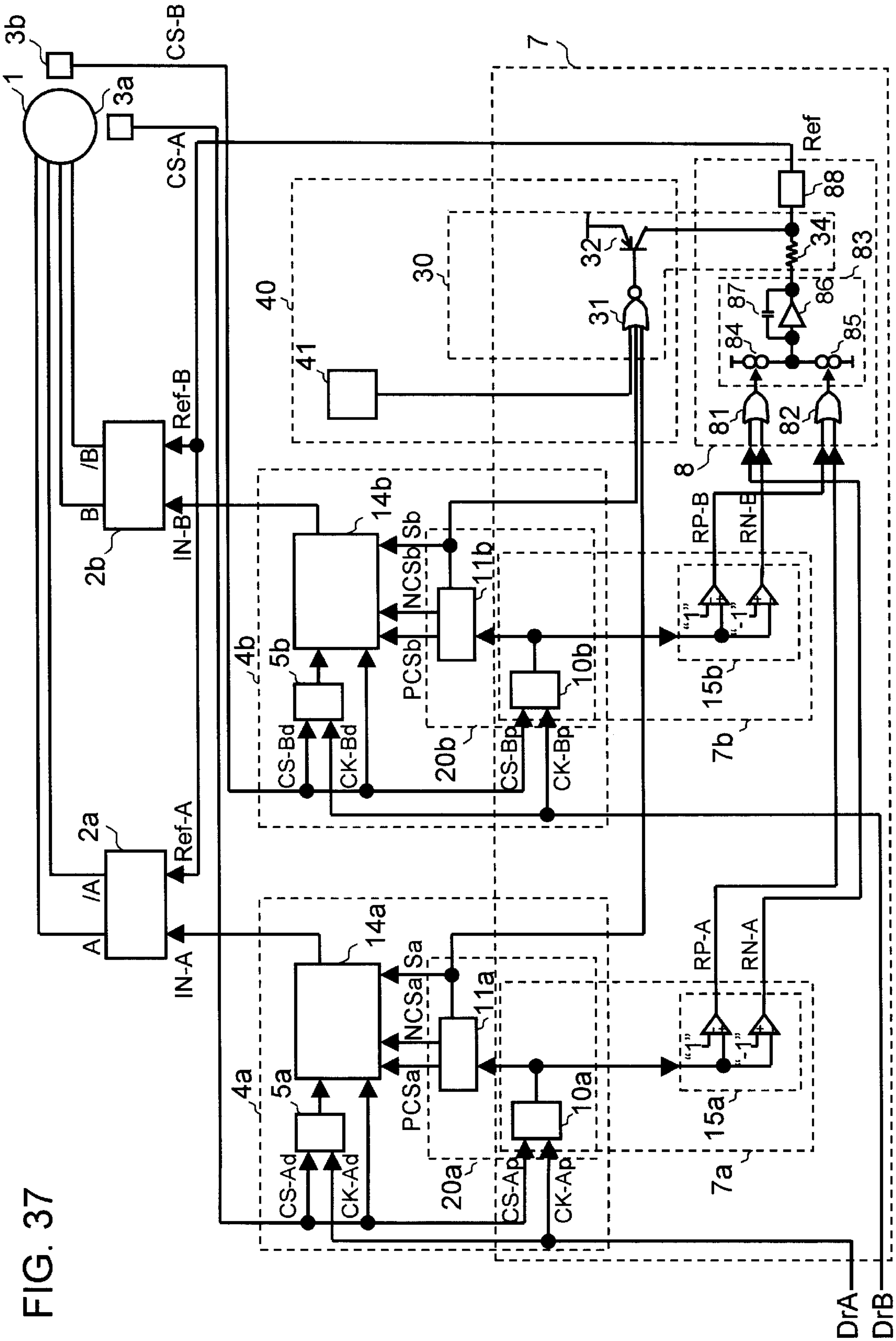
FIG. 37 illustrates a structure of a step-motor-driving device in accordance with a tenth exemplary embodiment.

FIG. 37 illustrates a structure of a step-motor-driving device in accordance with the tenth exemplary embodiment. In FIG. 37 frequency-discriminator 41 is provided to the input terminal of NOR gate 31, which is an element of exciting-current-compulsory-booster 30. Other elements are the same as those in the ninth embodiment. Combining frequency discriminator 41 with booster 30 forms start-stop-exciter 40.

An operation of the tenth embodiment having the structure discussed above is demonstrated hereinafter.

In general, when the step-motor is instructed to rotate, at starting, the driving-instruction-signal carries a rather low frequency, and the signal increases the frequency step by step, which is referred to as "soft-start". When the step-motor is halted for positioning control, the driving-instruction-frequency is naturally "0" (zero). In other words, when the motor starts to rotate or halts for positioning control, driving-instruction signals DrA, DrB carry a low frequency or "0" (zero).

If this phenomenon is used in the other way around, the frequency of signals DrA, DrB can tell a user in which mode the motor operates, i.e. in the starting mode, in the halting for positioning control, or in the regular driving mode.

Frequency discriminator 41 determines whether the frequency of signals DrA, DrB is lower or higher than a given value. When the frequency is lower than the given value, discriminator 41 outputs a signal at level H. In other words, frequency discriminator 41 outputs a signal at level H when signals DrA, DrB carry a low frequency and also the motor is in the starting mode or in the halting mode for a positioning control purpose.

When the output from discriminator 41 is at level H, booster 30 increases current-control-signal Ref, thereby increasing the exciting-current of the windings.

In the meantime, when the motor is started, starter-torque is required in order to overcome the load. When the motor is halted for positioning control, hold-torque is required for the more accurate positioning. In other words, when the motor is started and halted for positioning, the torque applied to the mover should be strengthened by increasing the exciting-current of the driving-windings.

In this tenth embodiment, the starting mode and holding mode of the motor are detected by the output from discriminator 41 at level H. When the output from discriminator 41 becomes at level H, booster 30 increases exciting current thereby strengthening the torque applied to the mover. As a result, the starter torque and the holding torque can be obtained without fail, so that the performance of the motor is further improved.

In the tenth embodiment, the instance, where start-stop-exciter 40 is added to the ninth embodiment, is described; and yet, the same effect can be produced by providing an equivalent for exciter 40 to the seventh embodiment shown in FIG. 29 or the eighth embodiment shown in FIG. 35.

Exemplary Embodiment 11

Figure 38:
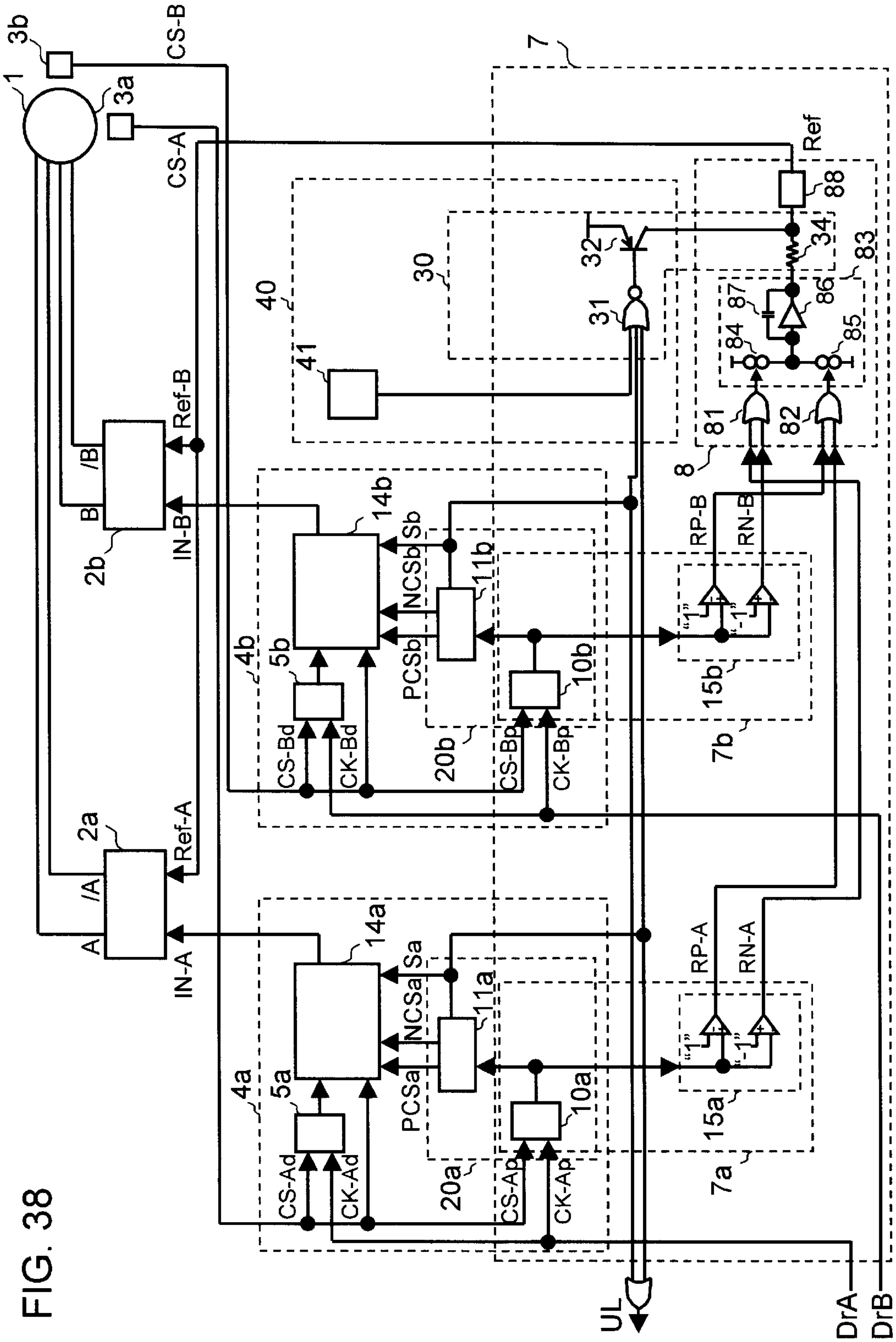
FIG. 38 illustrates a structure of a step-motor-driving device in accordance with a eleventh exemplary embodiment.

FIG. 38 illustrates a structure of a step-motor-driving device in accordance with the 11th exemplary embodiment. In FIG. 38, the OR signal of Sa and Sb tapped off from deviation-detectors 20*a* and 20*b* is supplied to an upper-class device outside this driving device as an out-of-sync signal "UL". This is additionally provided to the tenth embodiment shown in FIG. 37. Other elements are the same as those used in the tenth embodiment.

An operation of the 11th embodiment structured as above is demonstrated hereinafter.

First, the instance, when the motor is in the first status, is demonstrated. In this instance, the outputs Sa, Sb from determiners 11*a* and 11*b*, elements of deviation-detectors 20*a* and 20*b*, are all at level L. This has been already described in the fifth embodiment. Out-of-sync signal "UL" is thus at level L, i.e. the condition that the motor synchronizes with driving-instruction-signals DrA, DrB and functions properly is transmitted to the upper-class device.

Next, the instances, when the motor falls into the second or third status, are demonstrated here.

In these instances, one of outputs Sa or Sb of determiners 11*a* or 11*b* is at level H. Out-of-sync signal "UL" is thus at level H, i.e. the condition—the motor is out of sync from signals DrA, DrB and is not ready to function properly—is transmitted to the upper-class device.

The upper-class device can determine whether the step-motor built in the system functions properly or not with this transmission of out-of-sync signal "UL". For example, when the upper-class device detects that signal "UL" is at level H, this device lowers the frequency of signals DrA, DrB so that signal "UL" turns to level L (feedback control).

In other words, when the upper-class device controls the motor, the motor can be driven to be kept synchronizing with the driving-instruction signal just before until signal "UL" turns to level H from level L. The motor can be thus driven up to its limit of the characteristics, which can effect the maximum performance of the motor.

In the 11th embodiment, the instance, where the structure supplying out-of-sync signal "UL" is added to the tenth embodiment, is described; and yet, the same effect can be produced by providing an equivalent for this structure to the fifth embodiment shown in FIG. 21, the seventh embodiment shown in FIG. 29, the eighth embodiment shown in FIG. 35, or the ninth embodiment shown in FIG. 36.

Exemplary Embodiment 12

Figure 39:
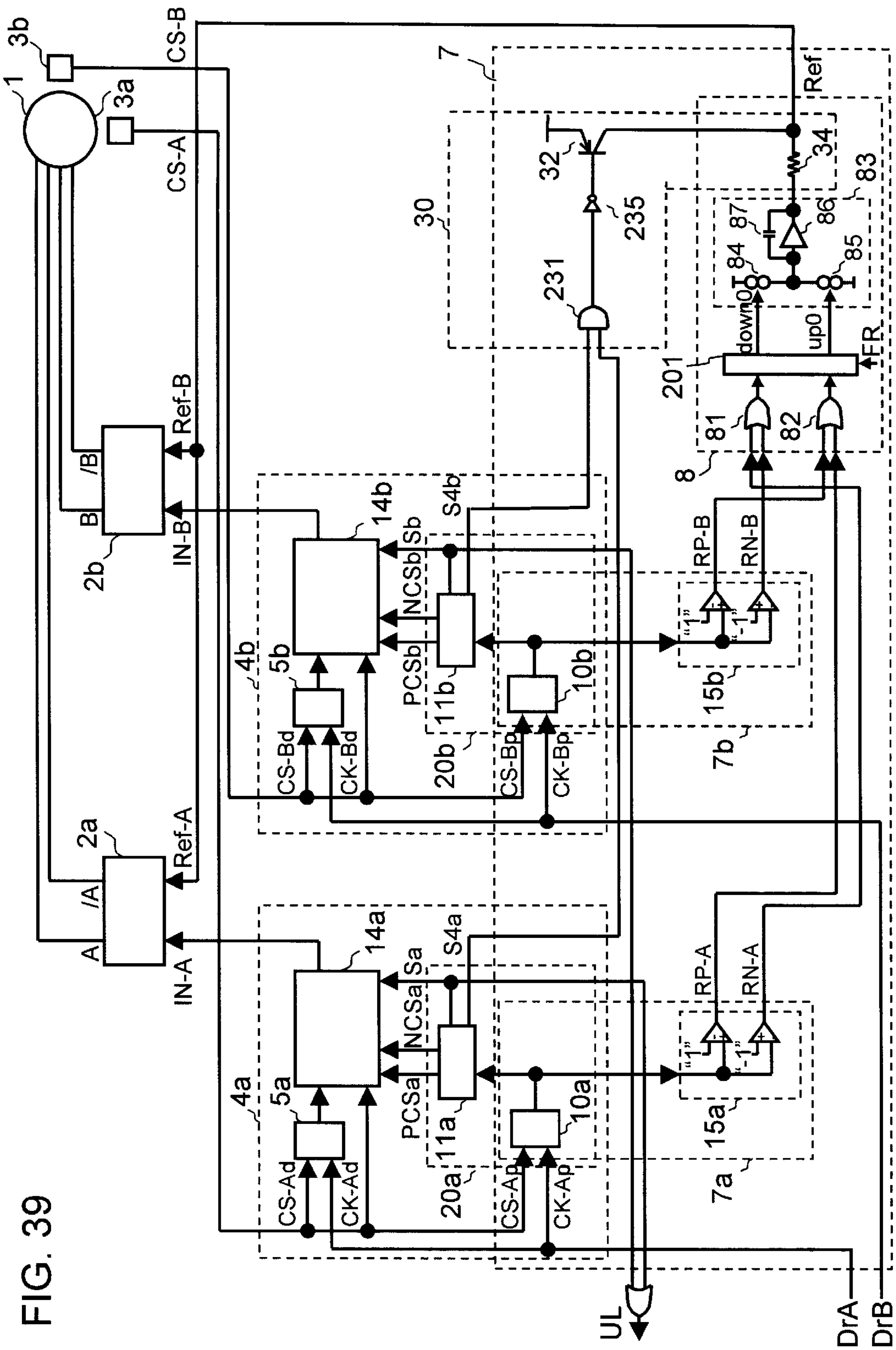
FIG. 39 illustrates a structure of a step-motor-driving device in accordance with a 12th exemplary embodiment.

FIG. 39 illustrates a structure of a step-motor-driving device in accordance with the 12th exemplary embodiment. This embodiment differs from the ninth embodiment shown in FIG. 36 mainly in the following points:

In the ninth embodiment, exciting-current-compulsory-booster 30 works responsive to output signals Sa, Sb from determiners 11*a* and 11*b*, which are elements of deviation-detectors 20*a* and 20*b*, while in the 12th embodiment output signals S4*a*, S4*b* are further provided and booster 30 works responsive to these newly provided output signals. In addition to this major difference, the ninth embodiment allows NOR gate 31 to turn on/off transistor 32, while this 12th embodiment allows AND gate 231 and inverter 235 to turn on/off PNP transistor 32.

Both the embodiments yet have the same structure that the turning-on of transistor 32 increases compulsorily exciting-current-control signal Ref.

Deviation-detectors 20*a* and 20*b* operate as follows in the 12th embodiment. Since each detector, i.e. 20*a* and 20*b*, works identically, only detector 20*a* is described here.

Detector 20*a* can detect a fourth status in addition to the first, second and third statuses which have been previously discussed and are summarized as follows.

the first status: a difference in numbers of pulses, i.e. deviation, between driving-instruction-signal DrA and position-detecting-signal CS-A falls within a given range;

the second status: the deviation falls outside the given range and forward torque is required for the mover to be directed in the positive direction so that the deviation falls within the given range; and the third status: the deviation falls outside the given range and reverse torque is required for the mover to be directed in the negative direction so that the deviation falls within the given range.

The fourth status is that the deviation extends over the given range. In this embodiment, for example, the fourth status has a span wider than the first status by ±1.

To be more specific, the deviation of the first status ranges within ±1, while that of the fourth status ranges within ±2.

When detecting the fourth status, deviation-detector 20*a* outputs signal S4*a* at level L. When detecting the deviation leaving the fourth status, detector 20*a* outputs signal S4*a* at level H. Detector 20*b* operates in the same manner, and thus outputs signal S4*b* as same as S4*a*.

Other operations of detectors 20*a* and 20*b* of the 12th embodiment are the same as those in the ninth and other embodiments previously discussed.

Exciting-current-compulsory-booster 30 allows AND gate 231 and inverter 235 to turn on transistor 32 when detectors 20*a* and 20*b* output S4*a*, S4*b* at level H. In other words, when detectors 20*a* and 20*b* both detect the deviation being out of the fourth status, booster 30 increases the exciting current.

An operation of the 12th embodiment-employing detectors 20*a*, 20*b* and compulsory-booster 30 of which operations are discussed above—is demonstrated hereinafter.

In the 12th embodiment, the compulsory increase of the exciting current is controlled responsive to the deviation in the fourth status. This is the different point from the ninth embodiment, and other operations as well as advantages are the same as those in the ninth embodiment.

Therefore, only the differences from the ninth embodiment are described. In general, when position detectors 3*a* and 3*b* (e.g. Hall elements) are mounted to the motor, some dimensional errors are produced, and output signals CS-A, CS-B include some error-factors such as off-set. The phase difference between signals CS-A and CS-B cannot be ideal 90 degree of electrical angle (in the case of two-phase motor), and yet, output duties of those signals are possibly uneven.

Figure 40:
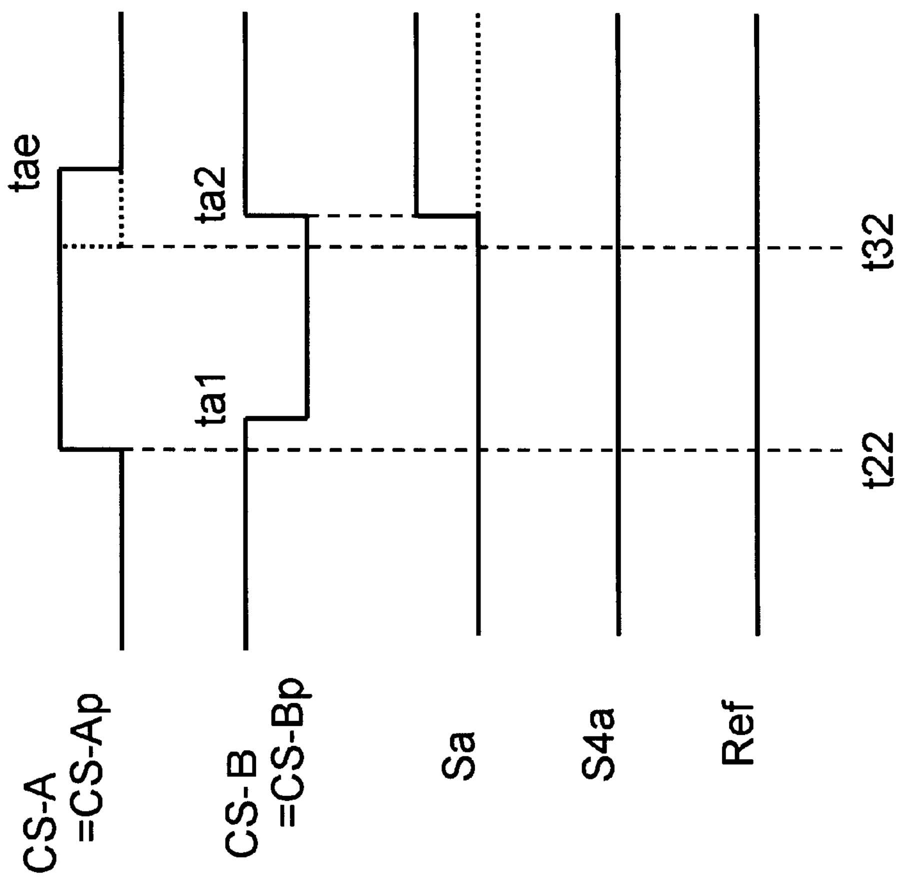
FIG. 40 illustrates an operation of the step-motor-driving device in accordance with the 12th exemplary embodiment.

FIG. 40 illustrates an example of some errors in signal CS-A. FIG. 40 shows an instance when the motor is driven synchronizing with the driving-instruction-signals, and a solid line indicates an operation of signal CS-A with errors, while a broken line indicates an operation of ideal signal CS-A.

As the broken line shows, ideal signal CS-A and the driving-instruction-signal DrA change alternately with each other. The deviation ranges between "+1" and "−1", i.e. the deviation falls within the first status and at the same time the deviation also falls within the fourth status. Therefore, signals Sa is at level L, and signal S4*a* is also at level L. The compulsory increase of exciting current is thus not performed. This condition is kept going as long as the motor is driven synchronizing with the driving-instruction-signals.

On the other hand, when signal CS-A includes some errors as shown with the solid line, signal CS-A, which should have changed at timing t32, changes not until timing "tae". In this case, if driving-instruction signal DrA changes at timing ta2, signal DrA changes twice (at timings ta1 and ta2) while signal CS-A stays at level H. The deviation thus reaches to "+2" at timing ta2. At this moment, the deviation falls into the second status, and signal Sa turns to level H.

In the ninth embodiment, the exciting current is compulsorily increased at this moment; however, the deviation temporarily leaves the first status because of the errors included in signal CS-A. If signal CS-A is an ideal shape, no compulsory increase is needed.

At this moment, the deviation is at "+2" and stays in the fourth status as it is, and signal S4*a* stays at level L.

In the 12th embodiment, if signal S4*a* is at level L at the same timing as discussed above, the compulsory increase of exciting current is not performed because signal S4*a* controls the compulsory increase of the exciting current. In other words, even if signal CS-A leaves the first status temporarily due to its own errors, unnecessary compulsory-increase of the exciting current is not performed.

The instance, when signal CS-A has some errors, is described hitherto. When signal CS-B has some errors, or the phase-difference between CS-A and CS-B has errors, the same operation as discussed above is applicable. These errors do not contribute to unnecessary increase of the exciting current.

The description refers to the deviation on plus side, and the same operation is applicable to the deviation on minus side.

When respective output signals from detectors 20*a* and 20*b* provided to each phase exceed the range from "+2" to "−2", i.e. the deviation exceeds over the fourth status, where the exciting-current-controller determines that the deviation should be restored to the first status and then booster 30 increases the exciting current compulsory so that the motor is accelerated or decelerated.

As such, in the 12th embodiment, the deviation leaves the first status temporarily due to errors in the output signals from the detectors because of (1) dispersion of mounting position-detectors 3*a* and 3*b*, or (2) offset of detectors per se. However, exciting-current is not increased unnecessarily or compulsorily, but is compulsorily increased only when the motor actually needs to be accelerated or decelerated.

Phase-difference-amplifier 8, in this 12th embodiment, feeds the output from OR gates 81 and 82 into charge-pump-circuit 83 via selector 201, and amplifier 8 supplies the output from charge-pump-circuit 83 as exciting-current-control-signal Ref via resistor 34.

Selector 201 transmits respective outputs from OR gate 81, 82 to charge-pump-circuit 83 responsive to signal FR which instructs the driving direction of the motor. In other words, when signal FR instructs the motor to rotate in the positive direction, current-sources 84, 85 are controlled responsive to the outputs from OR gate 81, 82 respectively via selector 201. When signal FR instructs the motor to rotate in the negative direction, selector 201 transmits the outputs from OR gate 81, 82 to circuit 83 so that current-source 85, 84 can be controlled respectively. As this operation has been already described in the third embodiment, signals RN-A, RN-B fed into OR gate 81 and signals RP-A, RP-B fed into OR gate 82 alternate their functions with each other depending on the motor driving direction. Selector 201 newly provided in the 12th embodiment can eliminate the absolute circuit 88 in the third embodiment shown in FIG. 10.

Phase-difference-amplifier 8 structured above functions in the same way as the phase-difference-amplifiers previously discussed, and exciting-current-controller 7 including this amplifier 8 also operates entirely in the same way as discussed in the previous embodiments.

Exemplary Embodiment 13

Figure 41:
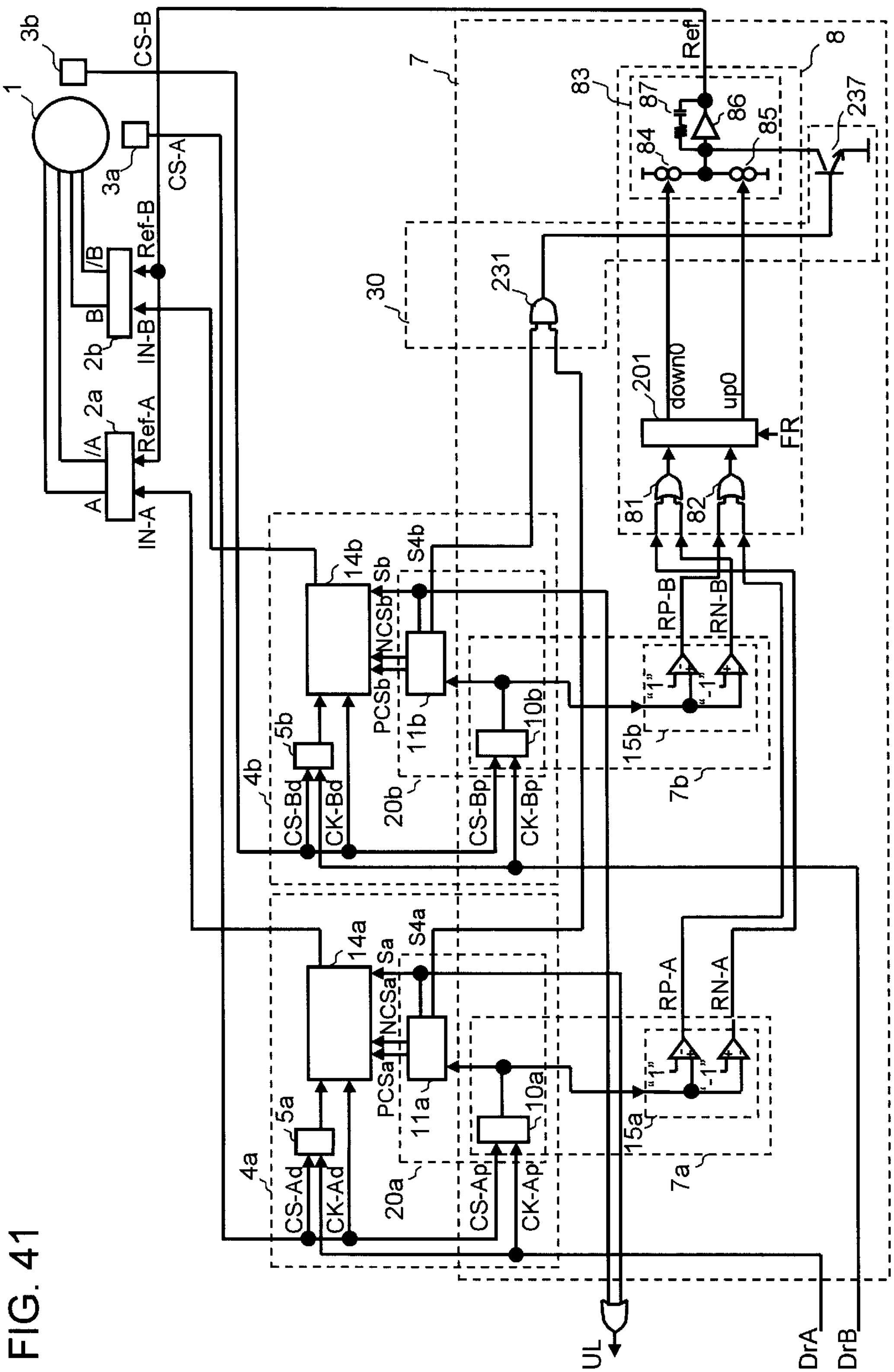
FIG. 41 illustrates a structure of a step-motor-driving device in accordance with a 13th exemplary embodiment.

FIG. 41 illustrates a structure of a step-motor-driving device in accordance with the 13th embodiment. A difference in FIG. 41 from FIG. 39 illustrating the 12th embodiment is a way of structuring exciting-current-compulsory-booster 30. In this 13th embodiment, an output from AND gate 231, to which determiners 11*a* and 11b output S4*a*, S4*b*, is fed into the base of NPN transistor 237 of which emitter is grounded. The collector of transistor 237 is coupled to an input terminal of integrating amplifier 86. Booster 30 comprises AND gate 231 and transistor 237 discussed above.

This structure allows booster 30 to turn on 237 thereby lowering a voltage at the input terminal of integrating amplifier 86 as well as increasing a voltage at the output terminal of amplifier 86, when the deviation leaves the fourth status and both signals S4*a*, S4*b* turn to level H. In other words, when the deviations detected by detectors 20*a* and 20*b* leave the fourth status and the motor is determined requiring acceleration or deceleration, the exciting current can be increased compulsorily. This is the same condition as that of the 12th embodiment.

When the deviation stays in the fourth status, one of signals S4*a* or S4*b* stays at level L. In this case, transistor 237 is turned off. In other words, when the deviation leaves the first status temporarily due to errors included in signals CS-A, CS-B, the exciting current is not increased compulsorily or unnecessarily. This is also the same condition as that of the 12th embodiment.

Demonstration discussed above proves that the 13th embodiment can achieve that the same operation as the 12th embodiment. Dispersions produced by mounting position-detectors 3*a* and 3*b* to the motor or offset included in the detectors per se produce some errors in the output signal from the detectors. Although these errors induce the deviation to leave the first status temporarily, the exciting current is not increased compulsorily or unnecessarily, but is compulsorily increased only when the motor needs acceleration or deceleration.

Exemplary Embodiment 14

Figure 42:
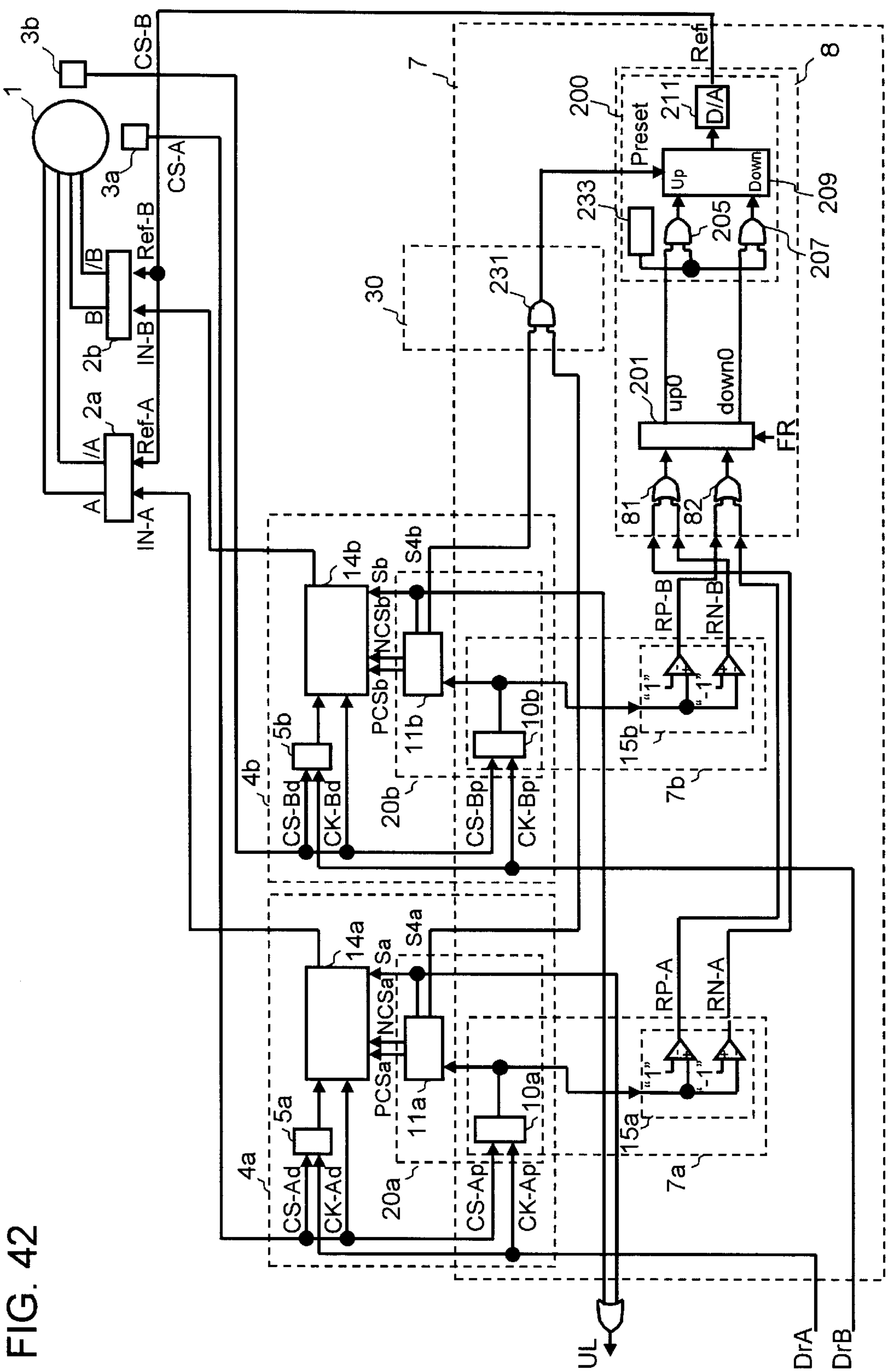
FIG. 42 illustrates a structure of a step-motor-driving device in accordance with a 14th exemplary embodiment.

FIG. 42 illustrates a structure of a step-motor-driving device in accordance with the 14th exemplary embodiment.

A difference in FIG. 42 from FIG. 39 illustrating the 12th embodiment is a way of structuring exciting-current-compulsory-booster 30. In this 14th embodiment, an output from AND gate 231, to which determiners 11*a* and 11*b* output S4*a*, S4*b*, is fed into a preset terminal of up-down counter 209 which is one of elements of integrator 200. An output signal in a digital form from counter 209 is converted into an analog voltage via D/A converter 211. Exciting-current-compulsory-booster 30 is formed by only AND gate 231.

Integrator 200 comprises oscillator 233, AND gates 205, 207, up-down counter 209 and D/A converter 211. Replacing charge-pump-circuit 83 in the 12th embodiment with a digital circuit forms integrator 200. The operation by integrator 200 is thus identical to that by charge-pump-circuit 83. The operation of phase-difference-amplifier 8 comprising integrator 200 is also identical to that of the phase-difference-amplifier used in respective embodiments.

When signal FR instructs the motor to rotate in the positive direction, selector 201 selects an output from OR gate 81 as signal "down 0" to be an input to AND gate 207 as well as selects an output from OR gate 82 as signal "up 0" to be an input to AND gate 205. When signal FR instructs the motor to rotate in the negative direction, selector 201 selects an output from OR gate 81 as signal "up 0" to be an input to AND gate 205 as well as selects an output from OR gate 82 as signal "down 0" to be an input to AND gate 207.

In this structure, when the deviation leaves the fourth status and both of signals S4*a*, S4*b* turn to level H, up-down counter 209 is preset thereby increasing an output voltage of D/A converter 211. As a result, the exciting current is increased compulsorily.

When the deviations detected by detector 20*a* and 20*b* leave the fourth status and they are determined that the motor actually needs acceleration or deceleration, the exciting current can be increased compulsorily. This is the same operation as that in the 12th embodiment.

When the deviation stays in the fourth status, one of signals S4*a* or S4*b* stays at level L. In this case, up-down counter 209 is not preset. In other words, when the deviation leaves the first status temporarily due to errors included in signals CS-A, CS-B, the exciting current is not increased compulsorily or unnecessarily. This is also the same condition as that of the 12th embodiment.

Demonstration discussed above proves that the 14th embodiment can achieve that the same operation as the 12th embodiment does. Dispersions produced by mounting position-detectors 3*a* and 3*b* to the motor or offset included in the detectors per se produce some errors in the output signal from the detectors. Although these errors induce the deviation to leave the first status temporarily, the exciting current is not increased compulsorily or unnecessarily, but is compulsorily increased only when the motor needs acceleration or deceleration.

Exemplary Embodiment 15

Figure 43:
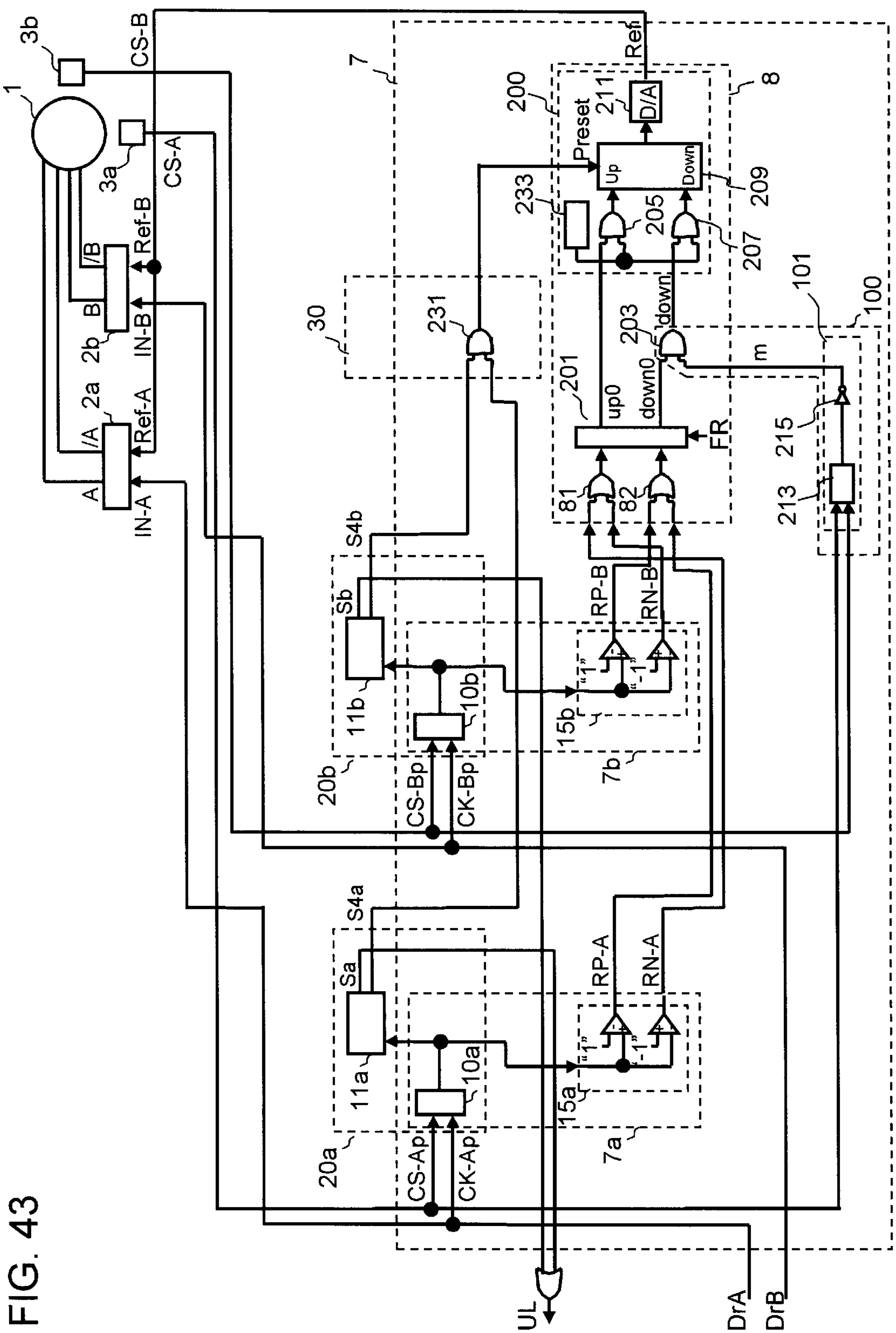
FIG. 43 illustrates a structure of a step-motor-driving device in accordance with a 15th exemplary embodiment.

FIG. 43 illustrates a structure of a step-motor-driving device in accordance with the 15th exemplary embodiment.

The 15th embodiment differs from the 14th embodiment shown in FIG. 42 in the following point.

In the 15th embodiment, delay-signal-selectors 5*a* and 5*b*, exciting-signal-selector 14*a* and 14*b*, both elements are used in the 14th embodiment, are eliminated. The 15th embodiment newly employs AND gate 203, which receives signal "down 0", one of the output signals from selector 201 of phase-difference-amplifier 8, as well as output signal "m" from halt-width-generator 101 which is also newly provided. Output signal "down" from AND gate 203 is fed into one of input terminals of AND gate 207. Halt-width-generator 101 and AND gate 207 form exciting-current-decrease-halter 100. Halt width generator 101 receives position-detecting-signals CS-A, CS-B and outputs a signal with a given pulse width every time one of CS-A or CS-B turns to level H from L or vice versa. Generator 101 comprises signal-width-generator 213 and inverter 215 which reverses an output from generator 213 and then outputs it to AND gate 203.

Exciting-current-decrease-halter 100 halts exciting-current-controller 7 from changing exciting-current-control-signal Ref so that exciting-current-controller 7 reduces the maximum exciting-current of the windings while halt-width-generator 101 outputs exciting-current-decrease-halt-signal "m".

An operation of the step-motor-driving device structured above in accordance with the 15th embodiment is demonstrated hereinafter with reference to FIGS. 44A through 44C.

Figure 44A:
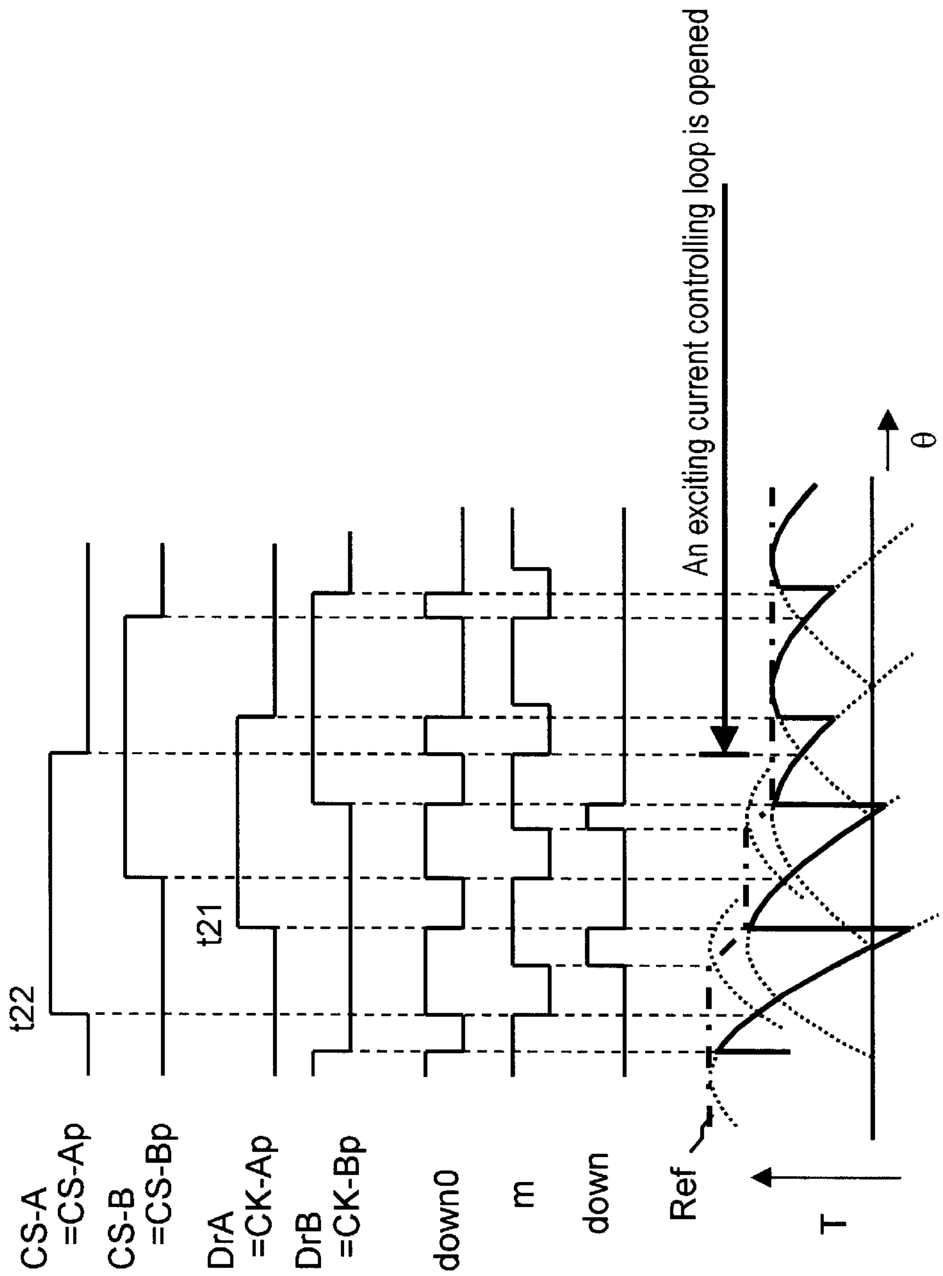
FIGS. 44A, 44B and 44C illustrate an operation of the step-motor-driving device in accordance with the 15th exemplary embodiment.
Figure 44B:
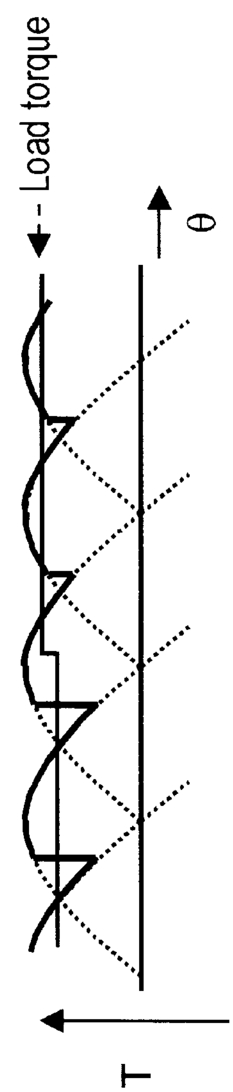
Figure 44C:
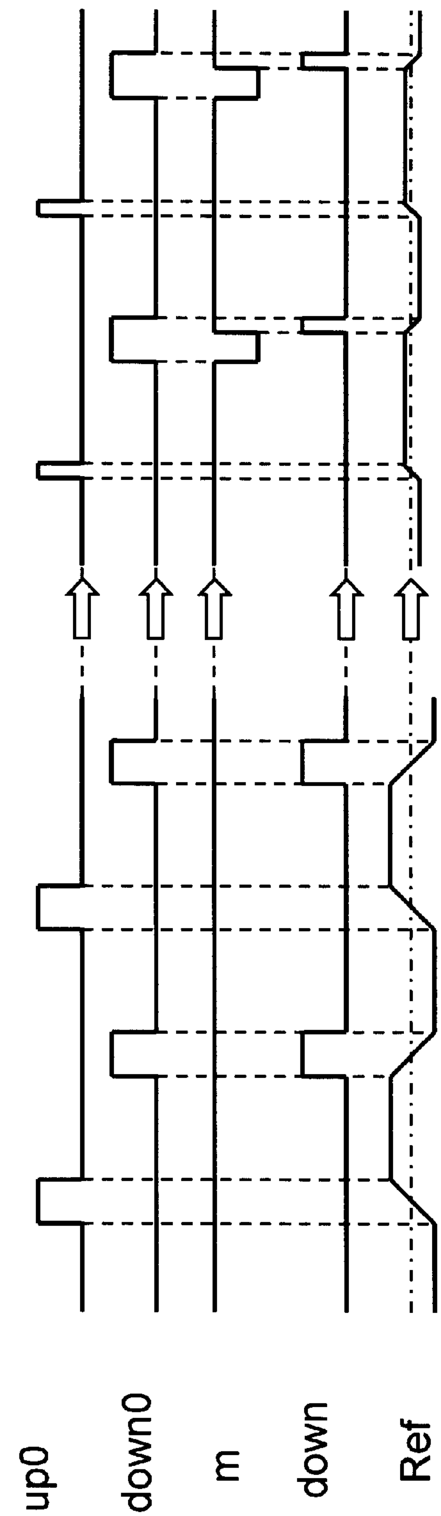

FIG. 44A illustrates an operation of an instance when the motor is driven in the positive direction, and driving-instruction-signals DrA, DrB delay with regard to position-detecting-signals CS-A, CS-B.

In this instance, exciting-current-controller 7 reduces exciting-current-control-signal Ref with instruction-delay-signal RN-A, RN-B responsive to the phase-difference between DrA, DrB and CS-A, CS-B.

In FIG. 44A, selector 201 selects the output from OR gate 81 as its output signal "down 0". Signal "down 0" is thus OR signals of signal RN-A and RN-B, and has a pulse width (a width at level H) responsive to the phase difference between the driving-instruction-signal and position-detecting-signal as signal RN-A, RN-B have.

On the other hand, an output from signal-width-generator 213 is reversed by inverter 215 in logic, and the resultant signal is tapped off from inverter 215 as exciting-current-decrease-halt-signal "m". Signal "m" turns to level L for a given period every time one of signals CS-A or CS-B changes.

AND gate 203 thus outputs the signal "down"—of which pulse width (a pulse width at level H) is narrower than the width of the signal "down 0" (a width at level H) by the width of signal "m" (a width at level L)—to integrator 200.

Integrator 200 counts down up-down-counter 209 thereby reducing exciting-current-control-signal Ref, while signal "down" stays at level H. Reducing signal Ref entails reducing the maximum-exciting-current of the motor. Then the phase-difference between the driving-instruction-signal and position-detecting-signal approaches to "0" (zero) as already discussed in the third embodiment. This operation is kept going until the pulse width of signal "down 0" becomes narrower than that of signal "m", whereby the supply w of signal "down" is stopped (keep staying at level L).

In other words, reducing of the exciting current is halted at the moment when the delay of signal CS-A, CS-B with regard to DrA, DrB becomes narrower than the pulse width of signal "m", i.e. it halts with some margin before it reaches to the minimum exciting current for the load.

As such, in this 15th embodiment, reduction of the exciting current stops with some margin against the load, and exciting-current-control loop is opened, i.e. when the exciting current is reduced to "the minimum value +$\alpha$", the step motor is still kept on driving (open control). The exciting current reduction not lowered down to the minimum value but held at "the minimum value +$\alpha$" allows the step motor to make use of its own restoring capability so that load disturbance, if any, can be controlled. FIG. 44B illustrates this operation. An open exciting-current-control can eliminate electronics feed-back system, and it avoids unstable controlling. This advantage produces more effect at the finer detecting resolution of a position-detecting-signal and at the lower driving speed of the motor. Thus this advantage contributes to cost reduction as well as downsizing of the step-motor-driving device. Further, the 15th embodiment proves that an influence of the mounting accuracy of the position detector can be moderated. FIG. 44C illustrates this advantage. In FIG. 44C, if the position detector has been mounted not so accurately, exciting-current-control signal Ref supplied from controller 7 sometimes carries large ripples. Exciting-current-decrease-halter 100 suppresses the ripples of signal Ref and contributes to stabilizing the exciting-current-control.

Exemplary Embodiment 16

Figure 45:
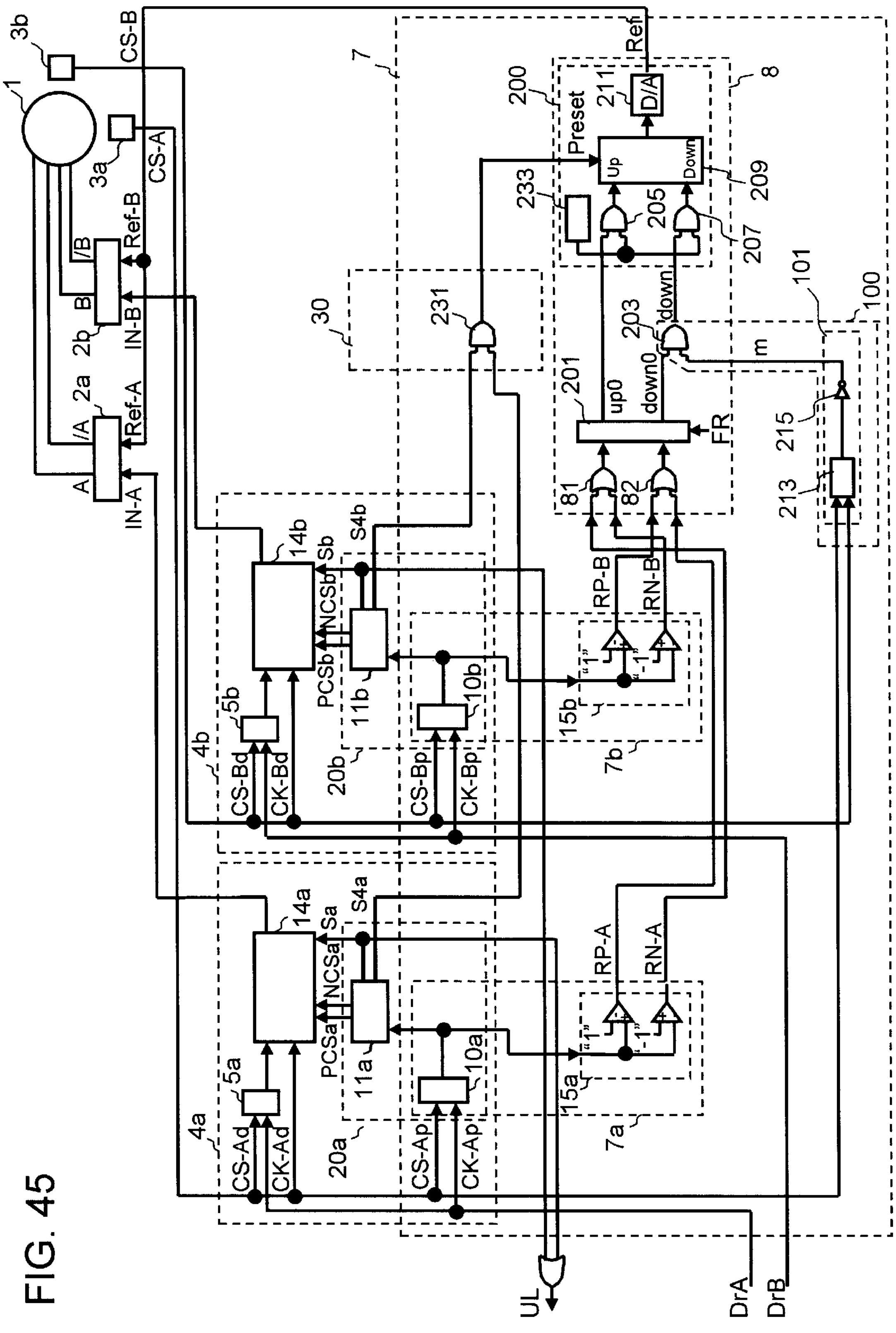
FIG. 45 illustrates a structure of a step-motor-driving device in accordance with a sixteenth exemplary embodiment.

FIG. 45 illustrates a structure of a step-motor-driving device in accordance with the 16th exemplary embodiment. The 16th embodiment differs from the 15th embodiment shown in FIG. 43 in the following point.

In the 16th embodiment, delay-signal-selectors 5*a* and 5*b* as well as exciting-signal-selectors 14*a* and 14*b* are added to the structure in accordance with the 15th embodiment so that excitation-timing-controllers 4*a* and 4*b* are formed.

This structure allows the step-motor-driving device in accordance with the 16th embodiment to have the advantages of the 15th embodiment and the advantage of excitation-timing-controllers 4*a* and 4*b*, which has been discussed hitherto in the previous embodiments, i.e. the advantage of avoiding sweepingly a chance of jumping "out of sync".

Figure 46:
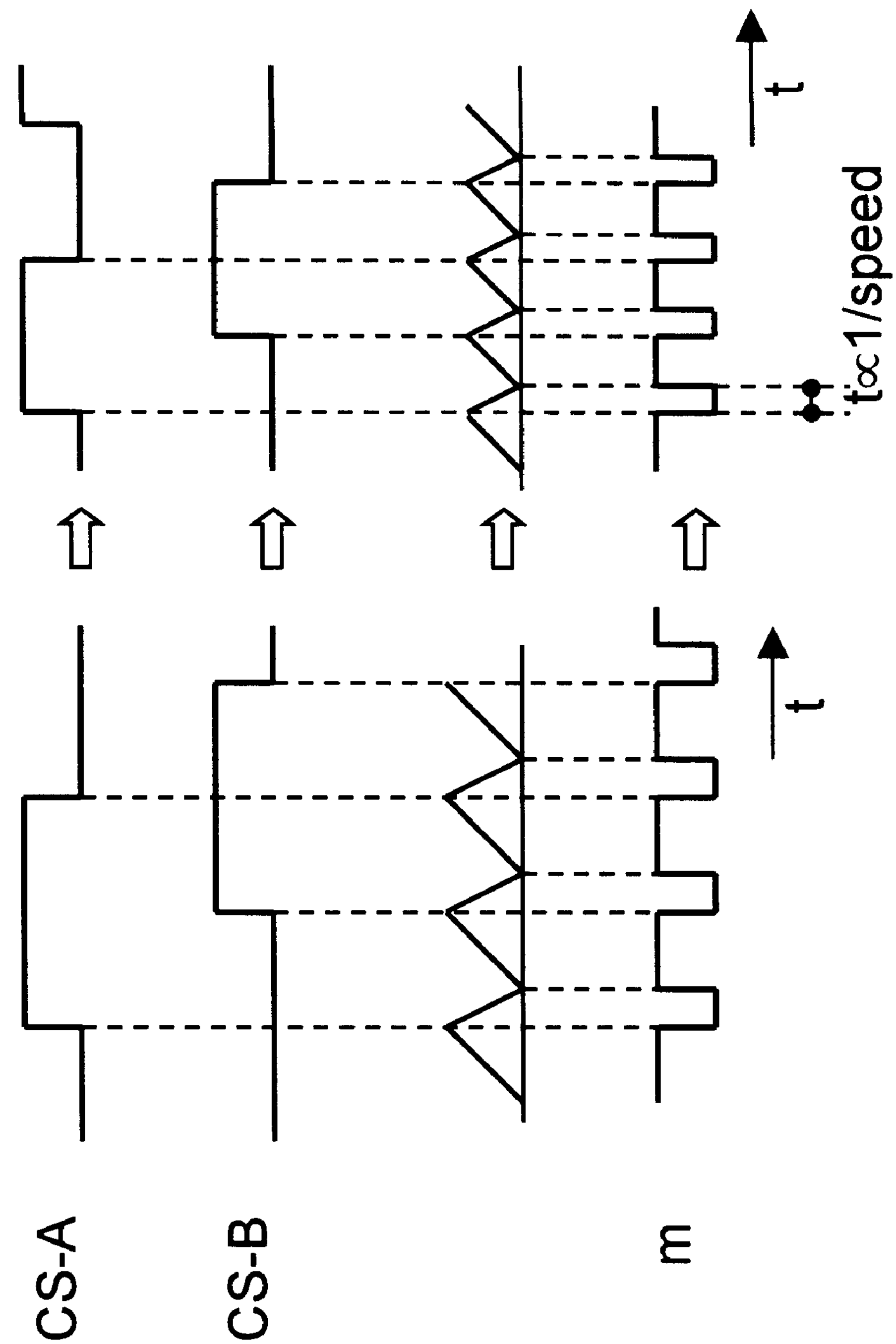
FIGS. 46 and 47 illustrate an operation of the step-motor-driving device in accordance with the sixteenth exemplary embodiment.

Exciting-current-decrease-halt-signal "m" discussed in FIG. 43 and FIG. 45 can be output for a period responding to the motor speed every time position-detecting-signals CS-A, CS-B are input. In this case, as shown in FIG. 46, signal-width-generator 213 can comprise a charger/discharger which discharges generator 213 every time signal CS-A or CS-B changes, and then charges the generator 213, when generator 213 is completely discharged. While the charger/discharger discharges, generator 213 outputs signal "m". The output width of signal "m" can be arbitrarily changed by changing a ratio of charging vs. discharging.

As such, output of signal "m" can be responsive to the motor speed so that the pulse width of signal "m" can indicate a given electrical angle regardless of the motor speed. The reduction of exciting current thus becomes stable regardless of the motor speed so that the motor's restoring capability against load disturbance becomes stable and ready for usefulness. This is an advantage when the motor speed is varied in a wide range.

Figure 47:
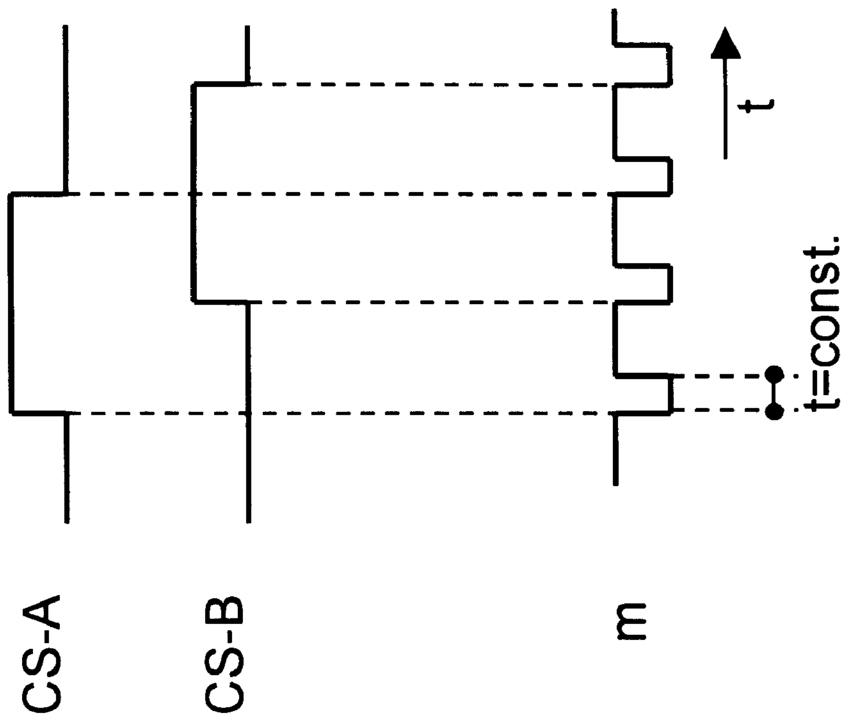

Exciting-current-decrease-halt-signal "m" can be output for a given period every time signals CS-A, CS-B are input. In this case, as shown in FIG. 47, signal-width-generator 213 can comprise a mono-multi circuit which operates every time signal CS-A or CS-B changes.

As such, for an application with a small range of speed variation, the output width of signal "m" can stay for a given period in the simple way as discussed above.

Exemplary Embodiment 17

Figure 48:
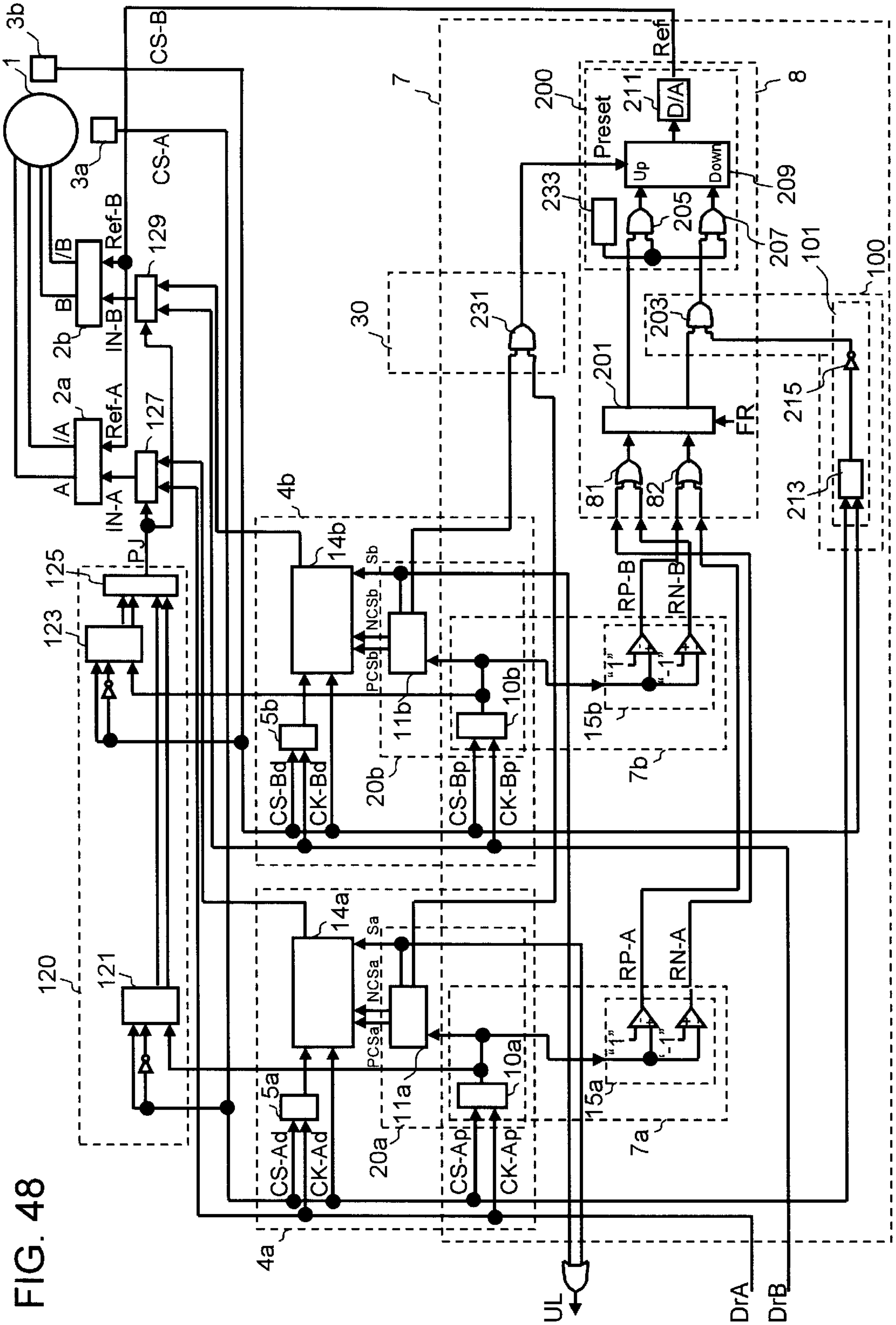
FIG. 48 illustrates a structure of a step-motor-driving device in accordance with a seventeenth exemplary embodiment.

FIG. 48 illustrates a structure of a step-motor-driving device in accordance with the 17th exemplary embodiment. The 17th embodiment differs from the 16th embodiment shown in FIG. 45 in the following points.

In the 17th embodiment, exciting-signal-stability-determiner 120 and selectors 127, 129 are provided in addition to the structure of the 16th embodiment.

Phase-memory 121 receives position-detecting signal CS-A and its reversal signal supplied from position detector 3*a* as well as a deviation signal supplied from deviation counter 10*a*, and outputs signals to agreement-detector 125. In the same manner, phase-memory 123 receives position-detecting signal CS-B and its reversal signal supplied from position detector 3*b* as well as a deviation signal supplied from deviation counter 10*b*, and outputs signals to agreement-detector 125. Phase-memories 121, 123 and agreement-detector 125 form exciting-signal-stability-determiner 120.

Selector 127 receives an output signal from detector 125, driving-instruction-signal DrA and an output signal from exciting-signal-selector 14*a*, and outputs a signal to input terminal IN-A of exciter 2*a*. In the same manner, selector 129 receives an output signal from detector 125, driving-instruction-signal DrB and an output signal from exciting-signal-selector 14*b*, and outputs a signal to input terminal IN-B of exciter 2*b*.

The structural matters of the 17th embodiment discussed above are the different points from the structure of the 16th embodiment.

Figure 49A:
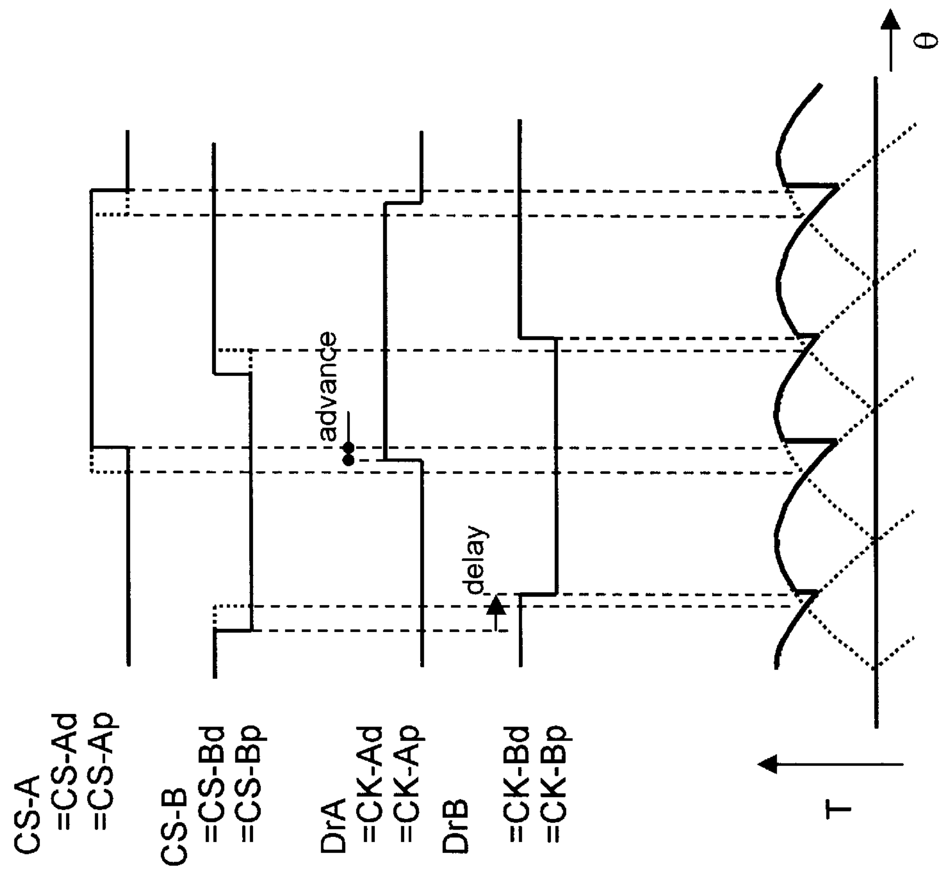
FIGS. 49A and 49B illustrate an operation of the step-motor-driving device in accordance with the seventeenth exemplary embodiment.
Figure 49B:
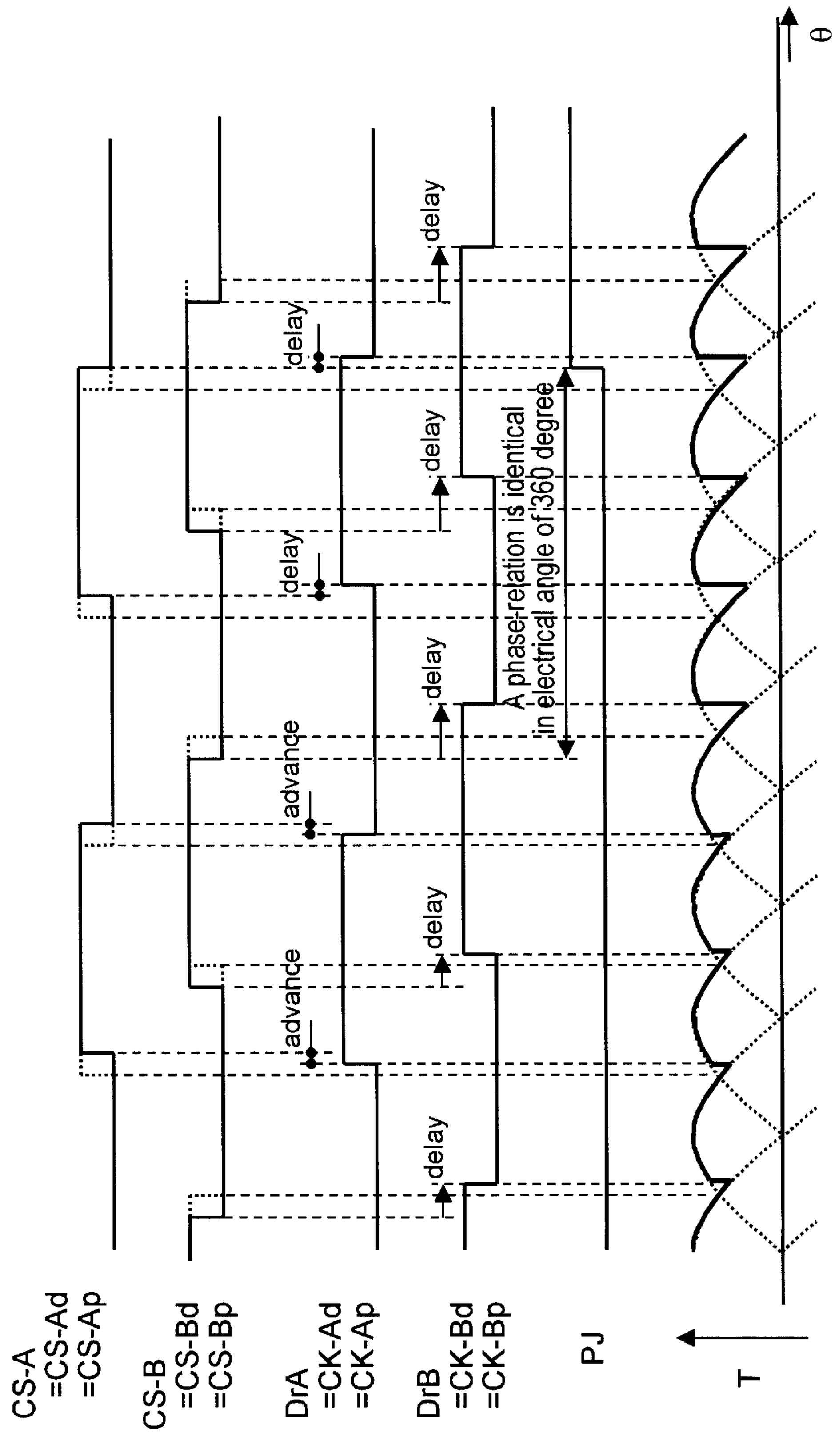

An operation of the 17th embodiment is demonstrated with reference to FIGS. 49A, 49B.

Excitation-timing controller 4*a* receives driving-instruction signal DrA and position-detecting signal CS-A, and outputs an exciting signal responsive to the input timing of signals DrA or CS-A. In the same manner, controller 4*b* receives driving-instruction signal DrB and position-detecting signal CS-B, and outputs an exciting signal responsive to the input timing of signals DrB or CS-B.

Controller 4*a* outputs an exciting signal responsive to an input timing of the driving-instruction signal when an excitation-switch depending on the driving-instruction signal directs the torque in a direction effective for motor 1 to rotate in a desirable direction. On the other hand, controller 4*a* outputs an exciting signal responsive to an input timing of the position-detecting signal when an excitation-switch depending on the driving-instruction signal directs the torque in an unfavorable direction for motor 1 to rotate in a desirable direction. These operations are applicable to controller 4*b*.

An instance, when an error occurs between position-detecting signals CS-A and CS-B, is discussed hereinafter.

This error is produced by mechanical accuracy of mounting detectors 3*a*, 3*b* to the motor and an output offset of the detectors per se, and the error causes unbalance of output duty of signals CS-A, CS-B as well as a phase-shift between signals CS-A, CS-B.

FIG. 49A illustrates an operation when the error discussed above occurs between signals CS-A, CS-B. In FIG. 49A, a broken line indicates an ideal signal and a solid line indicates a signal with an error.

When respective phase differences between signals CS-A, CS-B and DrA, DrB are near to "0" (zero), the error pretends that delay and advance of these signals alternate with each other frequently. In this case, controllers 4*a* and 4*b* output the signals of later arrival between these signals—undergone the operation of delay-signal-selectors 5*a*, 5*b*—as exciting signals in order to perform the operation discussed above. However, the exciting signal responses to signals CS-A, CS-B or DrA, DrB due to the frequent switch of delay and advance.

When such exciting signals are fed into exciters 2*a*, 2*b*, torque ripples become large and an average torque lowers as shown in FIG. 49A.

Exciting-signal-stability-determiner 120, and selectors 127, 129 are provided in order to avoid these problems.

Stability-determiner 120 determines whether the exciting signal from controller 4*a* is in a stable condition, i.e. the exciting signal responses to one of those input timings for a rather long period, or the exciting signal is in an unstable condition, i.e. the exciting signal changes the respond to one of those input timings alternatively in a rather short period. This operation is applicable to controller 4*b*.

Selector 127 selects one of the driving signal or exciting signal based on the determination by determiner 120, and outputs a signal to exciter 2*a*. Selector 129 operates in the same way.

Figure 50:
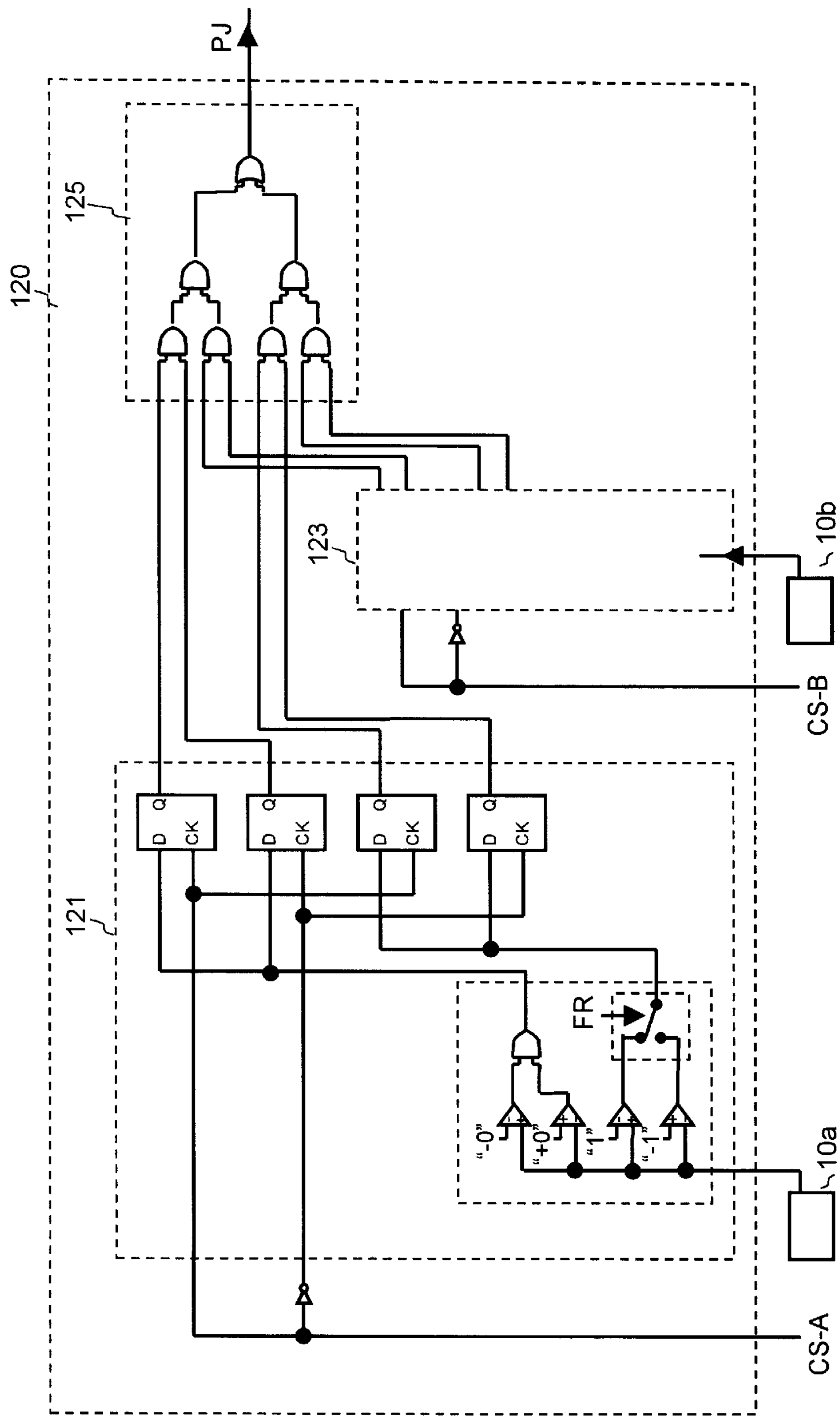
FIG. 50 illustrates a specific structure of an exciting-signal-stability-determiner.

When determiner 120 determines that the exciting signal is in the stable condition, selectors 127 and 129 select the exciting signals. On the other hand, when determiner 120 determines that the exciting signal is in the unstable condition, selectors 127 and 129 selects the driving-instruction signals. FIG. 50 illustrates a structure of determiner 120.

Determiner 120 illustrated in FIG. 50 detects the phase relation between signals CS-A, CS-B and DrA, DrB with deviations supplied from deviation counters 10*a*, 10*b*. (phase relation: signals DrA, DrB advance or delay with regard to signals CS-A, CS-B, supplied deviations: when the motor is driven in the positive direction, the deviation is "+1" or "0", and when in the negative direction, the deviation is "−1" or "0") This phase relation detected with the deviation is stored in a plurality of D-type flip-flops in plural times (four times) every time signals CS-A, CS-B change. Agreement-detector 125 detects whether these four phase-relations stored in the flip flops are all identical or not. When the four relations stored are identical, the condition is detected to be stable, and when at least one of relations stored is different from others, the condition is detected to be unstable.

Determiner 120 determines whether or not the exciting signals supplied from controllers 4*a*, 4*b* are in the stable condition based on the rather longer period while the phase-relation keeps staying the same. This rather longer period is determined by the numbers of storing the phase-relations discussed above.

FIG. 49B illustrates an operation of the step-motor-driving device, in which determiner 120 and selectors 127, 129 are provided, in accordance with the 17th embodiment.

In FIG. 49B, during a period when output PJ from determiner 120 stays at level L, the exciting signal is in the unstable condition. At this time, selectors 127, 129 send driving-instruction signals DrA, DrB to exciters 2*a*, 2*b*.

When the exciting signals supplied from controllers 4*a*, 4*b* become unstable due to the errors of signals CS-A, CS-B, the excitation of the driving windings of the motor is switched responsive to driving signals DrA, DrB in a stable manner. As a result, torque ripples can be regulated within small values, and the motor is kept driving free from lowering the torque.

When the exciting signals are in the stable condition and output PJ turns to level H, controllers 4*a*, 4*b* output the exciting signals to exciters 2*a*, 2*b* so that the motor is kept driving free from jumping "out of sync" as discussed in the previous embodiments.

Determiner 120 has been described that the phase-relation between the position-detecting signal and driving-instruction signal is stored every time the position-detecting signal changes; however, the phase-relation can be stored every time the driving-instruction signal changes. The deviation counter has detected the phase-relation in the above demonstration; however, a level of the driving-instruction signal (or the position-detecting signal) can be latched at a change of the position-detecting signal (or driving-instruction signal).

The 17th embodiment thus proves that the exciting-signal-stability-determiner, newly employed, determines whether the phase-relation between the position-detecting signal and driving-instruction signal is stable or unstable, and then the selectors, also newly employed, select the driving-instruction signal as the exciting signal when the determiner determines the phase relation is unstable. The selectors select the output signal from the excitation-timing controller as the exciting signal when the determiner determines the relation is stable.

The position detector, e.g. formed of Hall elements, outputs some error due to its mounting accuracy and its own offset. In this case, the excitation-timing-controller performs unstable such as outputting a position-detecting signal or a driving-instruction signal, which invites torque ripples, larger variations of rotating speed, or decreasing the torque. The condition, where the phase difference between the position-detecting signal and driving-instruction signal is near to "0" (zero), easily invites these problems. The 17th embodiment proves that the structure discussed above can avoid these problems and can supply stable exciting signals even when the position-detecting-signal has an error and the phase difference is near to "0" (zero). Torque ripples, the larger variations of rotating speed, or decrease of the torque can be thus prevented. As a result, the exciting signal is stabilized as the driving-instruction signal, and the step-motor can be driven in a stable manner up to the limit of its torque characteristics.

Exemplary Embodiment 18

Figure 51:
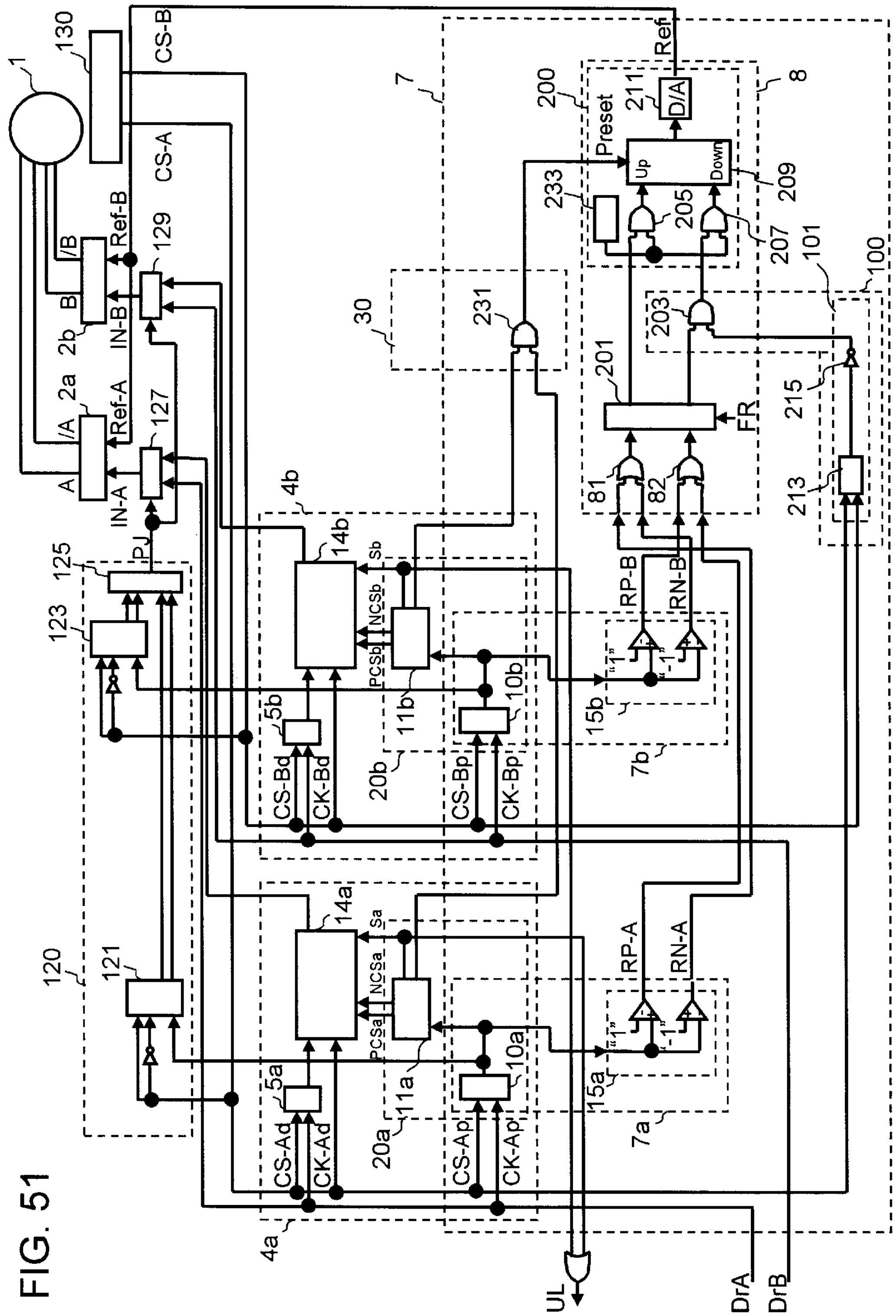
FIG. 51 illustrates a structure of a step-motor-driving device in accordance with an eighteenth exemplary embodiment.

FIG. 51 illustrates a structure of a step-motor-driving device in accordance with the 18th exemplary embodiment. In FIG. 51, exciting-signal-stability-determiner 120, and selectors 127, 129 are the same as those used in the 17th embodiment.

This 18th embodiment differs from the 17th embodiment shown in FIG. 48 in the structure of the position detector, i.e. position detector 130 is provided instead of detectors 3*a*, 3*b* used in 17th embodiment.

A position-detecting signal supplied from detector 130 contains signals of an advance-phase and a delay-phase with regard to an inductive voltage which the driving-winding generates.

Figure 52A:
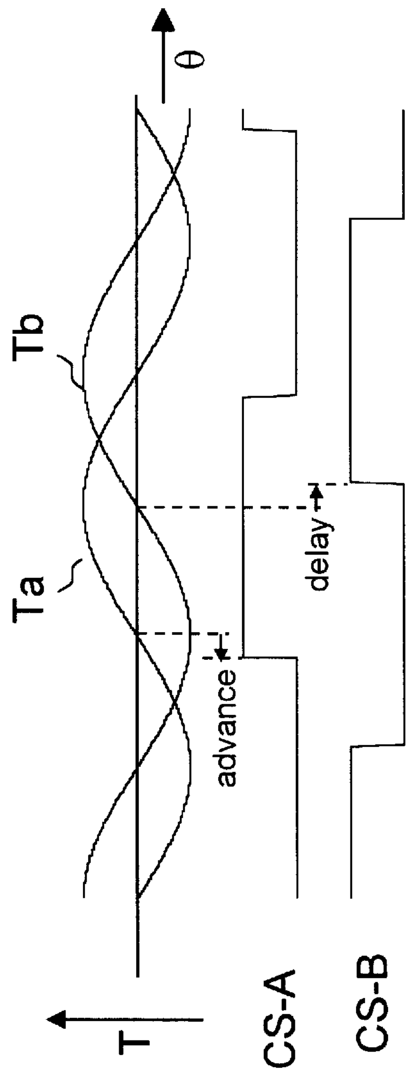
FIGS. 52A and 52B illustrate an operation of the step-motor-driving device in accordance with the eighteenth exemplary embodiment.
Figure 52B:
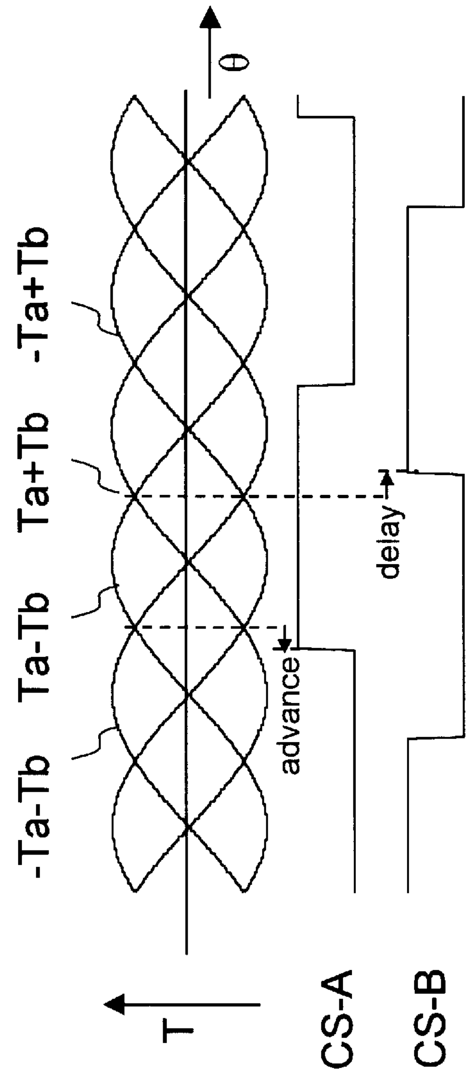

FIG. 52A illustrates a relation between position-detecting signals CS-A, CS-B supplied from detector 130 and torque Ta, torque Tb: Torque Ta is generated when driving-windings of phase-A is excited, and torque Tb is generated when driving-windings of phase-B is excited. FIG. 52B illustrates a relation between signals CS-A, CS-B and each torque of "−Ta−Tb", "Ta−Tb", "Ta+Tb", "−Ta+Tb", which are generated when the driving-windings of phase-A and phase-B are excited to be plus or minus.

As shown in those FIGS., signal CS-A is output ahead in phases of the inductive voltage, i.e. torque Ta, and signal CS-B is output with delaying in phases with regard to the inductive voltage, i.e. torque Tb.

An operation of the 18th embodiment, where the position-detector outputting a signal as shown in FIGS. 52A, 52B is newly provided, is demonstrated hereinafter in comparison with the 17th embodiment where exciting-signal-stability-determiner 120 and selectors 127, 129 are provided.

As described already in the 17th embodiment, when the phase-relation between the position-detecting signal and the driving-instruction signal alternates frequently, determiner 120 and selectors 127, 129 determine that the exciting signal is unstable and then input the driving-instruction signals to exciters 2*a*, 2*b*. In other words, during the period while the driving-instruction signal is input later than the advance-phase-signal supplied from detector 130 but earlier than the delay-phase-signal, determiner 120 determines that the exciting signal is unstable and the excitation of the windings is switched responsive to the driving-instruction signal.

When the motor is instructed to rotate in the positive direction, the motor is thus kept driving as a step-motor until the phase of driving-instruction signal advances with regard to signal CS-A set in advance-phase. As a result, the advantage due to advance-phase is effected, thereby improving the motor efficiency. The advance-phase is well known for increasing the motor efficiency.

In the case of driving the motor in the negative direction, signal CS-B set in the delay-phase becomes the advance-phase when the negative direction is viewed as a reference. The motor is thus kept driving as a step-motor until the driving-instruction signal advances with regard to signal CS-B in phases. The advantage of advance-phase is also effected thereby improving the motor efficiency.

The 18th embodiment proves that the position-detecting signal supplied from position detector 130 contains signals of advance-phase and delay-phase with regard to the inductive voltage so that the advantage of advance-phase is effected regardless of rotating directions. As a result, the efficiency of the motor increases.

Exemplary Embodiment 19

Figure 53:
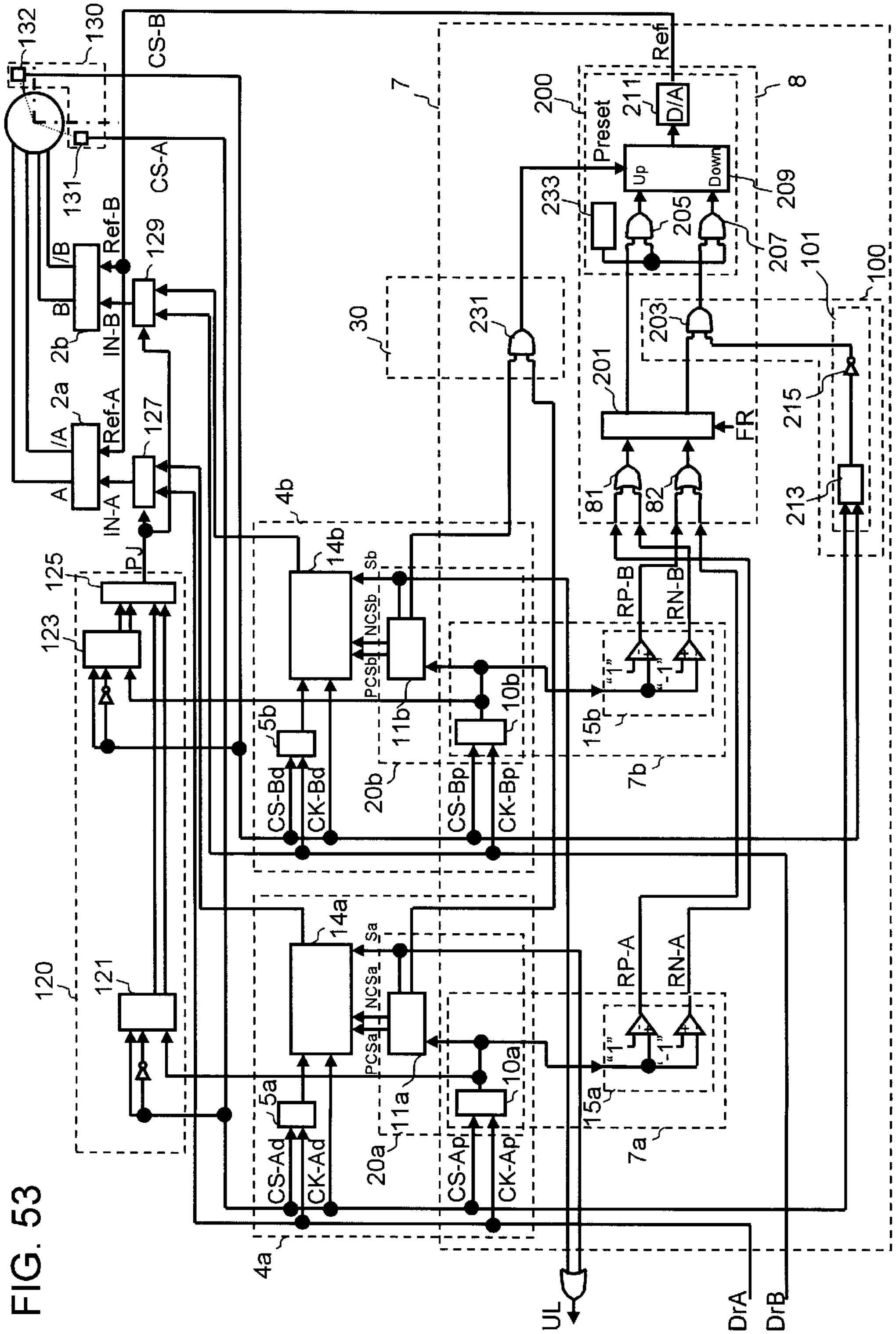
FIG. 53 illustrates a structure of a step-motor-driving device in accordance with a nineteenth exemplary embodiment.

FIG. 53 illustrates a structure of a step-motor-driving device in accordance with the 19th exemplary embodiment. In FIG. 53, exciting-signal-stability-determiner 120, selectors 127, 129 are the same as those used in the 18th embodiment.

This 19th embodiment differs from the 18th embodiment shown in FIG. 51 in position-detector 130, which includes first sensor 131 and second sensor 132. Sensor 131 is mounted so that a phase advances with regard to an inductive voltage generated by the driving-winding. On the other hand, sensor 132 is mounted so that a phase delays with regard to the inductive voltage.

The relation between respective output signals CS-A, CS-B from sensors 131, 132 and respective torque generated by exciting each driving-winding is the same as that of embodiment 18th shown in FIGS. 52A, 52B.

The two sensors can be formed of, e.g. Hall elements, MR sensors, optical encoder, or resolver. In the case of three-phase step-motor which has three-phase driving-windings, two sensors out of three can be used.

An operation of the 19th embodiment structured above is basically the same as that of the 18th embodiment.

In other words, during the period while the driving-instruction signal is input later than an advance-phase signal supplied from sensor 131 but earlier than a delay-phase signal supplied from sensor 132, determiner 120 determines that the exciting signal is unstable, whereby excitation of the windings is switched responsive to the driving-instruction signal.

As a result, the advantage of advance-phase is effected regardless of the rotating directions so that the motor efficiency increases.

Figure 54A:
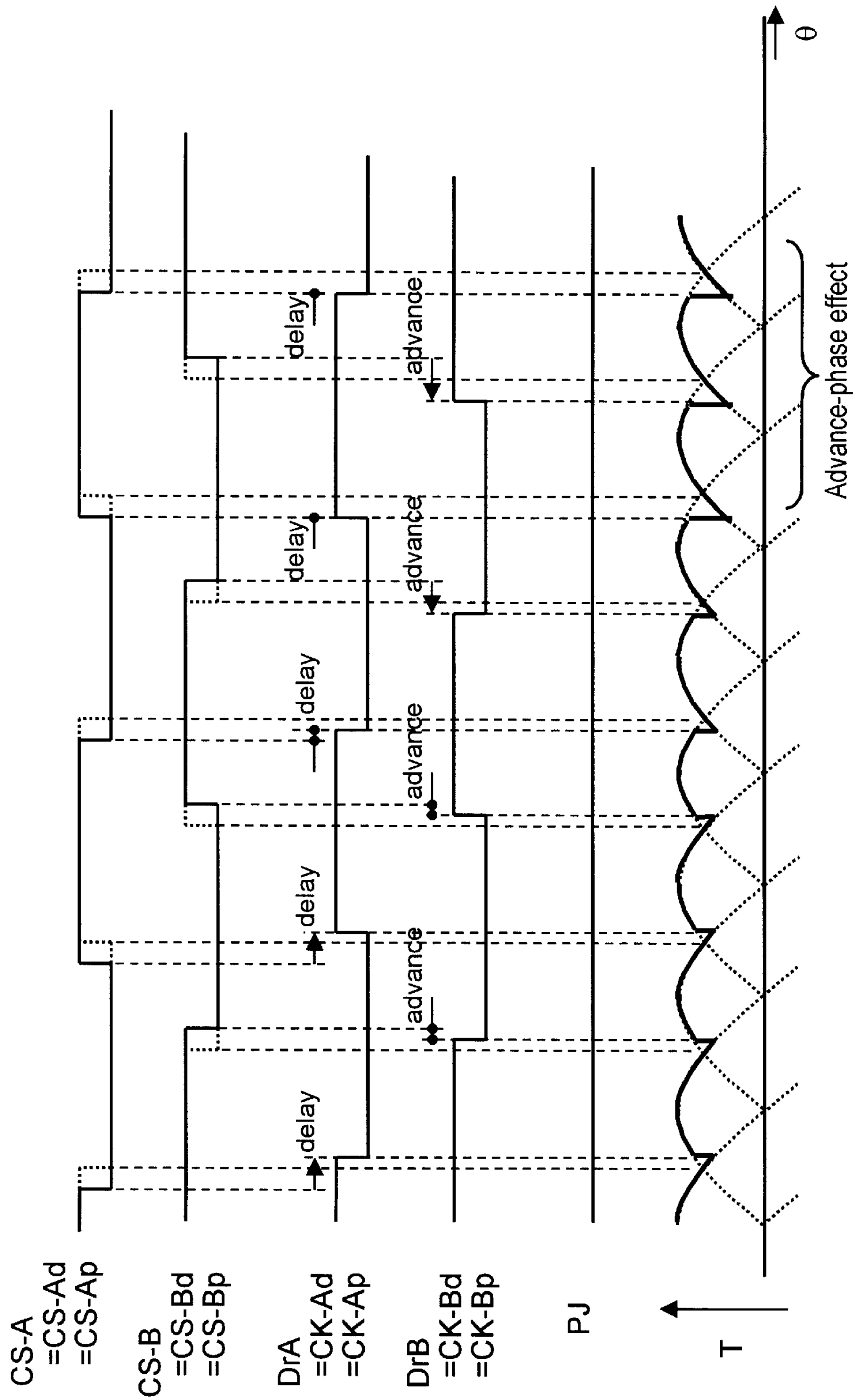
FIG. 54A illustrates an operation of the step-motor-driving device in accordance with the nineteenth exemplary embodiment.

FIG. 54A illustrates a condition where determiner 120 determines that the exciting signal is unstable, and the excitation is switched responsive to the driving-instruction signals DrA, DrB.

This excitation switch seems apparently unfavorable for the motor to rotate in the desirable direction; however, this excitation switch is actually favorable for the motor to be kept driving because the advance-phase-effect can boost the torque.

Figure 54B:
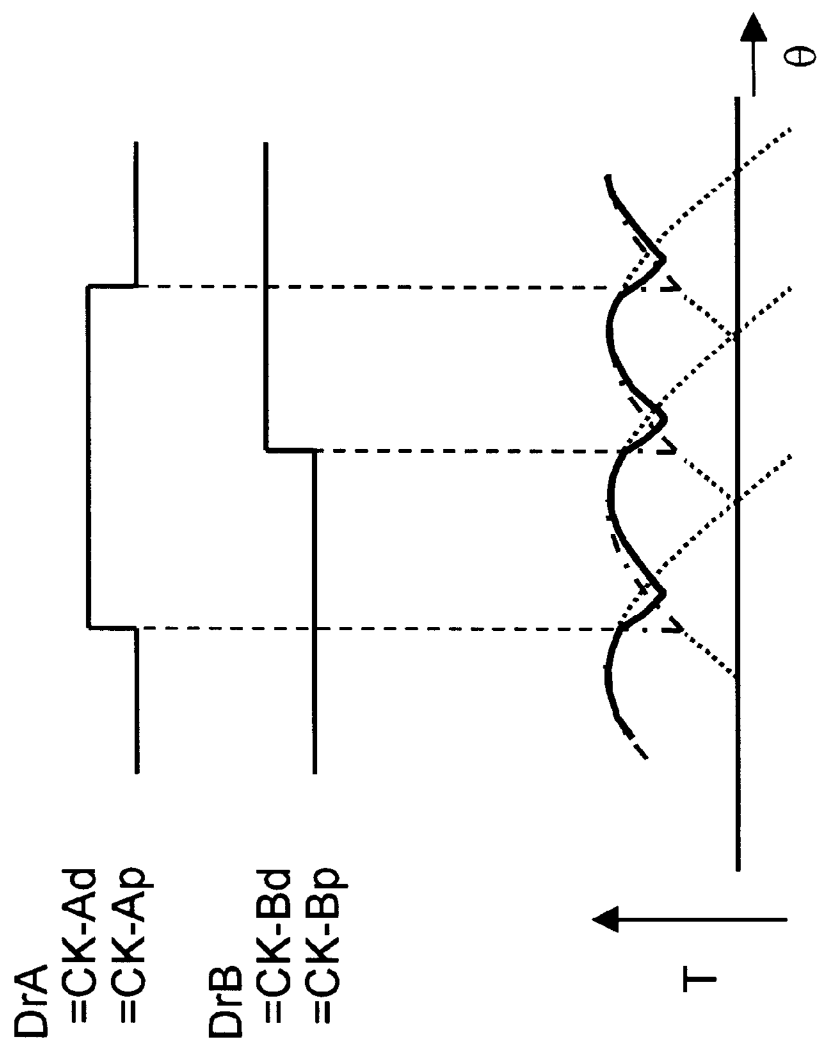
FIG. 54B illustrates an effect of phase-advancement.

This operation is further detailed with reference to FIG. 54B. Since the driving-windings of the motor has inductance component, switching the exciting current of the driving-windings delays from the excitation-switching signals (=signals DrA, DrB in the instance discussed above). As shown in FIG. 54B, the excitation-switching signals should be thus supplied slightly earlier, thereby increasing the torque T. This is well known for an advance-phase effect.

In the 19th embodiment, the step-motor-driving device, comprising exciting-signal-stability-determiner 120, selectors 127, 129 and position detector 130 formed of sensors 131, 132 mounted in advance-phase manner with regard to the inductive voltage of the driving-windings, produces advance-phase effect regardless of the rotating directions, thereby increasing the motor efficiency, as same as the 18th embodiment already discussed.

Exemplary Embodiment 20

Figure 55:
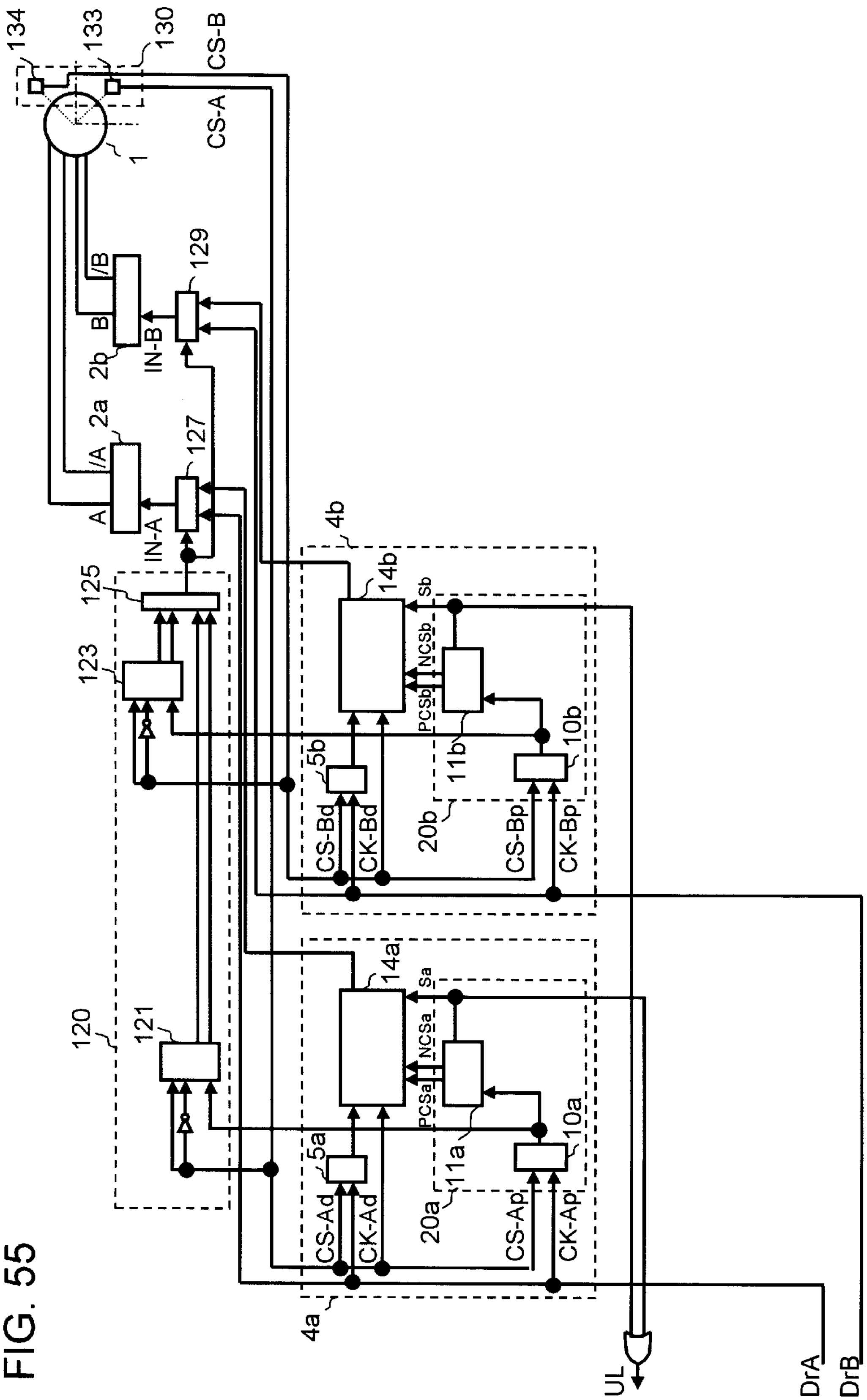
FIG. 55 illustrates a structure of a step-motor-driving device in accordance with a twentieth exemplary embodiment.

FIG. 55 illustrates a structure of a step-motor-driving device in accordance with the 20th exemplary embodiment. In FIG. 55, excitation-timing-controllers 4*a*, 4*b* exciting-signal-stability-determiner 120, and selectors 127, 129 are the same as those used in the 19th embodiment.

First sensor 133 and second sensor 134 forming position detector 130 are provided so that the sensors can output position-detecting signals CS-A, CS-B having advance-phases with regard to an inductive voltage generated by driving-windings, i.e. torque Ta, Tb generated by exciting each deriving-winding.

Figure 56:
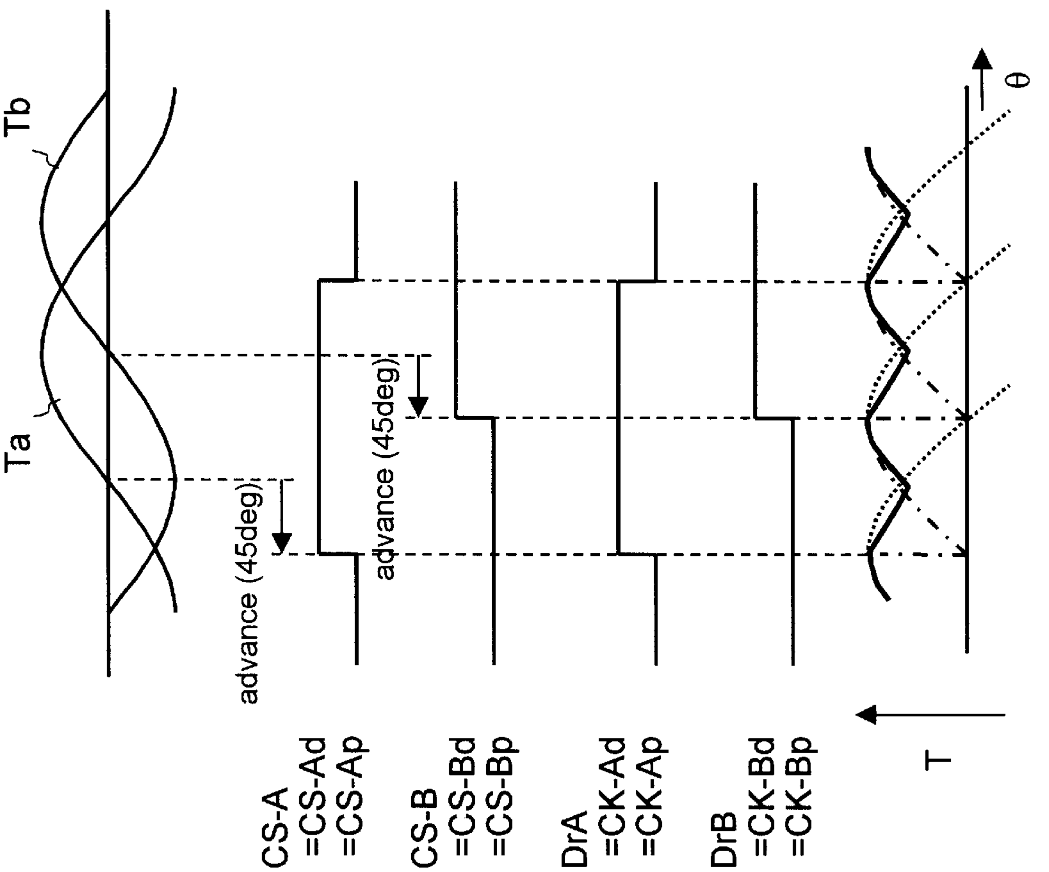
FIG. 56 illustrates an operation of the step-motor-driving device in accordance with the twentieth exemplary embodiment.

An operation of the 20th embodiment is illustrated in FIG. 56. As shown in FIG. 56, signals CS-A, CS-B advance in angle. Controllers 4*a*, 4*b* thus output signals DrA, DrB as exciting signals until driving-instruction signals DrA, DrB are input earlier than signals CS-A, CS-B having the advance-phase. As a result, the step-motor can be kept functioning responsive to the driving-instruction signals up to a region where an advantage of the advance-phase is effected by an earlier switch of exciting the driving-windings. Thus the step-motor-driving device of higher performance can be achieved. When signals DrA, DrB are input further earlier than signals CS-A, CS-B, controllers 4*a*, 4*b* turn signals CS-A, CS-B to the exciting signals, thereby achieving the step-motor-driving device free from jumping "out of sync" as discussed in the previous embodiments.

Exemplary Embodiment 21

Figure 57:
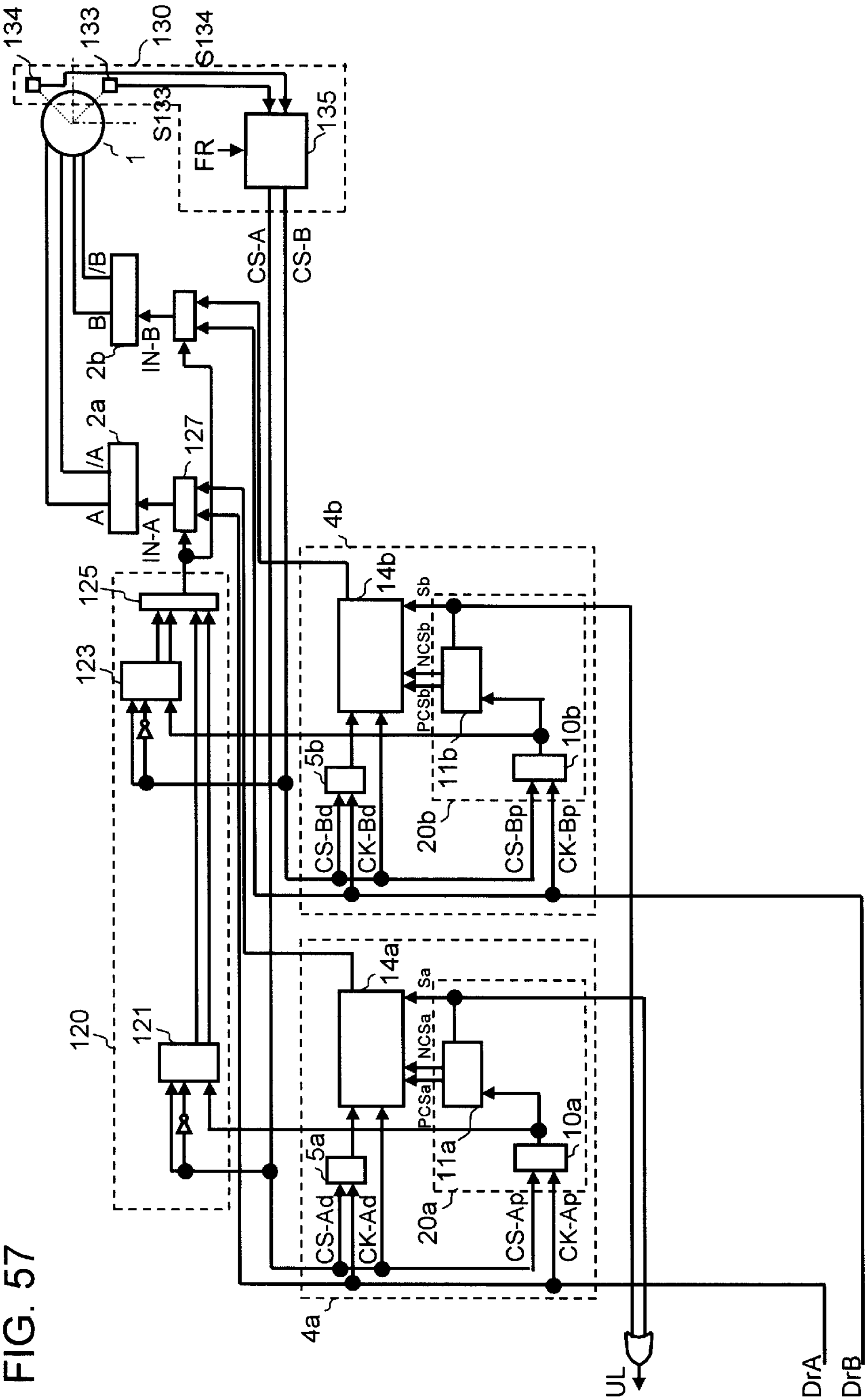
FIG. 57 illustrates a structure of a step-motor-driving device in accordance with a twenty-first exemplary embodiment.

FIG. 57 illustrates a structure of a step-motor-driving device in accordance with the 21st exemplary embodiment.

The 21st embodiment differs from the 20th embodiment shown in FIG. 55 in the structure of position-detector 130, which is structured as follows: Position-signal generator 135 receives respective output signals from first sensor 133 and second sensor 134, then outputs position-detecting signals CS-A, CS-B after processing the signals.

The driving-windings of motor 1 comprise the first and second windings having a phase-difference of 90 degree electrical angle with each other.

In the case of driving motor 1 in the positive direction, first sensor 133 is mounted to the stator so that the sensor can output a signal advancing in phases with regard to an inductive voltage generated by the first phase winding. In the same case, second sensor 134 is mounted to the stator so that this sensor can output a signal advancing in phases with regard to an inductive voltage generated by the second phase winding. Position-signal-generator 135 receives outputs from sensors 133, 134, then generates position-detecting signals CS-A, CS-B corresponding to windings of each phase. An advanced phase of the output signal from sensor 133 is approx. 45 degree of electrical angle with regard to an inductive voltage generated by the first phase winding. An advanced phase of the output signal from sensor 134 is also approx. 45 degree of electrical angle with regard to an inductive voltage generated by the second phase winding.

In the case of instructing motor 1 to rotate in the positive direction, position-signal-generator 135 outputs the signal received from sensor 133 as position-detecting signal CS-A corresponding to the first phase winding. It also outputs the signal received from sensor 134 as position-detecting signal CS-B corresponding to the second phase winding. In the case of instructing motor 1 to rotate in the negative direction, position-signal-generator 135 outputs a signal reversed to the signal received from sensor 133 as position-detecting signal CS-B corresponding to the second phase winding. It also outputs a signal reversed to the signal received from sensor 134 as position-detecting signal CS-A corresponding to the first phase winding.

An operation of the 21st embodiment structured above is demonstrated hereinafter.

Figure 58B:
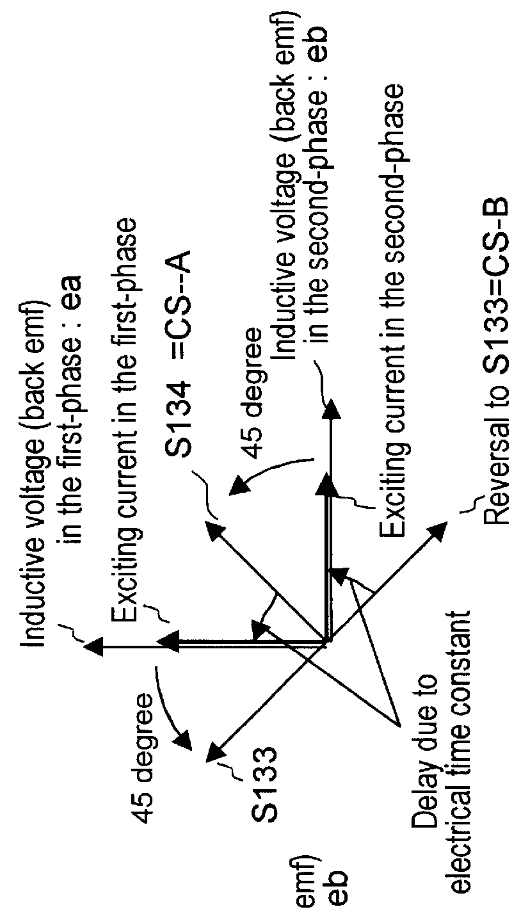
FIGS. 58A and 58B illustrate an operation of the step-motor-driving device in accordance with the twenty-first exemplary embodiment.
Figure 58A:
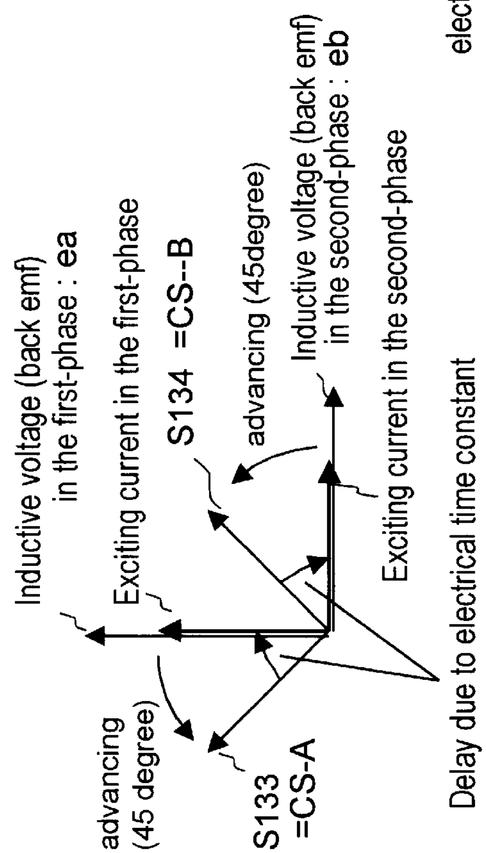

First, an instance, when the motor is instructed to rotate in the positive direction, is demonstrated with reference to FIG. 58A.

Sensor 133 outputs signal S133 having an advanced-phase by 45 degree of electrical angle with regard to the inductive voltage "ea" generated by the first phase winding. Sensor 134 outputs signal S134 having an advanced-phase by 45 degree of electrical angle with regard to the inductive voltage "eb" generated by the second phase winding. Position-signal-generator 135 receives these signals S133, S134 and outputs them as signals CS-A, CS-B. As is evident from this description, respective signals CS-A, CS-B have the advanced-phase by 45 degree of electrical angle with regard to the inductive voltages "ea" and "eb" of respective phase-windings, i.e. torque Ta, Tb generated by exciting the respective phase-windings. Therefore, as same as the 20th embodiment, excitation-timing-controllers 4*a*, 4*b* use driving-instruction signals DrA, DrB as the exciting signals until driving-instruction-signals DrA, DrB are input earlier than this advanced-phase signals so that the step-motor can be kept functioning up to a region where an advantage of advanced-phase is effected and the motor efficiency is improved.

Next, an instance, when the motor is instructed to rotate in the negative direction, is demonstrated with reference to FIG. 58B. In this case, phase-relations of signals S133, 134 with regard to inductive voltages "ea", "eb" are reversal to those of driving motor 1 in the positive direction. Signals 133, 134 have delayed-phases by 45 degree of electrical angle with regard to inductive voltages "ea", "eb". If controllers 4*a*, 4*b* use these signals as signals CS-A, CS-B as same as the first instance, i.e. when the motor is instructed to rotate in the positive direction, the advantage of advanced-phase cannot be effected.

In the case of driving motor 1 in the negative direction, as shown in FIG. 58B, position-signal-generator 135 outputs a signal reversal to signal S133 as signal CS-B and also outputs signal S134 as signal CS-A. This turns signals CS-A, CS-B to the signals having advance-phases by 45 degree of electrical angle with regard to the inductive voltages "ea", "eb" thereby producing the same effect of advanced-phase as the first instance.

In this 21st embodiment, as evident from the above description, signal S133 supplied from sensor 133 should be used as signal CS-A or should be reversed as being signal CS-B depending on the positive or negative driving direction of the motor. Also, signal S134 supplied from second sensor 134 should be used as signal CS-B or CS-A depending on the driving direction of the motor. These operations are controlled by generator 135.

This control is simple one because the advanced-phase of each sensor is set at 45 degree. In other words, each sensor has advanced-phase by 45 degree so that identical views from respective driving-windings are achieved. As a result, advanced-phases in both driving directions can be controlled with a simple mechanism.

The advanced-phase by 45 degree is not necessarily to be strict, but it can be approximately 45 degree as far as the motor characteristics tolerate.

As discussed above, the step-motor-driving device in accordance with the 21st embodiment includes position detector 130 which comprises position-signal generator 135, and the first, second sensors having approx. 45 degree of electrical angle with regard to the inductive voltages generated by respective driving-windings of the first and second phases. In the case of instructing the motor to rotate in the positive direction, a signal from the first sensor is used as position-detecting signal CS-A corresponding to the first phase winding, and a signal from the second sensor is used as position-detecting signal CS-B corresponding to the second phase winding. On the other hand, in the case of instructing the motor to rotate in the negative direction, a signal reversed to the signal from the first sensor is used as position-detecting signal CS-B corresponding to the second phase winding, and the signal from the second sensor is used as position-detecting-signal CS-A corresponding to the first phase winding. These signals are controlled by position-signal-generator 135. This structure allows the step-motor to be kept driving by the driving-instruction signals up to a region where an advantage of advanced-phase is effected. As a result, the step-motor with a higher efficiency can be achieved. When the driving-instruction signals are input further earlier than signals CS-A, CS-B are input, controllers 4*a*, 4*b* turn signals CS-A, CS-B to the exciting signals. As a result, the step-motor-driving device free from jumping "out of sync" as described in the previous embodiments can be achieved.

Exemplary Embodiment 22

Figure 59:
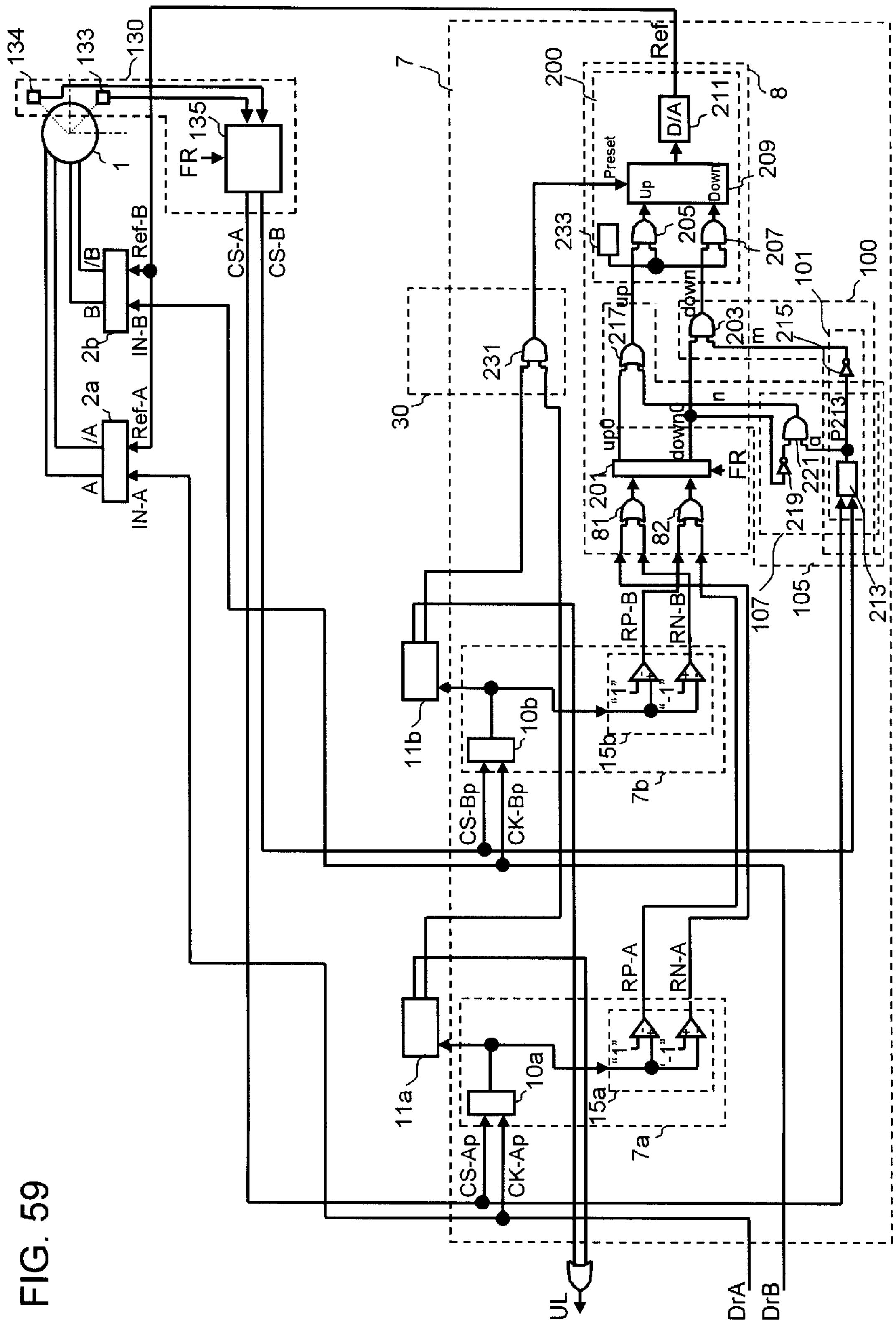
FIG. 59 illustrates a structure of a step-motor-driving device in accordance with a twenty-second exemplary embodiment.

FIG. 59 illustrates a structure of a step-motor-driving device in accordance with the 22nd exemplary embodiment.

The 22nd embodiment differs from the 15th embodiment shown in FIG. 43 in the structure of position-detector 130. In this 22nd embodiment, detector 130 used in the 21st embodiment is employed, and exciting-current-boosting-interrupter 105 is newly employed. Since the structure of detector 130 is the same as that of the 21st embodiment, the description thereof is thus omitted here.

Exciting-current controller 7 outputs exciting-current-control signal "Ref", responsive to the phase-difference between position-detecting signals CS-A, CS-B and driving-instruction signals DrA, DrB, to exciters 2*a*, 2*b* as current-value signal Ref-A, Ref-B. Meanwhile driving-instruction signals DrA, DrB are fed into exciters 2*a*, 2*b* as exciting signals IN-A, IN-B. In this case, controller 7 changes signal Ref as follows:

When excitation-switch of windings responsive to signals DrA, DrB directs the torque in a direction effective for the motor to rotate in a desirable direction, controller 7 changes signal Ref thereby reducing the maximum exciting current of the winding responsive to the phase-difference between signals DrA, DrB and signals CS-A, CS-B. On the other hand, when excitation-switch of windings responsive to signals DrA, DrB directs the torque in a direction unfavorable to the motor to rotate in a desirable direction, controller 7 changes signal Ref thereby increasing the maximum exciting current of the winding responsive to the phase-difference between signals DrA, DrB and signals CS-A, CS-B.

Further, controller 7 are equipped with exciting-current-decrease-halter 100 including halt-width-generator 101 as well as exciting-current-boosting-interrupter 105 including interruption-width-generator 107. Halter 100 halts signal Ref from changing during a period when halt-width-generator 101 outputs exciting-current-decrease-halting signal "m" responsive to the output of position-detecting signals CS-A, CS-B. The change of signal Ref, as discussed above, reduces the maximum-exciting-current of the winding. Interruption-width-generator 107 outputs interrupt-enable-signal "q" responsive to position-detecting-signals CS-A, CS-B, and when signals DrA, DrB change while generator 107 outputs signal "q", exciting-current-boosting-interrupter 105 outputs exciting-current-boosting-interrupt signal "n" since then until generator 107 completes outputting signal "q". Interrupter 105 also changes signal Ref thereby increasing the maximum-exciting-current of the winding while it keeps outputting signal "q".

Signal-width-generator 213 outputs signal P213 having a given pulse width every time one of position-detecting signals CS-A or CS-B turns to level H from level L or vice versa. A reversed signal to signal P213 is tapped off from halt-width-generator 101 as exciting-current-decrease-halting signal "m", and signal P213 also functions as interrupt-enable signal "q" fed into interruption-width generator 107.

Exciters 2*a*, 2*b* receive driving-instruction signals DrA, DrB as exciting signals and the current-value signal supplied from controller 7, then switches excitation of the driving-windings responsive to the exciting signals. Exciters 2*a*, 2*b* also sets the maximum-exciting current responsive to the current-value signal and supplies power for exciting the driving-windings.

An operation of the step-motor-driving device structured above in accordance with the 22nd embodiment is demonstrated hereinafter with reference to FIGS. 60A, 60B.

Figure 60A:
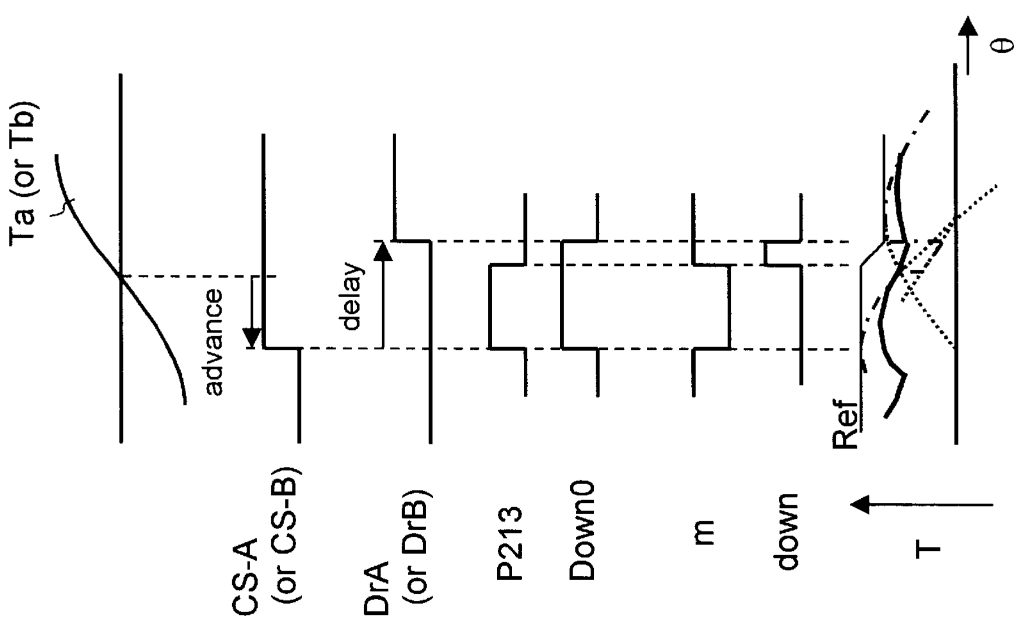
FIG. 60A and 60B illustrates an operation of the step-motor-driving device in accordance with the twenty-second exemplary embodiment.
Figure 60B:
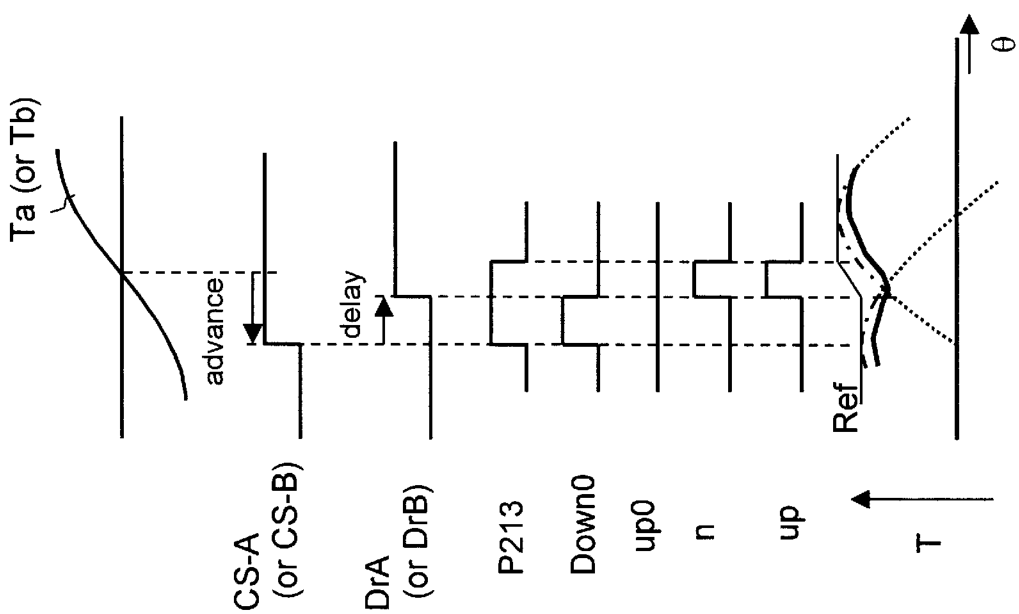

The operation shown in FIGS. 60A, 60B is applicable when the motor is instructed to rotate in the positive direction. In the case of instructing the motor to rotate in the negative direction, basically the elements operate in the same way. Therefore, the demonstration is shown only in the case of instructing the motor to rotate in the positive direction.

When driving-instruction signals DrA, DrB delay from position-detecting signals CS-A, CS-B, exciting-current controller 7 outputs instruction-delay signal RN-A, RN-B responsive to the phase-difference of these signals, thereby reducing exciting-current-control signal Ref. This operation of controller 7 has been already described.

Signals RN-A, RN-B are synthesized by OR gate 81 and supplied from selector 201 as signal "down 0" when the motor is driven in the positive direction. Signal "down 0" supplies information for reducing the exciting current. Here is some remarks about this signal:

Signal "down 0" is responsive to the delay-phase-difference of signals DrA, DrB with regard to signals CS-A, CS-B. However, since signals CS-A, CS-B have advanced-phases with regard to the inductive voltage generated by each winding of respective phases as described in the 21st embodiment, signal "down 0" supplies surplus information for reduction of exciting current. Therefore, at the advanced-phases, if signal "down 0" directly reduces the exciting current, excessive reduction would result in stalling the motor.

Exciting-current-decrease-halter 100 employed in this embodiment can avoid this problem. The operation of halter 100 is detailed with reference to FIG. 60A.

Signals CS-A, CS-B have advanced-phases with regard to the inductive voltages generated by the windings of respective phases, i.e. the signals advance with regard to torque Ta, Tb in phases. Torque Ta, Tb are generated by exciting the windings of respective phases.

Signal-width-generator 213 outputs signal P213 at level H during a given pulse width every time signals CS-A, CS-B change.

In this embodiment, signal "down 0" during the period when signal P213 stays at level H is treated as surplus information for reducing the exciting current.

FIG. 60A illustrates an operation when driving-instruction signals DrA, DrB delay from position-detecting signals CS-A, CS-B, and further illustrates signal P213 is supplied with delay after the period while signal P213 stays at level H.

In this case, signal "down 0" stays at level H longer than signal P213 does. Signal "down 0" thus supplies surplus information in reducing the exciting current.

Exciting-current-decrease-halter 100 holds exciting-current-decrease-halting signal "m" at level L while signal P213 stays at level H. Integrator 200 thus receives signal "down" which stays at level H for a shorter period than signal "down 0" does. As a result, exciting-current-control signal Ref is controlled by signal "down" free from the surplus information that signal "down 0" has.

Integrator 200 reduces current of signal Ref during the period while signal "down" stays at level H. This has been already described in the 15th embodiment.

As discussed above, exciting-current-decrease-halter 100 prevents the exciting current from being excessively reduced even when position-detecting signals CS-A, CS-B advance in phases. This eliminates a chance of stalling the motor.

Signal "up 0" has some remarks as follows: Signal "up 0" is supplied from selector 201. In the case of driving the motor in the positive direction, signals RP-A, RP-B are synthesized by OR gate 82 into signal "up 0". Instruction-advance signals RP-A, RP-B are supplied when driving-instruction signals DrA, DrB advance from position-detecting signals CS-A, CS-B in phases, and exciting-current controller 7 increases the current of exciting-current-control signal Ref responsive to instruction-advance signals RP-A, RP-B. This has been already described in the previous embodiments.

In other words, signal "up 0" supplies information for increasing the exciting current. However, when signals CS-A, CS-B have advanced-phases as described previously, signal "up 0" is supplied not before signals DrA, DrB are input earlier than these advanced signals. The signal "up 0" supplies thus insufficient information for increasing the exciting current.

At the advanced-phases, if signal "up 0" directly increases the exciting current, current-increase would delay so that the motor falls into unstable condition or stalling.

Exciting-current-boosting-interrupter 105—newly employed in this embodiment-can avoid this problem. An operation of interrupter 105 is detailed hereinafter with reference to FIG. 60B.

As same as shown in FIG. 60A, signal-width-generator 213 outputs signal P213 at level H during a given pulse width every time the advanced-phase signals CS-A, CS-B change.

In this embodiment, signal P213 is used as interrupt enable signal "q". When signals DrA, DrB change while signal "q" stays at level H, interrupter 105 outputs exciting-current-boosting-interrupt signal "n" because of insufficient information in increasing the exciting current.

FIG. 60B illustrates an operation when driving-instruction signals DrA, DrB delay from position-detecting signals CS-A, CS-B, and further, signals DrA, DrB are supplied while signal P213, i.e. interrupt enable signal "q", stays at level H.

In this case, since signals DrA, DrB change while signal P213, i.e. interrupt enable signal "q", stays at level H, information in increasing the exciting current is in short supply.

When signals DrA, DrB change while interrupt enable signal "q" stays at level H, signal "down 0" turns to level L. Then interrupting-width generator 107 turns exciting-current-boosting-interrupt signal "n" to level H through inverter 219 and AND gate 221. Interrupter 105 thus interrupts signal "up 0" with signal "n", and inputs signal "up" to integrator 200. Signal "up" can turn to level H regardless of signal "up 0". As a result, exciting-current-control signal "Ref" is controlled by signal "up" which is supplemented with the information short in signal "up 0".

Integrator 200 counts up up-down counter 209 thereof, thereby increasing signal "Ref", while signal "up" stays at level H.

Exciting-current-boosting-interrupter 105 as discussed above can prevent the increase of exciting current from delaying even if position-detecting signals CS-A, CS-B advance with regard to signals DrA, DrB in phases. As a result, the motor is free from falling into unstable condition or jumping out of sync.

The step-motor-driving device in accordance with the 22nd embodiment can avoid excessive reduction of the exciting current as well as delay in increasing the exciting current even when the position-detecting signals advance in phases. As a result, the motor can make use of the advantages of advanced-phases, i.e. increase of the motor-efficiency and stableness in control over the exciting current.

Exemplary Embodiment 23

Figure 61:
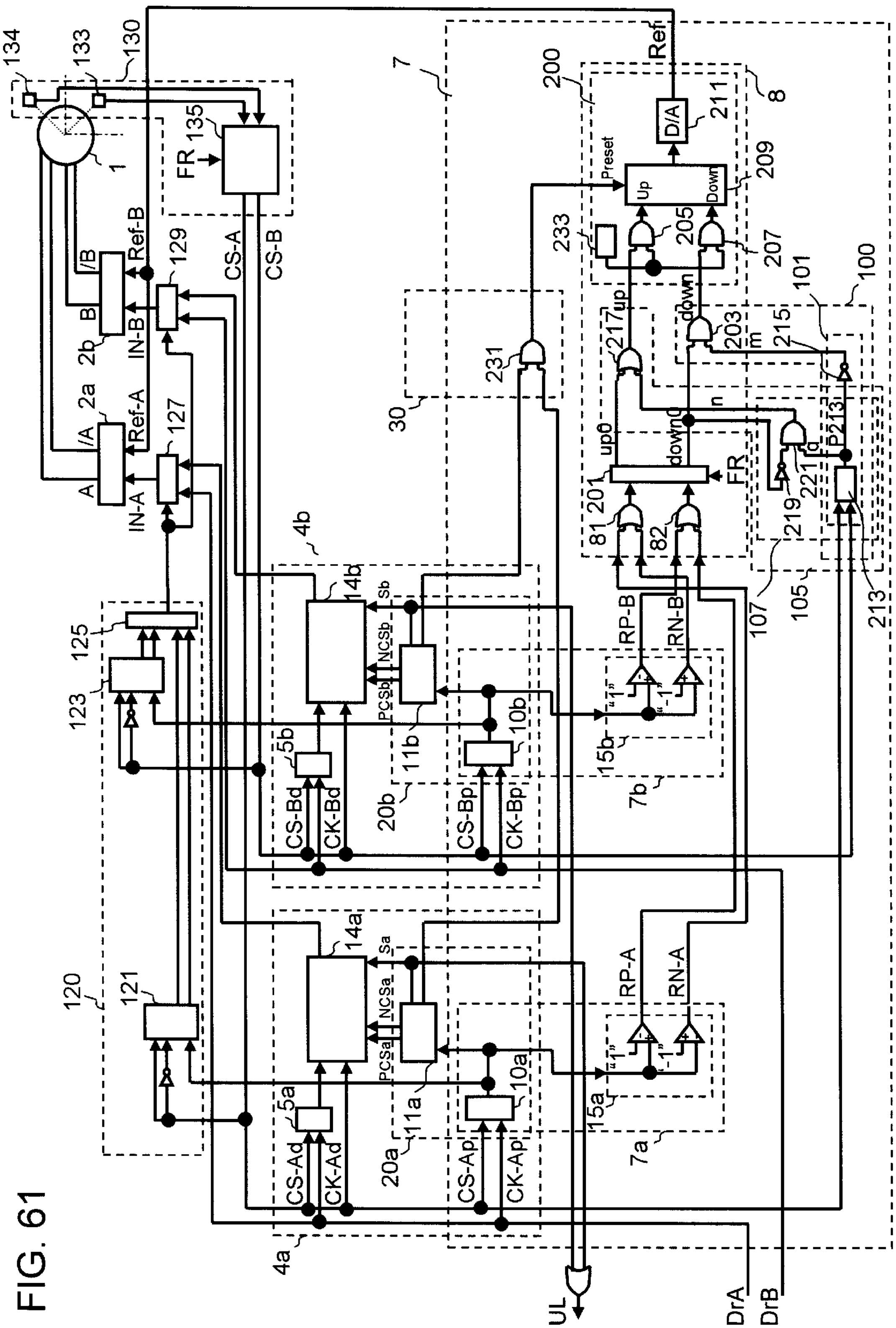
FIG. 61 illustrates a structure of a step-motor-driving device in accordance with a twenty-third exemplary embodiment.

FIG. 61 illustrates a structure of a step-motor-driving device in accordance with the 23rd exemplary embodiment.

The 23rd embodiment differs from the 22nd embodiment shown in FIG. 59 in the following points: Delay-signal selectors 5*a*, 5*b* and exciting-signal selectors 14*a*, 14*b* are provided to form excitation-timing controllers 4*a*, 4*b* in the 23rd embodiment. Further, exciting-signal-stability determiner 120 and selectors 127, 129 are also provided in this embodiment.

This structure produces another advantage in addition to the advantages proved by the 22nd embodiment, i.e. allowing excitation-timing controllers 4*a*, 4*b* to eliminate a chance for the step-motor to jump out of sync.

In the 22nd and 23rd embodiments, exciting-current-decrease-halter 100 and exciting-current-boosting-interrupter 105 commonly share signal P213 output from signal-width-generator 213. In other words, an output width of exciting-current-decrease-halting signal "m" equals that of interrupt enable signal "q".

Figure 63:
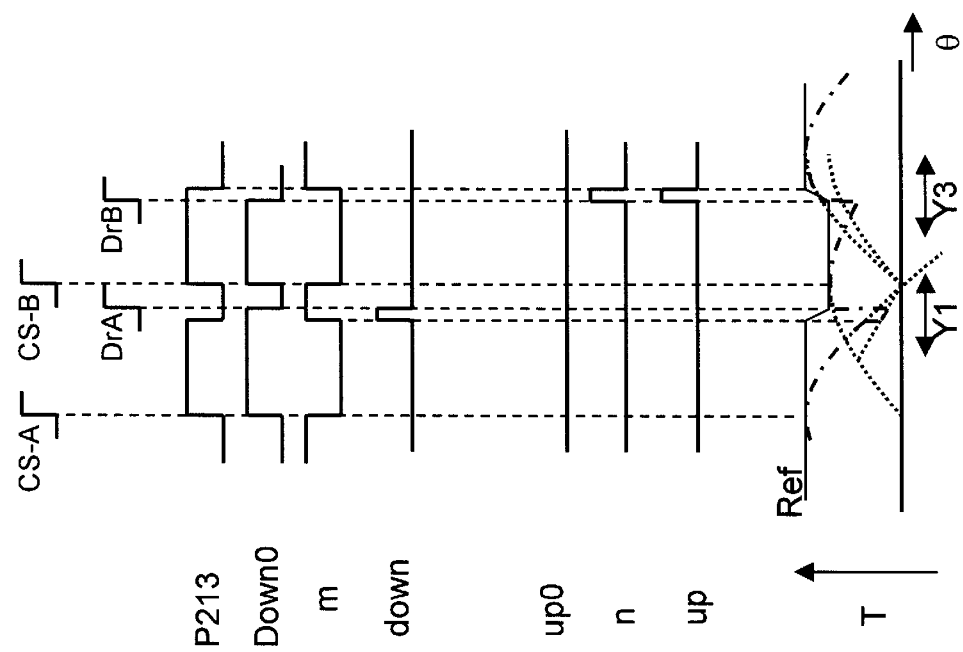
FIG. 63 illustrates an operation of the step-motor-driving device in accordance with the twenty-third exemplary embodiment.

An operation in this case is illustrated in FIG. 63.

First, when signals DrA, DrB change after signal P213 leaves level H, signal "down" stays at level H during the period since signal P213 leaves level H until signals DrA, DrB change, thereby reducing the exciting current (Period Y1).

Second, when signals DrA, DrB change while signal P213 stays at level H, signal "up" stays at level H during the period since signals DrA, DrB change until signal P213 leaves level H (period Y3).

In other words, the exciting current is controlled so that phase-difference of driving-instruction-signals DrA, DrB delaying from position-detecting signals CS-A, CS-B can correspond to the width of level H where signals P213 stays.

Based on this control, a proper setting of output width (i.e. width of level H) of signal P213 can control the exciting current so that the phase difference between signals CS-A, CS-B and DrA, DrB can take an arbitrary value. For instance, the output width of signal P213 is set slightly wider than the advanced-phase of signals CS-A, CS-B thereby controlling the exciting current to have some margin against the load, i.e. the exciting current at the level of "minimum value +α". Reducing the exciting current down to "the minimum value +α" allows the control method to make use of restoring force intrinsic in the step-motor when the step-motor-driving-device encounters some load disturbance.

Exemplary Embodiment 24

Figure 62:
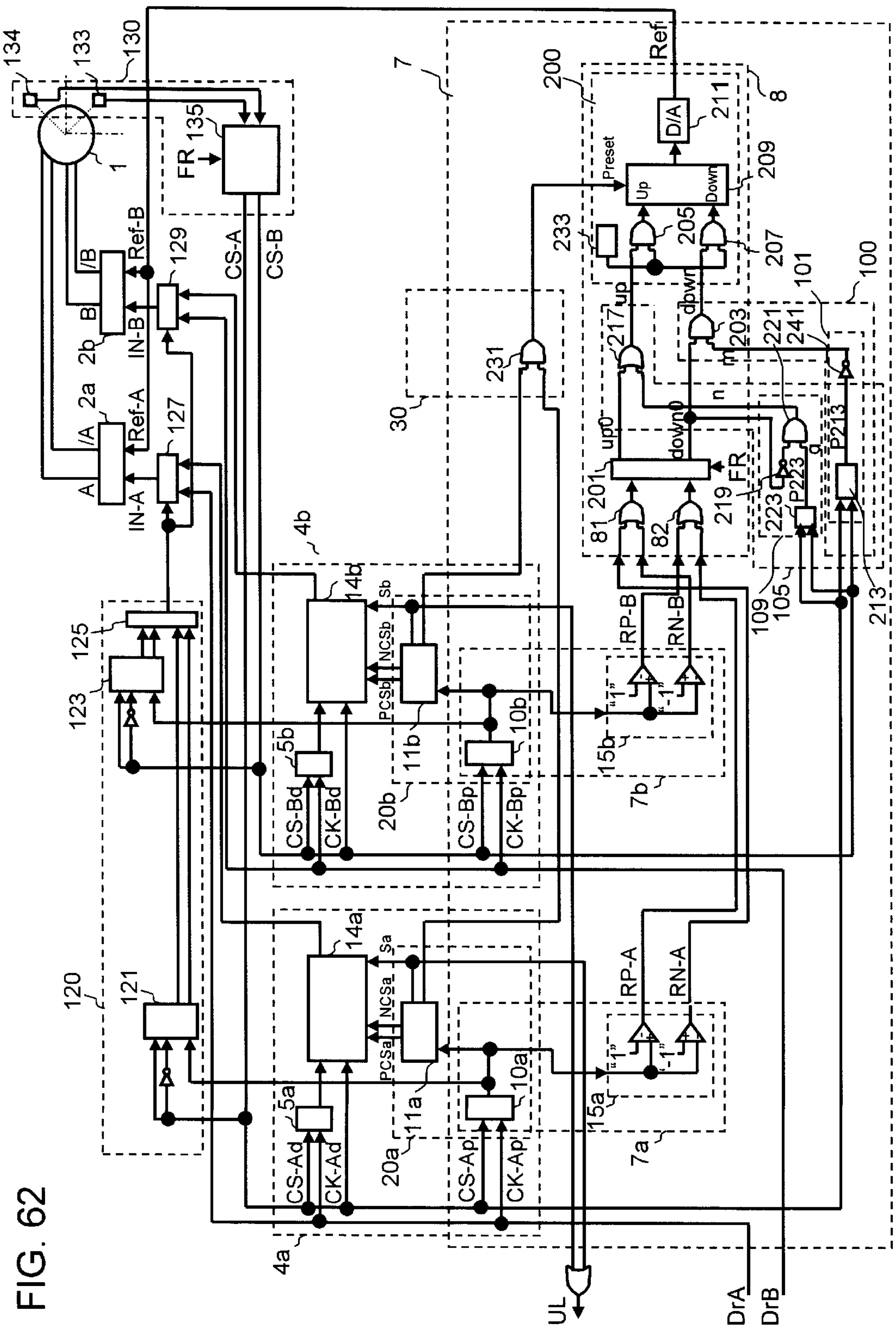
FIG. 62 illustrates a structure of a step-motor-driving device in accordance with a twenty-fourth exemplary embodiment.

FIG. 62 illustrates a structure of a step-motor-driving-device in accordance with the 24th exemplary embodiment.

The 24th embodiment differs from the 23rd embodiment shown in FIG. 61 in the structure of interrupt-width-generator 109 of exciting-current-boosting-interrupter 105.

In the 23rd embodiment previously discussed, exciting-current-decrease-halter 100 and exciting-current-boosting-interrupter 105 commonly share signal-width generator 213, which outputs signal P213. Signal P213 is reversed and tapped off from halt-width generator 101 as exciting-current-decrease-halting signal "m". Signal P213 functions as interrupt enable signal "q" in interrupt-width generator 107.

On the other hand, in this 24th embodiment, signal-width generator 213 exclusively works for exciting-current-decrease-halter 100, and signal P213 is exclusively used as exciting-current-decrease-halting signal "m". Another signal-width generator 223 is newly provided to exciting-current-boosting-interrupter 105, and signal P223 supplied from generator 223 functions as interrupt-enable signal "q" in interrupt-width generator 109.

Signal-width generator 223 receives position-detecting signals CS-A, CS-B as signal-width-generator 213 receives the same, and outputs signal P223 having a given pulse width as interrupt-enable signal "q" every time one of CS-A or CS-B turns to level H from level L or vice versa. This operation is the same as that of generator 213.

In the 24th embodiment structured above, each output-width of exciting-current-decrease-halting signal "m" and interrupt-enable signal "q" can be independently set. For instance, an output width "tm" (width of level L) of signal "m" is set slightly wider than the advanced-phases of position-detecting signals CS-A, CS-B, and an output width "tq" (width of level H) is set slightly narrower than output width "tm" of signal "m", e.g. roughly the same value of the advanced-phase.

Figure 64:
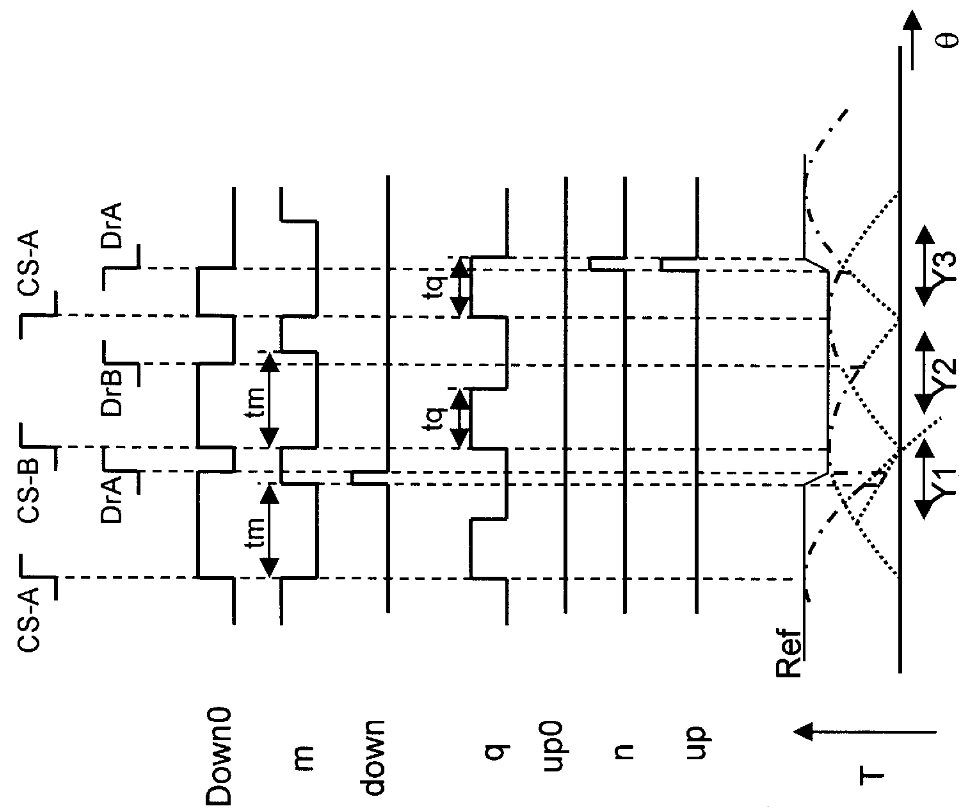
FIG. 64 illustrates an operation of the step-motor-driving device in accordance with a twenty-fourth exemplary embodiment.

The operation in this case is illustrated in FIG. 64.

First, when driving-instruction signals DrA, DrB change after exciting-current-decrease-halting signal "m" is tapped off (i.e. after width "tm"), signal "down" stays at level H during the period since signal "m" is tapped off until signals DrA, DrB change, thereby reducing the exciting current (period Y1).

The phase-difference between signals DrA, DrB and position-detecting signals CS-A, CS-B decreases at less exciting current. In due course, signals DrA, DrB vary only within the period while signal "m" is supplied (i.e. during the width "m"). While signal "mi" is supplied, signal "down" stays at level L thereby halting the exciting current from decreasing. At this time, if DrA, DrB change after interrupt-enable signal "q" is supplied (after width "q"), signal "up" stays at level L, and the exciting current does not increase (period Y2).

If signals DrA, DrB change while signal "q" is supplied (during the width "tq"), signal "up" stays at level H during the period since signals DrA, DrB change until signal "q" completes its output, thereby increasing the exciting current (period Y3).

The phase-difference between signals DrA, DrB and position-detecting signals CS-A, CS-B increases at greater exciting current. Eventually, the phase-difference becomes stable in the condition in period Y2 discussed above.

During period Y2 shown in FIG. 64, the exciting current halts having some margin against the load, and neither increases nor decreases, i.e. exciting-current-controlling loop is open.

This operation is the same as that described in 15th embodiment shown in FIG. 43. The 24th embodiment thus produces the same effect as the 15th embodiment has done.

In the 24*th* embodiment as discussed above, signal-width generators 213 and 223 are exclusively provided to exciting-current-decrease-halter 100 and exciting-current-boosting-interrupter 105 respectively and independently. Each output width of exciting-current-decrease-halting signal "m" and interrupt-enable signal "q" can be also set independently. Then the width of signal "m" is set wider than the advance-phase of the position-detecting signal, and the width of signal "q" is set narrower than that of signal "m", e.g. approximately the same width as the advanced-phase of the position-detecting signal. As a result, the exciting current halts decreasing or increasing with some margin against the load, i.e. the same effects as obtained in the 15th embodiment shown in FIG. 43 can be achieved. Not to mention, the 24th embodiment can also achieve other effects proved by the 23rd embodiment.

Signal-width generators 213 and 223 can output signals having a pulse width responsive to a mover's speed of the motor every time the position-detecting signal is input. This can be achieved by the method shown in FIG. 46 of the 16th embodiment. In this case, exciting-current-decrease-halting signal "m" or interrupt-enable signal "q" is supplied for a period responsive to the speed of the mover. This structure is thus good for an application where the motor speed is varied in a wide range.

Signal-width generators 213 and 223 can also simply output signals having a given pulse-width every time the position-detecting signal is input. This is achieved by the method shown in FIG. 47 of the 16th embodiment.

Exemplary Embodiment 25

Figure 65:
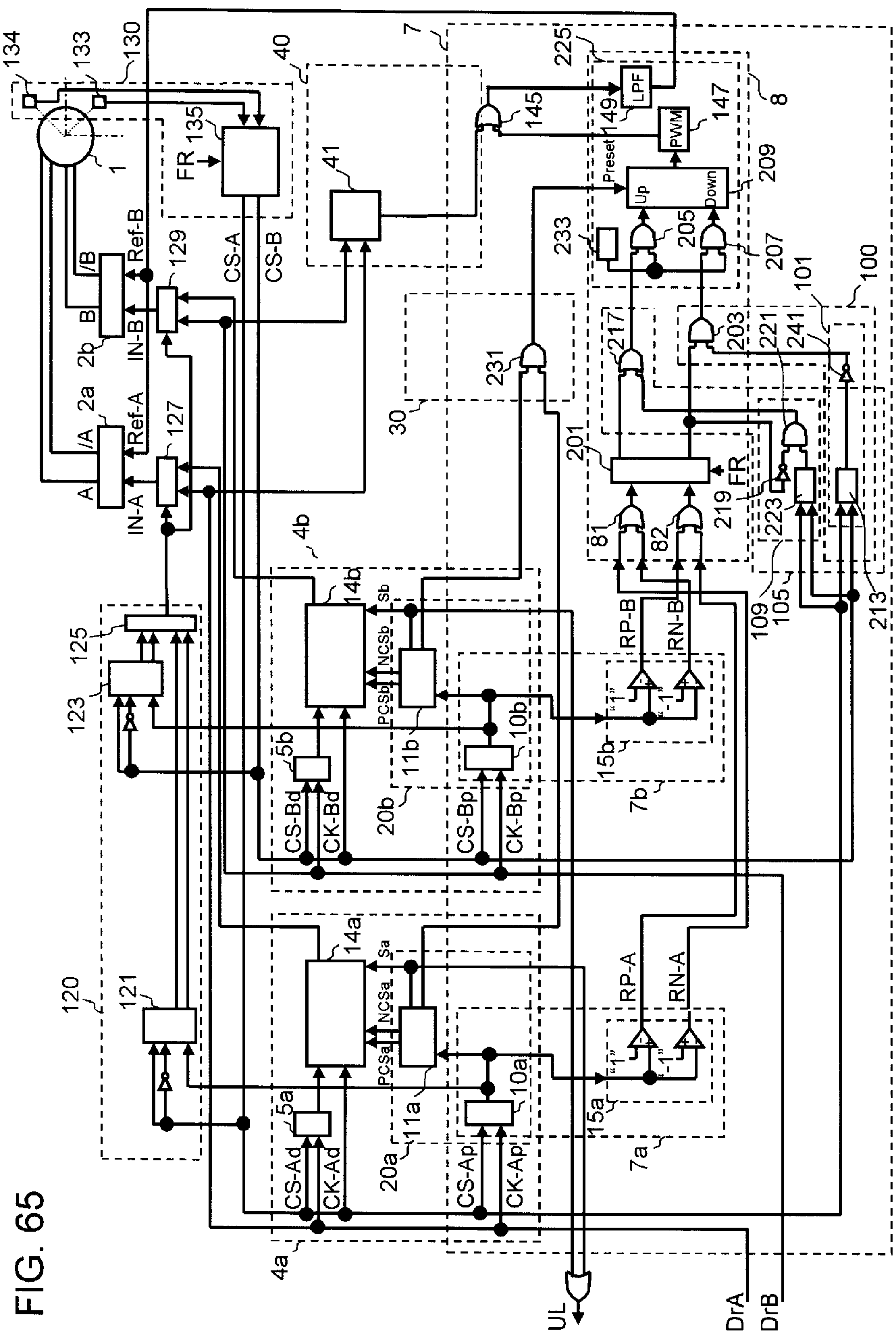
FIG. 65 illustrates a structure of a step-motor-driving device in accordance with a twenty-fifth exemplary embodiment.

FIG. 65 illustrates a structure of a step-motor-driving device in accordance with the 25th exemplary embodiment.

The 25th embodiment differs from the 24th embodiment shown in FIG. 62 in the following points: (1) structure of an output stage of phase-difference amplifier 8, and (2) start-stop-exciter 40 is newly provided, exciter 40 includes frequency discriminator 41 identifying the frequency of driving-instruction signals DrA, DrB.

Start-stop-exciter 40 and frequency discriminator 41 work in the same way as the start-stop-exciter and the frequency discriminator used in the 10th embodiment shown in FIG. 37.

When the frequency of signal DrA, DrB is lower than the given value, frequency discriminator 41 outputs a signal at level H. In other words, frequency discriminator 41 makes use of a low frequency of signals DrA, DrB, thereby detecting the motor being in the starting mode or in the halting mode for positioning control. When an output from discriminator 41 turns to level H, start-stop exciter 40 forces phase-difference amplifier 8 to increase current-control signal Ref, thereby increasing the exciting current of the windings.

An output stage of amplifier 8 comprises PWM circuit 147 and smoothing circuit 149. This structure operates in the same way as D/A converter 211 used in the 24th embodiment shown in FIG. 62.

An output signal in digital form from up-down counter 209 is transformed by PWM circuit 147 into a pulse-width-modulated signal carrying a frequency ranging from, e.g. several dozens kHz to several hundreds kHz. Smoothing circuit 149 removes the carrier frequency component from this modulated signal, then the signal is transformed into an analog signal. In other words, PWM circuit 147 and smoothing circuit 149 function as same as D/A converter which transforms a digital signal into an analog signal. Phase-difference amplifier 8 comprising circuits 147 and 149 works basically in the same way as the phase-difference amplifier discussed in the previous embodiments.

The output from PWM circuit 147 is a pulse-width-modulated signal and extends its staying time on level H at a greater value in digital-signal supplied from up-down counter 209. This PWM signal is fed into smoothing circuit 149 via OR gate 145. Smoothing circuit 149 increases its output, i.e. current-control signal Ref, at longer staying time on level H of its input signal.

OR gate 145 receives the output from frequency discriminator 41 and the output from PWM circuit 147.

Accordingly, in the case that the output from discriminator 41 is at level L, i.e. driving-instruction signals DrA, DrB carry a rather high frequency, and the motor is driven in a normal way, the output from PWM circuit 147 is fed into smoothing circuit 149 as it is and signal Ref is controlled so that it supplies exciting current to the windings appropriately responsive to the load.

In the case that the output from discriminator 41 is at level H, i.e. driving-instruction signals DrA, DrB carry a rather low frequency, and the motor is started or stopped for positioning, OR gate 145 allows smoothing circuit 149 to receive the signal at level H so that signal Ref is compulsorily increased. In other words, the exciting current of the windings is compulsorily increased.

A response at the compulsory increase of signal Ref is influenced by a smoothing-time-constant set in smoothing circuit 149; however, this time constant has been set at a rather high frequency (more than several kHz) in order to remove the carrier frequency. The influence to the response is thus negligible small.

The 25th embodiment discussed above effects not only the advantage by the 24th embodiment, but also the advantage of the 10th embodiment, i.e. when the motor is stopped or halted for positioning, this action is detected because driving-instruction signals carry a low frequency, then exciting current should be promptly increased so that starter-torque for starting the motor or holding torque for halting and positioning the motor can be obtained.

Exemplary Embodiment 26

Figure 66:
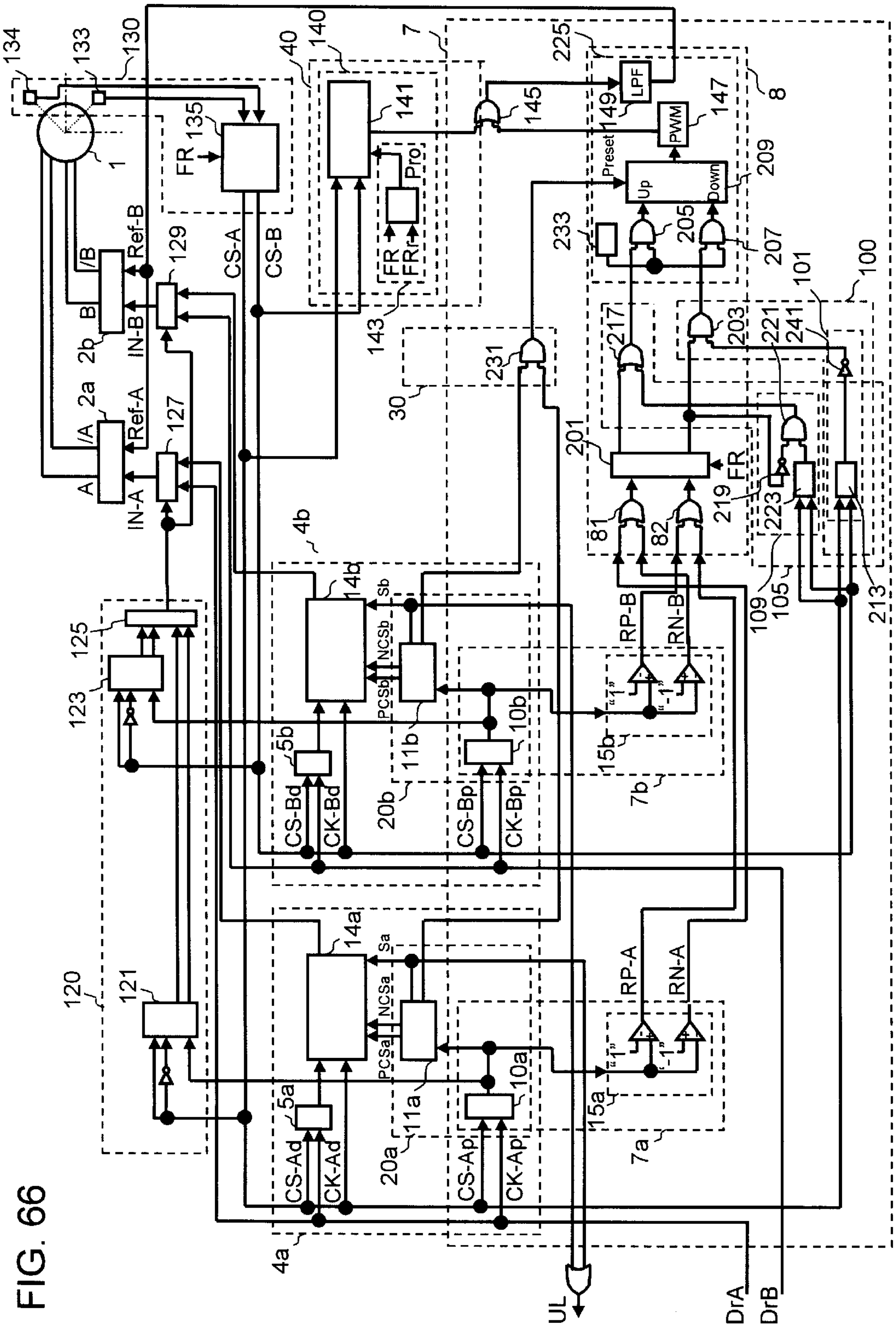
FIG. 66 illustrates a structure of a step-motor-driving device in accordance with a twenty-sixth exemplary embodiment.

FIG. 66 illustrates a structure of a step-motor-driving device in accordance with the 26th exemplary embodiment.

The 26th embodiment differs from the 25th embodiment shown in FIG. 65 in the structure of start-stop exciter 40.

In FIG. 65, start-stop-exciter 40 includes speed detector 140 which discriminator whether or not a driving speed of mover 1 of the motor is lower than a given value.

When detector 140 determines that the driving speed is lower than the given value and outputs a signal at level H, start-stop exciter 40 considers that the motor is to stop or halt for positioning. Then exciter 40 feeds the signal at level H into smoothing circuit 149 forming an output stage of phase-difference amplifier 8 via OR gate 8, thereby increasing current-control signal Ref As a result, the exciting current of the windings is compulsorily increased.

Start-stop exciter 40 works in the same way as the start-stop exciter used in the 25th embodiment, though exciter 40 has a structure different from the exciter in the 25th embodiment.

Speed detector 140 comprises position-signal-frequency detector 141 which detects a frequency of the position-detecting-signal responsive to an output change of the position-detecting-signal and protector 143 which makes an output-change of position-detecting signal effective only when an instruction of driving direction of the motor is directed in the same direction as the driving direction of the mover. Speed detector 140 counts the time since an effective output-change occurs until the next effective output-change occurs, thereby detecting the driving speed of the mover.

Figure 67:
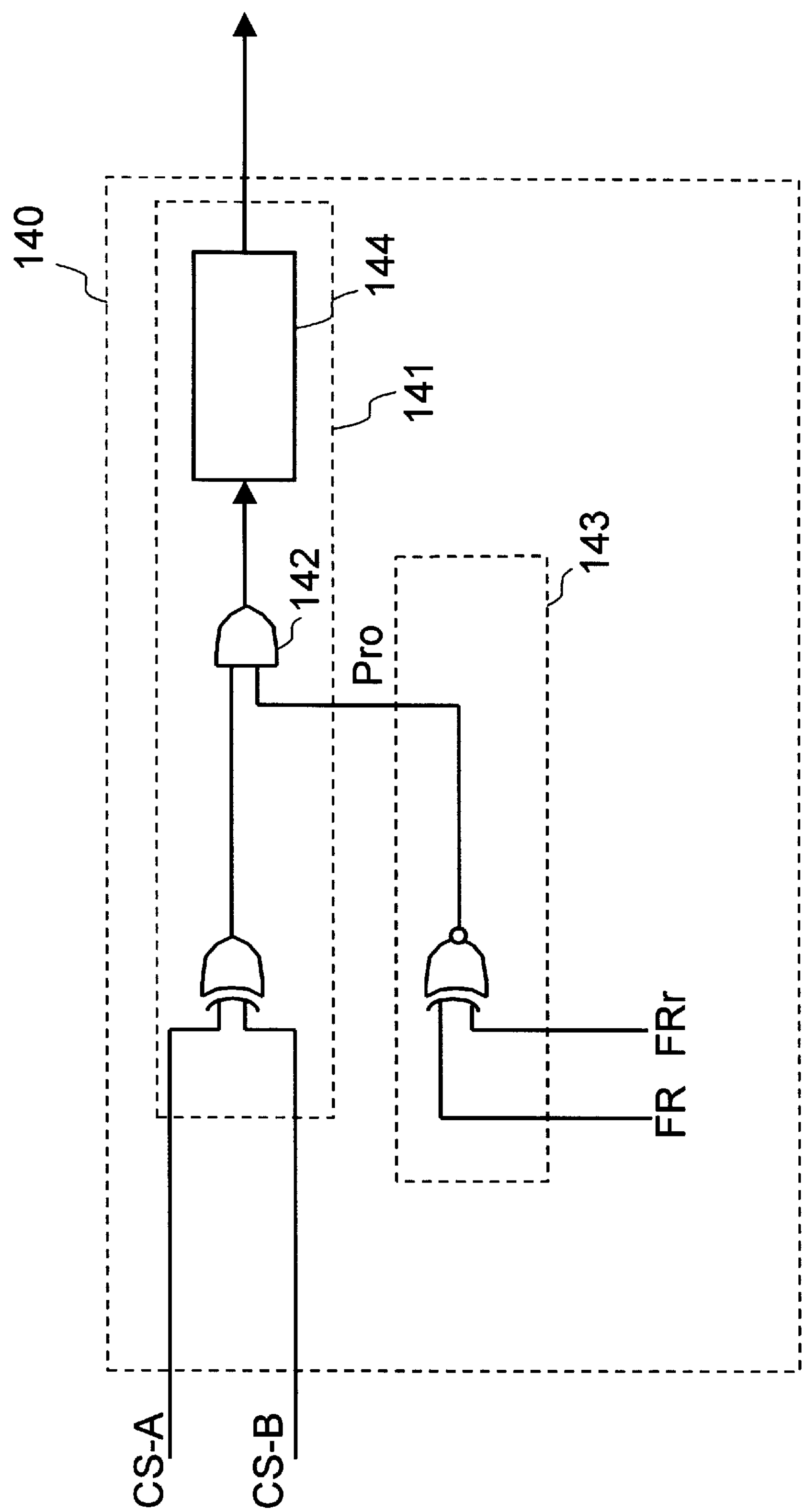
FIG. 67 illustrates a specific structure of a speed detector in accordance with the twenty-sixth exemplary embodiment.

FIG. 67 illustrates a structure of speed detector 140.

In FIG. 67, protector 143 receives driving-direction-instructing signal FR, which instructs the motor to rotate in the positive or negative direction, and driving-direction signal FRr which indicates in which direction the motor actually rotates. Exclusive NOR gate (EX-NOR gate) detects whether these signals agree or not, and when the signals agree, protector 143 outputs a signal at level H as signal "Pro" or outputs a signal at level L as signal Pro when not agree.

In position-signal-frequency detector 141, frequencies of position-detecting signals CS-A, CS-B are multiplied by exclusive OR gate (EX-OR gate), then the resultant signals are fed into frequency detector 144 via AND gate 142. When the input signal turns to level H from level L or vice versa, frequency detector 144 counts a time between these changes. Detector 144 then outputs a signal at level H when the counted time is longer than a given time. In other words, frequency detector 144 outputs a signal at level H responding to its input signal carrying a low frequency. Position-signal-frequency detector 141 outputs the signal supplied from this frequency counter 144.

AND gate 142 receives output signal Pro from protector 143 and the multiplied signals CS-A, CS-B.

Protector 143 transfers changes of signals CS-A, CS-B to frequency detector 144 only when signal Pro is at level H, and does not transfer it when signal Pro is at level L.

Accordingly, speed detector 140 as a whole detects a frequency of the position-detecting-signal as a change of position-detecting-signal is valid when the instruction of driving direction of the motor agrees with the actual rotating direction. When the instruction does not agree with the actual rotating direction, speed detector 140 considers a change of position-detecting-signal invalid, speed detector 140 does not reflect this invalid change to detecting the frequency.

A step-motor, in general, produces greater torque-ripples when it tries to obtain starter-torque or holding torque by increasing the exciting current. Variation in rotating speed grows larger at the greater torque ripples, and an output frequency from the position detector thus looks higher than an actual frequency. Therefore, the mover's speed cannot be detected simply with this frequency. Assume that the exciting current is increased simply because the signal frequency supplied from the position detector lowers. Then the rotating-speed-variation increases upon obtaining the starter-torque or holding torque due to the factors discussed above, and the apparent output frequency from the position detector grows higher. As a result, the exciting current cannot be increased anymore, i.e. the starter-torque or holding torque cannot be maintained.

At the moment when the step-motor produces large rotating-speed-variations due to the factors discussed above, the instruction of motor's driving direction does not agree with the actual rotating direction. Speed detector 140 used in this embodiment focuses on this problem, and protector 143 is thus employed therein so that detector 140 can detect a speed accurately even in the condition as discussed above.

When a time span over a first effective change of the position-detecting signal and a second effective change exceeds a given time pre-set in frequency-detector 144, speed detector 140 outputs a signal at level H.

When speed detector 140 outputs a signal at level H, start-stop-exciter 40 considers it as the time for starting or halting the motor to be positioned. Then exciter 40 increases current-control-signal Ref, so that the exciting current of the windings is compulsorily increased.

The 26th embodiment, as discussed above, proves that the time when the motor should stop or halt for positioning can be detected with a low driving speed of the mover. Then the exciting current promptly increases thereby obtaining the starter torque for starting the motor or holding torque for positioning the motor. The 26th embodiment thus effects the same advantages that the 25th embodiment does.

At detecting the speed of the mover, the protector newly employed in this embodiment determines an output-change of the position-detecting signal to be an effective one only when the instruction of driving direction of the motor agrees with the actual rotating direction. Thanks to this function of the protector, the speed detector can accurately detect the driving speed of the mover regardless of large variations in the rotating speed. The large variations can be produced when the starter torque or holding torque is obtained by increasing the exciting current. As a result, not only detecting an accurate rotating speed but also maintaining the starter toque or holding torque can be achieved.

Exemplary Embodiment 27

Figure 68:
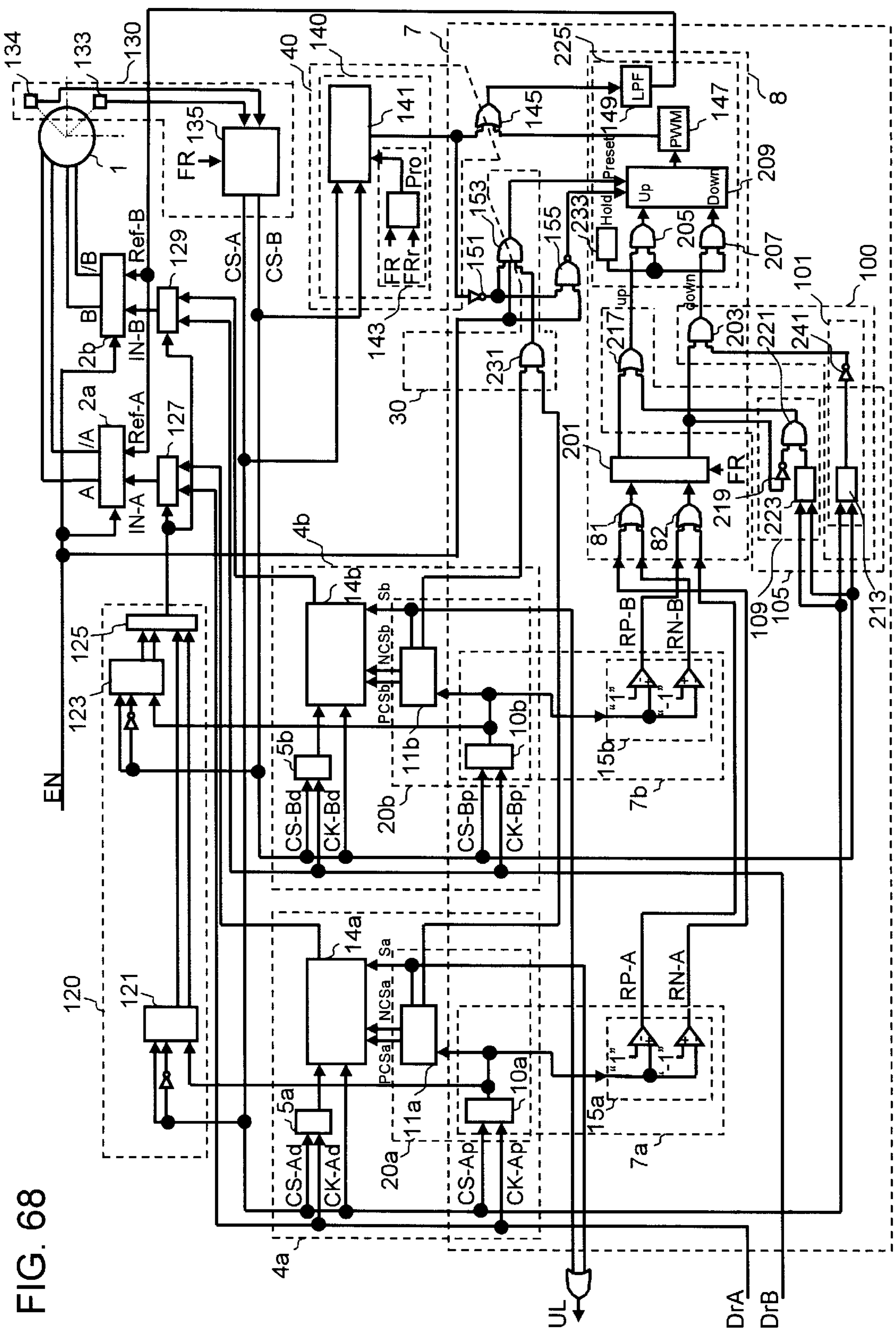
FIG. 68 illustrates a structure of a step-motor-driving device in accordance with a twenty-seventh exemplary embodiment.

FIG. 68 illustrates a structure of a step-motor-driving device in accordance with the 27th exemplary embodiment.

The 27th embodiment differs from the 26th embodiment shown in FIG. 66 in the following points: In FIG. 68, an output signal from AND gate 231, which is one of elements making up exciting-current-compulsory-booster 30, and a signal reversed to an output from speed detector 140 are fed into a pre-set terminal of integrator 225 via AND gate 153. The signal reversed to the output from speed detector 140 is also fed into a hold-terminal of integrator 225 via NAND gate 155. AND gate 153 and NAND gate 155 receive power-supply-stop-signal "EN" of the motor. Exciters 2*a* and 2*b* also receive signal "EN". The preset and hold terminals of integrator 225 are coupled with a preset terminal and a hold terminal of up-down counter 229 included in integrator 225. Other structures in this embodiment are the same as those in the 26th embodiment shown in FIG. 66.

An operation of the 27th embodiment structured above is demonstrated hereinafter.

An output signal from booster 30 turns to level H when the deviation leaves the fourth status, which has been described in the 14th embodiment shown in FIG. 42, and this output signal presets up-down-counter 209 so that the exciting current can be increased.

An output from speed detector 140 turns to level H when the motor is to be started or halted for positioning, which has been described in the 26th embodiment shown in FIG. 66. This output signal increases the exciting current so that starter torque or holding torque can be obtained.

Power-supply-stop-signal "EN" at level H means an instruction of supplying the power, and signal "EN" at level L means an instruction of stopping the power supply. Signal "EN" at level H allows exciters *2a*, *2b* to supply the power for exciting the driving windings of the motor, and signal "EN" at level L allows the exciters to stop supplying the power.

Figure 69:
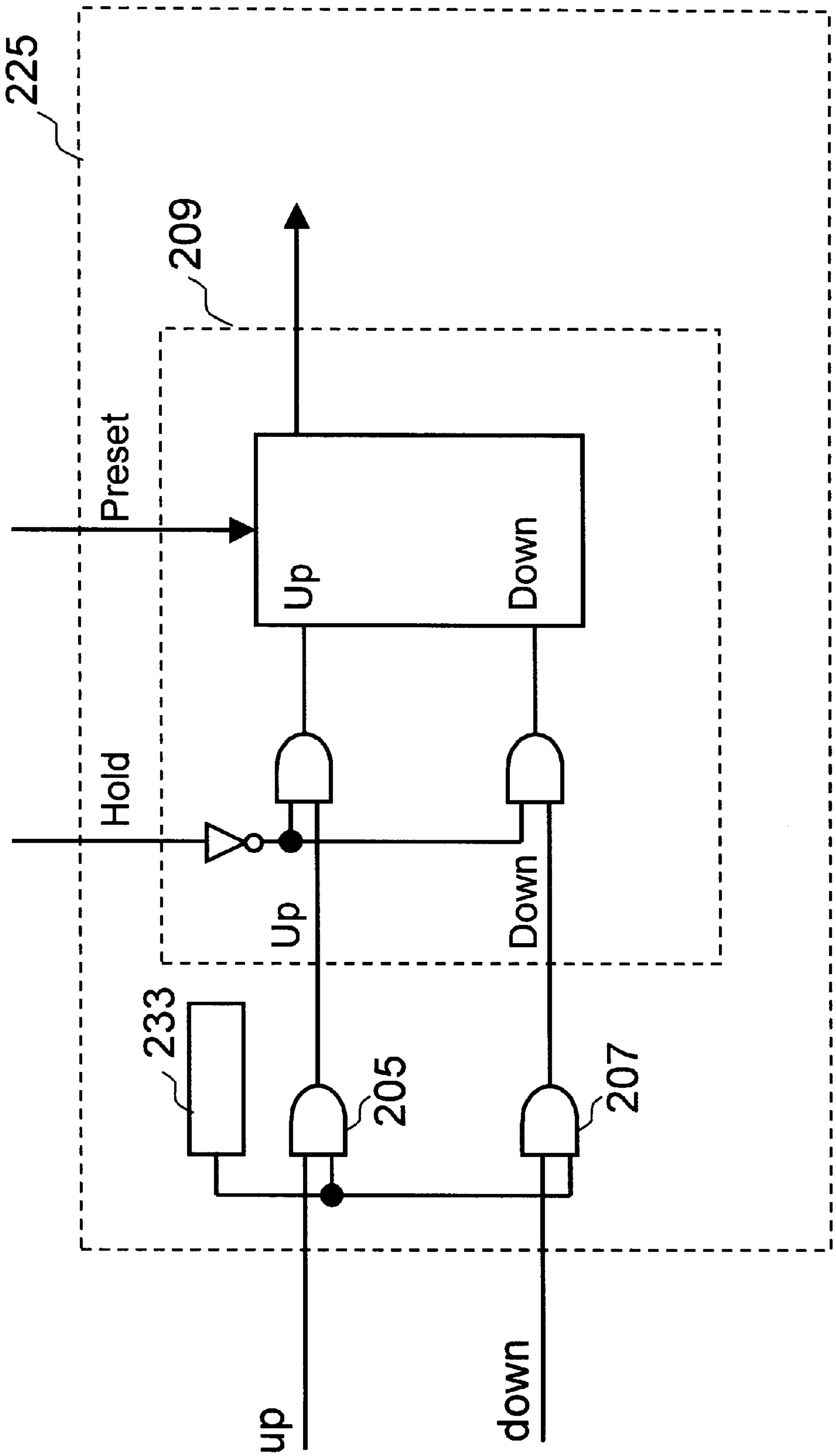
FIG. 69 illustrates a specific structure of an integrator in accordance with the twenty-seventh exemplary embodiment.

The preset terminal of integrator 225 at level H allows up-down-counter 209 to output the maximum value in digital form so that current-control-signal Ref can increase. The hold-terminal of integrator 225 at level H allows up-down-counter 209 to stop counting and hold the digital output value so that exciting-current-control signal Ref until then can be stored. FIG. 69 illustrates the structure of integrator 225 thus operates.

In FIG. 69, when the hold-terminal turns to level H, input-terminals "up" and "down" are fixed at level L and counter 209 stops its operation.

An operation of the 27th embodiment is demonstrated hereinafter.

First, an instance, when signal "EN" is at level H and the output from speed detector 140 is at level L, is demonstrated.

In this instance, the motor is driven in normal way, and the exciting current does not need to increase for obtaining the starter torque or holding torque.

The same signal as tapped off from AND gate 231 is supplied from AND gate 153, i.e. this signal is supplied to the preset-terminal of integrator 225. The output from NAND gate 155, i.e. the hold-terminal of integrator 225, is at level L.

Integrator 225 thus can operate in normal way free from being held, and is not preset except when the deviation leaves the fourth status and the exciting current is truly required as described in the embodiment 14th. Thus the motor is kept rotating in normal way. In this instance, exciting-current-controller 7 controls exciting-current-control-signal Ref appropriately responsive to the load.

Second, an instance, when signal "EN" is at level H and the output from speed detector 140 is also at level H, is demonstrated.

In this instance, the motor halts its rotating with generating the holding torque for positioning. The output from AND gate 153, i.e. the preset terminal of integrator 225, is at level L. An output of NAND gate 155, i.e. the hold terminal of integrator 225 is at level H.

Integrator 225 is thus held, and up-down-counter 209 maintains the digital output with which the motor is driven in normal way. The preset terminal of integrator 225 is held at level L so that counter 209 can avoid being preset by an error.

Since the output from speed detector 140 is at level H in this case, OR gate 145 compulsorily increases exciting-current-control signal Ref thereby obtaining the holding torque. This is the same operation as discussed in the 26th embodiment.

Third, an instance, when signal "EN" is at level L, is demonstrated.

In this instance, the motor is halted because the power for exciting the windings is stopped. The output from AND gate 153, i.e. the preset terminal of integrator 225, is at level L, and the output from NAND gate 155, i.e. the hold terminal of integrator 225 is at level H.

Integrator 225 is thus held, and up-down-counter 209 maintains the digital output with which the motor is driven in normal way. The preset terminal of integrator 225 is held at level L so that counter 209 can avoid being preset by an error.

The 27th embodiment, as discussed above, proves that when the motor is to be halted for positioning by generating the holding torque or the motor is stopped by stopping the power supply to the windings, i.e. reducing the exciting current almost to zero, the hold terminal of integrator 225 is held at level H thereby halting the operation of the integrator. This operation allows up-down-counter 209, an element of integrator 225, to maintain its digital output thereby storing the value of exciting-current-control-signal Ref, with which the motor is driven in normal way.

When the motor is re-driven, this stored value of signal Ref can be a starting point for counter 209 to change its output, thereby restarting the integrating operation of integrator 225. This operation allows signal Ref to converge promptly on a value appropriate to the load. In shorts, the step-motor-driving device in accordance with the 27th embodiment can experience the loaded condition, so that response performance of controlling the exciting current at re-start of the motor is improved.

Exemplary Embodiment 28

Figure 70:
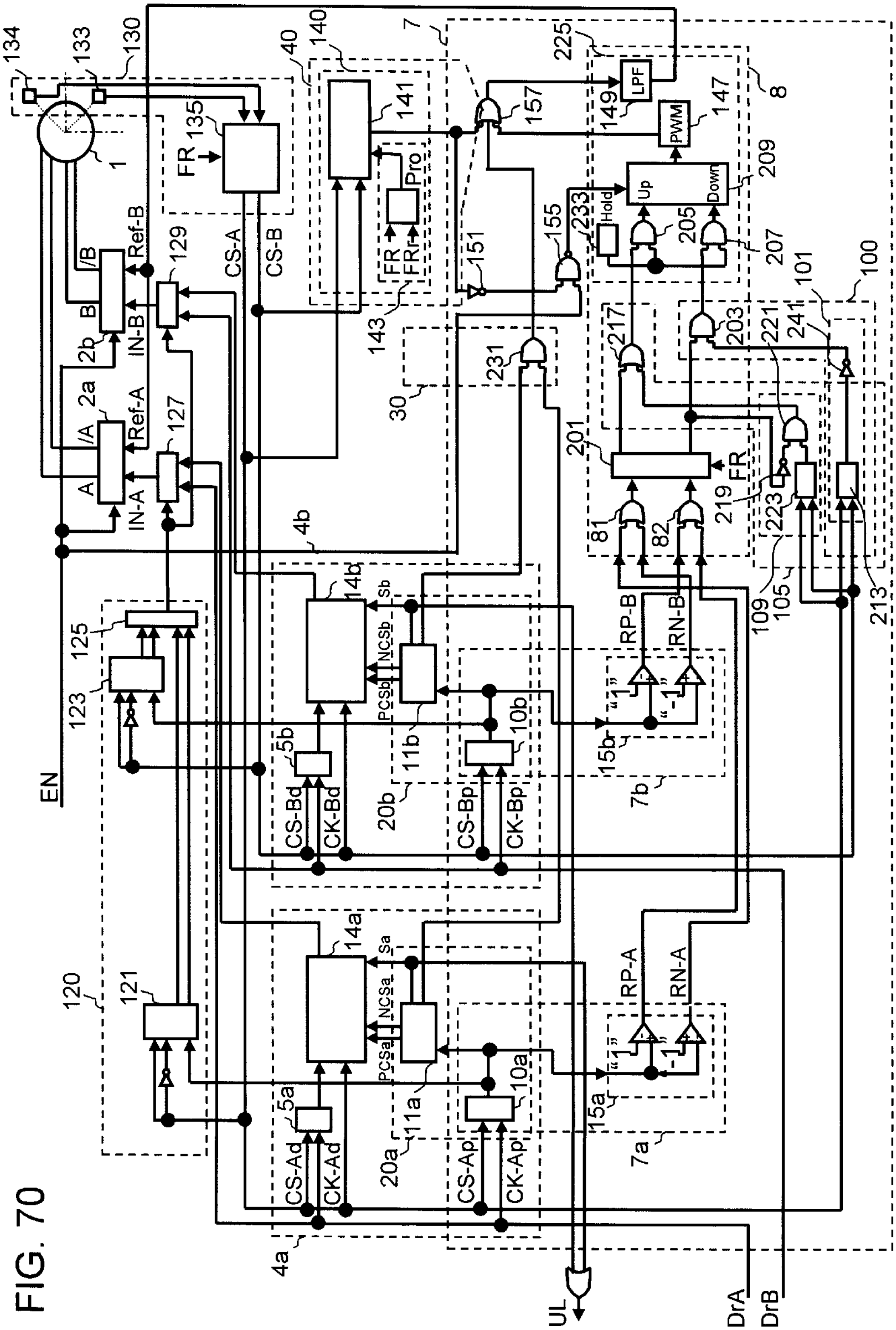
FIG. 70 illustrates a structure of a step-motor-driving device in accordance with a twenty-eighth exemplary embodiment.

FIG. 70 illustrates a structure of a step-motor-driving device in accordance with the 28th exemplary embodiment.

The 28th embodiment differs from the 27th embodiment shown in FIG. 68 in the following points:

In FIG. 70, an output signal from AND gate 231, which is one of elements making up exciting-current-compulsory-booster 30, an output signal from speed detector 140 and an output signal from PWM circuit 147 are together fed into smoothing circuit 149 via AND gate 157. The signal reversed to the output from speed detector 140 and power-supply-stop-signal "EN" are together fed into a hold-terminal of integrator 225 via NAND gate 155. The hold terminal of integrator 225 is coupled with hold terminal of up-down counter 209 included in integrator 225. The preset terminal and AND gate 153 described in the 27th embodiment shown in FIG. 68 are thus omitted. Other structures in this embodiment are the same as those in the 27th embodiment shown in FIG. 68.

An operation of the 28th embodiment structured above is demonstrated hereinafter. Meanwhile, the output from AND gate 231, an element of booster 30, the output from speed detector 140 and stop-signal "EN" are identical to those described in the 27th embodiment. Further, the hold terminal of integrator 225 works in the same way as described in the 27th embodiment.

First, an instance, when signal "EN" is at level H and the output from speed detector 140 is at level L, is demonstrated, i.e. in this instance, the motor is driven in normal way, and the exciting current does not need to increase for obtaining the starter torque or holding torque.

The output from NAND gate 155, i.e. the hold terminal of integrator 225, is at level L. Integrator 225 thus can operate in normal way free from being held, and the motor is thus kept rotating in normal way. In this instance, exciting-current-controller 7 controls exciting-current-control-signal Ref appropriately responsive to the load.

When the deviation leaves the fourth status, the output from AND gate 231 turns to level H, thereby increasing the output from smoothing circuit 149 via OR gate 157. In shorts, as same as the 14th embodiment, although the exciting-current-control-signal Ref is compulsorily boosted, a digital output from up-down-counter 209 in integrator 225 is not influenced by this compulsory boosting and is kept maintaining.

Second, an instance, when signal "EN" is at level H and the output from speed detector 140 is also at level H, is demonstrated. In this instance, the motor halts its rotating with generating the holding torque for positioning. An output of NAND gate 155, i.e. the hold terminal of integrator 225 is at level H. Integrator 225 is thus held, and up-down-counter 209 maintains the digital output with which the motor is driven in normal way.

Since the output from speed detector 140 is at level H in this case, OR gate 157 compulsorily increases exciting-current-control signal Ref thereby obtaining the holding torque. This is the same operation as discussed in the 26th embodiment.

Third, an instance, when signal "EN" is at level L, is demonstrated.

In this instance, the motor is halted because the power for exciting the windings is stopped. The output from NAND gate 155, i.e. the hold terminal of integrator 225 is at level H. Integrator 225 is thus held, and up-down-counter 209 maintains the digital output with which the motor is driven in normal way.

The 28th embodiment, as discussed above and as same as the 27th embodiment, proves that when the motor is to be halted for positioning by generating the holding torque or the motor is stopped by stopping the power supply to the windings, i.e. reducing the exciting current almost to zero, the value of exciting-current-control-signal Ref, with which the motor is driven in normal way, can be stored. The step-motor-driving device in accordance with the 28th embodiment can experience the loaded condition, so that response performance of controlling the exciting current at re-start of the motor is improved.

Exemplary Embodiment 29

In FIG. 70 illustrating the 28th embodiment previously discussed, signals Sa, Sb are supplied from deviation-detectors 20*a*, 20*b* as out-of-sync signals "UL" via OR gate 239. This signal "UL" is identical to signal "UL" described in the 11th embodiment shown in FIG. 38. In other words, when deviation detectors 20*a*, 20*b* detect the second status or the third status, signals "UL"—indicating that the driving-instruction-signal is out of sync from the position-detecting-signal—is fed into an upper-class device.

This transmission of out-of-sync signal "UL" to the upper-class device allows the upper-class-device to determine whether the step-motor mounted therein properly functions or not. In other words, the upper-class device makes use of signals "UL" so that the step-motor mounted therein can be driven up to the limit of the torque characteristics by keeping the motor synchronizing with the driving-instruction-signal. As a result, the motor exerts its upper most work capability.

Signal "UL", not to mention and not limited to the embodiment shown in FIG. 70, is applicable to any embodiments previously described as long as they have employed signals Sa, Sb.

Figure 71:
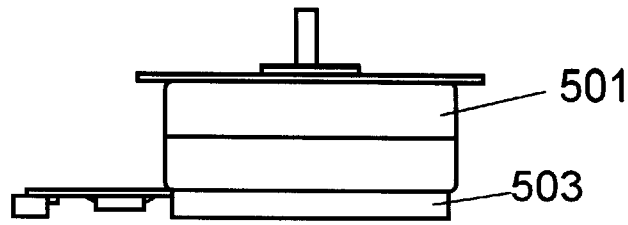
FIGS. 71 and 72 are an outlook viewed from the front, and a bottom-view of a step-motor-driving device according to the present invention.
Figure 72:
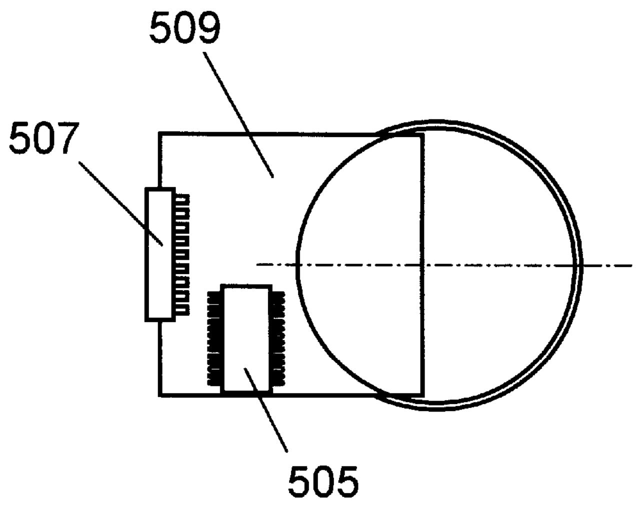

FIGS. 71, 72 are a front outlook view and a bottom view of a step-motor-driving device of the present invention. Motor 501 includes (1) a rotor comprising cylindrical permanent magnet magnetized to N and S poles and (2) a stator comprising iron cores facing the rotor via annular space, the iron core being wounded by windings. Magnetic sensor 503 includes a position detector comprising Hall elements. Circuit-board 509 is equipped with an integrated circuits (IC) for controlling the motor, external electronic components to the IC (not shown) and connector 507. Board 509 extends to inside of the motor, and components forming magnetic sensor 503 are mounted thereon.

The IC incorporates the circuits having the structures described in the previous embodiments and a power transistor for powering the motor integratively on a single silicon chip. Connector 507 conveys signals between the step-motor-driving device and the system in which the device is mounted.

The motor and the board are not necessarily incorporated as discussed above, but they can be coupled with lead wires.

The step-motor-driving device of the present invention, as discussed above, comprises the motor which is basically the same step-motor as the conventional one, and the magnetic sensor which can be formed by, e.g. Hall elements thereby eliminating a high-resolution encoder such as a bulky resolver. The step-motor-driving device of the present invention physically needs only the magnetic sensor in addition to the conventional one, thus the device of the present invention does not become bulky and fits easily in a system which has employed the conventional step-motor-driving device.

The advantages of the step-motor-driving device of the present invention can be summarized as follows:

1. Re: Exemplary Embodiments 1 and 2

When the excitation switch of the windings of each phase responsive to the driving-instruction signals directs the torque in an unfavorable direction for the motor to rotate in a desirable direction, a signal generated by the position detector is supplied to the exciter as an exciting signal. When the excitation switch directs the torque in the favorable direction for the motor to rotate in the desirable direction, the driving-instruction-signal is supplied to the exciter as the exciting signal. The excitation-timing controller thus operating is provided to the step-motor-driving device. As a result, a speed control and a positioning control can be achieved at a low cost by an extremely simple system, which is a key advantage of the step-motor. On top of that, when the driving-instruction-signal carries a high frequency, the step-motor exerts the performance identical to a DC brushless motor thereby clearing away a chance of jumping "out of sync".

The excitation-timing-controller can be formed with ease by the delay-signal-selector. In the case of instructing the motor to rotate in the positive direction, the delay-signal-selector outputs the later input signal between the driving-instruction-signals and position-detecting-signal. In the case of instructing the motor to rotate in the negative direction, the delay-signal-selector outputs the later input signal between the driving-instruction-signals and the signals reversed to the position-detecting-signals.

The delay-signal-selector can be formed by the reciprocal latch, which latches levels of signals as follows:

(a) in the case of instructing the motor to rotate in the positive direction: (a-1) Latch a level of the position-detecting-signal at a timing when the driving instruction-signal changes. (a-2) Latch a level of driving-instruction-signal at a timing when the position-detecting-signal changes.

(b) in the case of instructing the motor to rotate in the negative direction: (b-1) Latch a level of the signal reversed to the position-detecting-signal at the timing when the driving-instruction-signal changes. (b-2) Latch the level of driving-instruction-signal at the timing when the position-detecting-signal changes.

In this instance, if an advance-delay relation between the driving-instruction-signal and the position-detecting-signal is abruptly reversed, the exciting signal can turn smoothly and seamlessly. As a result, the step-motor can be controlled in a more stable manner.

The delay-signal-selector can be formed by the reciprocal-signal-selector. In the case of instructing the motor to rotate in the positive direction, the reciprocal-signal-selector selects and outputs the position-detecting-signal at the timing when the driving-instruction-signal changes, or selects and outputs the driving-instruction-signal at the timing when the position-detecting-signal changes. In the case of instructing the motor to rotate in the negative direction, the reciprocal-signal-selector selects and outputs the signals reversed to the position-detecting-signal at the timing when the driving-instruction-signal changes, or selects and outputs the driving-instruction-signal at the timing when the position-detecting-signal changes. In this instance, if the advance-delay relation between the driving-instruction-signal and the position-detecting-signal is abruptly reversed, the exciting signal can turn smoothly and seamlessly. As a result, the step-motor can be controlled in a more stable manner.

The position detector can be formed by Hall elements, which are inexpensive and small in size. In this case, the position detector requires a little space to be mounted to the motor, and thus the step-motor-driving device free from jumping "out of sync" and as good as the conventional one both in size and cost can be achieved. The position detector and excitation-timing-controller can be provided to each phase independently. This structure allows the excitation-timing-controller to independently process the signals and thus to be free from linking with processing signals of other phases, thereby simplifying the construction. Further, this structure is applicable to the multi-phase step-motor with ease, therefore, the multi-phase step-motor free from jumping "out of sync" can be achieved.

(2) Re: Exemplary Embodiments 3 and 4

The exciting-current-controller is provided, which operates as follows: When the excitation switch of the windings of each phase responsive to the driving-instruction signals directs the torque in a favorable direction for the motor to rotate in a desirable direction, the exciting-current-controller changes the signal therefrom responsive to the phase-difference between the driving-instruction-signal and the position-detecting-signal so that the maximum exciting-current of the driving windings can decrease. When the excitation switch directs the torque in the unfavorable direction for the motor to rotate in the desirable direction, the exciting-current-controller changes the signal therefrom responsive to the phase-difference between the driving-instruction-signal and the position-detecting-signal so that the maximum exciting-current of the windings can increase. This structure allows the motor to reduce its torque ripples, vibrations, noises and rotating-speed-variations.

Further, the exciting-current is controlled to an appropriate value responsive to the frequency of the driving-instruction signal and the load, thus the motor efficiency is substantially improved, and the motor can withstand more persistently against a chance of the "out of sync".

The step-motor-driving device employs the following two elements: (1) the excitation-timing controller, which outputs the exciting current responsive to an input timing of the driving-instruction signal or the position-detecting signal, and (2) the exciting-current-controller, which outputs the exciting-current-controlling-signal responsive to the phase difference between the driving-instruction-signal and the position-detecting-signal. When the excitation switch of the windings of each phase responsive to the driving-instruction signals directs the torque in the favorable direction for the motor to rotate in a desirable direction, the excitation-timing-controller outputs the exciting signal responsive to an input timing of the driving-instruction-signal. Further, the exciting-current-controller changes the signal therefrom responsive to the phase difference between the driving-instruction-signal and the position-detecting-signal so that the maximum exciting current of the windings can decrease. When the excitation switch directs the torque in the unfavorable direction for the motor to rotate in the desirable direction, the excitation-timing-controller outputs the exciting signal responsive to an input timing of the position-detecting-signal. Further, the exciting-current-controller changes the signal therefrom responsive to the phase difference between the driving-instruction-signal and the position-detecting-signal so that the maximum exciting current of the windings can increase.

This structure allows the step-motor to be sweepingly free from jumping "out of sync". This structure also reduces torque ripples, vibrations, noises and rotation-speed-variations of the motor. Further, the exciting-current is controlled to an appropriate value responsive to the frequency of the driving-instruction signal and the load, thus the motor efficiency is substantially improved.

The position detector can be formed by compact and inexpensive Hall elements, thus not necessarily employs a bulky and expensive encoder or resolver. In this case, the position detector requires a little space to be mounted to the motor, and thus the step-motor-driving device free from jumping "out of sync" and as good as the conventional one both in size and cost can be achieved.

The position detector can still employ an encoder or a resolver, not to mention, without any technical problems.

Since the exciting-current controller controls the exciting-current of the driving windings appropriately responsive to the load, the motor generates less heat. This allows the position detector (Hall elements) to employ not high-temperature-compensating Hall elements but inexpensive and general-purpose Hall elements.

(3) Re: Exemplary Embodiments 5 through 11

The excitation-timing controller is provided to the step-motor-driving device, and this controller comprises (a) the delay-signal-selector, (b) the deviation-detector, and (c) the exciting-signal-selector. Each element operates in the following way:

(a) The delay-signal-selector outputs a later input-signal between the driving-instruction signal and position-detecting-signal when the motor is instructed to rotate in the positive direction. On the other hand, when the motor is instructed to rotate in the negative direction, the delay-signal selector outputs a later input-signal between the driving-instruction-signal and a signal reversed to the position-detecting-signal.

(b) The deviation-detector detects whether the deviation, i.e. a difference in the numbers of pulses between the driving-instruction signal and position-detecting-signal, falls into the (b-1) first status, (b-2) second status, or (b-3) third status. The definitions of each status are as follows:

(b-1) the deviation falls within a given value;

(b-2) the deviation falls outside the given value and then requires forward torque for the motor's mover to be directed in the positive direction thereby restoring the deviation within the given value; and (b-3) the deviation falls outside the given value and then requires reversal torque for the motor's mover to be directed in the negative direction thereby restoring the deviation within the given value.

(c) The exciting-signal-selector selects a single exciting signal out of the following three signals based on detection result by the deviation-detector: (c-1) an output signal from the delay-signal-selector, (c-2) position-detecting signal, and (c-3) a signal reversed to the position-detecting signal.

The exciting-signal-selector operates as follows: When the deviation detector detects that the deviation falls within the first status, the exciting-signal-selector selects the output from the delay-signal-selector as the exciting signal. When the detector detects the second status, the exciting-signal-selector selects the position-detecting-signal as the exciting signal. When the detector detects the third status, the selector selects the signal reversed to the position-detecting-signal as the exciting signal. The three statuses are further detailed below:

(a) When the deviation falls within the first status and the driving-instruction-signal carries a low frequency or the motor bears light load, the delay-signal-selector allows the driving-instruction-signal to be the exciting signal. Thus the step-motor functions as good as the conventional one, i.e. the rotating speed can be controlled responsive to the frequency of driving-instruction-signal with ease so that the speed control as well as the positioning control can be achieved at a low cost by an extremely simple system. The main feature of the step-motor is thus taken over into step-motor-driving device of the present invention.

(b) When the deviation falls within the first status and the driving-instruction-signal carries a high frequency or the motor bears heavy load, the delay-signal-selector allows the position-detecting-signal to be the exciting signal. In short, the step-motor operates equivalently with a dc bruschless motor, thus the problem of jumping "out of sync" is eliminated.

(c) In the second status, at least one of the following phenomena occurs: the driving-instruction-signal carries an extremely high frequency;

the frequency of the signal jumps up abruptly;

the motor bears heavy load; or the load of the motor increases abruptly.

the mover undershoots the position.

When the deviation leaves the first status and falls into the second status, the position-detecting-signal functions as the exciting signal so that the excitation of the driving-windings can be switched without lowering the torque generated. The mover thus can be accelerated and driven in the positive direction with maintaining the torque at the maximum level.

The mover is sufficiently accelerated in the positive direction, and eventually the second status is taken over by the first status where the step-motor properly functions.

In the transition period from the first to second status or vice versa, there is no chance for the motor to jump "out of sync".

(d) In the third status, at least one of the following phenomena occurs:

the frequency of the driving-instruction-signal lowers abruptly;

the load to the motor abruptly decreases;

the instruction of the driving direction is reversed; or the mover overshoots the position.

When the deviation leaves the first status and falls into the third status, the signal revered to position-detecting-signal functions as the exciting signal so that the torque applied to the motor works to decelerate the mover in order to avoid jumping "out of sync".

The mover is sufficiently decelerated, and eventually the third status is taken over by the first status where the step-motor properly functions.

In the transition period from the first to third status or vice versa, there is no chance for the motor to jump "out of sync".

The delay-signal-selector can be formed by the reciprocal latch, which latches levels of signals in the following way:

(a) in the case of instructing the motor to rotate in the positive direction: (a-1) Latch a level of the position-detecting-signal at a timing when the driving instruction-signal changes. (a-2) Latch a level of driving-instruction-signal at a timing when the position-detecting-signal changes.

(b) in the case of instructing the motor to rotate in the negative direction: (b-1) Latch a level of the signal reversed to the position-detecting-signal at the timing when the driving-instruction-signal changes. (b-2) Latch the level of driving-instruction-signal at the timing when the position-detecting-signal changes.

In these instances, if an advance-delay relation between the driving-instruction-signal and the position-detecting-signal is abruptly reversed, the exciting signal can turn smoothly and seamlessly. As a result, the step-motor can be controlled in a more stable manner.

The delay-signal-selector can be formed by the reciprocal-signal-selector. In the case of instructing the motor to rotate in the positive direction, the reciprocal-signal-selector selects and outputs the position-detecting-signal at the timing when the driving-instruction-signal changes, or selects and outputs the driving-instruction-signal at the timing when the position-detecting-signal changes. In the case of instructing the motor to rotate in the negative direction, the reciprocal-signal-selector selects and outputs the signals reversed to the position-detecting-signal at the timing when the driving-instruction-signal changes, or selects and outputs the driving-instruction-signal at the timing when the position-detecting-signal changes. In these instances, if the advance-delay relation between the driving-instruction-signal and the position-detecting-signal is abruptly reversed, the exciting signal can turn smoothly and seamlessly. As a result, the step-motor can be controlled in a more stable manner.

The position detector and excitation-timing-controller can be provided to each phase independently. This structure allows the excitation-timing-controller to be free from linking with processing signals of other phases, thereby simplifying the construction. Further, this structure is applicable to the multi-phase step-motor with ease, therefore, the multi-phase step-motor free from jumping "out of sync" can be achieved.

In addition to the excitation-timing-controller, the step-motor-driving-device employs the exciting-current-controller, which outputs the exciting-current-control signal responsive to the phase-difference between the driving-instruction-signal and position-detecting-signal thereby controlling the exciting-current of the driving-windings. Here are control methods responsive to the respective phase differences.

(a) In the case of instructing the motor to rotate in the positive direction: (a-1) When the driving-instruction-signal delays with regard to phase-detecting-signal in phases, the phase-difference is referred to as a delay-phase-difference. (a-2) When the driving-instruction-signal advances with regard to phase-detecting-signal in phases, the phase-difference is referred to as an advance-phase-difference.

(b) In the case of instructing the motor to rotate in the negative direction: (b-1) When the driving-instruction-signal delays with regard to a signal reversed to the position-detecting signal in phases, the phase-difference is referred to as a delay-phase-difference. (b-2) When the driving-instruction-signal advances with regard to the signal reversed to the phase-detecting-signal in phases, the phase-difference is referred to as an advance-phase-difference.

When the delay-phase-difference is produced, the exciting-current controller changes the signal therefrom so that the maximum exciting-current can decrease. When the advance-phase-difference is produced, the exciting-current controller changes the signal therefrom so that the maximum exciting-current can increase.

This construction discussed above further produces the following advantage, i.e. in the first status, when the driving-instruction-signal carries a low frequency or the motor bears light load, the exciting-current-controller controls the signal therefrom so that the exciting-current of the driving-windings decreases, thereby reducing the torque ripples at driving the motor to substantially small ripples.

Such substantially small torque-ripples decrease the vibrations, noises and rotating-speed-variations of the motor. Further, since the exciting current is controlled at a minimum level responsive to the load, the motor-efficiency can be substantially improved.

In the first status, when the driving-instruction-signal carries a high frequency or the motor bears heavy load, the excitation-timing-controller and the exciting-current-controller increase the driving capability of the mover, so that the step-motor increases its capability to be kept driving in the first status where the motor can properly function. In this case, the torque ripples decreases, thereby reducing the vibrations, noises and rotating-speed-variations of the motor. As a result, the exciting current is controlled at an appropriate level responsive to the load and the motor-efficiency is substantially improved.

When the motor falls into the second status, the excitation-timing-controller and the exciting-current-controller increase substantially the forward torque applied to the mover, so that capability of accelerating the motor is substantially increased.

Therefore, when the motor falls into the second status due to the following factors, the motor is instantly restored to the first status, where the step-motor can properly function:

the driving-instruction signal carries a high frequency;

the frequency of the signal jumps abruptly to a high level;

the motor bears heavy load;

the load to the motor jumps abruptly to a heavier level; or the mover overshoots the position.

When the motor falls into the third status, the excitation-timing-controller and the exciting-current-controller increase substantially the reverse torque applied to the mover, so that capability of decelerating the motor is substantially increased.

Therefore, when the motor falls into the third status due to the following factors, the motor is instantly restored to the first status, where the step-motor can properly function:

the frequency of the signal lowers abruptly;

the load to the motor lightens abruptly;

the instruction of the rotating direction is reversed; or the mover undershoots the position.

In addition to the excitation-timing controller, the exciting-current-compulsory-booster, which increases the exciting current compulsorily, is provided to the step-motor-driving device. The excitation-timing controller includes the deviation detector which detects whether the deviation falls within the first status, second status or third status. The description of each status has been already discussed, and thus they are not repeated here. The exciting-current-compulsory-booster increases compulsorily the exciting current of the driving-windings when the deviation detector detects that the motor falls into the second or third status.

The structure discussed above effects the following advantages:

When the motor falls into the second status or third status due to the factors previously discussed, this structure allows the exciting current to be increased compulsorily with a fast response thereby restoring the motor instantly to the first status where the step motor can properly function.

Further, in addition to the excitation-timing-controller and exciting-current-controller, the exciting-current-compulsory-booster—which increases the exciting current of the driving-windings—is provided, so that the step-motor-driving device having all the advantages discussed previously can be achieved.

The start-stop-exciter can be further provided. At the starting of the motor or halting the motor for positioning, this exciter works on the current-value-signal supplied to the exciters so that the exciting-current of the driving-windings is compulsorily increased. This structure allows the step-motor-driving-device to obtain the starter-torque required at starting the motor as well as the holding-torque required at positioning the motor. As a result, the motor performance is further improved.

Still further, when the deviation detector detects that the motor falls into the second or third status, a signal—carrying the information that the driving-instruction-signal is out of sync from the position-detecting-signal—can be transmitted to the upper-class-device from the step-motor-driving device. This structure allows the step-motor-driving device to inform the upper-class-device of the fact that the step-motor leaves the normal driving condition where the driving-instruction-signal synchronizes with the position-detecting-signal and the step-motor can properly function. As a result, the motor can exert its upper most capability.

The position detector can be formed by inexpensive and small Hall elements instead of an expensive and bulky encoder or resolver. In this case, the position detector (Hall elements) requires a little mounting space to the step-motor, and thus the step-motor-driving device free from jumping "out of sync" and as good as the conventional device in size and cost can be achieved.

Not to mention, the position detector can be formed by the encoder or resolver without any technical problems.

The exciting-current-controller controls the exciting-current of the driving-windings appropriately responsive to the load, so that the motor generates less heat. As a result, the position detector can be formed by general-purpose inexpensive Hall elements instead of high-temperature-compensating Hall elements.

(4) Re: Exemplary Embodiments 12 through 29

In these embodiments, embodiments 1 through 11 are modified so that the advantages discussed above can be obtained.

In each embodiment, the rotating type step-motor is used, where the mover is the rotor; however, the present invention is applicable to the linear step motor where the mover moves linearly.

Various controls discussed in each embodiment are not limited to hardware structure but available by software.

The current-value-signals supplied to the respective exciters can be controlled independently to operated in micro-steps manner.

The greatest advantage of the present invention is to realize the step-motor free from jumping "out of sync". This advantage improves the performance of the step-motor in the existing application field, and further develops new application fields, which have refused to employ the step-motor due to the problem of jumping "out of sync". The present invention thus produces great merits in the industry.

What is claimed is:

1. A step-motor-driving device comprising:

(a) a step-motor having a driving-winding for plurality of phases;

(b) an exciter for supplying power to excite the driving-winding;

(c) a position detector for detecting a mover of said step-motor and outputting a position-detecting-signal;

(d) an excitation-timing-controller for receiving a driving-instruction-signal and the position-detecting-signal and outputting an exciting signal to said exciter responsive to an input of one of the driving-instruction-signal and the position-detecting signal, wherein said excitation-timing-controller outputs the exciting signal responding to the input of the driving-instruction-signal when an excitation-switch of the driving-winding responsive to the driving-instruction-signal directs torque in a direction effective for said step-motor to rotate in a desirable direction, and outputs the exciting signal responding to the input of the position-detecting-signal when the excitation-switch of the driving-winding responsive to the driving-instruction-signal directs the torque in a direction reverse to the desirable direction for said step-motor to rotate in the desirable direction.

2. The step-motor-driving device as defined in claim 1, further comprising a delay-signal-selector for outputting a later input signal between the driving-instruction-signal and the position-detecting-signal when said step-motor is instructed to rotate in a positive direction, and outputting a later input signal between the driving-instruction-signal and a signal reversed to the position-detecting-signal when said step-motor is instructed to rotate in a negative direction, wherein the output signal from said delay-signal-selector is fed into said exciter as the exciting signal.

3. The step-motor-driving device as defined in claim 2, wherein said delay-signal-selector is formed by a reciprocal latch for latching a level of the position-detecting-signal at a change of the driving-instruction-signal as well as latching a level of the driving-instruction-signal at a change of the position-instruction-signal when said step-motor is instructed to rotate in the positive direction, and for latching a level of the signal reversed to the position-detecting-signal at the change of the driving-instruction-signal as well as latching the level of the driving-instruction-signal at the change of the position-instruction-signal when said step-motor is instructed to rotate in the negative direction.

4. The step-motor-driving device as defined in claim 2, wherein said delay-signal-selector is formed by a reciprocal-signal-selector for selecting and outputting the position-detecting-signal at a change of the driving-instruction-signal as well as selecting and outputting the driving-instruction-signal at a change of the position-detecting-signal when said step-motor is instructed to rotate in the positive direction, and for selecting and outputting the signal reversed to the position-detecting-signal at the change of the driving-instruction-signal as well as selecting and outputting the driving-instruction-signal at the change of the position-detecting-signal when said step-motor is instructed to rotate in the negative direction.

5. The step-motor-driving device as defined in claim 1, wherein said excitation-timing-controller is provided to each phase of respective driving windings, and said excitation-timing-controller receives the position-detecting-signal and the driving-instruction-signal of the driving-winding corresponding to said excitation-timing-controller as well as outputs the exciting signal independently of other phases to the driving-winding corresponding to said excitation-timing-controller.

6. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding, wherein said exciter receives an exciting signal and a current-value-signal, then switches an excitation of the driving-winding responsive to the exciting signal, and determines a maximum exciting current responsive to the current-value-signal; and (d) an exciting-current-controller for outputting an exciting-current-control-signal as a current-value-signal to said exciter responsive to a phase-difference between a driving-instruction-signal and the position-detecting-signal, both of the signals are fed into said exciter, wherein when an excitation-switch of the driving-winding responsive to the driving-instruction-signal directs torque in a direction effective for said step-motor to rotate in a desirable direction, said exciting-current-controller changes the exciting-current-control-signal to reducing a maximum exciting-current of the driving-winding responsive to the phase difference between the driving-instruction-signal and the position-detecting-signal, and wherein when the excitation-switch of the driving-winding responsive to the driving-instruction-signal directs the torque in a direction reverse to the desirable direction for said step-motor to rotate in the desirable direction, said exciting-current-controller changes the exciting-current-control-signal to increase the maximum exciting-current of the driving-winding responsive to the phase difference between the driving-instruction-signal and the position-detecting-signal.

7. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal;

(d) an excitation-timing-controller for receiving a driving-instruction-signal and the position-detecting-signal, and for outputting the exciting signal to said exciter responsive to an input of one of the driving-instruction-signal and the position-detecting-signal; and (e) an exciting-current-controller for outputting a current-value-signal to said exciter responsive to a phase-difference between the driving-instruction-signal and the position-detecting-signal, wherein when an excitation-switch of the driving-winding responsive to the driving-instruction-signal directs torque in a direction effective for said step-motor to rotate in a desirable direction, said excitation-timing-controller outputs the exciting signal responding to an input of the driving-instruction-signal and said exciting-current-controller changes the exciting-current-control-signal to decrease a maximum exciting-current of the driving-winding responsive to the phase difference between the driving-instruction-signal and the position-detecting-signal, and wherein when the excitation-switch of the driving-winding responsive to the driving-instruction-signal directs the torque in a direction reverse to the desirable direction for said step-motor to rotate in the desirable direction, said excitation-timing-controller outputs the exciting signal responding to an input of the position-detecting-signal and said exciting-current-controller changes the exciting-current-control-signal to increase the maximum exciting-current of the driving-winding responsive to the phase difference between the driving-instruction-signal and the position-detecting-signal.

8. The step-motor-driving device as defined in claim 6 or 7, wherein when said step-motor is instructed to rotate in a positive direction, said exciting-current-controller takes the phase difference as a delay-phase-difference when the driving-instruction-signal delays with regard to the position-detecting-signal in phases, and takes the phase difference as an advance-phase-difference when the driving-instruction-signal advances with regard to the position-detecting-signal in phases, wherein when said step-motor is instructed to rotate in a negative direction, said exciting-current-controller takes the phase difference as a delay-phase-difference when the driving-instruction-signal delays with regard to a signal reversed to the position-detecting-signal in phases, and takes the phase difference as an advance-phase-difference when the driving-instruction-signal advances with regard to the signal reversed to the position-detecting-signal in phases, wherein when the delay-phase-difference is produced, said exciting-current-controller changes the exciting-current-control-signal to decrease the maximum exciting-current, and wherein when the advance-phase-difference is produced, said exciting-current-controller changes the exciting-current-control-signal to increase the maximum exciting-current.

9. A step-motor-driving device comprising:

(a) a step-motor having a driving-winding for plurality of phases;

(b) an exciter for supplying power to excite the driving-winding;

(c) a position detector for detecting a mover of said step-motor and outputting a position-detecting-signal;

(d) an excitation-timing-controller for receiving a driving-instruction-signal and the position-detecting-signal and for outputting an exciting signal to said exciter responsive to an input of one of the driving-instruction-signal and the position-detecting signal, wherein said excitation-timing-controller comprises:

(d-1) a delay-signal-selector for outputting a later input signal between the driving-instruction-signal and the position-detecting-signal when said step-motor is instructed to rotate in a positive direction, and outputting a later input signal between the driving-instruction-signal and a signal reversed to the position-detecting-signal when said step-motor is instructed to rotate in a negative direction;

(d-2) a deviation-detector for detecting one of which status a difference of numbers of pulses between the driving-instruction-signal and a signal reversed to the position-detecting-signal, i.e. a deviation, falls into, a first status where the deviation falls within a given range, a second status where the deviation falls outside the given range and requires forward torque directing the mover of said step-motor in the positive direction for the deviation to fall within the given range, and a third status where the deviation falls outside the given range and requires reverse torque directing the mover of said step-motor in a negative direction for the deviation to fall within the given range; and (d-3) an exciting-signal-selector for selecting one of an output signal from said delay-signal-selector, the position-detecting-signal and the signal reversed to the position-detecting-signal based on a detection result by said deviation detector, wherein when said deviation detector detects the deviation in the first status, said exciting-signal-selector selects the output signal from said delay-signal-selector as the exciting signal;

wherein when said deviation detector detects the deviation in the second status, said exciting-signal-selector selects the position-detecting-signal as the exciting signal; and wherein when said deviation detector detects the deviation in the third status, said exciting-signal-selector selects the signal reversed to said position-detecting-signal as the exciting signal.

10. The step-motor-driving device as defined in claim 9, wherein said deviation detector comprises:

a deviation counter for counting the difference in numbers of pulses between the driving-instruction-signal and the position-detecting-signal, i.e. the deviation, and a determiner for determining one of which status the deviation falls into, the first status, the second status and the third status responsive to an output from said deviation counter, wherein said deviation counter counts up by one every time the driving-instruction-signal is input when said step-motor is instructed to rotate in the positive direction, counts down by one every time the driving-instruction-signal is input when said step-motor is instructed to rotate in the negative direction, also counts down by one every time the position-detecting-signal is input when said step-motor is driven in the positive direction, and counts up by one every time the position-detecting-signal is input when said step-motor is driven in the negative direction, wherein said determiner determines the deviation is in the first status when said deviation counter outputs a value ranging from −1 to +1, also determines the deviation is in the second status during a period since an output from said deviation counter reaches to +2 until the output returns to 0 (zero), and determines the deviation is in the third status during a period since the output from said deviation counter reaches to −2 until the output returns to 0 (zero).

11. The step-motor-driving device as defined in claim 9, wherein said deviation detector comprises:

a deviation counter for counting a difference in numbers of pulses between the driving-instruction-signal and the position-detecting-signal, i.e. the deviation, and a determiner for determining one of which status the deviation falls into, the first status, the second status and the third status responsive to an output from said deviation counter, wherein said deviation counter counts down by one every time the driving-instruction-signal is input when said step-motor is instructed to rotate in the positive direction, counts up by one every time the driving-instruction-signal is input when said step-motor is instructed to rotate in the negative direction, also counts up by one every time the position-detecting-signal is input when said step-motor is driven in the positive direction, and counts down by one every time the position-detecting-signal is input when said step-motor is driven in the negative direction, wherein said determiner determines the deviation is in the first status when said deviation counter outputs a value ranging from −1 to +1, also determines the deviation is in the second status during a period since an output from said deviation counter reaches to −2 until the output returns to 0 (zero), and determines the deviation is in the third status during a period since the output from said deviation counter reaches to +2 until the output returns to 0 (zero).

12. The step-motor-driving device as defined in claim 9, wherein said delay-signal-selector is formed by a reciprocal latch for latching a level of the position-detecting-signal at a change of the driving-instruction-signal as well as latching a level of the driving-instruction-signal at a change of the position-instruction-signal when said step-motor is instructed to rotate in the positive direction, and for latching a level of the signal reversed to the position-detecting-signal at a change of the driving-instruction-signal as well as latching the level of the driving-instruction-signal at a change of the position-instruction-signal when said step-motor is instructed to rotate in the negative direction.

13. The step-motor-driving device as defined in claim 9, wherein said delay-signal-selector is formed by a reciprocal-signal-selector for selecting and outputting the position-detecting-signal at a change of the driving-instruction-signal as well as selecting and outputting the driving-instruction-signal at a change of the position-detecting-signal when said step-motor is instructed to rotate in the positive direction, and for selecting and outputting the signal reversed to the position-detecting-signal at the change of the driving-instruction-signal as well as selecting and outputting the driving-instruction-signal at the change of the position-detecting-signal when said step-motor is instructed to rotate in the negative direction.

14. The step-motor-driving device as defined in claim 9, wherein said excitation-timing-controller is provided to each phase of respective driving windings, and said excitation-timing-controller receives the position-detecting-signal and the driving-instruction-signal of the driving-winding corresponding to said excitation-timing-controller as well as outputs the exciting signal independently of other phases to the driving-winding corresponding to said excitation-timing-controller.

15. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal;

(d) an excitation-timing-controller for receiving a driving-instruction-signal and the position-detecting-signal, and for outputting the exciting signal to said exciter responsive to an input of one of the driving-instruction-signal and the position-detecting-signal; and (e) an exciting-current-controller for outputting the current-value-signal to said exciter responsive to a phase-difference between the driving-instruction-signal and the position-detecting-signal, wherein said excitation-timing-controller comprises:

a delay-signal-selector for outputting a later input signal between the driving-instruction-signal and the position-detecting-signal when said step-motor is instructed to rotate in a positive direction, and for outputting a later input signal between the driving-instruction-signal and a signal reversed to the position-instructing-signal when said step-motor is instructed to rotate in a negative direction, a deviation-detector for detecting one of which status a difference of numbers of pulses between the driving-instruction-signal and the position-detecting-signal, i.e. a deviation, falls into, a first status where the deviation falls within a given range, a second status where the deviation falls outside the given range and requires forward torque directing a mover of said step-motor in a positive direction for the deviation to fall within the given range, and a third status where the deviation falls outside the given range and requires reverse torque directing the mover of said step-motor in a negative direction for the deviation to fall within the given range; and an exciting-signal-selector for selecting one of an output signal from said delay-signal-selector, the position-detecting-signal and the signal reversed to the position-detecting-signal based on a detection result by said deviation detector, wherein when said deviation detector detects the deviation in the first status, said exciting-signal-selector selects an output signal from said delay-signal-selector as the exciting signal;

wherein when said deviation detector detects the deviation in the second status, said exciting-signal-selector selects the position-detecting-signal as the exciting signal; and wherein when said deviation detector detects the deviation in the third status, said exciting-signal-selector selects the signal reversed to said position-detecting-signal as the exciting signal, wherein when said step-motor is instructed to rotate in the positive direction, said exciting-current-controller considers the phase difference of the driving-instruction-signal being delayed with regard to the position-detecting-signal in phases as a delayphase-difference as well as considers the phase difference of the driving-instruction-signal being advanced with regard to the position-detecting-signal in phases as an advance-phase-difference, and when said step-motor is instructed to rotate in the negative direction, said exciting-current-controller considers the phase difference of the driving-instruction-signal being delayed with regard to the signal reversed to the position-detecting-signal in phases as a delay-phase-difference as well as considers the phase difference of the driving-instruction-signal being advanced with regard to the signal reversed to the position-detecting-signal in phases as an advance-phase-difference, wherein when the delay-phase-difference is produced, said exciting-current-controller changes the exciting-current-control-signal to reduce the maximum exciting-current of the driving-winding, and when the advance-phase-difference is produced, said exciting-current-controller changes the exciting-current-control-signal to increase the maximum exciting-current of the driving-winding.

16. The step-motor-driving device as defined in claim 15, wherein said exciting-current-controller comprises:

a deviation counter for counting the difference of numbers of pulses between the driving-instruction-signal and the position-detecting-signal, i.e. the deviation; and a phase determiner for determines the phase-difference being one of the delay-phase-difference and the advance-phase-difference depending on an output from said deviation counter, wherein said deviation counter counts up by one every time the driving-instruction-signal is input when said step-motor is instructed to rotate in the positive direction, counts down by one every time the driving-instruction-signal is input when said step-motor is instructed to rotate in the negative direction, also counts down by one every time the position-detecting-signal is input when said step-motor is driven in the positive direction, and counts up by one every time the position-detecting-signal is input when said step-motor is driven in the negative direction, and wherein said phase determiner determines that the phase difference is the advance-phase-difference when said deviation counter outputs a value of +1 or more, and determines that the phase difference is the delay-phase-difference when said deviation counter outputs a value of −1 or less.

17. The step-motor-driving device as defined in claim 15, wherein said exciting-current-controller comprises:

a deviation counter for counting the difference of numbers of pulses between the driving-instruction-signal and the position-detecting-signal, i.e. the deviation; and a phase determiner for determines the phase-difference being one of the delay-phase-difference and the advance-phase-difference depending on an output from said deviation counter, wherein said deviation counter counts down by one every time the driving-instruction-signal is input when said step-motor is instructed to rotate in the positive direction, counts up by one every time the driving-instruction-signal is input when said step-motor is instructed to rotate in the negative direction, also counts up by one every time the position-detecting-signal is input when said step-motor is driven in the positive direction, and counts down by one every time the position-detecting-signal is input when said step-motor is driven in the negative direction, and wherein said phase determiner determines that the phase difference is the advance-phase-difference when said deviation counter outputs a value of—1 or less, and determines that the phase difference is the delay-phase-difference when said deviation counter outputs a value of +1 or more.

18. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal;

(d) an excitation-timing-controller for receiving a driving-instruction-signal and the position-detecting-signal, and for outputting the exciting signal to said exciter responsive to an input of one of the driving-instruction-signal and the position-detecting-signal; and (e) an exciting-current-compulsory-booster for enabling the current-value-signal supplied to said exciter to increase compulsorily the exciting current of the driving-winding, wherein said excitation-timing-controller comprises:

(e-1) a delay-signal-selector for outputting a later input signal between the driving-instruction-signal and the position-detecting-signal when said step-motor is instructed to rotate in a positive direction, and outputting a later input signal between the driving-instruction-signal and a signal reversed to the position-detecting-signal when said step-motor is instructed to rotate in a negative direction;

(e-2) a deviation-detector for detecting one of which status a difference of numbers of pulses between the driving-instruction-signal and the position-detecting-signal, i.e. a deviation, falls into, a first status where the deviation falls within a given range, a second status where the deviation falls outside the given range and requires forward torque directing a mover of said step-motor in a positive direction for the deviation to fall within the given range, and a third status where the deviation falls outside the given range and requires reverse torque directing the mover of said step-motor in a negative direction for the deviation to fall within the given range; and (e-3) an exciting-signal-selector for selecting one of an output signal supplied from said delay-signal-selector, the position-detecting-signal and the signal reversed to the position-detecting-signal based on a detection result by said deviation detector, wherein when said deviation detector detects the deviation in the first status, said exciting-signal-selector selects an output signal from said delay-signal-selector as the exciting signal;

wherein when said deviation detector detects the deviation in the second status, said exciting-signal-selector selects the position-detecting-signal as the exciting signal; and wherein when said deviation detector detects the deviation in the third status, said exciting-signal-selector selects the signal reversed to said position-detecting-signal as the exciting signal, wherein said exciting-current-compulsory-booster increases compulsorily the exciting-current of the driving-winding when said deviation detector detects one of the second status and the third status.

19. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal;

(d) an excitation-timing-controller for receiving a driving-instruction-signal and the position-detecting-signal, and for outputting the exciting signal to said exciter responsive to an input of one of the driving-instruction-signal and the position-detecting-signal;

(e) an exciting-current-controller for outputting a current-value-signal to said exciter responsive to a phase-difference between the driving-instruction-signal and the position-detecting-signal; and (f) an exciting-current-compulsory-booster for increasing compulsorily the exciting current of the driving-winding, wherein said excitation-timing-controller comprises:

a delay-signal-selector for outputting a later input signal between the driving-instruction-signal and the position-detecting-signal when said step-motor is instructed to rotate in a positive direction, and for outputting a later input signal between the driving-instruction-signal and a signal reversed to the position-instructing-signal when said step-motor is instructed to rotate in a negative direction, a deviation-detector for detecting one of which status a difference of numbers of pulses between the driving-instruction-signal and the position-detecting-signal, i.e. a deviation, falls into, a first status where the deviation falls within a given range, a second status where the deviation falls outside the given range and requires forward torque directing a mover of said step-motor in a positive direction for the deviation to fall within the given range, and a third status where the deviation falls outside the given range and requires reverse torque directing the mover of said step-motor in a negative direction for the deviation to fall within the given range; and an exciting-signal-selector for selecting one of an output signal from said delay-signal-selector, the position-detecting-signal and the signal reversed to the position-detecting-signal based on a detection result by said deviation detector, wherein when said deviation detector detects the deviation in the first status, said exciting-signal-selector selects an output signal from said delay-signal-selector as the exciting signal;

wherein when said deviation detector detects the deviation in the second status, said exciting-signal-selector selects the position-detecting-signal as the exciting signal; and wherein when said deviation detector detects the deviation in the third status, said exciting-signal-selector selects the signal reversed to said position-detecting-signal as the exciting signal, wherein when said step-motor is instructed to rotate in the positive direction, said exciting-current-controller considers the phase difference of the driving-instruction-signal being delayed with regard to the position-detecting-signal in phases as a delay-phase-difference as well as considers the phase difference of the driving-instruction-signal being advanced with regard to the position-detecting-signal in phases as an advance-phase-difference, and when said step-motor is instructed to rotate in the negative direction, said exciting-current-controller considers the phase difference of the driving-instruction-signal being delayed with regard to the signal reversed to the position-detecting-signal in phases as the delay-phase-difference as well as considers the phase difference of the driving-instruction-signal being advanced with regard to the signal reversed to the position-detecting-signal in phases as the advance-phase-difference, wherein when the delay-phase-difference is produced, said exciting-current-controller changes the exciting-current-control-signal to reduce the maximum exciting-current of the driving-winding, and when the advance-phase-difference is produced, said exciting-current-controller changes the exciting-current-control-signal to increase the maximum exciting-current of the driving-winding, and wherein said exciting-current-compulsory-booster increases compulsorily the exciting-current of the driving-winding when said deviation detector detects one of the second status and the third status.

20. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal;

(d) an excitation-timing-controller for receiving a driving-instruction-signal and the position-detecting-signal, and for outputting the exciting signal to said exciter responsive to an input of one of the driving-instruction-signal and the position-detecting-signal;

(e) an exciting-current-controller for outputting a current-value-signal to said exciter responsive to a phase-difference between the driving-instruction-signal and the position-detecting-signal; and (f) an exciting-current-compulsory-booster for increasing compulsorily the exciting current of the driving-winding, wherein said excitation-timing-controller comprises:

a delay-signal-selector for outputting a later input signal between the driving-instruction-signal and the position-detecting-signal when said step-motor is instructed to rotate in a positive direction, and for outputting the later input signal between the driving-instruction-signal and a signal reversed to the position-instructing-signal when said step-motor is instructed to rotate in a negative direction, a deviation-detector for detecting one of which status a difference of numbers of pulses between the driving-instruction-signal and the position-detecting-signal, i.e. a deviation, falls into, a first status where the deviation falls within a given range, a second status where the deviation falls outside the given range and requires forward torque directing a mover of said step-motor in a positive direction for the deviation to fall within the given range, a third status where the deviation falls outside the given range and requires reverse torque directing the mover of said step-motor in a negative direction for the deviation to fall within the given range, and a fourth status where the deviation has a wider range than the given range, and an exciting-signal-selector for selecting one of an output signal from said delay-signal-selector, the position-detecting-signal and the signal reversed to the position-detecting-signal based on a detection result by said deviation detector, wherein when said deviation detector detects the deviation in the first status, said exciting-signal-selector selects an output signal from said delay-signal-selector as the exciting signal;

wherein when said deviation detector detects the deviation in the second status, said exciting-signal-selector selects the position-detecting-signal as the exciting signal; and wherein when said deviation detector detects the deviation in the third status, said exciting-signal-selector selects the signal reversed to said position-detecting-signal as the exciting signal, wherein when said step-motor is instructed to rotate in the positive direction, said exciting-current-controller considers the phase difference of the driving-instruction-signal being delayed with regard to the position-detecting-signal in phases as a delay-phase-difference as well as considers the phase difference of the driving-instruction-signal being advanced with regard to the position-detecting-signal in phases as an advance-phase-difference, and when said step-motor is instructed to rotate in the negative direction, said exciting-current-controller considers the phase difference of the driving-instruction-signal being delayed with regard to the signal reversed to the position-detecting-signal in phases as a delay-phase-difference as well as considers the phase difference of the driving-instruction-signal being advanced with regard to the signal reversed to the position-detecting-signal in phases as an advance-phase-difference, wherein when the delay-phase-difference is produced, said exciting-current-controller changes the exciting-current-control-signal to reduce the maximum exciting-current of the driving-winding, and when the advance-phase-difference is produced, said exciting-current-controller changes the exciting-current-control-signal to increase the maximum exciting-current of the driving-winding, and wherein said exciting-current-compulsory-booster increases compulsorily the exciting-current of the driving-winding when said deviation detector detects the deviation leaves the fourth status.

21. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal; and (d) an exciting-current-controller for outputting an exciting-current-control-signal as a current-value-signal to said exciter responsive to a phase-difference between a driving-instruction-signal and the position-detecting-signal, both of which are fed into said exciter, wherein when an excitation-switch of the driving-winding responsive to the driving-instruction-signal directs torque in a direction effective for said step-motor to rotate in a desirable direction, said exciting-current-controller changes the exciting-current-control-signal to reduce a maximum exciting-current of the driving-winding responsive to the phase difference between the driving-instruction-signal and the position-detecting-signal, and wherein when the excitation-switch of the driving-winding responsive to the driving-instruction-signal directs the torque in a direction reverse to the desirable direction, said exciting-current-controller changes the exciting-current-control-signal to increase the maximum exciting-current of the driving-winding responsive to the phase difference between the driving-instruction-signal and the position-detecting-signal, wherein said exciting-current-controller comprises an exciting-current-decrease-halter including a halt-width-generator, wherein said halter halts the exciting-current-control-signal from changing this change induces the maximum exciting-current of the driving-winding to decrease while said halt-width-generator keeps supplying an exciting-current-decrease-halting-signal.

22. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal;

(d) an excitation-timing-controller for receiving a driving-instruction-signal and the position-detecting-signal, and for outputting the exciting signal to said exciter responsive to an input of one of the driving-instruction-signal and the position-detecting-signal; and (e) an exciting-current-controller for outputting a current-value-signal to said exciter responsive to a phase-difference between the driving-instruction-signal and the position-detecting-signal, wherein when an excitation-switch of the driving-winding responsive to the driving-instruction-signal directs torque in a direction effective for said step-motor to rotate in a desirable direction, said excitation-timing-controller outputs the exciting signal responding to an input of the driving-instruction-signal and said exciting-current-controller changes the exciting-current-control-signal to decrease a maximum exciting-current of the driving-winding responsive to the phase difference between the driving-instruction-signal and the position-detecting-signal, wherein when an excitation-switch of the driving-winding responsive to the driving-instruction-signal directs the torque in a direction reverse to the desirable direction, said excitation-timing-controller outputs the exciting signal responding to an input of the position-detecting-signal and said exciting-current-controller changes the exciting-current-control-signal to increase the maximum exciting-current of the driving-winding responsive to the phase difference between the driving-instruction-signal and the position-detecting-signal, and wherein said exciting-current-controller comprises an exciting-current-decrease-halter including a halt-width-generator, wherein said halter halts the exciting-current-control-signal from changing this change induces the maximum exciting-current of the driving-winding to decrease while said halt-width-generator keeps supplying an exciting-current-decrease-halting-signal.

23. The step-motor-driving device as defined in claims 21 or 22, wherein the exciting-current-decrease-halting-signal is supplied during a period corresponding to a speed of the mover of said step-motor, every time the position-detecting-signal is input from said position detector.

24. The step-motor-driving device as defined in claims 21 or 22, wherein the exciting-current-decrease-halting-signal is supplied for a given period, every time the position-detecting-signal is input from said position detector.

25. A step-motor-driving device comprising:

(a) a step-motor having a driving-winding for plurality of phases;

(b) an exciter for supplying power to excite the driving-winding;

(c) a position detector for detecting a mover of said step-motor and outputting a position-detecting-signal;

(d) an excitation-timing-controller for receiving a driving-instruction-signal and the position-detecting-signal and outputting an exciting signal to said exciter responsive to an input of one of the driving-instruction-signal and the position-detecting signal, wherein said excitation-timing-controller outputs the exciting signal responding to the input of the driving-instruction-signal when an excitation-switch of the driving-winding responsive to the driving-instruction-signal directs torque in a direction effective for said step-motor to rotate in a desirable direction, and outputs the exciting signal responding to the input of the position-detecting-signal when an excitation-switch of the driving-winding responsive to the driving-instruction-signal directs the torque in a direction reverse to the desired direction for said step-motor to rotate in a desirable direction;

(e) an exciting-signal-stability-determiner for determining whether the exciting signal supplied from said excitation-timing-controller stays in a stable condition where the exciting signal keeps responding to one of the input of the driving-instruction-signal and the position-detecting-signal for a long period, or the exciting signal supplied from said excitation-timing-controller stays in an unstable condition where the exciting signal alternates responses to one of the input of the driving-instruction-signal and the position-detecting-signal for a short period; and (f) a selector for selecting one of the driving-instruction-signal and the exciting signal and outputting a selected signal based on a result determined by said exciting-signal-stability-determiner, wherein when said exciting-signal-stability-determiner determines the exciting signal is in the stable condition, said selector selects the exciting signal to excite the driving-winding, and when said exciting-signal-stability-determiner determines the exciting signal is in the unstable condition, said selector selects the driving-instruction-signal to excite the driving-winding.

26. The step-motor-driving device as defined in claim 25, wherein said exciting-signal-stability-determiner stores a phase difference condition of advance and delay between the drive-instruction-signal and the position-instruction-signal every time one of the drive-instruction-signal and the position-instruction-signal is input, and determines the exciting signal is in the stable condition when the phase difference condition stays the same for at least a period of one cycle of electrical angle as well as determines the exciting signal is in the unstable condition when the phase difference condition changes for at least a period of one cycle of electrical angle.

27. A step-motor-driving device comprising:

(a) a step-motor having a driving-winding for plurality of phases;

(b) an exciter for supplying power to excite the driving-winding;

(c) a position detector for detecting a mover of said step-motor and outputting a position-detecting-signal including an advanced-phase-signal and a delayed-phase-signal with regard to an inductive voltage generated by the driving-winding;

(d) an excitation-timing-controller for receiving a driving-instruction-signal and the position-detecting-signal, and for outputting the exciting signal to said exciter responsive to an input of one of the driving-instruction-signal and the position-detecting-signal; wherein when said step-motor is instructed to rotate in a positive direction, said excitation-timing-controller outputs the exciting signal responding to a later input signal between the driving-instruction-signal and the position-detecting-signal, and when the step-motor is instructed to rotate in a negative direction, said excitation-timing-controller outputs the exciting current responding to a later input signal between the driving-instruction-signal and a signal reversed to the position-detecting-signal;

(e) an exciting-signal-stability-determiner for determining whether the exciting signal supplied from said excitation-timing-controller stays in a stable condition where the exciting signal keeps responding to one of the input of the driving-instruction-signal and the position-detecting-signal for a long period, or the exciting signal supplied from said excitation-timing-controller stays in an unstable condition where the exciting signal alternates responses to one of the input of the driving-instruction-signal and the position-detecting-signal for a short period; and (f) a selector for receiving the driving-instruction-signal and the exciting signal, and for selecting and outputting the exciting signal to said exciter when said exciting-signal-stability-determiner determines the exciting signal is in the stable condition as well as selecting and outputting the driving-instruction-signal to said exciter when said exciting-signal-stability-determiner determines the exciting signal is in the unstable condition, wherein the driving-winding is kept exciting responsive to the driving-instruction-signal until every position-detecting-signal indicating an advanced-phase and a delayed-phase detected by said position-detector is input with a delay with regard to an input of the driving-instruction-signal.

28. The step-motor-driving device as defined in claim 27, wherein said position detector includes at least one of a first sensor mounted to said motor in the advanced-phase with regard to the inductive voltage generated by the driving-winding and a second sensor mounted to said motor in the delayed-phase with regard to the inductive voltage generated by the driving-winding.

29. The step-motor-driving device as defined in claims 27 or 28, wherein said exciting-current-stability-determiner stores a phase difference condition of advance and delay between the drive-instruction-signal and the position-instruction-signal every time one of the drive-instruction-signal and the position-instruction-signal is input, and determines the exciting signal is in the stable condition when the phase difference condition stays the same for at least a period of one cycle of electrical angle as well as determines the exciting signal is in the unstable condition when the phase difference condition changes for at least a period of one cycle of electrical angle.

30. A step-motor-driving device comprising:

(a) a step-motor having a driving-winding for plurality of phases;

(b) an exciter for supplying power to excite the driving-winding;

(c) a position detector for detecting a mover of said step-motor and outputting a position-detecting-signal; and (d) an excitation-timing-controller for receiving a driving-instruction-signal and the position-detecting-signal, and for outputting the exciting signal to said exciter responsive to an input of one of the driving-instruction-signal and the position-detecting-signal;

wherein said position detector outputs the position-detecting-signal indicating an advanced-phase with regard to an inductive voltage generated by the driving-winding, wherein when said step-motor is instructed to rotate in a positive direction, said excitation-timing-controller outputs the exciting signal responding to a later input signal between the driving-instruction-signal and the position-detecting-signal, and when the step-motor is instructed to rotate in a negative direction, said excitation-timing-controller outputs the exciting signal responding to a later input signal between the driving-instruction-signal and a signal reversed to the position-detecting-signal, and wherein the driving-winding is kept exciting responsive to the driving-instruction-signal until the position-detecting-signal indicating an advanced-phase detected by said position-detector is input with a delay with regard to an input of the driving-instruction-signal.

31. The step-motor-driving device as defined in claim 30, wherein the driving-winding comprises a first-phase driving-winding and a second-phase driving-winding having a phase-difference of 90 degree of electrical angle in between;

wherein said position detector comprises:

a first sensor mounted to a stator for outputting a signal in the advanced-phase with regard to the inductive voltage generated by a first-phase driving-winding when said step-motor rotates in the positive direction;

a second sensor mounted to the stator for outputting a signal in the advanced-phase with regard to the inductive voltage generated by a second-phase driving-winding when said step-motor rotates in the positive direction; and a position-signal-generator for receiving each output from the first and the second sensors, and for generating respective position-detecting-signals corresponding to the driving-windings of each phase, wherein each sensor outputs the signal in the advanced-phase by approximately 45 degree of electrical angle with regard to an inductive voltage generated by respective driving-windings of each phase, wherein when said step-motor is instructed to rotate in the positive direction, said position-signal-generator allows the output signal from said first sensor to be the position-detecting-signal and to correspond to the first-phase driving-winding as well as allows the output signal from said second sensor to be the position-detecting-signal and to correspond to the second-phase driving-winding, wherein when said step-motor is instructed to rotate in the negative direction, said position-signal-generator allows a signal reversed to the output signal from said first sensor to be the position-detecting-signal and to correspond to the second-phase driving-winding as well as allows the output signal from said second sensor to be the position-detecting-signal and to correspond to the first-phase driving-winding.

32. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal;

(d) an exciting-current-controller for outputting an exciting-current-control-signal as a current-value-signal to said exciter responsive to a phase-difference between a driving-instruction-signal and the position-detecting-signal, both of which are fed into said exciter, wherein said position detector outputs the position-detecting-signal indicating an advanced-phase with regard to an inductive voltage generated by the driving-winding, wherein when an excitation-switch of the driving-winding responsive to the driving-instruction-signal directs torque in a direction effective for said step-motor to rotate in a desirable direction, said exciting-current-controller changes the exciting-current-control-signal to reduce a maximum exciting-current of the driving-winding responsive to the phase difference between the driving-instruction-signal and the position-detecting-signal, and wherein when the excitation-switch of the driving-winding responsive to the driving-instruction-signal directs the torque in a direction reverse to the desirable direction, said exciting-current-controller changes the exciting-current-control-signal to increase the maximum exciting-current of the driving-winding responsive to the phase difference between the driving-instruction-signal and the position-detecting-signal, wherein said exciting-current-controller comprises:

an exciting-current-decrease-halter including a halt-width-generator; and an exciting-current-boosting-interrupter including an interrupt-width-generator, wherein said halter halts the exciting-current-control-signal from changing this change induces the maximum exciting-current of the driving-winding to decrease while said halt-width-generator keeps supplying an exciting-current-decrease-halting-signal, and wherein said exciting-current-boosting-interrupter outputs an exciting-signal-boosting-interrupt-signal during a period since the interrupt-width-generator outputs an interrupt-enable-signal responding to an output from said position detector and then the driving-instruction-signal changes while an interrupt-enable-signal is supplied until a supply of the interrupt-enable-signal is completed, and said interrupter changes the exciting-current-control-signal to increase the maximum exciting-current of the driving-winding while the exciting-current-boosting-interrupt-signal is kept supplying.

33. A step-motor-driving device comprising:

(a) a step-motor having a driving-winding for plurality of phases;

(b) a position detector for detecting a mover of said step-motor and outputting a position-detecting-signal;

(c) an exciter for supplying power to excite the driving-winding wherein said exciter receives the exciting signal and a current-value-signal, then switches an excitation of the driving-winding responsive to the exciting signal, and determines a maximum exciting current responsive to the current-value-signal;

(d) an excitation-timing-controller for receiving a driving-instruction-signal and the position-detecting-signal, and for outputting the exciting signal to said exciter responsive to an input of one of the driving-instruction-signal and the position-detecting-signal; and (e) an exciting-current-controller for outputting a current-value-signal to said exciter responsive to a phase-difference between the driving-instruction-signal and the position-detecting-signal, wherein when an exciting-switch of the driving-winding responsive to the driving-instruction-signal directs torque in a direction effective for said step-motor to rotate in a desirable direction, said excitation-timing-controller outputs the exciting signal responsive to an input of the driving-instruction-signal, and said exciting-current-controller changes the exciting-current-control-signal to decrease a maximum exciting-current of the driving-winding responsive to a phase difference between the driving-instruction-signal and the position-detecting-signal, wherein when an exciting-switch of the driving-winding responsive to the driving-instruction-signal directs the torque in a direction reverse to the desirable direction, said excitation-timing-controller outputs the exciting signal responsive to an input of the position-detecting-signal, and said exciting-current-controller changes the exciting-current-control-signal to increase the maximum exciting-current of the driving-winding responsive to the phase difference between the driving-instruction-signal and the position-detecting-signal, wherein said position detector outputs the position-detecting-signal in an advanced-phase with regard to an inductive voltage generated by the driving-winding, and wherein said exciting-current-controller comprises:

an exciting-current-decrease-halter including a halt-width-generator; and an exciting-current-boosting-interrupter including an interrupt-width-generator, wherein said halter halts the exciting-current-control-signal from changing this change induces the maximum exciting-current of the driving-winding to decrease while said halt-width-generator keeps supplying an exciting-current-decrease-halting-signal responsive to an output from the position-detecting-signal, and wherein said exciting-current-boosting-interrupter outputs an exciting-signal-boosting-interrupt-signal during a period since the interrupt-width-generator outputs an interrupt-enable-signal responding to an output from said position detector and then the driving-instruction-signal changes while an interrupt-enable-signal is supplied until a supply of the interrupt-enable-signal is completed, and said interrupter changes the exciting-current-control-signal to increase a maximum exciting-current of the driving-winding while the exciting-current-boosting-interrupt-signal is kept supplying.

34. The step-motor-driving device as defined in claim 32 or 33, wherein the exciting-current-decrease-halting-signal supplied by the halt-width-generator and the interrupt-enable-signal supplied by the interrupt-width-generator are output for a longer period than a period corresponding to the advanced-phase of the position-detecting-signal with regard to the inductive voltage generated by the driving-winding.

35. The step-motor-driving device as defined in claim 32 or 33, wherein the exciting-current-decrease-halting-signal supplied by the halt-width-generator is output for a longer period than a period corresponding to the advanced-phase of the position-detecting-signal with regard to the inductive voltage generated by the driving-winding, and the interrupt-enable-signal supplied by the interrupt-width-generator is supplied for a shorter period than a period during which the exciting-current-decrease-halting-signal is supplied.

36. The step-motor-driving device as defined in claim 32 or 33, wherein one of the exciting-current-decrease-halting-signal supplied by the halt-width-generator and the interrupt-enable-signal supplied by the interrupt-width-generator is output for a period responsive to a speed of said mover every time the position-detecting-signal supplied by said position detector is input.

37. The step-motor-driving device as defined in claim 32 or 33, wherein one of the exciting-current-decrease-halting-signal supplied by the halt-width-generator and the interrupt-enable-signal supplied by the interrupt-width-generator is output for a given period every time the position-detecting-signal supplied by said position detector is input.

38. The step-motor-driving device as defined in claim 6, 7, 15, 18, 19, 20, 21, 22, 32 or 33, further comprising a start-stop-exciter for allowing the current-value-signal to increase compulsorily the exciting-current of the driving-winding at starting said step-motor and at holding said step-motor for positioning.

39. The step-motor-driving device as defined in claim 38, wherein said start-stop-exciter includes a frequency discriminator for discriminating whether or not a frequency of the driving-instruction-signal is lower than a given value, and when the frequency discriminator discriminates that the frequency of the driving-instruction-signal is lower than the given value, the discriminator considers the frequency value as a time for one of starting said step-motor and halting said step-motor for positioning, then increases compulsorily the exciting-current of the driving-winding.

40. The step-motor-driving device as defined in claim 38, wherein said start-stop-exciter includes a speed detector for determining whether or not a driving speed of the mover of said step-motor is lower than a given value, and when the speed detector determines that the driving speed is lower than the given value, the speed detector considers the driving speed as a time for one of starting said step-motor and halting said step-motor for positioning, then increases compulsorily the exciting-current of the driving-winding, wherein the speed detector comprises:

a position-signal-frequency-detector for detecting a frequency of the position-detecting-signal responsive to an output change of the position-detecting-signal; and a protector for allowing the output change of the position-detecting-signal to be effective only when an instruction of a driving-direction agrees with a driving direction of the mover, and wherein the speed detector detects the driving speed of the mover by measuring a time span from an effective output change of the position-detecting signal until a next effective output thereof.

41. The step-motor-driving device as defined in claim 6, 7, 15, 19, 20, 21, 22, 32 or 33, wherein said exciting-current-controller includes an integrator for integrating the phase difference between the driving-instruction-signal and the position-detecting-signal, and outputs the exciting-current-control-signal based on an output from the integrator;

wherein the integrator halts an integrating operation and stores an output value of the exciting-current-control-signal just before said step-motor is stopped, when said step-motor is stopped by reducing the exciting-current nearly to 0 (zero) or said step-motor is halted by generating holding torque, wherein the integrator re-starts the integrating operation and starts supplying the exciting-current-control-signal at the output value stored, when said step-motor is re-driven.

42. The step-motor-driving device as defined in claim 38, wherein said exciting-current-controller includes an integrator for integrating the phase difference between the driving-instruction-signal and the position-detecting-signal, and said controller outputs the exciting-control-signal based on an output from the integrator, wherein the integrator halts an integrating operation and stores an output value of the exciting-current-control-signal just before said step-motor is stopped, when said step-motor is stopped by reducing the exciting-current nearly to θ(zero) or said step-motor is halted by generating holding torque, wherein the integrator re-starts the integrating operation and starts supplying the exciting-current-control-signal at the output value stored, when said step-motor is re-driven.

43. The step-motor-driving device as defined in claim 1, 6, 7, 9, 15, 18, 19, 20, 21, 22, 25, 27, 30, 32 or 33, wherein when said deviation detector detects the deviation falls into one of the second status and the third status, said device transmits a signal indicating that the driving-instruction-signal is out of sync from the position-detecting-signal to an upper-class-device.

44. The step-motor-driving device as defined in claim 38, wherein when said deviation detector detects the deviation falls into one of the second status and the third status, said device transmits a signal indicating that the driving-instruction-signal is out of sync from the position-detecting-signal to an upper-class-device.

45. The step-motor-driving device as defined in claim 41, wherein when said deviation detector detects the deviation falls into one of the second status and the third status, said device transmits a signal indicating that the driving-instruction-signal is out of sync from the position-detecting-signal to an upper-class-device.

* * * * *